(12) United States Patent
Das et al.

(10) Patent No.: US 9,161,313 B2
(45) Date of Patent: Oct. 13, 2015

(54) METHODS AND APPARATUS FOR COMMUNICATING AND/OR USING TRANSMISSION POWER INFORMATION

(71) Applicant: Qualcomm Incorporated, San Diego, CA (US)

(72) Inventors: Arnab Das, Summit, NJ (US); Sundeep Rangan, Jersey City, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/654,360

(22) Filed: Oct. 17, 2012

(65) Prior Publication Data

US 2013/0230027 A1    Sep. 5, 2013

Related U.S. Application Data

(63) Continuation of application No. 11/333,771, filed on Jan. 17, 2006, now Pat. No. 8,514,771.

(60) Provisional application No. 60/752,973, filed on Dec. 22, 2005.

(51) Int. Cl.
*H04W 52/14*    (2009.01)
*H04W 52/16*    (2009.01)
(Continued)

(52) U.S. Cl.
CPC ............ *H04W 52/146* (2013.01); *H04B 17/24* (2015.01); *H04W 52/16* (2013.01); *H04W 52/367* (2013.01); *H04W 24/10* (2013.01); *H04W 52/54* (2013.01)

(58) Field of Classification Search
CPC . H04W 52/00; H04W 52/146; H04W 52/367; H04W 52/16; H04W 24/10; H04W 52/54; H04B 17/24

USPC ........... 370/329, 336, 341, 349; 455/509, 522
See application file for complete search history.

(56) References Cited

U.S. PATENT DOCUMENTS 4,631,720 A    12/1986  Koeck
4,660,196 A     4/1987  Gray et al.
(Continued)

FOREIGN PATENT DOCUMENTS

CN    1159262 A    9/1997
CN    1159286 A    9/1997
(Continued)

OTHER PUBLICATIONS

3GPP: ETSI TS 125 331 V6.3.0: Radio Resource Control (RRC) protocol specification (3GPP TS 25.331 version 6.3.0 Release 6), Sep. 1, 2004, pp. 49, 202-209, 220,221,406,579-585, 589, 930.
(Continued)

*Primary Examiner* — Paul H Masur
*Assistant Examiner* — Kabir Jahangir
(74) *Attorney, Agent, or Firm* — Dalei Dong

(57) ABSTRACT

A wireless terminal determines the transmission power used for its dedicated control channel at a point in time, and generates a power report indicating a ratio of a maximum wireless terminal transmit power to the transmit power of the dedicated control channel at the point in time. The power report provides a measure of available transmit power for wireless terminal use for other purposes, e.g., uplink traffic channels, after taking into consideration the transmit power used for the dedicated control channel. The point in time has a known time offset from the start of a communications segment in which the power report is transmitted. This allows the base station receiving dedicated control channel uplink signals from the wireless terminal to measure the received signals, receive and process the communicated power report, and correlate information to be used for accurate wireless terminal closed loop power control.

18 Claims, 66 Drawing Sheets

(51) Int. Cl.
*H04W 52/36* (2009.01)
*H04B 17/24* (2015.01)
*H04W 24/10* (2009.01)
*H04W 52/54* (2009.01)

(56) References Cited

U.S. PATENT DOCUMENTS

| | | |
|---|---|---|
| 4,679,244 A | 7/1987 | Kawasaki et al. |
| 4,833,701 A | 5/1989 | Comroe et al. |
| 5,128,938 A | 7/1992 | Borras |
| 5,203,013 A | 4/1993 | Breeden et al. |
| 5,387,905 A | 2/1995 | Grube et al. |
| 5,434,848 A | 7/1995 | Chimento, Jr. et al. |
| 5,461,645 A | 10/1995 | Ishii |
| 5,465,389 A | 11/1995 | Agrawal et al. |
| 5,506,865 A | 4/1996 | Weaver, Jr. |
| 5,537,414 A | 7/1996 | Takiyasu et al. |
| 5,579,307 A | 11/1996 | Richetta et al. |
| 5,732,328 A | 3/1998 | Mitra et al. |
| 5,835,847 A | 11/1998 | Gilmore et al. |
| 5,867,478 A | 2/1999 | Baum et al. |
| 5,898,925 A | 4/1999 | Honkasalo et al. |
| 5,914,950 A | 6/1999 | Tiedemann, Jr. et al. |
| 5,915,221 A | 6/1999 | Sawyer et al. |
| 5,923,650 A | 7/1999 | Chen et al. |
| 5,933,421 A | 8/1999 | Alamouti et al. |
| 5,940,771 A | 8/1999 | Gollnick et al. |
| 5,966,657 A | 10/1999 | Sporre |
| 5,966,662 A | 10/1999 | Murto |
| 5,978,657 A | 11/1999 | Suzuki |
| 5,999,534 A | 12/1999 | Kim |
| 6,002,676 A | 12/1999 | Fleming |
| 6,004,276 A | 12/1999 | Wright et al. |
| 6,026,081 A | 2/2000 | Hamabe |
| 6,028,842 A | 2/2000 | Chapman et al. |
| 6,028,843 A | 2/2000 | Delp et al. |
| 6,035,000 A | 3/2000 | Bingham |
| 6,069,871 A | 5/2000 | Sharma et al. |
| 6,070,072 A | 5/2000 | Dorenbosch et al. |
| 6,073,025 A | 6/2000 | Chheda et al. |
| 6,075,025 A | 6/2000 | Bishop et al. |
| 6,122,270 A | 9/2000 | Whinnett et al. |
| 6,128,506 A | 10/2000 | Knutsson et al. |
| 6,131,016 A | 10/2000 | Greenstein et al. |
| 6,141,565 A | 10/2000 | Feuerstein et al. |
| 6,169,896 B1 | 1/2001 | Sant et al. |
| 6,173,005 B1 | 1/2001 | Kotzin et al. |
| 6,181,948 B1 | 1/2001 | Kondo |
| 6,201,793 B1 | 3/2001 | Chen et al. |
| 6,205,129 B1 | 3/2001 | Esteves et al. |
| 6,215,791 B1 | 4/2001 | Kim |
| 6,236,646 B1 | 5/2001 | Beming et al. |
| 6,256,478 B1 | 7/2001 | Allen et al. |
| 6,259,927 B1 | 7/2001 | Butovitsch et al. |
| 6,263,392 B1 | 7/2001 | McCauley |
| 6,298,233 B1 | 10/2001 | Souissi et al. |
| 6,308,080 B1 | 10/2001 | Burt et al. |
| 6,310,857 B1 | 10/2001 | Duffield et al. |
| 6,311,065 B1 | 10/2001 | Ushiki et al. |
| 6,374,085 B1 | 4/2002 | Saints et al. |
| 6,377,583 B1 | 4/2002 | Lyles et al. |
| 6,377,955 B1 | 4/2002 | Hartmann et al. |
| 6,405,047 B1 | 6/2002 | Moon |
| 6,414,946 B1 | 7/2002 | Satou et al. |
| 6,445,917 B1 | 9/2002 | Bark et al. |
| 6,453,151 B1 | 9/2002 | Kiang et al. |
| 6,493,539 B1 | 12/2002 | Falco et al. |
| 6,526,281 B1 | 2/2003 | Gorsuch et al. |
| 6,538,986 B2 | 3/2003 | Isaksson et al. |
| 6,545,999 B1 | 4/2003 | Sugita |
| 6,549,780 B2 | 4/2003 | Schiff et al. |
| 6,553,336 B1 | 4/2003 | Johnson et al. |
| 6,590,890 B1 | 7/2003 | Stolyar et al. |
| 6,597,914 B1 | 7/2003 | Silventoinen et al. |
| 6,597,922 B1 | 7/2003 | Ling et al. |
| 6,600,903 B1 | 7/2003 | Lilja et al. |
| 6,609,007 B1 | 8/2003 | Eibling et al. |
| 6,621,808 B1 | 9/2003 | Sadri |
| 6,625,133 B1 | 9/2003 | Balachandran et al. |
| 6,662,024 B2 | 12/2003 | Walton et al. |
| 6,671,512 B2 | 12/2003 | Laakso |
| 6,680,909 B1 | 1/2004 | Bansal et al. |
| 6,697,417 B2 | 2/2004 | Fernandez-Corbaton et al. |
| 6,710,651 B2 | 3/2004 | Forrester |
| 6,728,551 B2 | 4/2004 | Chang |
| 6,742,020 B1 | 5/2004 | Dimitroff et al. |
| 6,745,003 B1 | 6/2004 | Maca et al. |
| 6,745,044 B1* | 6/2004 | Holtzman et al. ............ 455/522 |
| 6,751,187 B2 | 6/2004 | Walton et al. |
| 6,771,934 B2 | 8/2004 | Demers et al. |
| 6,788,963 B2 | 9/2004 | Laroia et al. |
| 6,798,761 B2 | 9/2004 | Cain et al. |
| 6,804,289 B2 | 10/2004 | Takahashi |
| 6,804,521 B2 | 10/2004 | Tong et al. |
| 6,807,428 B2 | 10/2004 | Casaccia |
| 6,816,476 B2 | 11/2004 | Kim et al. |
| 6,836,673 B1 | 12/2004 | Trott |
| 6,865,168 B1 | 3/2005 | Sekine |
| 6,889,056 B2 | 5/2005 | Shibutani |
| 6,892,071 B2 | 5/2005 | Park et al. |
| 6,895,005 B1 | 5/2005 | Malin et al. |
| 6,895,364 B2 | 5/2005 | Banfer |
| 6,901,268 B2 | 5/2005 | Chang |
| 6,901,270 B1 | 5/2005 | Beach |
| 6,904,016 B2 | 6/2005 | Kuo et al. |
| 6,912,405 B2 | 6/2005 | Hiramatsu et al. |
| 6,917,607 B1 | 7/2005 | Yeom et al. |
| 6,940,827 B2 | 9/2005 | Li et al. |
| 6,954,643 B2 | 10/2005 | Petrus |
| 6,957,072 B2 | 10/2005 | Kangras et al. |
| 6,967,937 B1 | 11/2005 | Gormley |
| 6,968,156 B2 | 11/2005 | Sugaya et al. |
| 7,006,841 B2 | 2/2006 | Monogioudis et al. |
| 7,024,460 B2 | 4/2006 | Koopmas et al. |
| 7,027,782 B2 | 4/2006 | Moon et al. |
| 7,031,983 B2 | 4/2006 | Israni et al. |
| 7,034,254 B2 | 4/2006 | Grabowski et al. |
| 7,039,029 B2 | 5/2006 | Lee et al. |
| 7,043,254 B2 | 5/2006 | Chawla et al. |
| 7,047,009 B2 | 5/2006 | Laroia et al. |
| 7,054,643 B2 | 5/2006 | Trossen et al. |
| 7,061,885 B2 | 6/2006 | Kurtz |
| 7,092,672 B1 | 8/2006 | Pekonen et al. |
| 7,120,123 B1 | 10/2006 | Quigley et al. |
| 7,120,448 B2 | 10/2006 | Brouwer |
| 7,123,910 B2 | 10/2006 | Lucidarme et al. |
| 7,139,536 B2 | 11/2006 | Chiu |
| 7,142,548 B2 | 11/2006 | Fong et al. |
| 7,142,864 B2 | 11/2006 | Laroia et al. |
| 7,146,172 B2 | 12/2006 | Li et al. |
| 7,158,796 B2 | 1/2007 | Tiedemann, Jr. et al. |
| 7,161,909 B2 | 1/2007 | Sharma |
| 7,162,203 B1 | 1/2007 | Brunner |
| 7,164,883 B2 | 1/2007 | Rappaport et al. |
| 7,197,025 B2 | 3/2007 | Chuah |
| 7,203,493 B2 | 4/2007 | Fujii et al. |
| 7,212,821 B2 | 5/2007 | Laroia et |
| 7,218,948 B2 | 5/2007 | Laroia et al. |
| 7,245,935 B2 | 7/2007 | Lin |
| 7,260,054 B2 | 8/2007 | Olszewski |
| 7,269,406 B2 | 9/2007 | Qi |
| 7,277,709 B2 | 10/2007 | Vadgama |
| 7,277,737 B1 | 10/2007 | Vollmer et al. |
| 7,280,814 B2 | 10/2007 | Austin et al. |
| 7,283,559 B2 | 10/2007 | Cho et al. |
| 7,283,836 B2 | 10/2007 | Hwang et al. |
| 7,299,277 B1 | 11/2007 | Moran et al. |
| 7,317,921 B2 | 1/2008 | Mueckenheim et al. |
| 7,319,680 B2 | 1/2008 | Cho |
| 7,321,563 B2 | 1/2008 | Kim et al. |
| 7,340,267 B2 | 3/2008 | Budka et al. |
| 7,349,667 B2 | 3/2008 | Magee et al. |
| 7,356,635 B2 | 4/2008 | Woodings et al. |
| 7,362,702 B2 | 4/2008 | Terrell et al. |

(56) References Cited

U.S. PATENT DOCUMENTS

| | | | |
|---|---|---|---|
| 7,382,755 B2 | 6/2008 | Dugad et al. | |
| 7,395,058 B1 | 7/2008 | Kalofonos et al. | |
| 7,397,803 B2 | 7/2008 | Love et al. | |
| 7,400,901 B2 | 7/2008 | Kostic et al. | |
| 7,412,265 B2 | 8/2008 | Chen et al. | |
| 7,418,260 B2 | 8/2008 | Lucidarme | |
| 7,420,939 B2 | 9/2008 | Laroia et al. | |
| 7,430,206 B2 | 9/2008 | Terry et al. | |
| 7,430,207 B2 | 9/2008 | Wu et al. | |
| 7,430,420 B2 | 9/2008 | Derakhshan et al. | |
| 7,447,148 B2 | 11/2008 | Gao et al. | |
| 7,463,577 B2 | 12/2008 | Sudo et al. | |
| 7,486,620 B2 | 2/2009 | Seol | |
| 7,486,638 B2 | 2/2009 | Ofuji et al. | |
| 7,502,614 B2 | 3/2009 | Uchida et al. | |
| 7,508,792 B2 | 3/2009 | Petrovic et al. | |
| 7,510,828 B2 | 3/2009 | Lynn et al. | |
| 7,512,076 B2 | 3/2009 | Kwon et al. | |
| 7,512,185 B2 | 3/2009 | Sharon et al. | |
| 7,519,013 B2 | 4/2009 | Destino et al. | |
| 7,519,033 B2 | 4/2009 | Soomro | |
| 7,522,544 B2 | 4/2009 | Cheng et al. | |
| 7,525,971 B2 | 4/2009 | Carroll et al. | |
| 7,526,091 B2 | 4/2009 | Jeong et al. | |
| 7,539,475 B2 | 5/2009 | Laroia et al. | |
| 7,558,235 B2 | 7/2009 | Lester et al. | |
| 7,558,572 B2 | 7/2009 | Anigstein | |
| 7,561,893 B2 | 7/2009 | Moulsley et al. | |
| 7,668,573 B2 | 2/2010 | Laroia et al. | |
| 7,743,284 B1 | 6/2010 | Taylor et al. | |
| 7,986,672 B2 | 7/2011 | Tiedemann, Jr. et al. | |
| 8,040,831 B2 | 10/2011 | Kurtz et al. | |
| 8,190,163 B2 | 5/2012 | Laroia et al. | |
| 8,233,462 B2 | 7/2012 | Walton et al. | |
| 8,284,752 B2 | 10/2012 | Ketchum et al. | |
| 8,325,621 B2 | 12/2012 | Simonsson et al. | |
| 8,437,251 B2 | 5/2013 | Das et al. | |
| 8,989,084 B2 | 3/2015 | Hande et al. | |
| 2001/0007552 A1 | 7/2001 | Schiff et al. | |
| 2001/0036181 A1 | 11/2001 | Rogers | |
| 2001/0046878 A1 | 11/2001 | Chang | |
| 2001/0055293 A1* | 12/2001 | Parsa et al. | 370/342 |
| 2002/0012326 A1 | 1/2002 | Chang | |
| 2002/0031105 A1 | 3/2002 | Zeira et al. | |
| 2002/0037729 A1 | 3/2002 | Kitazawa et al. | |
| 2002/0045448 A1 | 4/2002 | Park et al. | |
| 2002/0049040 A1 | 4/2002 | Sugaya et al. | |
| 2002/0075835 A1 | 6/2002 | Krishnakumar et al. | |
| 2002/0077140 A1 | 6/2002 | Monogioudis et al. | |
| 2002/0080967 A1 | 6/2002 | Abdo et al. | |
| 2002/0082011 A1 | 6/2002 | Fujii et al. | |
| 2002/0085516 A1 | 7/2002 | Bridgelall | |
| 2002/0093953 A1 | 7/2002 | Naim et al. | |
| 2002/0107028 A1 | 8/2002 | Rantalainen et al. | |
| 2002/0122431 A1 | 9/2002 | Cho et al. | |
| 2002/0136195 A1 | 9/2002 | Kurtz | |
| 2002/0142788 A1 | 10/2002 | Chawla et al. | |
| 2002/0143858 A1 | 10/2002 | Teague et al. | |
| 2002/0147017 A1 | 10/2002 | Li et al. | |
| 2002/0160802 A1 | 10/2002 | Hiramatsu et al. | |
| 2002/0177452 A1 | 11/2002 | Ruutu et al. | |
| 2002/0186678 A1 | 12/2002 | Averbuch et al. | |
| 2003/0003921 A1 | 1/2003 | Laakso | |
| 2003/0007498 A1 | 1/2003 | Angle et al. | |
| 2003/0012212 A1 | 1/2003 | Earnshaw et al. | |
| 2003/0023412 A1 | 1/2003 | Rappaport et al. | |
| 2003/0027587 A1 | 2/2003 | Proctor, Jr. | |
| 2003/0028606 A1 | 2/2003 | Koopmans et al. | |
| 2003/0064737 A1 | 4/2003 | Eriksson et al. | |
| 2003/0078067 A1 | 4/2003 | Kim et al. | |
| 2003/0083069 A1 | 5/2003 | Vadgama | |
| 2003/0095519 A1 | 5/2003 | Kuo et al. | |
| 2003/0100269 A1* | 5/2003 | Lehtinen et al. | 455/69 |
| 2003/0114180 A1 | 6/2003 | Black et al. | |
| 2003/0123396 A1 | 7/2003 | Seo et al. | |
| 2003/0123410 A1 | 7/2003 | Youm | |
| 2003/0139197 A1 | 7/2003 | Kostic et al. | |
| 2003/0144042 A1 | 7/2003 | Weinfield et al. | |
| 2003/0157899 A1 | 8/2003 | Trossen et al. | |
| 2003/0161285 A1 | 8/2003 | Tiedemann et al. | |
| 2003/0169705 A1 | 9/2003 | Knisely et al. | |
| 2003/0185224 A1 | 10/2003 | Ramanan et al. | |
| 2003/0185285 A1 | 10/2003 | Talwar | |
| 2003/0189930 A1 | 10/2003 | Terrell et al. | |
| 2003/0193915 A1 | 10/2003 | Lee et al. | |
| 2003/0198204 A1 | 10/2003 | Taneja et al. | |
| 2003/0198206 A1 | 10/2003 | Cain et al. | |
| 2003/0206541 A1 | 11/2003 | Yun et al. | |
| 2003/0207691 A1 | 11/2003 | Chen | |
| 2003/0207693 A1 | 11/2003 | Roderique | |
| 2003/0214906 A1 | 11/2003 | Hu et al. | |
| 2003/0214928 A1 | 11/2003 | Chuah | |
| 2003/0223354 A1 | 12/2003 | Olszewski | |
| 2004/0001429 A1 | 1/2004 | Ma et al. | |
| 2004/0004954 A1 | 1/2004 | Terry et al. | |
| 2004/0013103 A1 | 1/2004 | Zhang et al. | |
| 2004/0057402 A1 | 3/2004 | Ramos et al. | |
| 2004/0062206 A1 | 4/2004 | Soong et al. | |
| 2004/0081089 A1 | 4/2004 | Ayyagari et al. | |
| 2004/0082344 A1 | 4/2004 | Moilanen et al. | |
| 2004/0085936 A1 | 5/2004 | Gopalakrishnan et al. | |
| 2004/0091026 A1 | 5/2004 | Nakayama | |
| 2004/0111640 A1 | 6/2004 | Baum | |
| 2004/0120411 A1 | 6/2004 | Walton et al. | |
| 2004/0125776 A1 | 7/2004 | Haugli et al. | |
| 2004/0127226 A1 | 7/2004 | Dugad et al. | |
| 2004/0131007 A1 | 7/2004 | Smee et al. | |
| 2004/0141466 A1 | 7/2004 | Kim et al. | |
| 2004/0147262 A1 | 7/2004 | Lescuyer et al. | |
| 2004/0147276 A1 | 7/2004 | Gholmieh et al. | |
| 2004/0160922 A1 | 8/2004 | Nanda et al. | |
| 2004/0162097 A1* | 8/2004 | Vijayan et al. | 455/522 |
| 2004/0166869 A1 | 8/2004 | Laroia et al. | |
| 2004/0166886 A1 | 8/2004 | Laroia et al. | |
| 2004/0166887 A1 | 8/2004 | Laroia et al. | |
| 2004/0171401 A1* | 9/2004 | Balachandran et al. | 455/522 |
| 2004/0180658 A1 | 9/2004 | Uchida et al. | |
| 2004/0184410 A1 | 9/2004 | Park | |
| 2004/0192371 A1 | 9/2004 | Zhao et al. | |
| 2004/0196802 A1 | 10/2004 | Bae et al. | |
| 2004/0203717 A1 | 10/2004 | Wingrowicz et al. | |
| 2004/0203981 A1 | 10/2004 | Budka et al. | |
| 2004/0218617 A1 | 11/2004 | Sagfors | |
| 2004/0223455 A1 | 11/2004 | Fong et al. | |
| 2004/0224677 A1 | 11/2004 | Kuchibhotla et al. | |
| 2004/0228313 A1 | 11/2004 | Cheng et al. | |
| 2004/0233838 A1 | 11/2004 | Sudo et al. | |
| 2004/0235510 A1 | 11/2004 | Elicegui et al. | |
| 2004/0248518 A1 | 12/2004 | Kashiwase | |
| 2004/0248568 A1 | 12/2004 | Lucidarme | |
| 2004/0252662 A1 | 12/2004 | Cho | |
| 2004/0253996 A1 | 12/2004 | Chen et al. | |
| 2004/0258040 A1 | 12/2004 | Joshi et al. | |
| 2004/0259546 A1 | 12/2004 | Balachandran et al. | |
| 2004/0264414 A1 | 12/2004 | Dorenbosch | |
| 2004/0266474 A1 | 12/2004 | Petrus | |
| 2005/0003847 A1 | 1/2005 | Love et al. | |
| 2005/0008892 A1 | 1/2005 | Yamamoto et al. | |
| 2005/0037771 A1 | 2/2005 | Tiedemann et al. | |
| 2005/0037775 A1 | 2/2005 | Moeglein et al. | |
| 2005/0047344 A1 | 3/2005 | Seol | |
| 2005/0047393 A1 | 3/2005 | Liu | |
| 2005/0047416 A1 | 3/2005 | Heo et al. | |
| 2005/0053099 A1 | 3/2005 | Spear et al. | |
| 2005/0058637 A1 | 3/2005 | Lynn et al. | |
| 2005/0064821 A1* | 3/2005 | Hedberg et al. | 455/67.11 |
| 2005/0068892 A1 | 3/2005 | Jalali | |
| 2005/0085197 A1 | 4/2005 | Laroia et al. | |
| 2005/0099987 A1 | 5/2005 | Lester et al. | |
| 2005/0111361 A1 | 5/2005 | Hosein | |
| 2005/0111462 A1 | 5/2005 | Walton et al. | |
| 2005/0118993 A1 | 6/2005 | Roux et al. | |
| 2005/0122900 A1 | 6/2005 | Tuulos et al. | |
| 2005/0124345 A1 | 6/2005 | Laroia et al. | |

(56) References Cited

U.S. PATENT DOCUMENTS

| | | |
|---|---|---|
| 2005/0128999 A1* | 6/2005 | Kwon et al. .................. 370/349 |
| 2005/0135320 A1 | 6/2005 | Tiedemann, Jr. et al. |
| 2005/0136937 A1 | 6/2005 | Qian et al. |
| 2005/0143084 A1 | 6/2005 | Cheng et al. |
| 2005/0143114 A1 | 6/2005 | Moulsley et al. |
| 2005/0152320 A1 | 7/2005 | Marinier et al. |
| 2005/0157803 A1 | 7/2005 | Kim et al. |
| 2005/0157876 A1 | 7/2005 | Jeong et al. |
| 2005/0170782 A1 | 8/2005 | Rong et al. |
| 2005/0181732 A1 | 8/2005 | Kang et al. |
| 2005/0185632 A1 | 8/2005 | Draves, Jr. et al. |
| 2005/0195765 A1 | 9/2005 | Sharon et al. |
| 2005/0201331 A1 | 9/2005 | Gaal et al. |
| 2005/0201353 A1 | 9/2005 | Lee et al. |
| 2005/0207335 A1 | 9/2005 | Schmidl et al. |
| 2005/0207359 A1 | 9/2005 | Hwang et al. |
| 2005/0232154 A1 | 10/2005 | Bang et al. |
| 2005/0243938 A1 | 11/2005 | Armstrong et al. |
| 2005/0249118 A1 | 11/2005 | Terry et al. |
| 2005/0250509 A1 | 11/2005 | Choksi |
| 2005/0250510 A1 | 11/2005 | Kaikkonen et al. |
| 2005/0250529 A1 | 11/2005 | Funnell et al. |
| 2005/0255873 A1* | 11/2005 | Zhang et al. .................. 455/522 |
| 2005/0259662 A1 | 11/2005 | Kim et al. |
| 2005/0265301 A1 | 12/2005 | Heo et al. |
| 2005/0281232 A1 | 12/2005 | Kim et al. |
| 2005/0281278 A1 | 12/2005 | Black et al. |
| 2005/0289256 A1 | 12/2005 | Cudak et al. |
| 2006/0003767 A1 | 1/2006 | Kim et al. |
| 2006/0015357 A1 | 1/2006 | Cagan |
| 2006/0018284 A1 | 1/2006 | Rudolf et al. |
| 2006/0019694 A1 | 1/2006 | Sutivong et al. |
| 2006/0034174 A1 | 2/2006 | Nishibayashi et al. |
| 2006/0040696 A1 | 2/2006 | Lin |
| 2006/0045013 A1 | 3/2006 | Vannithamby et al. |
| 2006/0056346 A1 | 3/2006 | Vadgama et al. |
| 2006/0073836 A1 | 4/2006 | Laroia et al. |
| 2006/0079257 A1 | 4/2006 | Iochi et al. |
| 2006/0079267 A1 | 4/2006 | Kim et al. |
| 2006/0083161 A1 | 4/2006 | Laroia et al. |
| 2006/0089104 A1 | 4/2006 | Kaikkonen et al. |
| 2006/0092881 A1 | 5/2006 | Laroia et al. |
| 2006/0104240 A1 | 5/2006 | Sebire et al. |
| 2006/0120470 A1 | 6/2006 | Hwang et al. |
| 2006/0126497 A1 | 6/2006 | Na et al. |
| 2006/0128410 A1 | 6/2006 | Derryberry et al. |
| 2006/0128412 A1* | 6/2006 | Mantha et al. ................ 455/522 |
| 2006/0133346 A1 | 6/2006 | Chheda et al. |
| 2006/0135193 A1 | 6/2006 | Ratasuk et al. |
| 2006/0140154 A1 | 6/2006 | Kwak et al. |
| 2006/0142032 A1 | 6/2006 | Derakhshan et al. |
| 2006/0164981 A1 | 7/2006 | Olsson et al. |
| 2006/0165029 A1 | 7/2006 | Melpignano et al. |
| 2006/0176807 A1 | 8/2006 | Wu et al. |
| 2006/0182022 A1 | 8/2006 | Abedi |
| 2006/0203765 A1 | 9/2006 | Laroia et al. |
| 2006/0205356 A1 | 9/2006 | Laroia et al. |
| 2006/0205396 A1 | 9/2006 | Laroia et al. |
| 2006/0215604 A1 | 9/2006 | Mueckenheim et al. |
| 2006/0234722 A1 | 10/2006 | Hanebeck et al. |
| 2006/0245452 A1 | 11/2006 | Frederiksen et al. |
| 2006/0246916 A1 | 11/2006 | Cheng et al. |
| 2006/0270399 A1 | 11/2006 | Qi |
| 2006/0285481 A1 | 12/2006 | Lane et al. |
| 2006/0287743 A1 | 12/2006 | Sampath et al. |
| 2007/0002757 A1 | 1/2007 | Soomro et al. |
| 2007/0002806 A1 | 1/2007 | Soomro |
| 2007/0004437 A1 | 1/2007 | Harada et al. |
| 2007/0010226 A1 | 1/2007 | Laroia et al. |
| 2007/0015541 A1 | 1/2007 | Dominique et al. |
| 2007/0026803 A1 | 2/2007 | Malm |
| 2007/0026808 A1 | 2/2007 | Love et al. |
| 2007/0026810 A1 | 2/2007 | Love et al. |
| 2007/0030828 A1 | 2/2007 | Vimpari et al. |
| 2007/0036116 A1 | 2/2007 | Eiger et al. |
| 2007/0054624 A1 | 3/2007 | Kashiwagi |
| 2007/0057952 A1 | 3/2007 | Swedberg et al. |
| 2007/0066273 A1 | 3/2007 | Laroia et al. |
| 2007/0070894 A1 | 3/2007 | Wang et al. |
| 2007/0081492 A1 | 4/2007 | Petrovic et al. |
| 2007/0081498 A1 | 4/2007 | Niwano |
| 2007/0104128 A1 | 5/2007 | Laroia et al. |
| 2007/0104164 A1 | 5/2007 | Laroia et al. |
| 2007/0109999 A1 | 5/2007 | Brunner |
| 2007/0133412 A1 | 6/2007 | Hutter et al. |
| 2007/0140168 A1 | 6/2007 | Laroia et al. |
| 2007/0140179 A1 | 6/2007 | Zhang et al. |
| 2007/0141994 A1 | 6/2007 | Cheng |
| 2007/0147283 A1 | 6/2007 | Laroia et al. |
| 2007/0147377 A1 | 6/2007 | Laroia et al. |
| 2007/0149126 A1 | 6/2007 | Rangan et al. |
| 2007/0149128 A1 | 6/2007 | Das et al. |
| 2007/0149129 A1 | 6/2007 | Das et al. |
| 2007/0149131 A1 | 6/2007 | Li et al. |
| 2007/0149132 A1 | 6/2007 | Li et al. |
| 2007/0149137 A1 | 6/2007 | Richardson et al. |
| 2007/0149138 A1 | 6/2007 | Das |
| 2007/0149194 A1 | 6/2007 | Das et al. |
| 2007/0149227 A1 | 6/2007 | Parizhsky et al. |
| 2007/0149228 A1 | 6/2007 | Das |
| 2007/0149238 A1 | 6/2007 | Das et al. |
| 2007/0159969 A1 | 7/2007 | Das et al. |
| 2007/0168326 A1 | 7/2007 | Das et al. |
| 2007/0169326 A1 | 7/2007 | Smith |
| 2007/0173208 A1 | 7/2007 | Nishio et al. |
| 2007/0183308 A1 | 8/2007 | Korobkov et al. |
| 2007/0213087 A1 | 9/2007 | Laroia et al. |
| 2007/0243882 A1 | 10/2007 | Edge |
| 2007/0249287 A1 | 10/2007 | Das et al. |
| 2007/0249360 A1 | 10/2007 | Das et al. |
| 2007/0253355 A1 | 11/2007 | Hande et al. |
| 2007/0253357 A1 | 11/2007 | Das et al. |
| 2007/0253358 A1 | 11/2007 | Das et al. |
| 2007/0253385 A1 | 11/2007 | Li et al. |
| 2007/0253449 A1 | 11/2007 | Das et al. |
| 2007/0258365 A1 | 11/2007 | Das et al. |
| 2008/0031368 A1 | 2/2008 | Lindoff et al. |
| 2008/0037474 A1 | 2/2008 | Niwano |
| 2008/0051086 A2 | 2/2008 | Etemad et al. |
| 2008/0057969 A1 | 3/2008 | Agami et al. |
| 2008/0076462 A1 | 3/2008 | Iochi et al. |
| 2008/0144521 A1 | 6/2008 | Soomro et al. |
| 2008/0159235 A1 | 7/2008 | Son et al. |
| 2008/0167047 A1 | 7/2008 | Abedi |
| 2009/0004983 A1 | 1/2009 | Darabi |
| 2009/0034455 A1 | 2/2009 | Lee et al. |
| 2009/0103507 A1 | 4/2009 | Gu et al. |
| 2009/0106507 A1 | 4/2009 | Skerlj et al. |
| 2009/0303900 A1 | 12/2009 | Cho et al. |
| 2010/0220626 A1 | 9/2010 | Das et al. |
| 2011/0090812 A1 | 4/2011 | Aoyama |
| 2011/0149789 A1 | 6/2011 | Edge |
| 2012/0140756 A1 | 6/2012 | Rudolf et al. |
| 2013/0242888 A1 | 9/2013 | Das et al. |
| 2015/0043374 A1 | 2/2015 | Hande et al. |

FOREIGN PATENT DOCUMENTS

| | | |
|---|---|---|
| CN | 1265792 | 9/2000 |
| CN | 1286006 A | 2/2001 |
| CN | 1286821 A | 3/2001 |
| CN | 1286832 A | 3/2001 |
| CN | 1316140 | 10/2001 |
| CN | 1335036 A | 2/2002 |
| CN | 1338877 A | 3/2002 |
| CN | 1507708 | 6/2004 |
| CN | 1545252 A | 11/2004 |
| CN | 1604685 A | 4/2005 |
| DE | 10162564 A1 | 7/2003 |
| EP | 1037419 A2 | 9/2000 |
| EP | 1037491 A1 | 9/2000 |
| EP | 1054518 A1 | 11/2000 |
| EP | 1089500 A2 | 4/2001 |
| EP | 1179962 A2 | 2/2002 |

(56) References Cited

FOREIGN PATENT DOCUMENTS

| | | |
|---|---|---|
| EP | 1180881 A1 | 2/2002 |
| EP | 1180907 A2 | 2/2002 |
| EP | 1207645 A1 | 5/2002 |
| EP | 1221273 A1 | 7/2002 |
| EP | 1233637 A1 | 8/2002 |
| EP | 1493284 A1 | 1/2005 |
| EP | 1511245 A2 | 3/2005 |
| EP | 1564953 A2 | 8/2005 |
| EP | 1571762 A1 | 9/2005 |
| EP | 1594260 A1 | 11/2005 |
| EP | 1377100 A2 | 1/2007 |
| EP | 1758276 A1 | 2/2007 |
| EP | 1841259 A2 | 10/2007 |
| GB | 2340693 A | 2/2000 |
| JP | 06268574 | 9/1994 |
| JP | 08008806 | 1/1996 |
| JP | 8503591 | 4/1996 |
| JP | 9275582 A | 10/1997 |
| JP | 09307939 | 11/1997 |
| JP | 10022975 A | 1/1998 |
| JP | 10173585 | 6/1998 |
| JP | 11122167 A | 4/1999 |
| JP | 2000049689 A | 2/2000 |
| JP | 2001007761 | 1/2001 |
| JP | 2001016152 | 1/2001 |
| JP | 2001510974 | 8/2001 |
| JP | 2001512921 T | 8/2001 |
| JP | 2001251680 A | 9/2001 |
| JP | 2001523901 T | 11/2001 |
| JP | 2001525135 T | 12/2001 |
| JP | 2002077992 | 3/2002 |
| JP | 2002111627 | 4/2002 |
| JP | 2002262330 A | 9/2002 |
| JP | 2003018641 A | 1/2003 |
| JP | 2003509983 A | 3/2003 |
| JP | 2003510887 | 3/2003 |
| JP | 2003520153 A | 7/2003 |
| JP | 2003244161 | 8/2003 |
| JP | 2004153585 | 5/2004 |
| JP | 2004297284 A | 10/2004 |
| JP | 2004533731 | 11/2004 |
| JP | 2004350052 | 12/2004 |
| JP | 2005073276 | 3/2005 |
| JP | 2005130482 | 5/2005 |
| JP | 2005136773 A | 5/2005 |
| JP | 2005142965 A | 6/2005 |
| JP | 2005333671 | 12/2005 |
| JP | 2006514735 A | 5/2006 |
| JP | 2006526323 A | 11/2006 |
| JP | 2007503156 A | 2/2007 |
| JP | 2007514364 A | 5/2007 |
| JP | 2007514378 T | 5/2007 |
| JP | 2011045054 | 3/2011 |
| JP | 2006524966 T | 5/2011 |
| KR | 1019990084525 | 12/1999 |
| KR | 20010014223 | 2/2001 |
| KR | 20040053859 A | 6/2004 |
| KR | 20040084599 A | 10/2004 |
| KR | 20040110044 A | 12/2004 |
| KR | 20050021083 A | 3/2005 |
| KR | 20050023187 A | 3/2005 |
| KR | 20050039376 A | 4/2005 |
| KR | 1020050121274 | 12/2005 |
| KR | 20060012282 A | 2/2006 |
| RU | 2149518 | 5/2000 |
| RU | 2181529 | 4/2002 |
| RU | 2188506 C2 | 8/2002 |
| RU | 2202154 C2 | 4/2003 |
| TW | 200423642 | 11/2004 |
| WO | WO-9408432 | 4/1994 |
| WO | 9623371 | 8/1996 |
| WO | 9845967 A2 | 10/1998 |
| WO | 9856120 | 12/1998 |
| WO | 9907090 A1 | 2/1999 |
| WO | WO-9909779 A1 | 2/1999 |
| WO | 9913600 A1 | 3/1999 |
| WO | 9959254 A2 | 11/1999 |
| WO | 0101610 | 1/2001 |
| WO | WO-0122759 A1 | 3/2001 |
| WO | 0135548 | 5/2001 |
| WO | WO-0142047 A2 | 6/2001 |
| WO | 0182504 | 11/2001 |
| WO | WO-0199291 A2 | 12/2001 |
| WO | 0232183 | 4/2002 |
| WO | 0233841 A1 | 4/2002 |
| WO | 0239760 A2 | 5/2002 |
| WO | 0249305 A2 | 6/2002 |
| WO | 02073831 A1 | 9/2002 |
| WO | 02101941 A2 | 12/2002 |
| WO | 02104058 A1 | 12/2002 |
| WO | 03094544 A1 | 11/2003 |
| WO | 03105498 A1 | 12/2003 |
| WO | WO-2004031918 A2 | 4/2004 |
| WO | 2004077728 A2 | 9/2004 |
| WO | 2004084452 | 9/2004 |
| WO | 2004084503 A2 | 9/2004 |
| WO | 2004100450 A1 | 11/2004 |
| WO | 2004105420 A1 | 12/2004 |
| WO | 2004110081 A1 | 12/2004 |
| WO | WO-2005018115 A1 | 2/2005 |
| WO | 2005020490 | 3/2005 |
| WO | 2005034438 A1 | 4/2005 |
| WO | 2005057812 A1 | 6/2005 |
| WO | 2005060132 | 6/2005 |
| WO | 2005060271 A1 | 6/2005 |
| WO | 2005065056 A2 | 7/2005 |
| WO | 2005069519 | 7/2005 |
| WO | 2005125049 | 12/2005 |
| WO | 2006075293 A1 | 7/2006 |
| WO | 2007031956 A2 | 3/2007 |

OTHER PUBLICATIONS

3GPP TSG RAN2#45bis. "EDCH Buffer Status Reporting," R2-050026, Sophia Antipolis, France, Jan. 10-14, 2005, URL: http://www.3gpp.org/ftp/tsg_ran/WG2_RL2/TSGR2_45bis/Dcs/R2-050026.zip.

3GPP TSG-RAN WG2 meeting #48. "Scheduling Information Contents," R2-051957, London, United Kingdom, Aug. 29, 2005, URL: http://3gpp.org/ftp/tsg_ran/WG2_RL2/TSGR2_48/Docments/R2-095517.zip.

Chang, Cheng-Ta: "Downlink Transmit Power Issues in a WCDMA Cellular System," Dec. 14, 2004, p. 3, Fig. 1, Retrieved online: http://wintech.ee.nctu.edu.tw/handoff/MediaTek/Material/Wintech/1214/Downlink%20Transmit%20Power%20Issues%20in%20a%20WCDMA%20Cellular%20System.pdf.

Ericsson: Discussion on SIR Measurement, TSG-RAN Working Group 4 (Radio) meeting #18, R4-010895, Berlin, Germany, 3GPP TS 25.101 V3.7.0, Jul. 9, 2001, URL: http://www.3gpp.org/ftp/tsg_ran/WG4_Radio/TSGR4_18/Docs/R4-010895.zip.

Gunnarson, F., et al.: "Uplink Admission Control in WCDMA Based on Relative Load Estimates", IEEE International Conference on Communications, vol. 1, pp. 3091-3095, IEEE, New York, NY USA (Apr. 28, 2002).

Gunnarsson, G. et al.,"Location Trial System for Mobile Phones," Global Telecommunications Conference, 1998. GLOBECOM 98. The Bridge to Global Integration. IEEE, vol. 4, pp. 2211-2216, Nov. 8-12, 1998.

Hobfeld, T. et al., "Supporting Vertical Handover by Using a Pastry Peer-to-Peer Overlay Network," Fourth Annual IEEE International Conference on Pervasive Computing and Communications Workshops, 2006. PERCOM Workshops 2006. Mar. 13-17, 2006, pp. 163-167, p. 164, paragraph III, IEEE, Piscataway, NJ, USA, XP010910514, ISBN: 0-7695-2520-2.

Hosein, et al., "Optimal Assignment of Mobile Station Serving Sector for the Forward Link of a Time-Shared Wireless Packet Data Channel," Fifth IEE International Conference on 3G Mobile Communication Technologies (3G 2004), Oct. 18-Oct. 20, 2004, pp. 654-658.

IEEE P802.16e/D5: "Draft IEEE Standard for Local and metropolitan area networks, Part 16: Air Interface for Fixed and Mobile Broad-

(56) References Cited

OTHER PUBLICATIONS band Wireless Access Systems Amendment for Physical and Medium Access Control Layers for Combined Fixed and Mobile Operation in Licensed Bands", pp. 1-356, Sep. 2004.

International Search Report—PCT/US2006/048506, International Search Authority—European Patent Office—May 11, 2007.

Kwon, et al., "Quasi-Dedicated Access Scheme for Uplink Realtime Services in Future Wireless Communication Systems," Vehicular Technology Conference, 2005. VTC 2005—Spring. 2005 IEEE 61st Stockholm, Sweden, Apr. 20-May 1, 2005, Piscataway, NJ, USA, May 30, 2005, pp. 3117-3121.

LG Electronics Inc., "Relative Buffer Status Reporting," 3GPP TSG-RAN WG2 meeting #46bis, R2-050852, Apr. 4, 2005, pp. 1-3, URL: http://www.3gpp.org/ftp/tsg_ran/WG2_RL2/TSGR2_46bis/Documents/R2-050852.zip.

Majmundar, "Impact of Mobile-Originated Short Message Service on the Digital Control Channel of TDMA Systems," Vehicular Technology Conference, 2000. IEEE VTS Fall VTC 2000. 52nd Sep. 24-28, 2000, Piscataway, NJ, USA, IEEE, Sep. 24, 2000, pp. 1550-1555.

Samsung: "Uplink control signaling structure (Revision of R1-041086)," 3GPP TSG-RAN WG1 Meeting #38bis, Tdoc R1-041222, 3GPP, Sep. 20, 2004, URL: http://www.3gpp.org/ftp/tsg_ran/WG1_RL1/TSGR1_38bis/Dcs/R1-041222.zip.

TIM/TILAB, Blu, Mobilkom Austria, One2one, Telefonica: "Re-introduction of SIR measurement," 3GPP TSG-RAN4 Meeting #17, R4-010647, 3GPP, Goteborg, Sweden, May 21, 2001, URL: http://www.3gpp.org/ftp/tsg_ran/WG4_Radio/TSGR4_17/Docs/R4-010647.Zip.

Wada, "A Study of OFDM Cellular System Using Single Band" Proceedings 1 of the 2002 Communications Society Conference, Japan, The Institute of Electronics, Information and Communication Engineers, Aug. 20, 2002, p. 355, B-5-58.

Written Opinion—PCT/US2006/048506, International Search Authority—European Patent Office—May 11, 2007.

Zhang H., et al., "Clean up for Closed-Loop MIMO in H-ARQ MAP IE", IEEE P802.16e/D7 Broadband Wireless Access Working Group <http://ieee802.org/16>, Mar. 10, 2010, pp. 1-6.

Taiwan Search Report—TW095148274—TIPO—Jul. 22, 2014.

\* cited by examiner

| Format of ULTxBKF5 | |
|---|---|
| Bits (MSb:LSb) | Reported wtDLPICHSNR |
| 0b00000 | 6.5 dB |
| 0b00001 | 7 dB |
| 0b00010 | 8 dB |
| 0b00011 | 9 dB |
| 0b00100 | 10 dB |
| 0b00101 | 11 dB |
| 0b00110 | 12 dB |
| 0b00111 | 13 dB |
| 0b01000 | 14 dB |
| 0b01001 | 15 dB |
| 0b01010 | 16 dB |
| 0b01011 | 17 dB |
| 0b01100 | 18 dB |
| 0b01101 | 19 dB |
| 0b01110 | 20 dB |
| 0b01111 | 21 dB |
| 0b10000 | 22 dB |
| 0b10001 | 23 dB |
| 0b10010 | 24 dB |
| 0b10011 | 25 dB |
| 0b10100 | 26 dB |
| 0b10101 | 27 dB |
| 0b10110 | 28 dB |
| 0b10111 | 29 dB |
| 0b11000 | 30 dB |
| 0b11001 | 32 dB |
| 0b11010 | 34 dB |
| 0b11011 | 36 dB |
| 0b11100 | 38 dB |
| 0b11101 | 40 dB |
| 0b11110 | Reserved |
| 0b11111 | Reserved |

| Format of DLSSNR4: | |
|---|---|
| Bits (MSb:LSb) | Saturation level of DL SNR |
| 0b0000 | 8.75 dB |
| 0b0001 | 9.5 dB |
| 0b0010 | 11 dB |
| 0b0011 | 12.5 dB |
| 0b0100 | 14 dB |
| 0b0101 | 15.5 dB |
| 0b0110 | 17 dB |
| 0b0111 | 18.5 dB |
| 0b1000 | 20 dB |
| 0b1001 | 21.5 dB |
| 0b1010 | 23 dB |
| 0b1011 | 24.5 dB |
| 0b1100 | 26 dB |
| 0b1101 | 27.5 dB |
| 0b1110 | 29 dB |
| 0b1111 | 29.75 dB |

| Format of TYPE 2 and BODY 4: | |
|---|---|
| Bits (MSb:LSb) | The type of report to be carried in the BODY4 of the same UL.DCCH segment |
| 0b00 | ULRQST4 |
| 0b01 | DLSSNR4 |
| 0b10 | Reserved |
| 0b11 | Reserved |

| Format of ULTxBKF4: | |
|---|---|
| Bits (MSb:LSb) | Reported WT.ULDCCHBackoff |
| 0b0000 | 6 dB |
| 0b0001 | 7 dB |
| 0b0010 | 8 dB |
| 0b0011 | 9 dB |
| 0b0100 | 10 dB |
| 0b0101 | 11 dB |
| 0b0110 | 12 dB |
| 0b0111 | 13 dB |
| 0b1000 | 14 dB |
| 0b1001 | 16 dB |
| 0b1010 | 18 dB |
| 0b1011 | 20 dB |
| 0b1100 | 24 dB |
| 0b1101 | 28 dB |
| 0b1110 | 32 dB |
| 0b1111 | 36 dB |

| Format of TYPE1 and BODY4: | |
|---|---|
| Bits (MSb:LSb) | The type of report to be carried in the BODY4 of the same UL.DCCH segment |
| 0b0 | ULRQST4 |
| 0b1 | Reserved |

| Specification of UL.DCCH modulation coding: full-tone format: | |
|---|---|
| Information Bits (MSb:LSb) | Coded Modulation Symbols (Most Significant:Least Significant) |
| 0b000 | (1, 0)(1, 0)(1, 0)(1, 0)(1, 0)(1, 0)(1, 0) |
| 0b001 | (1, 0)(1, 0)(1, 0)(1, 0)(-1, 0)(-1, 0)(-1, 0) |
| 0b010 | (1, 0)(1, 0)(-1, 0)(-1, 0)(1, 0)(1, 0)(-1, 0) |
| 0b011 | (1, 0)(1, 0)(-1, 0)(-1, 0)(-1, 0)(-1, 0)(1, 0) |
| 0b100 | (1, 0)(-1, 0)(1, 0)(-1, 0)(1, 0)(-1, 0)(1, 0) |
| 0b101 | (1, 0)(-1, 0)(1, 0)(-1, 0)(-1, 0)(1, 0)(-1, 0) |
| 0b110 | (1, 0)(-1, 0)(-1, 0)(1, 0)(1, 0)(-1, 0)(-1, 0) |
| 0b111 | (1, 0)(-1, 0)(-1, 0)(1, 0)(-1, 0)(1, 0)(1, 0) |

| Specification of UL.DCCH modulation coding: split-tone format: | |
|---|---|
| Information Bits (MSb:LSb) | Coded Modulation Symbols (Most Significant:Least Significant) |
| 0b0000 | (1, 0)(1, 0)(1, 0)(1, 0)(1, 0)(1, 0)(1, 0) |
| 0b0001 | (1, 0)(0, 1)(0, -1)(0, 1)(-1, 0)(0, 1)(-1, 0) |
| 0b0010 | (1, 0)(-1, 0)(-1, 0)(-1, 0)(1, 0)(-1, 0)(1, 0) |
| 0b0011 | (1, 0)(0, -1)(0, 1)(0, -1)(-1, 0)(0, -1)(-1, 0) |
| 0b0100 | (0, 1)(1, 0)(0, 1)(0, 1)(0, -1)(-1, 0)(1, 0) |
| 0b0101 | (0, 1)(0, 1)(1, 0)(-1, 0)(0, 1)(0, -1)(-1, 0) |
| 0b0110 | (0, 1)(-1, 0)(0, -1)(0, -1)(0, -1)(1, 0)(1, 0) |
| 0b0111 | (0, 1)(0, -1)(-1, 0)(1, 0)(0, 1)(0, 1)(-1, 0) |
| 0b1000 | (-1, 0)(1, 0)(-1, 0)(-1, 0)(-1, 0)(1, 0)(1, 0) |
| 0b1001 | (-1, 0)(0, 1)(0, 1)(0, -1)(1, 0)(0, 0, 1)(-1, 0) |
| 0b1010 | (-1, 0)(-1, 0)(1, 0)(1, 0)(-1, 0)(-1, 0)(1, 0) |
| 0b1011 | (-1, 0)(0, -1)(0, -1)(0, 1)(1, 0)(0, -1)(-1, 0) |
| 0b1100 | (0, -1)(1, 0)(0, -1)(0, -1)(0, 1)(-1, 0)(1, 0) |
| 0b1101 | (0, -1)(0, 1)(-1, 0)(1, 0)(0, 0, -1)(0, -1)(-1, 0) |
| 0b1110 | (0, -1)(-1, 0)(0, 1)(0, 1)(0, 1)(1, 0)(1, 0) |
| 0b1111 | (0, -1)(0, -1)(1, 0)(-1, 0)(0, 0, -1)(0, 1)(-1, 0) |

FIGURE 38

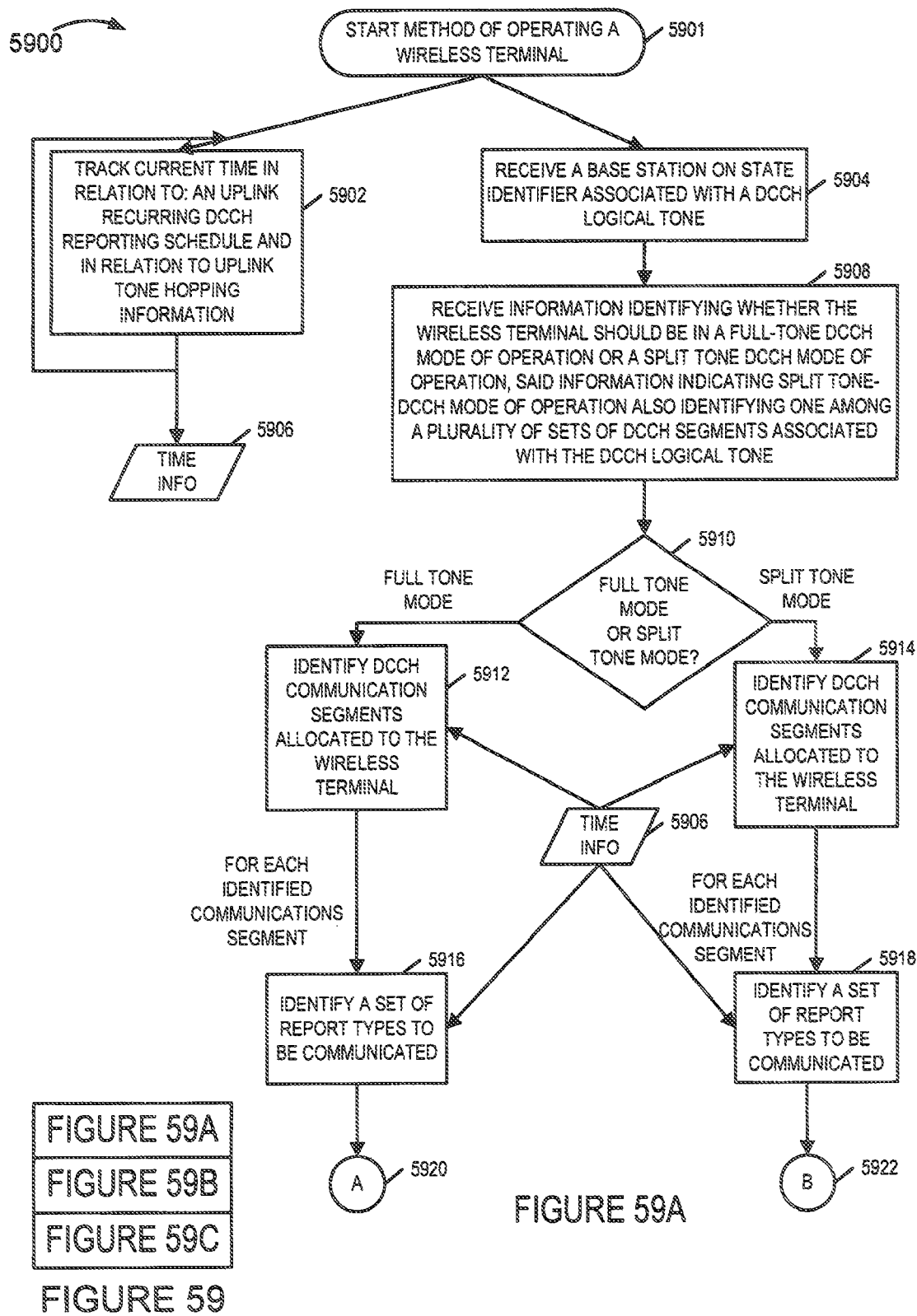

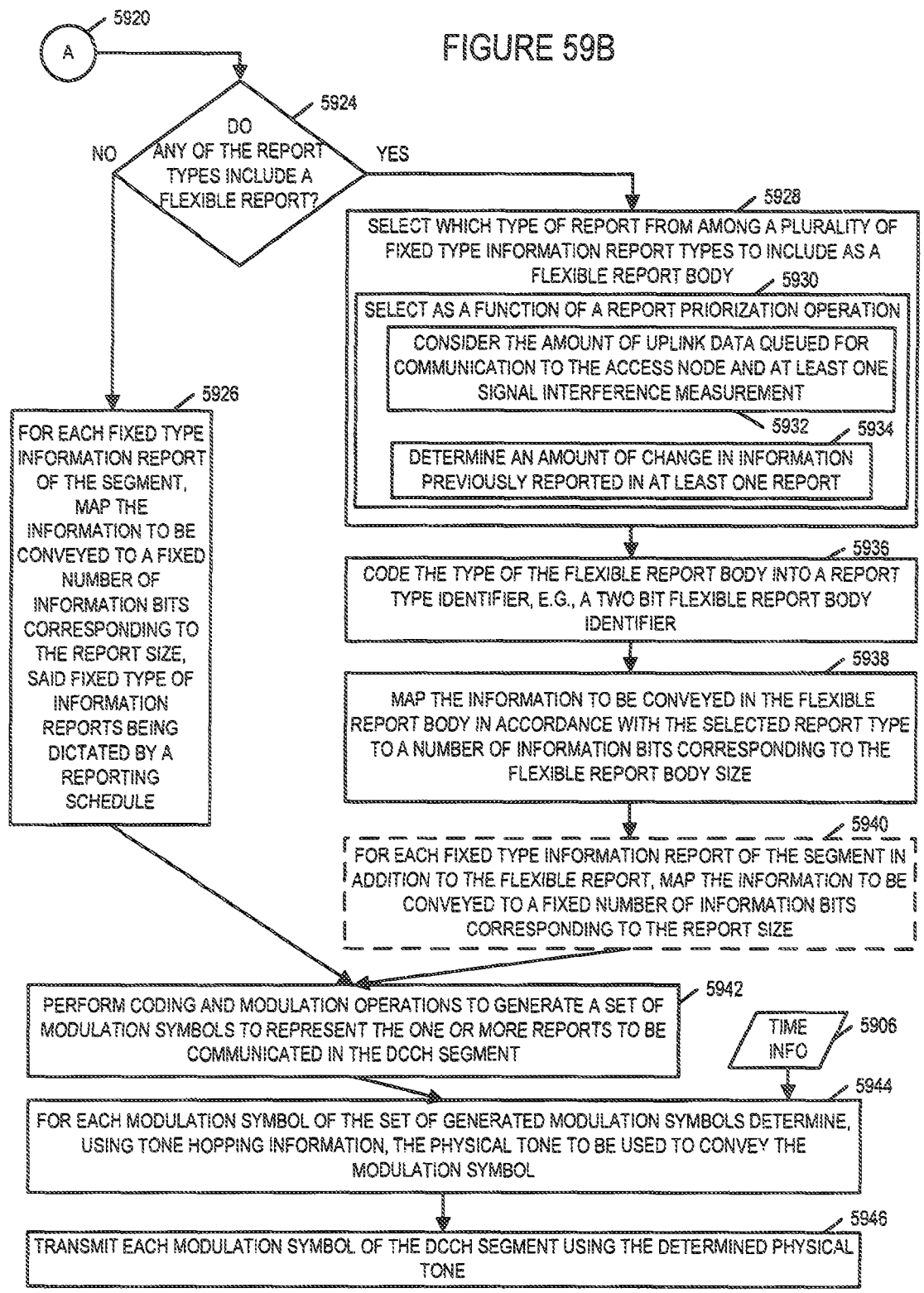

Request dictionary (RD reference number = 3): format of ULRQST4:

| Bits (MSb:LSb) | Notes |
|---|---|
| 0b0000 | No change from the previous request |
| 0b0001 | N[1]=1 |
| 0b0010 | N[1]=2 |
| 0b0011 | N[1]=3 |
| 0b0100 | N[1]>=4 |
| 0b0101 | N[2]=1 |
| 0b0110 | N[2]=2:3 |
| 0b0111 | N[2]=4:6 |
| 0b1000 | N[2]>=7 |
| 0b1001 | ceil(N[3]/y)=1 |
| 0b1010 | ceil(N[3]/y)=2:3 |
| 0b1011 | ceil(N[3]/y)=4:5 |
| 0b1100 | ceil(N[3]/z)=2 |
| 0b1101 | ceil(N[3]/z)=3 |
| 0b1110 | ceil(N[3]/z)=4:5 |
| 0b1111 | ceil(N[3]/z)>=6 |

Request dictionary (RD reference number = 3): format of ULRQST3:

| Bits (MSb:LSb) | Notes |
|---|---|
| 0b000 | N[0]=0, N[1]=0 |
| 0b001 | N[0]=0, N[1]=1 |
| 0b010 | N[0]=0, N[1]=2 |
| 0b011 | N[0]=0, N[1]>=3 |
| 0b100 | N[0]>=1, N[1]=0 |
| 0b101 | N[0]>=1, N[1]=1 |
| 0b110 | N[0]>=1, N[1]=2 |
| 0b111 | N[0]>=1, N[1]>=3 |

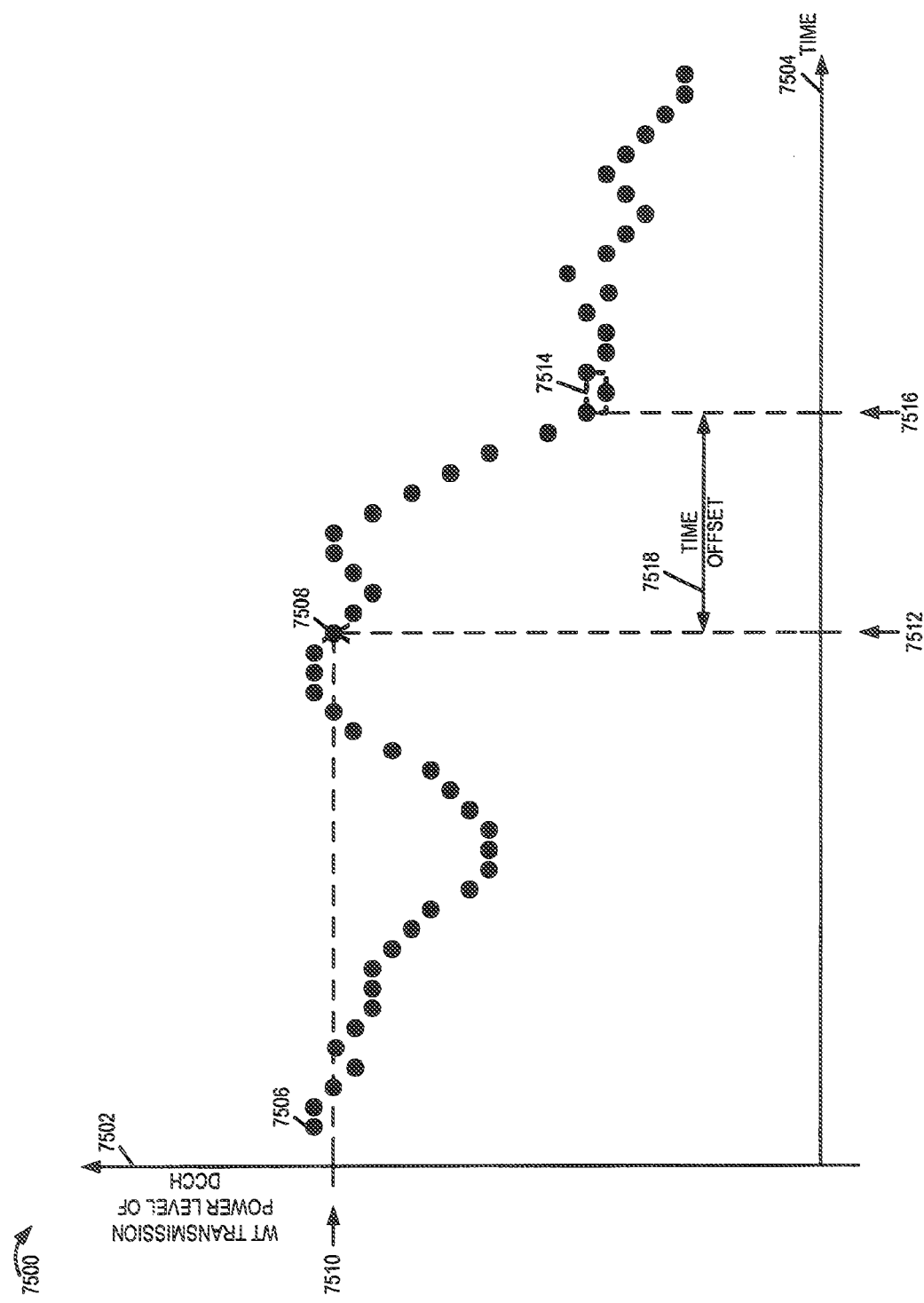

METHODS AND APPARATUS FOR COMMUNICATING AND/OR USING TRANSMISSION POWER INFORMATION

RELATED APPLICATIONS

This application is a Continuation application of U.S. Ser. No. 11/333,771, filed Jan. 17, 2006, entitled "Methods and Apparatus for Communicating and/or Using Transmission Power Information", which claims priority to U.S. Provisional Patent Application Ser. No. 60/752,973, filed on Dec. 22, 2005, titled "Communications Methods and Apparatus."

FIELD OF THE INVENTION

The present invention relates to wireless communications methods and apparatus and, more particularly, to methods and apparatus for reporting and interpreting communicated control information.

BACKGROUND

Wireless terminals, e.g., mobile nodes, in a cellular wireless communications system supporting uplink traffic channel communications with a base station attachment point, are typically power controlled with respect to their transmitter power level of operation, e.g., to accommodate for changing channel conditions and/or data rates.

While the base station may control wireless terminal transmission power based on received signal strength, the base station may not know the actual transmission power used by the wireless terminal or the wireless terminal's maximum transmission power level capacity.

From a scheduling and control perspective, it would be useful from a base station point of view if information were available from individual wireless terminals providing some indication of the terminal's ability to allocate transmission power, at a particular point in time, to the transmission of, e.g., user data.

Based on the above, it should be appreciated that there is a need for methods and apparatus for providing information to a base station about the amount of power available for transmission of, e.g., user data at one or more particular points in time.

SUMMARY

The present invention is directed to method and apparatus for reporting transmission power information to a base station. It is also directed to methods and apparatus for receiving and processing the power report information, e.g., for control purposes.

In one particular exemplary method in which the invention is used, a wireless terminal generates a power report, e.g., a wireless terminal transmission power backoff report indicating a dB value. In various embodiments the power report indicates a ratio of a maximum transmit power of the wireless terminal to the transmit power of a reference signal having a power level known to the wireless terminal at a point in time corresponding to the report. The wireless terminal transmits the generated power report to the base station. In some embodiments the wireless terminal repeats the report generating and transmitting steps according to a report transmission schedule, e.g., a recurring dedicated control channel reporting schedule. In some embodiments, the power level of the reference signal is controlled by the wireless terminal based on at least one closed loop power control signal received from a base station. The closed loop power control signals from the base station are used to control the wireless terminal's transmitter to make adjustments such as to achieve a desired received power level at the base station. In various embodiments, the reference signal is a control information signal transmitted over a dedicated control channel, e.g. a single tone channel which corresponds to a single logical tone dedicated to the wireless terminal for use in transmitting control information to the base station. In various embodiments, the wireless terminal implements uplink tone hopping using tone hopping information and the single logical dedicated control channel tone is determined to correspond to a single physical OFDM tone during each of a plurality of consecutive OFDM symbol transmission time intervals. In some embodiments, the power report corresponds to a single instant in time, e.g., a point in time which has a known offset from a start of a communications segment in which the power report is to be transmitted.

The method of generating the power report, in some embodiments, includes performing a subtraction operation, said subtraction operation including subtracting a per-tone transmission power of an uplink dedicated control channel, in dBm from a maximum transmission power value of the wireless terminal in dBm. In various embodiments, the maximum transmission power depends upon a power output capacity of the wireless terminal. In some embodiments, the maximum transmission power value is specified by a government regulation limiting the maximum output power level of the wireless terminal.

The power report is, in some embodiments, during a first mode of wireless terminal operation, transmitted as a first size information bit report, e.g., a 5 bit report, coded in a control channel segment dedicated to the wireless terminal. In addition, the power report is, in some embodiments, in a second mode of wireless terminal operation transmitted as a second size information bit report, e.g., a 4 bit report, coded in a control channel segment dedicated to the wireless terminal. In one exemplary embodiment, the first mode is a full-tone DCCH mode in which the wireless terminal is dedicated a single logical DCCH channel tone which is not shared with other wireless terminals for DCCH segments, while the second mode is a split-tone DCCH mode in which the wireless terminal is dedicated a portion of a single tone channel, which is available for use on a time shared basis with at least one other wireless terminal. In some embodiments, the power report is combined with additional bits of control information and communicated in a DCCH segment. For example, a DCCH segment is, in some embodiments, the same size in terms of air link resources, e.g., 21 OFDM tone-symbols, regardless of the full-tone/split tone mode, but in full-tone mode the power report, e.g., 5 bit power report is combined with an additional 1 bit information report, while in split-tone mode, the power report, e.g., a 4 bit report, is combined with an additional 4 information bits.

In some embodiments, the power report is transmitted multiple times, e.g., two or more times, during each recurring cycle of a dedicated control channel reporting structure used to control transmission of control information by the wireless terminal. In various embodiments, the power report is transmitted, on average at least once every 500 OFDM symbol transmission time periods but on average at intervals spaced at least 200 symbol transmission time intervals apart.

In one particular exemplary embodiment, the wireless terminal determines the transmission power of its dedicated control channel, a single logical tone channel used for transmitting control channel reports, at a point in time, and generates a power report indicating a ratio of a maximum transmit power of the wireless terminal to the transmit power of the dedicated control channel at the point in time. The power report is referred to as a transmission power backoff report since the power report provides a measure of the power available for the wireless terminal to use for other purposes, e.g., uplink traffic channels, after taking into consideration the power used by the wireless terminal for the dedicated control channel. A base station receiving a wireless terminal transmission power backoff report can use the report information to determine maximum uplink data rates that can be supported by the wireless terminal, e.g., on a per segment basis for uplink traffic channel segments. The point in time, in accordance with the present invention, in various embodiments has a known time offset from the start of a communications segment in which the power report is transmitted. The time offset is known to both the base station and wireless terminal. The maximum transmit power of the wireless terminal is known to the wireless terminal. However, the maximum transmit power of the wireless terminal and/or the actual transmission power level of the wireless terminal need not be, and in some embodiments is not, known to the base station. The base station receiving dedicated control channel uplink signals from the wireless terminal measures the received signal, receives and process the communicated power report, correlates the information, and achieves better wireless terminal transmission closed loop power control than might otherwise have been possible if a different type of power report was communicated, e.g., a report that communicates an average transmission power information over a range between successive reports.

In some embodiments different wireless terminals, e.g., different types of wireless terminals, may have different maximum transmission power levels. In various embodiments, a wireless terminal may support multiple simultaneous connections and each of the connections may have a corresponding maximum transmission power level. In some such embodiments, an individual maximum transmission power level associated with a connection, may vary over time, e.g., as a function of the number of connections being currently maintained by the wireless terminal.

While various embodiments have been discussed in the summary above, it should be appreciated that not necessarily all embodiments include the same features and some of the features described above are not necessary but can be desirable in some embodiments. Numerous additional features, embodiments and benefits of the present invention are discussed in the detailed description which follows.

BRIEF DESCRIPTION OF THE FIGURES

FIG. 10 is a drawing illustrating an exemplary default mode of the full tone format in a beaconslot for a given DCCH tone.

FIG. 26 is a table identifying bit format and interpretations associated with each of 32 bit patterns for an exemplary 5 bit uplink transmitter power backoff report (ULTxBKF5), in accordance with the present invention.

FIG. 30 is a drawing of an exemplary table describing the format of an exemplary 4 bit downlink self-noise saturation level of SNR report (DLSSNR4), in accordance with the present invention.

FIG. 31 is a drawing of a table illustrating an example of mapping between indicator report information bits and the type of report carried by the corresponding flexible report.

FIG. 35 is a table identifying bit format and interpretations associated with each of 16 bit patterns for an exemplary 4 bit uplink transmission backoff report (ULTxBKF4), in accordance with the present invention.

FIG. 36 is an example of mapping between indicator report information bits and the type of report carried by the corresponding flexible report.

FIG. 37 is an exemplary specification of uplink dedicated control channel segment modulation coding in full-tone format.

FIG. 38 is a drawing of a table illustrating an exemplary specification of uplink dedicated control channel segment modulation coding in split-tone format.

FIG. 59 comprising the combination of FIG. 59A, FIG. 59B

FIG. 75 is a drawing used to explain features of an exemplary embodiment of the present invention using a wireless terminal transmission power report.

DETAILED DESCRIPTION OF THE INVENTION

Figure 1:
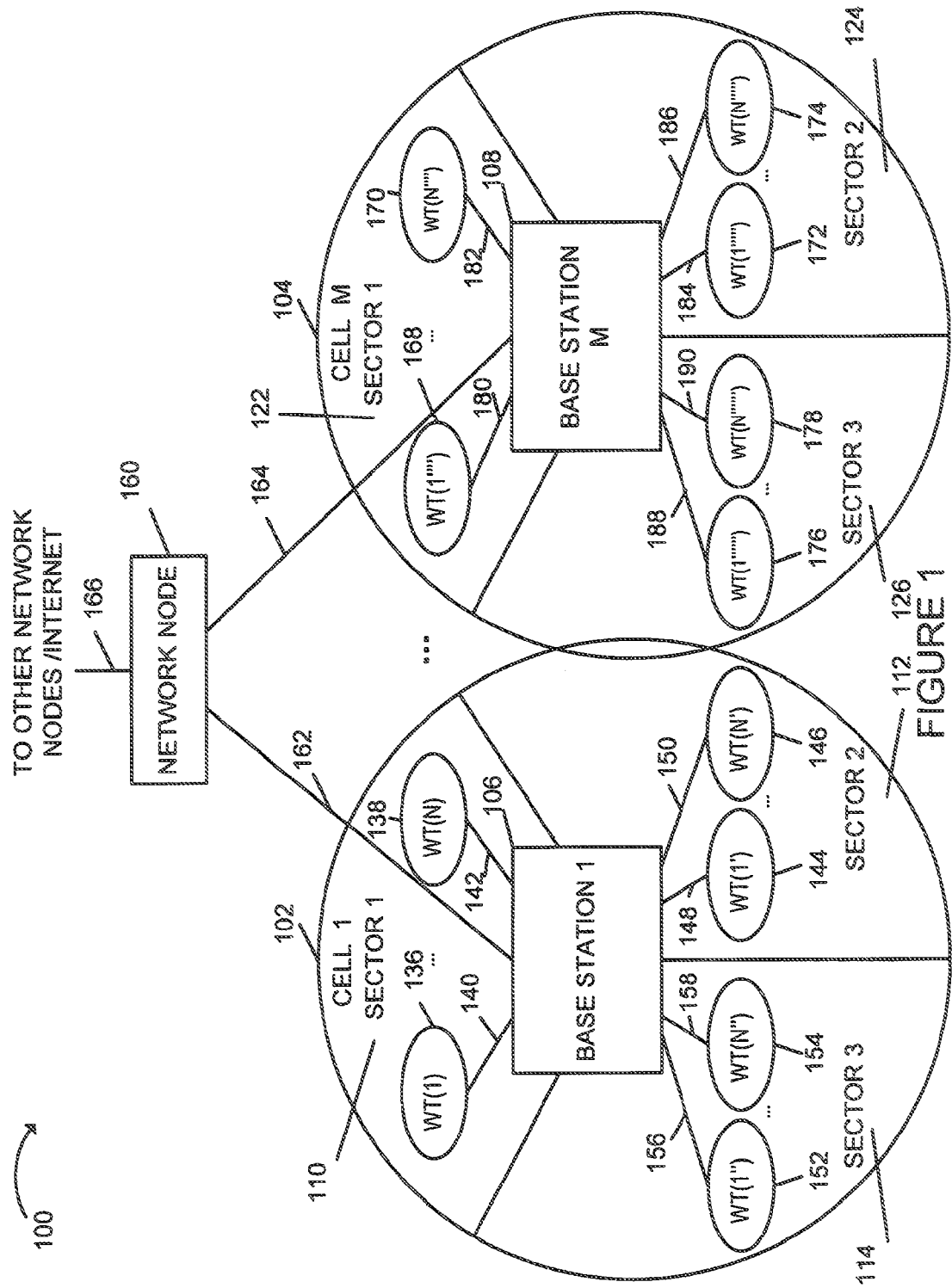
FIG. 1 is a drawing of an exemplary communication system implemented in accordance with the present invention.

FIG. 1 shows an exemplary communication system 100 implemented in accordance with the present invention. Exemplary communications system 100 includes multiple cells: cell 1 102, cell M 104. Exemplary system 100 is, e.g., an exemplary orthogonal frequency division multiplexing (OFDM) spread spectrum wireless communications system such as a multiple access OFDM system. Each cell 102, 104 of exemplary system 100 includes three sectors. Cells which have not be subdivided into multiple sectors (N=1), cells with two sectors (N=2) and cells with more than 3 sectors (N>3) are also possible in accordance with the invention. Each sector supports one or more carriers and/or downlink tones blocks. In some embodiments, each downlink tone block has a corresponding uplink tone block. In some embodiments at least some of the sectors support three downlink tones blocks. Cell 102 includes a first sector, sector 1 110, a second sector, sector 2 112, and a third sector, sector 3 114. Similarly, cell M 104 includes a first sector, sector 1 122, a second sector, sector 2 124, and a third sector, sector 3 126. Cell 1 102 includes a base station (BS), base station 1 106, and a plurality of wireless terminals (WTs) in each sector 110, 112, 114. Sector 1 110 includes WT(1) 136 and WT(N) 138 coupled to BS 106 via wireless links 140, 142, respectively; sector 2 112 includes WT(1') 144 and WT(N') 146 coupled to BS 106 via wireless links 148, 150, respectively; sector 3 114 includes WT(1") 152 and WT(N") 154 coupled to BS 106 via wireless links 156, 158, respectively. Similarly, cell M 104 includes base station M 108, and a plurality of wireless terminals (WTs) in each sector 122, 124, 126. Sector 1 122 includes WT(1''') 168 and WT(N''') 170 coupled to BS M 108 via wireless links 180, 182, respectively; sector 2 124 includes WT(1) 172 and WT(N) 174 coupled to BS M 108 via wireless links 184, 186, respectively; sector 3 126 includes WT(1'''') 176 and WT(N'''') 178 coupled to BS M 108 via wireless links 188, 190, respectively.

System 100 also includes a network node 160 which is coupled to BS1 106 and BS M 108 via network links 162, 164, respectively. Network node 160 is also coupled to other network nodes, e.g., other base stations, AAA server nodes, intermediate nodes, routers, etc. and the Internet via network link 166. Network links 162, 164, 166 may be, e.g., fiber optic cables. Each wireless, e.g. WT 1 136, includes a transmitter as well as a receiver. At least some of the wireless terminals, e.g., WT(1) 136, are mobile nodes which may move through system 100 and may communicate via wireless links with the base station in the cell in which the WT is currently located, e.g., using a base station sector attachment point. The wireless terminals, (WTs), e.g. WT(1) 136, may communicate with peer nodes, e.g., other WTs in system 100 or outside system 100 via a base station, e.g. BS 106, and/or network node 160. WTs, e.g., WT(1) 136 may be mobile communications devices such as cell phones, personal data assistants with wireless modems, laptop computers with wireless modems, data terminals with wireless modems, etc.

Figure 2:
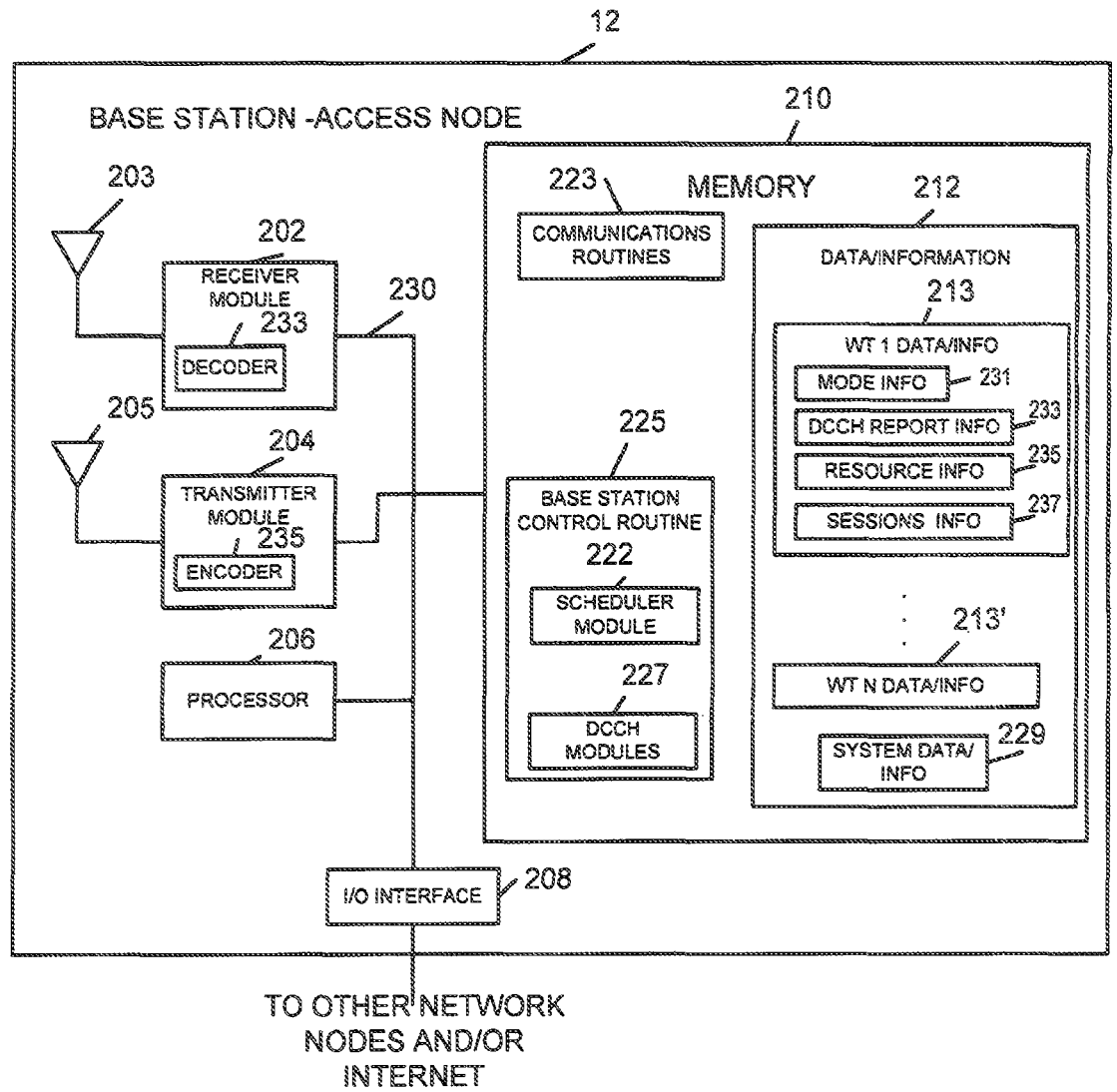
FIG. 2 illustrates an exemplary base station, implemented in accordance with the invention.

FIG. 2 illustrates an exemplary base station 12, implemented in accordance with the invention. Exemplary base station 12 may be any of the exemplary base stations of FIG. 1. The base station 12 includes antennas 203, 205 and receiver transmitter modules 202, 204. The receiver module 202 includes a decoder 233 while the transmitter module 204 includes an encoder 235. The modules 202, 204 are coupled by a bus 230 to an I/O interface 208, processor (e.g., CPU) 206 and memory 210. The I/O interface 208 couples the base station 12 to other network nodes and/or the Internet. The memory 210 includes routines, which when executed by the processor 206, causes the base station 12 to operate in accordance with the invention. Memory 210 includes communications routines 223 used for controlling the base station 12 to perform various communications operations and implement various communications protocols. The memory 210 also includes a base station control routine 225 used to control the base station 12 to implement the steps of methods of the present invention. The base station control routine 225 includes a scheduling module 226 used to control transmission scheduling and/or communication resource allocation. Thus, module 226 may serve as a scheduler. Base station control routine 225 also includes dedicated control channel modules 227 which implement methods of the present invention, e.g., processing received DCCH reports, performing control related to DCCH mode, allocating DCCH segments, etc. Memory 210 also includes information used by communications routines 223, and control routine 225. The data/information 212 includes a set of data/information for a plurality of wireless terminal (WT 1 data/info 213, WT N data/info 213'. WT 1 data/information 213 includes mode information 231, DCCH report information 233, resource information 235 and sessions information 237. Data/information 212 also includes system data/information 229.

Figure 3:
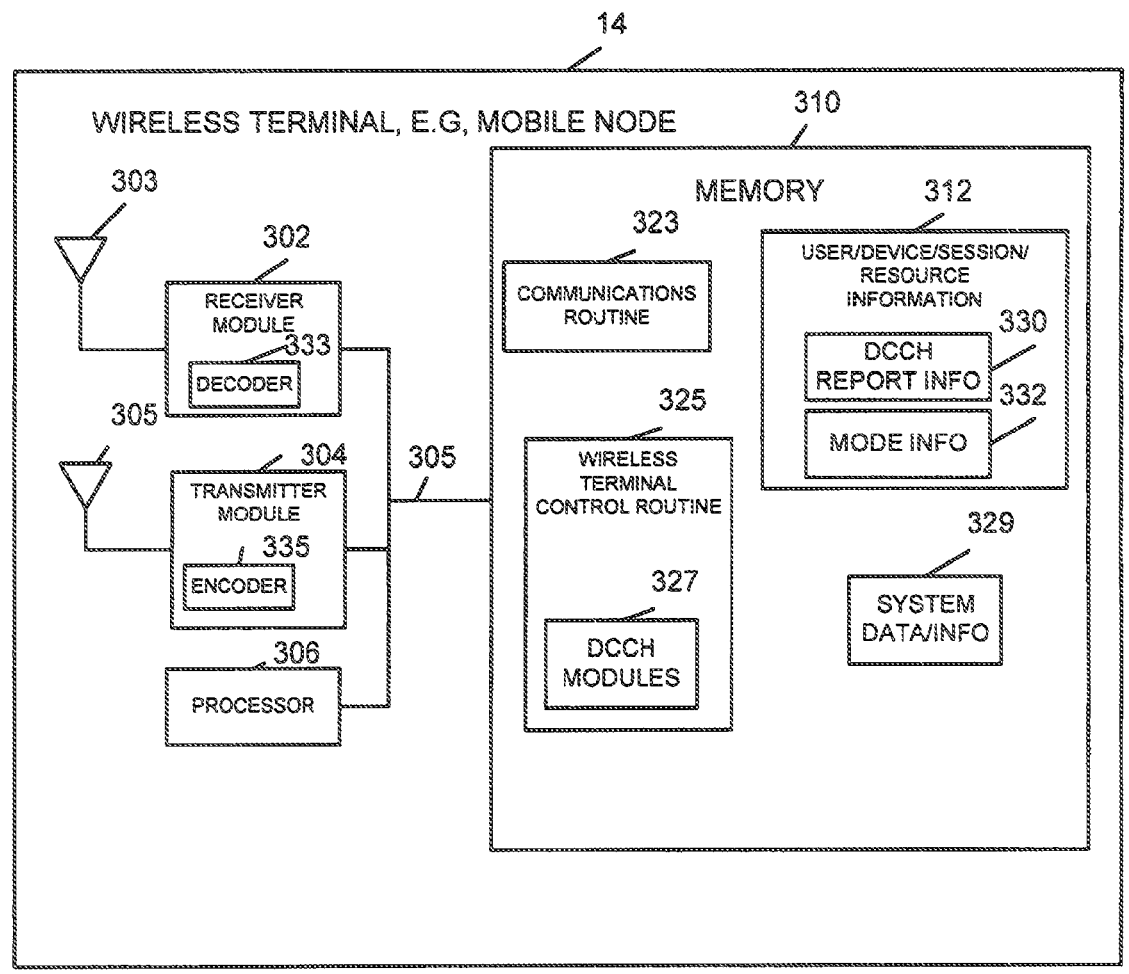
FIG. 3 illustrates an exemplary wireless terminal, e.g., mobile node, implemented in accordance with the present invention.

FIG. 3 illustrates an exemplary wireless terminal 14, e.g., mobile node implemented in accordance with the present invention. Exemplary wireless terminal 14 may be any of the exemplary wireless terminals of FIG. 1. The wireless terminal 14, e.g., mobile node may be used as a mobile terminal (MT). The wireless terminal 14 includes receiver and transmitter antennas 303, 305 which are coupled to receiver and transmitter modules 302, 304 respectively. The receiver module 302 includes a decoder 333 while the transmitter module 304 includes an encoder 335. The receiver/transmitter modules 302, 304 are coupled by a bus 305 to a memory 310. Processor 306, under control of one or more routines stored in memory 310 causes the wireless terminal 14 to operate in accordance with the methods of the present invention. In order to control wireless terminal operation memory 310 includes communications routine 323 and wireless terminal control routine 325. Communications routine 323 is used for controlling the wireless terminal 14 to perform various communications operations and implement various communications protocols. The wireless terminal control routine 325 is responsible for insuring that the wireless terminal operates in accordance with the methods of the present invention and performs the steps in regard to wireless terminal operations. Wireless terminal control routine 325 includes DCCH modules 327, which implement methods of the present invention, e.g., control the performing of measurements used in DCCH reports, generate DCCH reports, control transmission of DCCH reports, control DCCH mode, etc. The memory 310 also includes user/device/session/resource information 312 which may be accessed and used to implement the methods of the present invention and/or data structures used to implement the invention. Information 312 includes DCCH report information 330 and mode information 332. Memory 310 also includes system data/information 329, e.g., including uplink and downlink channel structure information.

Figure 4:
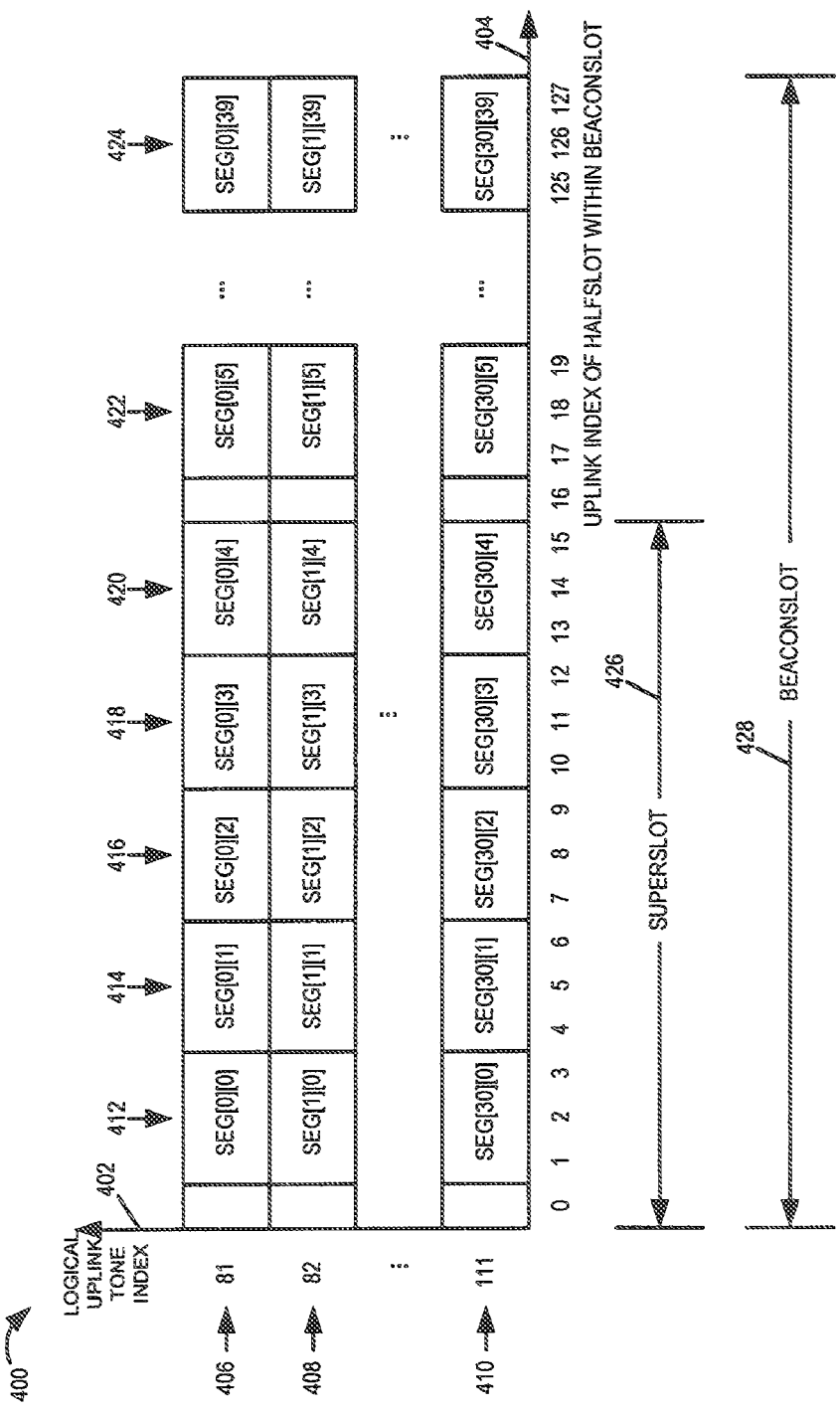
FIG. 4 is a drawing of exemplary uplink dedicated control channel (DCCH) segments in an exemplary uplink timing and frequency structure in an exemplary orthogonal frequency division multiplexing (OFDM) multiple access wireless communications system.

FIG. 4 is a drawing 400 of exemplary uplink dedicated control channel (DCCH) segments in an exemplary uplink timing and frequency structure in an exemplary orthogonal frequency division multiplexing (OFDM) multiple access wireless communications system. The uplink dedicated control channel is used to send Dedicated Control Reports (DCR) from wireless terminals to base stations. Vertical axis 402 plots logical uplink tone index while horizontal axis 404 plots the uplink index of the halfslot within a beaconslot. In this example, an uplink tone block includes 113 logical uplink tones indexed (0, . . . , 112); there are seven successive OFDM symbol transmission time periods within a halfslot, 2 additional OFDM symbol time periods followed by 16 successive half-slots within a superslot, and 8 successive superslots within a beacon slot. The first 9 OFDM symbol transmission time periods within a superslot are an access interval, and the dedicated control channel does not use the air link resources of the access interval.

The exemplary dedicated control channel is subdivided into 31 logical tones (uplink tone index 81 406, uplink tone index 82 408, . . . , uplink tone index 111 410). Each logical uplink tone (81, . . . , 111) in the logical uplink frequency structure corresponds to a logical tone indexed with respect to the DCCH channel (0, . . . , 30).

For each tone in the dedicated control channel there are 40 segments in the beaconslot corresponding to forty columns (412, 414, 416, 418, 420, 422, . . . , 424). The segment structure repeats on a beaconslot basis. For a given tone in the dedicated control channel there are 40 segments corresponding to a beaconslot 428; each of the eight superslots of the beaconslot includes 5 successive segments for the given tone. For example, for first superslot 426 of beaconslot 428, corresponding to tone 0 of the DCCH, there are five indexed segments (segment [0][0], segment [0][1], segment [0][2], segment [0][3], segment [0][4]). Similarly, for first superslot 426 of beaconslot 428, corresponding to tone 1 of the DCCH, there are five indexed segments (segment [1][0], segment [1][1], segment [1][2], segment [1][3], segment [1][4]). Similarly, for first superslot 426 of beaconslot 428, corresponding to tone 30 of the DCCH, there are five indexed segments (segment [30][0], segment [30][1], segment [30][2], segment [30][3], segment [30][4]).

In this example each segment, e.g., segment [0][0], comprises one tone for 3 successive half-slots, e.g., representing an allocated uplink air link resource of 21 OFDM tone-symbols. In some embodiments, logical uplink tones are hopped to physical tones in accordance with an uplink tone hopping sequence such that the physical tone associated with a logical tone may be different for successive half-slots, but remains constant during a given half-slot.

In some embodiments, of the present invention, a set of uplink dedicated control channel segments corresponding to a given tone can use one of a plurality of different formats. For example, in an exemplary embodiment, for a given tone for a beaconslot, the set of DCCH segments can use one of two formats: split tone format and full-tone format. In the full tone format, the set of uplink DCCH segments corresponding to a tone are used by a single wireless terminal. In the split tone format, the set of uplink DCCH segment corresponding to the tone are shared by up to three wireless terminals in a time division multiplexing manner. The base station and/or the wireless terminal can, in some embodiments, change the format for a given DCCH tone, using predetermined protocols. The format of the uplink DCCH segments corresponding to a different DCCH tone can, in some embodiments, be independently set and may be different.

In some embodiments, in either format, the wireless terminal shall support a default mode of the uplink dedicated control channel segments. In some embodiments, the wireless terminal supports the default mode of the uplink dedicated control channel segments and one or more additional modes of the uplink dedicated control channel segments. Such a mode defines the interpretation of the information bits in the uplink dedicated control channel segments. The base station and/or the WT can, in some embodiments, change the mode, e.g., using an upper layer configuration protocol. In various embodiments, the uplink DCCH segments corresponding to a different tone or those corresponding to the same tone but used by different WTs can be independently set and may be different.

Figure 5:
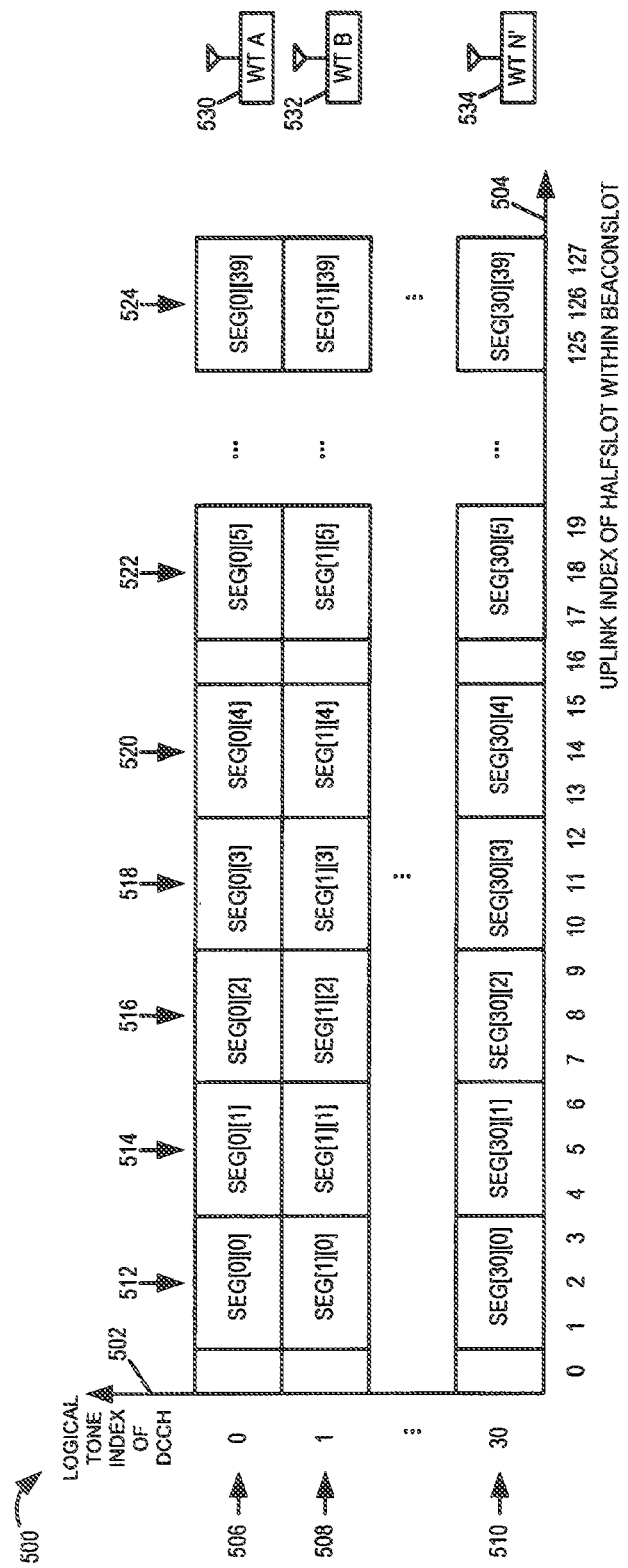
FIG. 5 includes a drawing of an exemplary dedicated control channel in an exemplary uplink timing and frequency structure in an exemplary orthogonal frequency division multiplexing (OFDM) multiple access wireless communications system at a time when each set of DCCH segments corresponding to a logical DCCH channel tone is in the full-tone format.

FIG. 5 includes a drawing 500 of an exemplary dedicated control channel in an exemplary uplink timing and frequency structure in an exemplary orthogonal frequency division multiplexing (OFDM) multiple access wireless communications system. Drawing 500 may represent the DCCH 400 of FIG. 4, at a time when each set of DCCH segments corresponding to a tone is in the full-tone format. Vertical axis 502 plots logical tone index of the DCCH while horizontal axis 504 plots the uplink index of the halfslot within a beaconslot. The exemplary dedicated control channel is subdivided into 31 logical tones (tone index 0 506, tone index 1 508, . . . , tone index 30 510). For each tone in the dedicated control channel there are 40 segments in the beaconslot corresponding to forty columns (512, 514, 516, 518, 520, 522, . . . , 524). Each logical tone of the dedicated control channel may be assigned by the base station to a different wireless terminal using the base station as its current point of attachment. For example, logical (tone 0 506, tone 1 508, . . . , tone 30 510) may be currently assigned to (WT A 530, WT B 532, . . . , WT N' 534), respectively.

Figure 6:
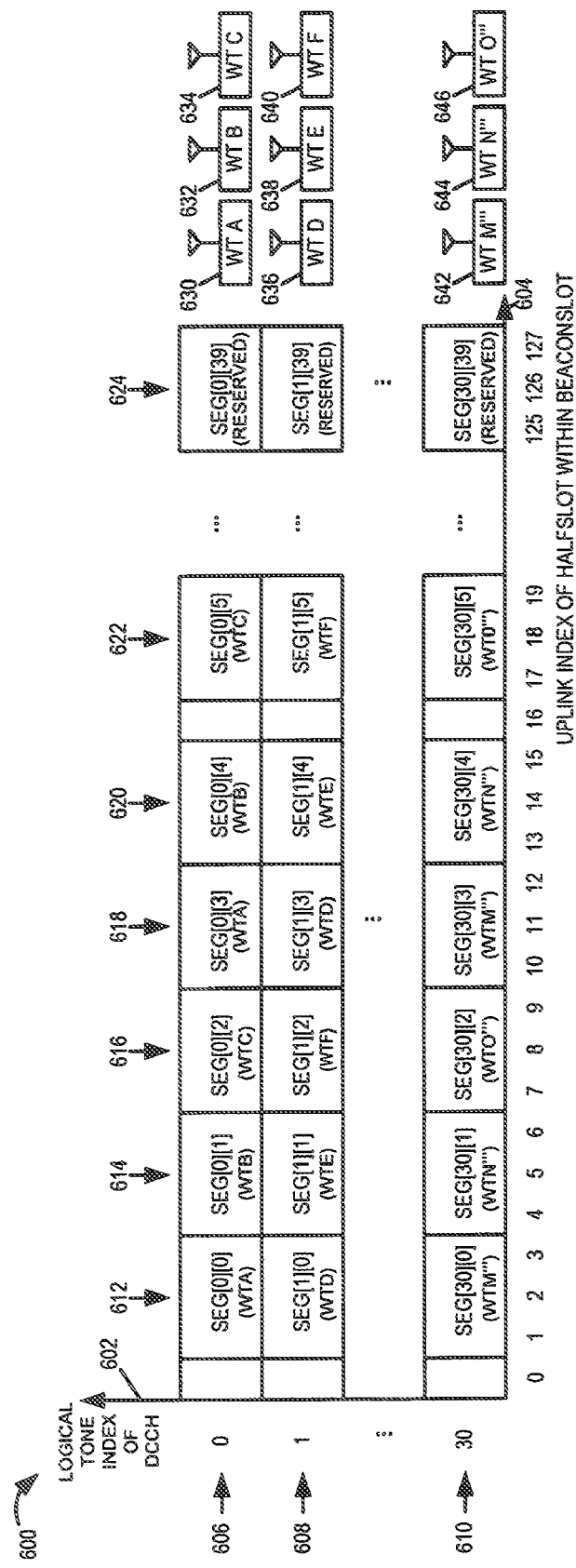
FIG. 6 includes a drawing of an exemplary dedicated control channel in an exemplary uplink timing and frequency structure in an exemplary orthogonal frequency division multiplexing (OFDM) multiple access wireless communications system at a time when each set of DCCH segments corresponding to a logical DCCH channel tone is in the split-tone format.

FIG. 6 includes a drawing 600 of an exemplary dedicated control channel in an exemplary uplink timing and frequency structure in an exemplary orthogonal frequency division multiplexing (OFDM) multiple access wireless communications system. Drawing 600 may represent the DCCH 400 of FIG. 4, at a time when each set of DCCH segments corresponding to a tone is in the split-tone format. Vertical axis 602 plots logical tone index of the DCCH while horizontal axis 604 plots the uplink index of the halfslot within a beaconslot. The exemplary dedicated control channel is subdivided into 31 logical tones (tone index 0 606, tone index 1 608, . . . , tone index 30 610). For each tone in the dedicated control channel there are 40 segments in the beaconslot corresponding to forty columns (612, 614, 616, 618, 620, 622, . . . , 624). Each logical tone of the dedicated control channel may be assigned by the base station to up to 3 different wireless terminals using the base station as their current point of attachment. For a given tone, the segments alternate between the three wireless terminals, with 13 segments being allocated for each of the three wireless terminals, and the $40^{th}$ segment is reserved. This exemplary division of air link resources of the DCCH channel represents a total of 93 different wireless terminals being allocated DCCH channel resources for the exemplary beaconslot. For example, logical tone 0 606 may be currently assigned to and shared by WT A 630, WT B 632, and WT C 634; logical tone 1 608 may be currently assigned to and shared by WT D 636, WT E 638, and WT F 640; logical tone 30 610 may be currently assigned to WT M''' 642, WT N''' 644, and WT O''' 646. For the beaconslot, each of the exemplary WTs (630, 632, 634, 636, 638, 640, 642, 644, 646) is allocated 13 DCCH segments.

Figure 7:
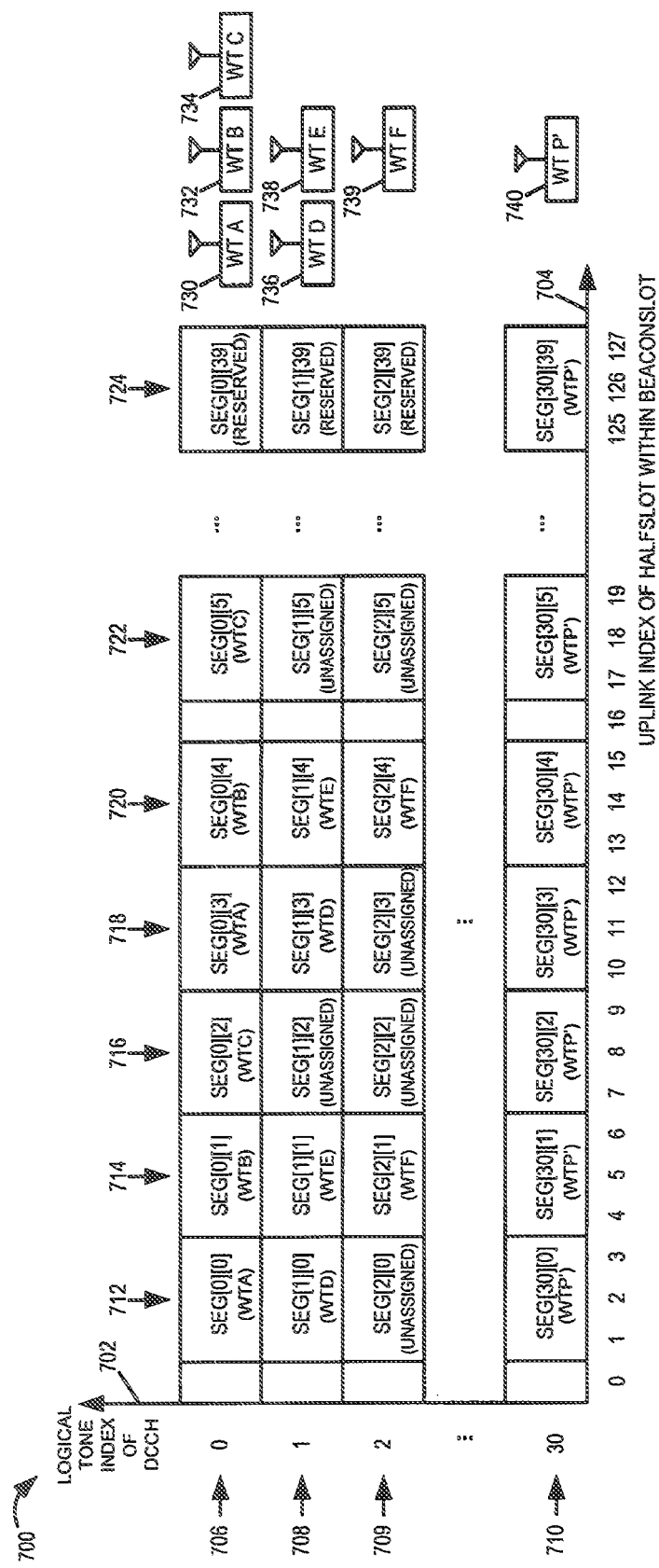
FIG. 7 includes a drawing of an exemplary dedicated control channel in an exemplary uplink timing and frequency structure in an exemplary orthogonal frequency division multiplexing (OFDM) multiple access wireless communications system at a time when some of the sets of DCCH segments corresponding to a logical DCCH channel tone are in the full-tone format and some of the sets of DCCH segments corresponding to a logical DCCH channel tone are in the split-tone format.

FIG. 7 includes a drawing 700 of an exemplary dedicated control channel in an exemplary uplink timing and frequency structure in an exemplary orthogonal frequency division multiplexing (OFDM) multiple access wireless communications system. Drawing 700 may represent the DCCH 400 of FIG. 4, at a time when some of the sets of DCCH segments corresponding to a tone are in the full-tone format and some of the sets of DCCH segments corresponding to a tone are in the split-tone format. Vertical axis 702 plots logical tone index of the DCCH while horizontal axis 704 plots the uplink index of the halfslot within a beaconslot. The exemplary dedicated control channel is subdivided into 31 logical tones (tone index 0 706, tone index 1 708, tone index 2 709, . . . , tone index 30 710). For each tone in the dedicated control channel there are 40 segments in the beaconslot corresponding to forty columns (712, 714, 716, 718, 720, 722, . . . , 724). In this example, the set of segments corresponding to logical tone 0 708 is in split-tone format and is currently assigned to and shared by WT A 730, WT B 732, and WTC 734, each receiving 13 segments with one segment being reserved. The set of segments corresponding to logical tone 1 708 is also in split-tone format, but is currently assigned to and shared by two WTs, WT D 736, WT E 738, each receiving 13 segments. For tone 1 708, there is a set of 13 unassigned segments, and one reserved segment. The set of segments corresponding to logical tone 2 709 is also in split-tone format, but is currently assigned to one WT, WT F 739, receiving 13 segments. For tone 2 709, there are two sets with 13 unassigned segments per set, and one reserved segment. The set of segments corresponding to logical tone 30 710 is in full-tone format and is currently assigned to WT P' 740, with WTP' 740 receiving the full 40 segments to use.

Figure 8:
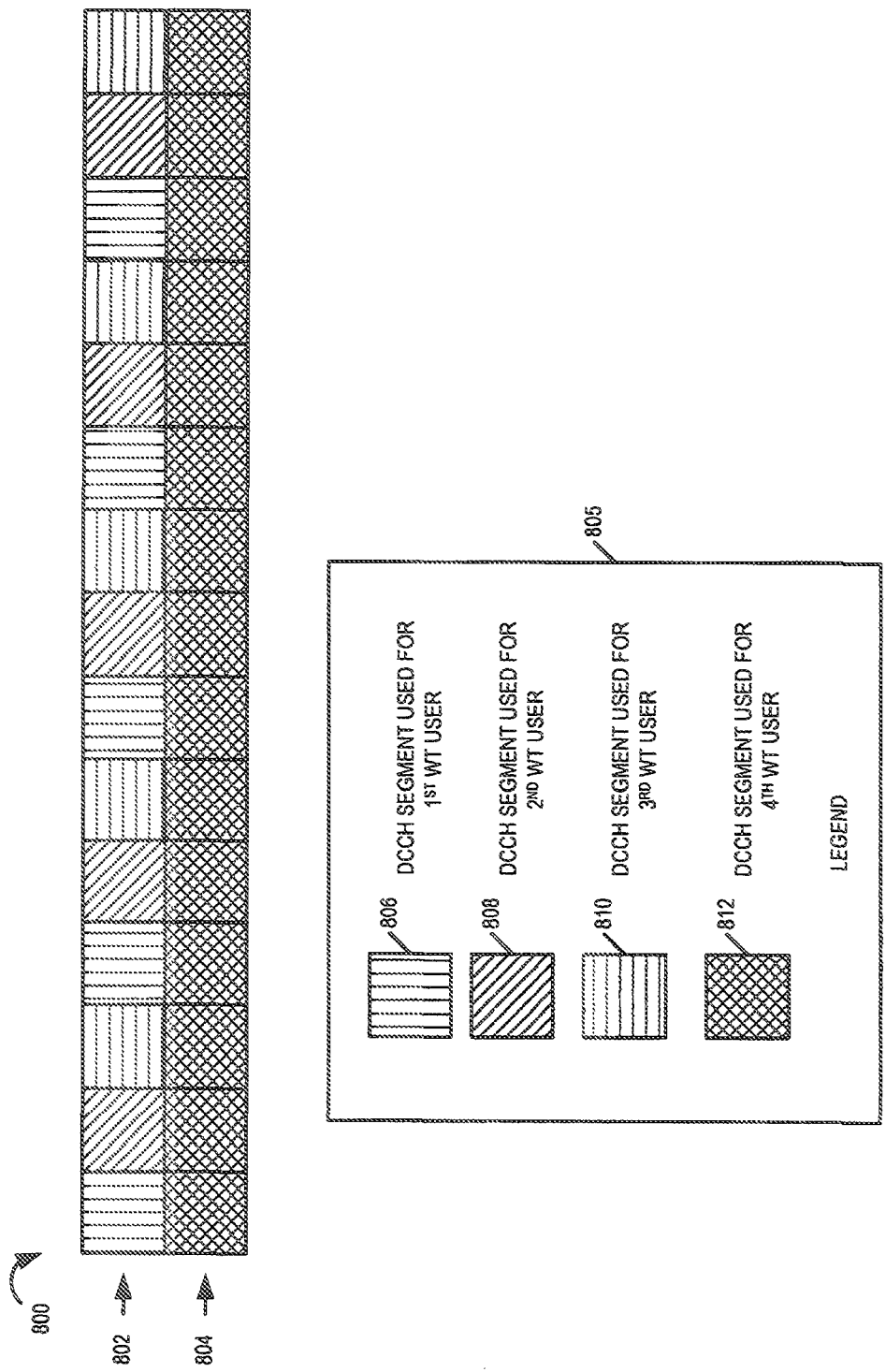
FIG. 8 is a drawing illustrating the use of format and mode in an exemplary uplink DCCH in accordance with the present invention, the mode defining the interpretation of the information bits in the DCCH segments.

FIG. 8 is a drawing 800 illustrating the use of format and mode in an exemplary uplink DCCH in accordance with the present invention, the mode defining the interpretation of the information bits in the DCCH segments. Row 802, corresponding to one tone of the DCCH, illustrates 15 successive segments of the DCCH, in which the split tone-format is used and thus the tone is shared by three wireless terminals, and the mode used by any one of the three WTs can be different. Meanwhile, row 804 illustrates 15 successive DCCH segments using the full tone format and is used by a single wireless terminal. Legend 805 indicates that: segments with vertical line shading 806 are used by a $1^{st}$ WT user, segments with diagonal line shading 808 are used by a $2^{nd}$ WT user, segments with horizontal line shading 810 are used by a $3^{rd}$ WT user, and segments with crosshatch shading 812 are used by a $4^{th}$ WT user.

Figure 9:
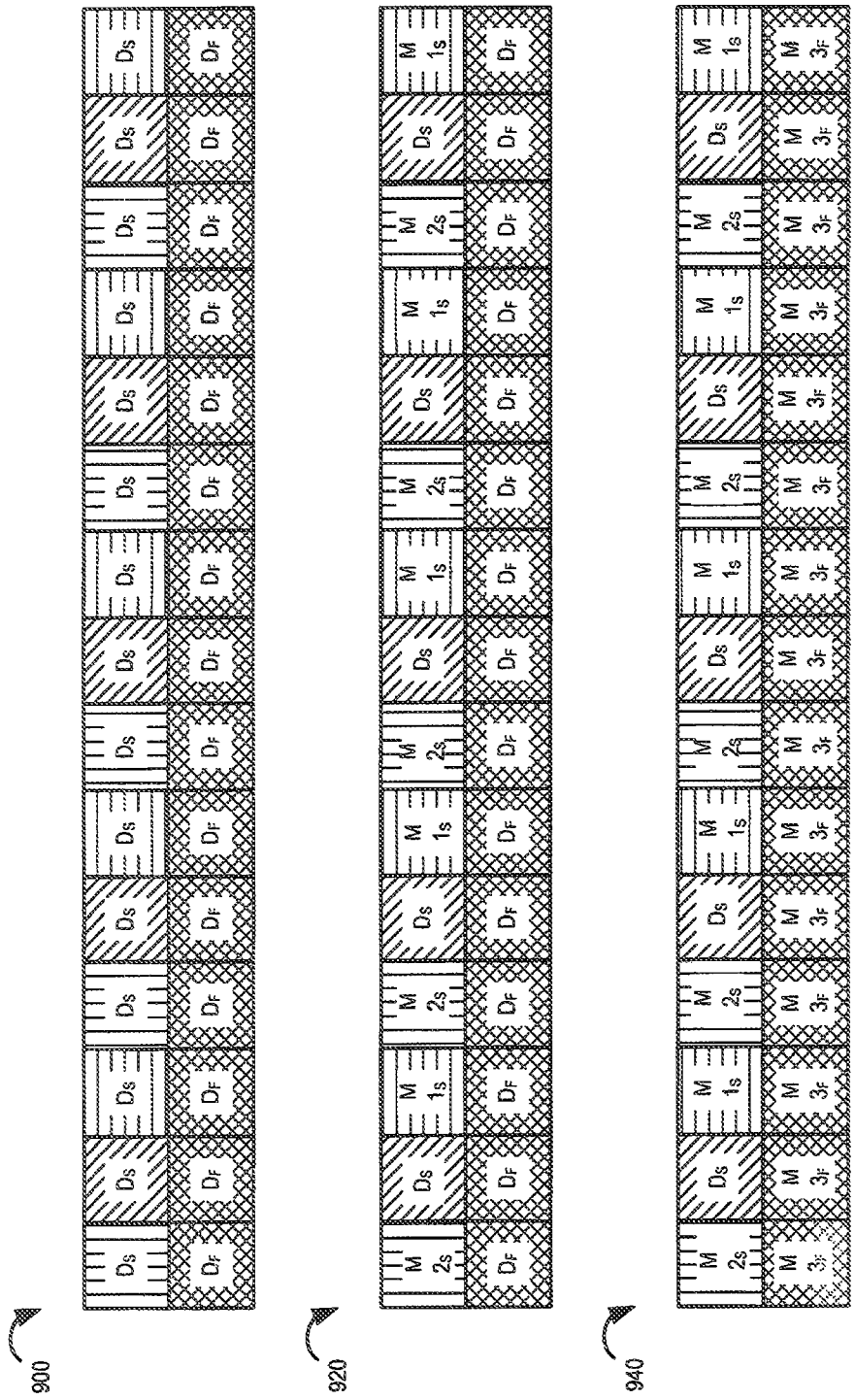
FIG. 9 illustrates several examples corresponding to FIG. 8 illustrating different modes of operation.

FIG. 9 illustrates several examples corresponding to drawing 800 illustrating different modes of operation. In the example of drawing 900, $1^{st}$, $2^{nd}$ and $3^{rd}$ WTs are sharing a DCCH tone in the split tone format while the $4^{th}$ WT is using a tone in the full tone format. Each of the WTs corresponding to the example of drawing 900 are using the default mode of uplink dedicated control channel segments, following a default mode interpretation of the information bits in the DCCH segments. The default mode for split tone format ($D_S$) is different than the default mode for full tone format ($D_F$).

In the example of drawing 920, $1^{st}$, $2^{nd}$ and $3^{rd}$ WTs are sharing a DCCH tone in the split tone format while the $4^{th}$ WT is using a tone in the full tone format. Each of the ($1^{st}$, $2^{nd}$, and $3^{rd}$) WTs corresponding to the example of drawing 920 are using different modes of uplink dedicated control channel segments, each following different interpretations of the information bits in the DCCH segments. The $1^{st}$ WT is using mode 2 for split-tone format, the $2^{nd}$ wireless terminal is using the default mode for split-tone format, and the 3rd WT is using mode 1 for split-tone format. In addition the $4^{th}$ WT is using the default mode for full-tone format.

In the example of drawing 940, $1^{st}$, $2^{nd}$ and $3^{rd}$ WTs are sharing a DCCH tone in the split tone format while the $4^{th}$ WT is using a tone in the full tone format. Each of the ($1^{st}$, $2^{nd}$, $3^{rd}$, and $4^{th}$) WTs corresponding to the example of drawing 940 are using different modes of uplink dedicated control channel segments, each following different interpretations of the information bits in the DCCH segments. The $1^{st}$ WT is using mode 2 for split-tone format, the $2^{nd}$ wireless terminal is using the default mode for split-tone format, the 3rd WT is using mode 1 for split tone format, and the $4^{th}$ WT is using mode 3 for full-tone format.

Figure 10:
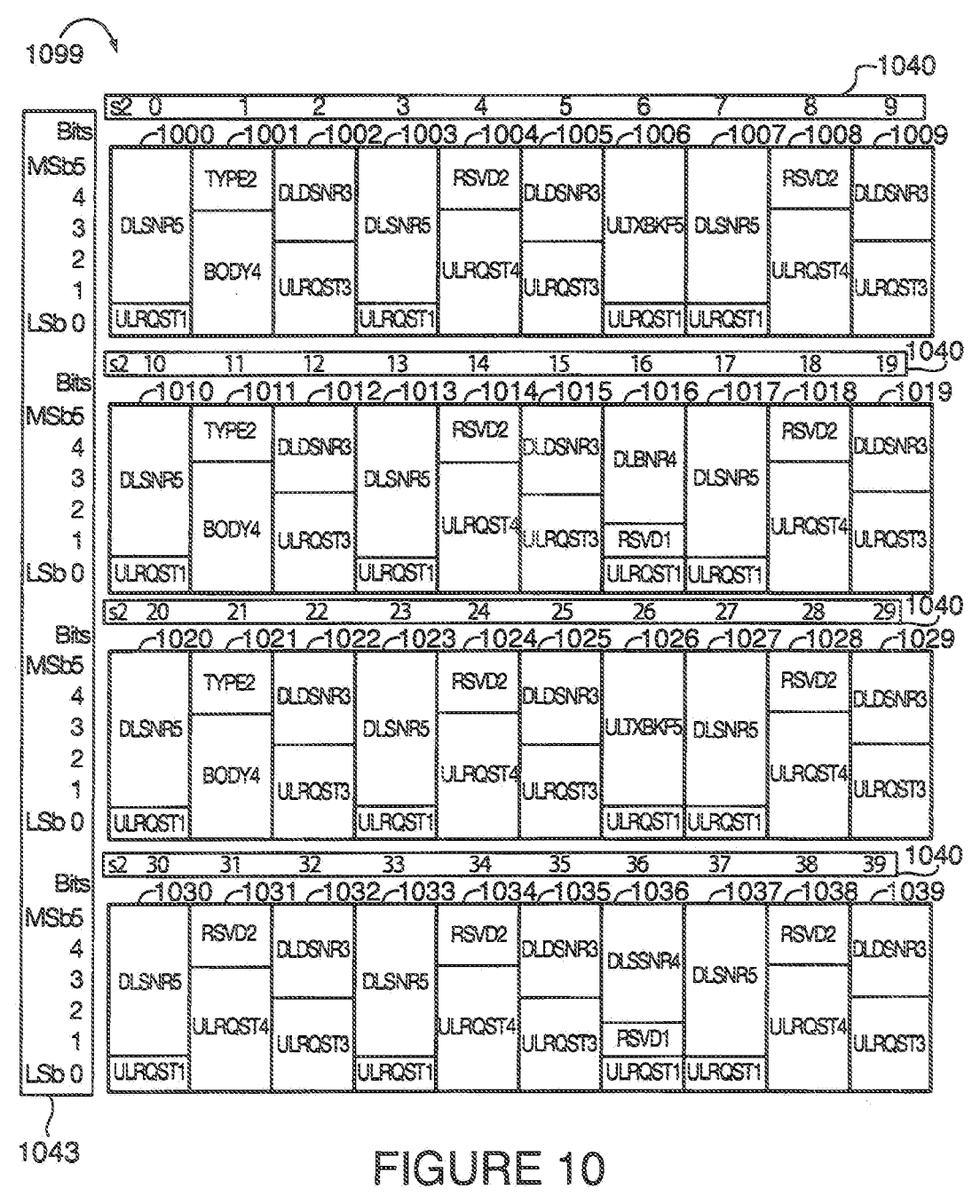

FIG. 10 is a drawing 1099 illustrating an exemplary default mode of the full tone format in a beaconslot for a given DCCH tone. In FIG. 10, each block (1000, 1001, 1002, 1003, 1004, 1005, 1006, 1007, 1008, 1009, 1010, 1011, 1012, 1013, 1014, 1015, 1016, 1017, 1018, 1019, 1020, 1021, 1022, 1023, 1024, 1025, 1026, 1027, 1028, 1029, 1030, 1031, 1032, 1033, 1034, 1035, 1036, 1037, 1038, 1039) represents one segment whose index s2 (0, . . . , 39) is shown above the block in rectangular region 1040. Each block, e.g., block 1000 representing segment 0, conveys 6 information bits; each block comprises 6 rows corresponding to the 6 bits in the segment, where the bits are listed from the most significant bit to the least significant bit downwards from the top row to the bottom row as shown in rectangular region 1043.

For the exemplary embodiment, the framing format shown in FIG. 10 is used repeatedly in every beaconslot, when the default mode of full-tone format is used, with the following exception. In the first uplink superslot after the wireless terminal migrates to the ON state in the current connection, the WT shall use the framing format shown in FIG. 11. The first uplink superslot is defined: for a scenario when the WT migrates to the ON state from the ACCESS state, for a scenario when the WT migrates to the ON state from a HOLD state, and for a scenario when the WT migrates to the ON state from the ON state of another connection.

Figure 11:
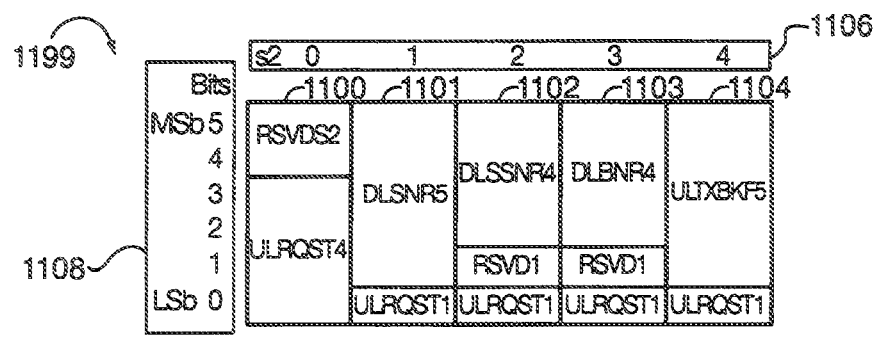
FIG. 11 illustrates an exemplary definition of the default mode in the full-tone format of the uplink DCCH segments in the first uplink superslot after the WT migrates to the ON state.

FIG. 11 illustrates an exemplary definition of the default mode in the full-tone format of the uplink DCCH segments in the first uplink superslot after the WT migrates to the ON state. Drawing 1199 includes five successive segments (1100,

1101, 1102, 1103, 1104) corresponding to segment index numbers, s2=(0, 1, 2, 3, 4), respectively in the superslot as indicated by rectangle 1106 above the segments. Each block, e.g., block 1100 representing segment 0 of the superslot, conveys 6 information bits; each block comprises 6 rows corresponding to the 6 bits in the segment, where the bits are listed from the most significant bit to the least significant bit downwards from the top row to the bottom row as shown in rectangular region 1108.

In the exemplary embodiment, in the scenario of migrating from the HOLD to ON state, the WT starts to transmit the uplink DCCH channel from the beginning of the first UL superslot, and therefore the first uplink DCCH segment shall transport the information bits in the leftmost information column of FIG. 11, the information bits of segment 1100. In the exemplary embodiment, in the scenario of migrating from the ACCESS state, the WT does not necessarily start from the beginning of the first UL superslot, but does still transmit the uplink DCCH segments according to the framing format specified in FIG. 11. For example, if the WT starts to transmit the UL DCCH segments from the halfslot of the superslot with index=4, then the WT skips the leftmost information column of FIG. 11 (segment 1100) and the first uplink DCCH segment transports the second leftmost column (segment 1101). Note that in the exemplary embodiment, superslot indexed halfslots (1-3) correspond to one DCCH segment (1100) and superslot indexed halfslots (4-6) correspond to the next segment (1101). In the exemplary embodiment, for the scenario of switching between the full-tone and split-tone formats, the WT uses the framing format shown in FIG. 10 without the above exception of using the format shown in FIG. 11.

Once, the first UL superslot ends, the uplink DCCH channel segments switch to the framing format of FIG. 10. Depending on where the first uplink superslot ends, the point of switching the framing format may or may not be the beginning of a beaconslot. Note that in this example embodiment, there are five DCCH segments for a given DCCH tone for a superslot. For example, suppose that the first uplink superslot is of uplink beaconslot superslot index=2, where beaconslot superslot index range is from 0 to 7. Subsequently in the next uplink superslot, which is of uplink beaconslot superslot index=3, the first uplink DCCH segment using the default framing format of FIG. 10 is of index s2=15 (segment 1015 of FIG. 10) and transports the information corresponding to segment s2=15 (segment 1015 of FIG. 10).

Figure 12:
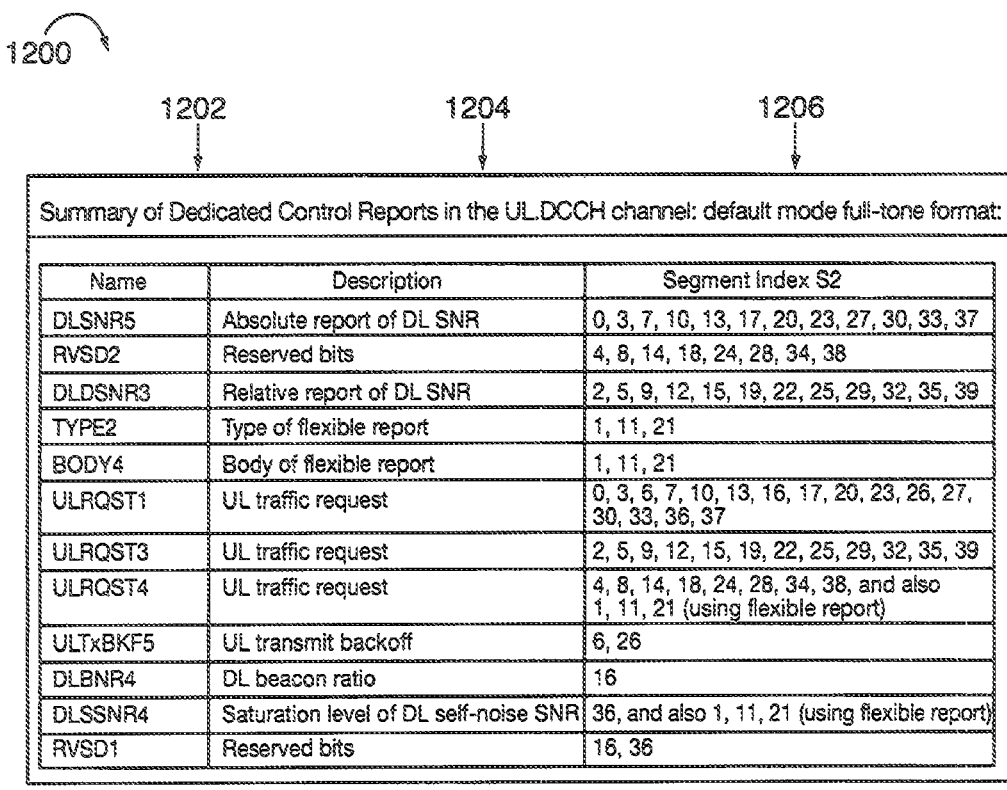
FIG. 12 is an exemplary summary list of dedicated control reports (DCRs) in the full-tone format for the default mode.

Each uplink DCCH segment is used to transmit a set of Dedicated Control Channel Reports (DCRs). An exemplary summary list of DCRs in the full-tone format for the default mode is given in table 1200 FIG. 12. The information of table 1200 is applicable to the partitioned segments of FIGS. 10 and 11. Each segment of FIGS. 10 and 11 includes two or more reports as described in table 1200. First column 1202 of table 1200 describes abbreviated names used for each exemplary report. The name of each report ends with a number which specifies the number of bits of the DCR. Second column 1204 of table 1200 briefly describes each named report. Third column 1206 specifies the segment index s2 of FIG. 10, in which a DCR is to be transmitted, and corresponds to a mapping between table 1200 and FIG. 10.

Figure 13:
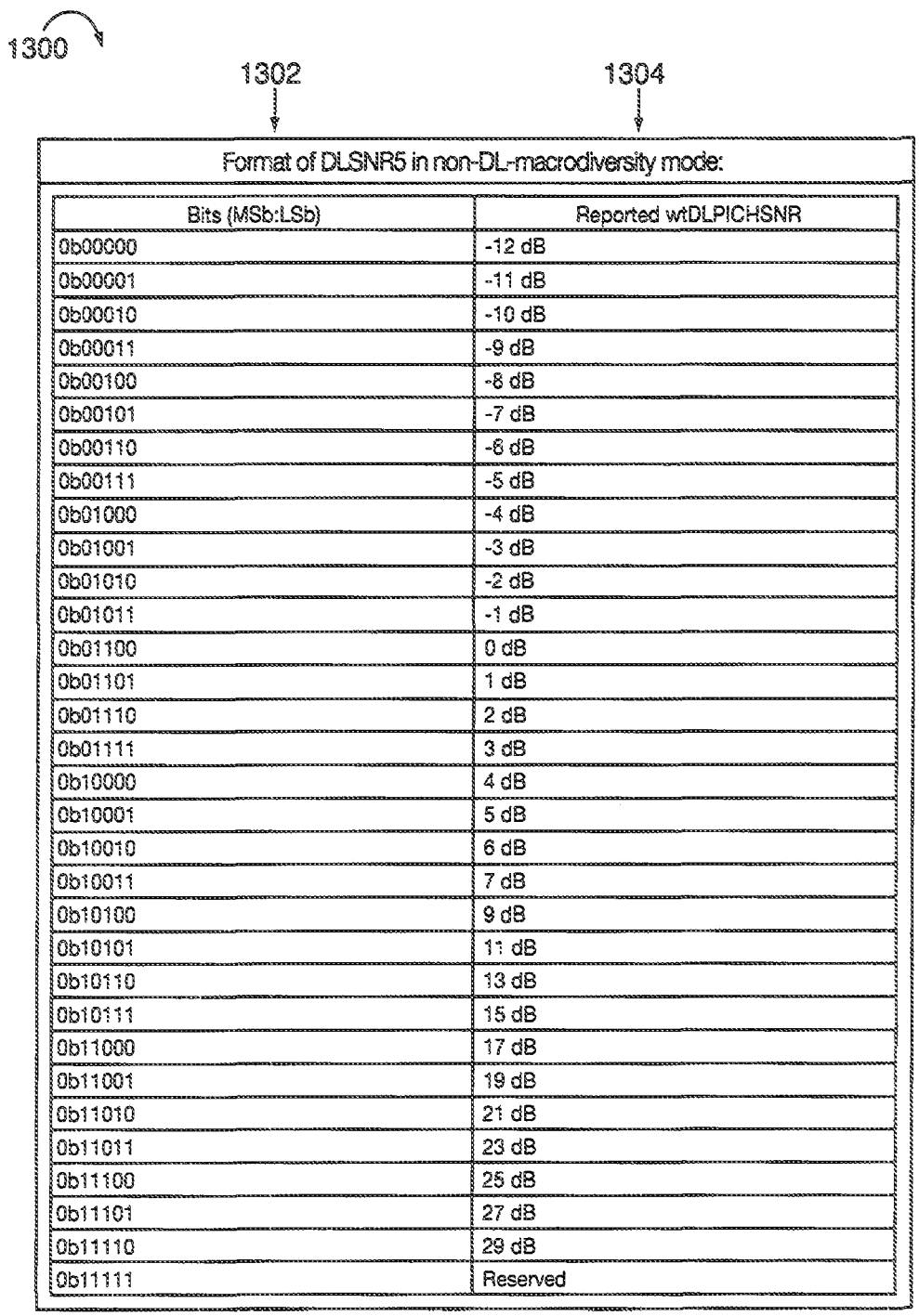
FIG. 13 is a table of an exemplary format for an exemplary 5 bit downlink SNR report (DLSNR5) in non-DL macrodiversity mode.

The exemplary 5 bit absolute report of downlink signal to noise ratio (DLSNR5) shall now be described. The exemplary DLSNR5 uses one of the following two mode formats. When the WT has only one connection, the non-DL macrodiversity mode format is used. When the WT has multiple connections, the DL-macrodiversity mode format is used if the WT is in the DL-macrodiversity mode; otherwise the non-macrodiversity mode format is used. In some embodiments, whether the WT is in the DL-macrodiversity mode and/or how the WT switches between the DL macrodiversity mode and the non-DL macrodiversity mode are specified in an upper layer protocol. In the non-DL macro-diversity mode the WT reports the measured received downlink pilot channel segment SNR using the closest representation of Table 1300 of FIG. 13. FIG. 13 is a table 1300 of an exemplary format of DLSNR5 in non-DL macrodiversity mode. First column 1302 list 32 possible bit pattern that may be represented by the 5 bits of the report. Second column 1304 lists the value of wtDLPICH-SNR being communicated to the base station via the report. In this example, incremental levels from −12 dB to 29 dB can be indicated corresponding to 31 different bit patterns, while bit pattern 11111 is reserved.

For example, if the calculated wtDLPICHSNR based on measurement is −14 dB, the DLSNR5 report is set to bit pattern 00000; if the calculated wtDLPICHSNR based on measurement is −11.6 dB, the DLSNR5 report is set to bit pattern 00000 because in table 1300 the entry with −12 dB is the closet to the calculated value of −11.6 dB; if the calculated wtDLPICHSNR based on measurement is −11.4 dB, the DLSNR5 report is set to bit pattern 00001 because in table 1300 the entry with −11 dB is the closet to the calculated value of −11.4 dB.

The reported wireless terminal downlink pilot SNR (wt-DLPICHSNR) accounts for the fact that the pilot signal, on which the SNR is measured, is typically transmitted at higher power than the average traffic channel power. For this reason, the pilot SNR is, in some embodiments, reported as, $$wtDLPICHSNR = PilotSNR - Delta,$$

where pilotSNR is the measured SNR on the received downlink pilot channel signal in dB, and Delta is a difference between the pilot transmission power and an average per tone channel transmission power level, e.g. the average per tone downlink traffic channel transmission power. In some embodiments Delta=7.5 dB.

Figure 14:
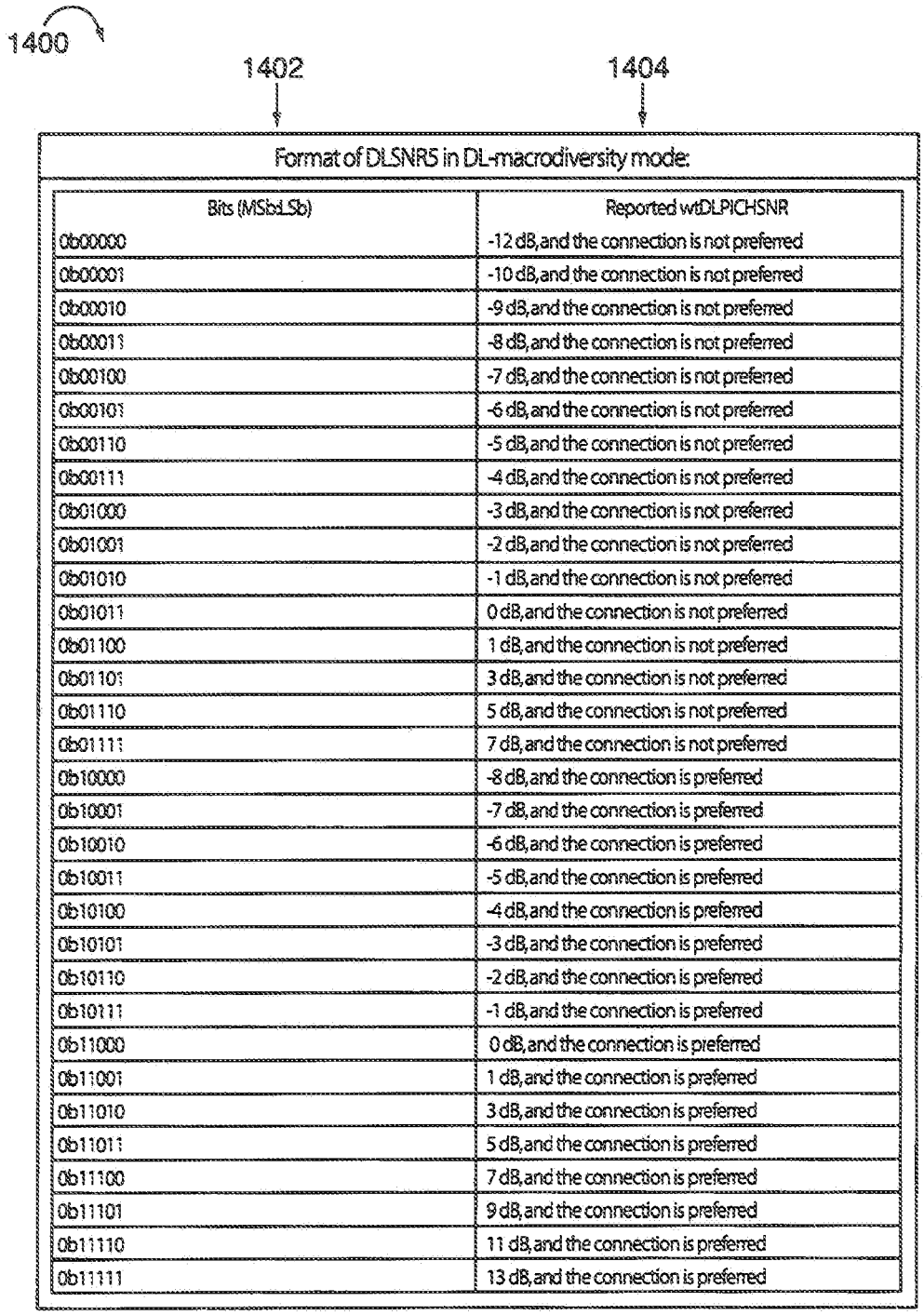
FIG. 14 is a table of an exemplary format of 5 bit downlink SNR report (DLSNR5) in DL macrodiversity mode.

In the DL-macrodiversity mode format the WT uses the DLSNR5 report to inform a base station sector attachment point, whether the current downlink connection with the base station sector attachment point is a preferred connection, and to report the calculated wtDLPICHSNR with the closest DLSNR5 report according to table 1400. FIG. 14 is a table 1400 of an exemplary format of DLSNR5 in DL macrodiversity mode. First column 1402 list 32 possible bit patterns that may be represented by the 5 bits of the report. Second column 1404 lists the value of wtDLPICHSNR being communicated to the base station via the report and an indication as to whether or not the connection is preferred. In this example, incremental levels of SNR from −12 db to 13 dB can be indicated corresponding to 32 different bit patterns. Sixteen of the bit patterns correspond to the case where the connection is not preferred; while the remaining sixteen bit patterns correspond to the case where the connection is preferred. In some exemplary embodiments, the highest SNR value that can be indicated when a link is preferred is greater than the highest SNR value that can be indicated when a link is not preferred. In some exemplary embodiments, the lowest SNR that can be indicated when a link is preferred is greater than the lowest SNR value that can be indicated when a link is not preferred.

In some embodiments, in the DL-macrodiversity mode, the wireless terminal indicates one and only one connection to be the preferred connection at any given time. Furthermore, in some such embodiments, if the WT indicates that a connection is preferred in a DLSNR5 report, then the WT sends at least NumConsecutive Preferred consecutive DLSNR5 reports indicating that the connection is preferred before the WT is allowed to a send a DLSNR5 report indicating that another connection becomes the preferred one. The value of the parameter NumConsecutive preferred depends on the format of the uplink DCCH channel, e.g., full-tone format vs split-tone format). In some embodiments the WT gets the parameter NumConsecutivePreferred in an upper level protocol. In some embodiments, the default value of NumConsecutivePreferred is 10 in the full-tone format.

Figure 15:
FIG. 15 is a table of an exemplary format of an exemplary 3 bit downlink delta SNR report (DLDSNR3).

An exemplary 3 bit relative (difference) report of downlink SNR (DLDSNR3) shall now be described. The wireless terminal measures the received SNR of the downlink pilot channel (PilotSNR), calculates the wtDLPICHSNR value, where wtDLPICHSNR=PilotSNR−Delta, calculates the difference between the calculated wtDLPICHSNR value and the reported value by the most recent DLSNR5 report, and reports the calculated difference with the closest DLDSNR3 report according to table 1500 of FIG. 15. FIG. 15 is a table 1500 of an exemplary format of DLDSNR3. First column 1502 lists 9 possible bit patterns that may represent the 3 information bits of the report. Second column 1504 lists the reported difference in wtDLPICHSNR being communicated to the base station via the report ranging from −5 dB to 5 dB.

Various exemplary uplink traffic channel request reports will now be described. In an exemplary embodiment three types of uplink traffic channel request reports are used: an exemplary single bit uplink traffic channel request report (ULRQST1), an exemplary three bit uplink traffic channel request report (ULRQST3), and an exemplary four bit uplink traffic channel request report (ULRQST4). The WT uses an ULRQST1, ULRQST3, or ULRQST4 to report the status of the MAC frame queues at the WT transmitter. In the exemplary embodiment, the MAC frames are constructed from the LLC frames, which are constructed from packets of upper layer protocols. In this exemplary embodiment, any packet belongs to one of four request groups (RG0, RG1, RG2, or RG3). In some exemplary embodiments, the mapping of packets to request groups is done through higher layer protocols. In some exemplary embodiments, there is a default mapping of packets to request groups, that may be changed by the base station and/or WT through higher layer protocols. If the packet belongs to one request group, then, in this exemplary embodiment, all the MAC frames of that packet also belong to that same request group. The WT reports the number of MAC frames in the 4 request groups that the WT may intend to transmit. In the ARQ protocol, those MAC frames are marked as "new" or "to be retransmitted". The WT maintains a vector of four elements N[0:3] for k=0:3, N[k] represents the number of MAC frames that the WT intends to transmit in request group k. The WT should report the information about N[0:3] to the base station sector so that the base station sector can utilize the information in an uplink scheduling algorithm to determine the assignment of uplink traffic channel segments.

Figure 16:
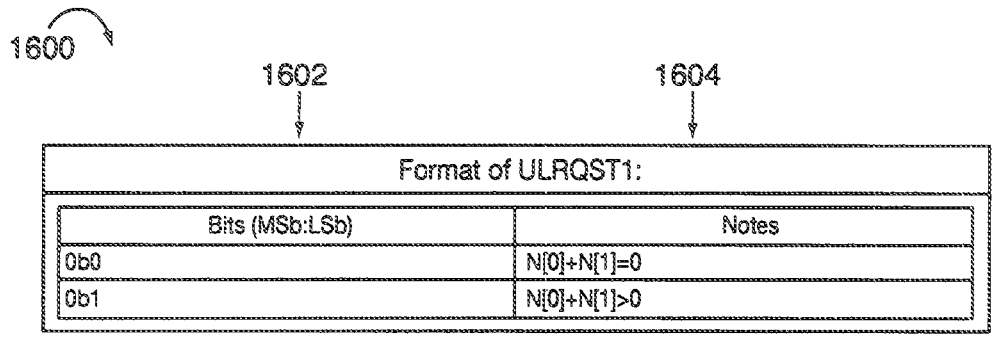
FIG. 16 is a table of an exemplary format for an exemplary 1 bit uplink request (ULRQST1) report.

In an exemplary embodiment, the WT uses the single bit uplink traffic channel request report (ULRQST1) to report N[0]+N[1] according to table 1600 of FIG. 16. Table 1600 is an exemplary format for an ULRQST1 report. First column 1602 indicates the two possible bit patterns that may be conveyed while second column 1604 indicates the meaning of each bit pattern. If the bit pattern is 0, that indicates that there are no MAC frames that the WT intends to transmit in either request group 0 or request group 1. If the bit pattern is 1, that indicates that the WT has at least one MAC frame in request group 0 or request group 1 that the WT intends to communicate.

In accordance with a feature used in various embodiments of the present invention, multiple request dictionaries are supported. Such a request dictionary defines the interpretation of the information bits in uplink traffic channel request reports in the uplink dedicated control channel segments. At a given time, the WT uses one request dictionary. In some embodiments, when the WT just enters the ACTIVE state, the WT uses a default request dictionary. To change the request dictionary the WT and base station sector use an upper layer configuration protocol. In some embodiments, when the WT migrates from the ON state to the HOLD state, the WT keeps the last request dictionary used in the ON state so that when the WT migrates from the HOLD state to the ON state later, the WT continues to use the same request dictionary until the request dictionary is explicitly changed; however, if the WT leaves the ACTIVE state, then the memory of the last request dictionary is cleared. In some embodiments, the ACTIVE state includes the ON state and the Hold state, but does not include the ACCESS state and sleep state.

Figure 17:
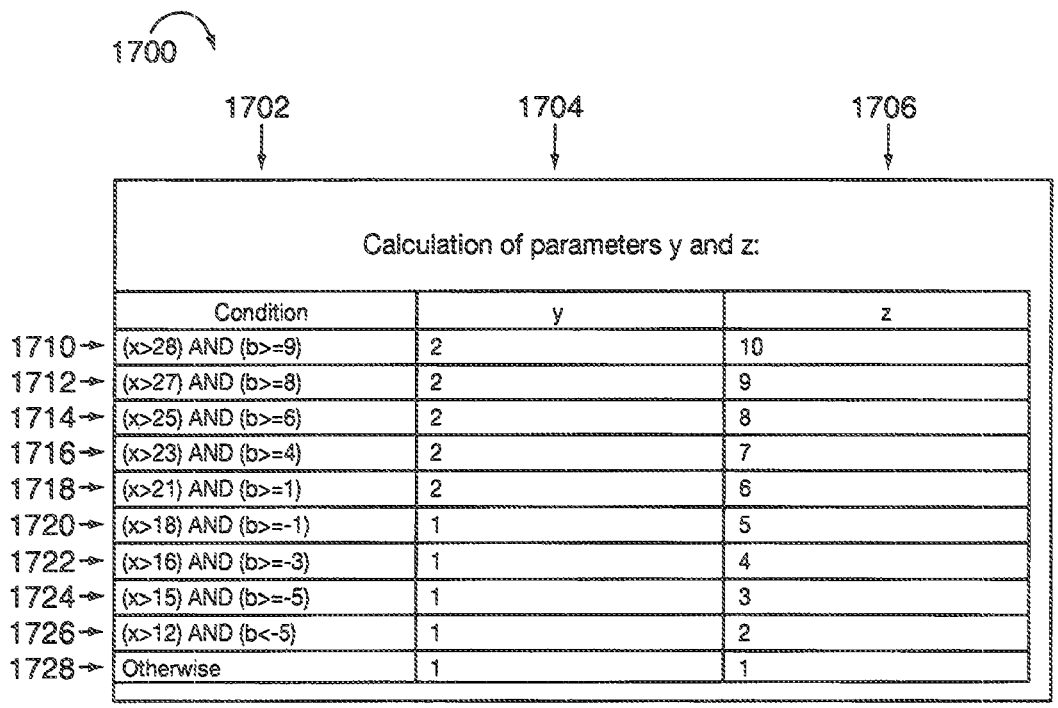
FIG. 17 is an exemplary table used to calculate exemplary control parameters y and z, the control parameters y and z being used in determining uplink multi-bit request reports conveying transmission request group queue information.

In some embodiments, to determine at least some ULRQST3 or ULRQST4 reports, the wireless terminal first calculates one or more of the following two control parameters y and z, and uses one of the request dictionaries, e.g., Request dictionary (RD) reference number 0, RD reference number 1, RD reference number 2, RD reference number 3. Table 1700 of FIG. 17 is an exemplary table used to calculate control parameters y and z. First column 1702 lists a condition; second column 1704 lists the corresponding value of output control parameter y; third column 1706 lists the corresponding value of output control parameter z. In first column 1702, x (in dBs) represents the value of the most recent 5 bit uplink transmit backoff report (ULTXBKF5) and the value b (in dBs) of the most recent 4 bit downlink beacon ratio report (DLBNR4). Given the input values of x and b from the most recent reports, the WT checks if the condition from first row 1710 is satisfied. If the test condition is satisfied, then the WT uses the corresponding y and z values of the row for calculating the ULRQST3 or ULRQST4. However, if the condition is not satisfied the testing continues with the next row 1712. Testing continues proceeding down the table 1700 in order from top to bottom (1710, 1712, 1714, 1716, 1718, 1720, 1722, 1724, 1726, 1728) until the condition listed in column 1702 for a given row is satisfied. The WT determines y and z as those from the first row in table 1700 for which the first column is satisfied. For example, if x=17 and b=1, then z=4 and y=1.

The WT, in some embodiments, uses an ULRQST3 or ULRQST4 to report the actual N[0:3] of the MAC frames queues according to a request dictionary. A request dictionary is identified by a request dictionary (RD) reference number.

In some embodiments, at least some request dictionaries are such that any ULRQST4 or ULRQST3 may not completely include the actual N[0:3]. A report is in effect a quantized version of the actual N[0:3]. In some embodiments, the WT sends a report to minimize the discrepancy between the reported and actual MAC frame queues first for request group 0 and 1, and then for request group 2, and finally for request group 3. However, in some embodiments, the WT has the flexibility of determining a report to benefit the WT most. For example, assume that the WT is using exemplary request dictionary 1 (See FIGS. 20 and 21), the WT may use an ULRQST4 to report N[1]+N[3] and use an ULRQST3 to report N[2] and N[0]. In addition if a report is directly related to a subset of request groups according to the request dictionary, it does not automatically imply that MAC frame queues of a remaining request group are empty. For example, if a report means N[2]=1, then it may not automatically imply that N[0]=0, N[1]=0, or N[3]=0.

Figure 18:
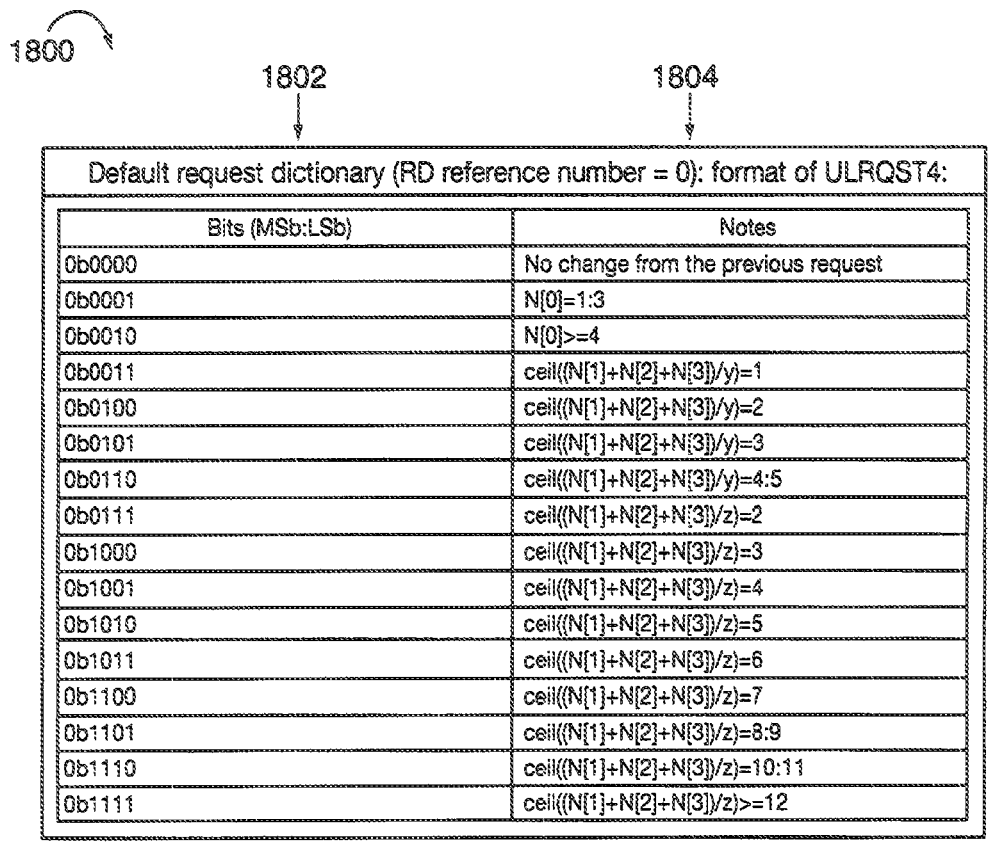
FIG. 18 is a table identifying bit format and interpretations associated with each of 16 bit patterns for a four bit uplink request, ULRQST4, corresponding to an exemplary first request dictionary (RD reference number=0).

FIG. 18 is a table 1800 identifying bit format and interpretations associated with each of 16 bit patterns for a four bit uplink request, ULRQST4, corresponding to an exemplary first request dictionary (RD reference number=0). In some embodiments, the request dictionary with reference number=0 is the default request dictionary. First column 1802 identifies the bit pattern and bit ordering, most significant bit to least significant bit. Second column 1804 identifies the interpretation associated with each bit pattern. An ULRQST4 of table 1800 conveys one of: (i) no change from the previous 4 bit uplink request, (ii) information about the N[0], and (iii) information about a composite of N[1]+N[2]+N[3] as a function of either control parameter y or control parameter z of table 1700 of FIG. 17.

Figure 19:
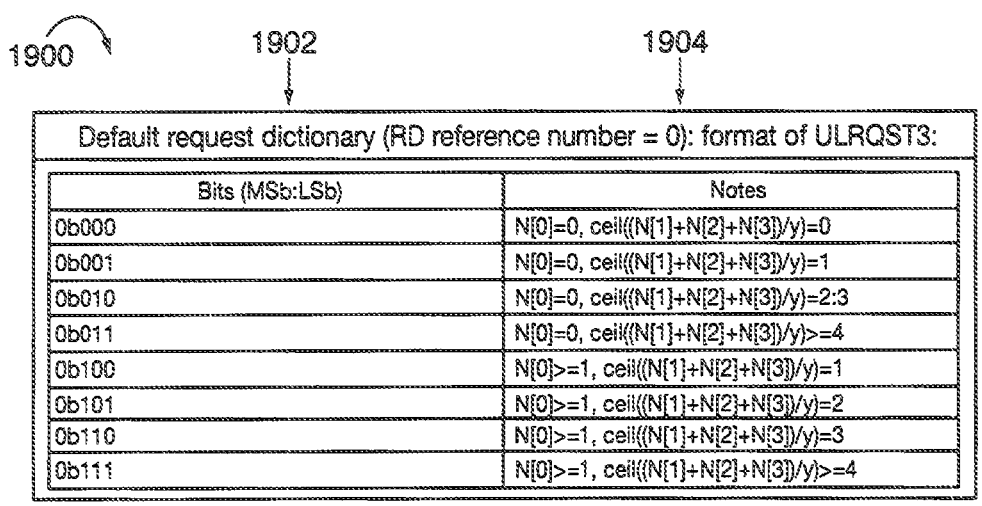
FIG. 19 is a table identifying bit format and interpretations associated with each of 8 bit patterns for a three bit uplink request, ULRQST3, corresponding to an exemplary first request dictionary (RD reference number=0).

FIG. 19 is a table 1900 identifying bit format and interpretations associated with each of 8 bit patterns for a three bit uplink request, ULRQST3, corresponding to an exemplary first request dictionary (RD reference number=0). In some embodiments, the request dictionary with reference number=0 is the default request dictionary. First column 1902 identifies the bit pattern and bit ordering, most significant bit to least significant bit. Second column 1904 identifies the interpretation associated with each bit pattern. An ULRQST3 of table 1900 conveys: (i) information about the N[0] and (ii) information about a composite of N[1]+N[2]+N[3] as a function of control parameter y of table 1700 of FIG. 17.

Figure 20:
FIG. 20 is a table identifying bit format and interpretations associated with each of 16 bit patterns for a four bit uplink request, ULRQST4, corresponding to an exemplary second request dictionary (RD reference number=1).

FIG. 20 is a table 2000 identifying bit format and interpretations associated with each of 16 bit patterns for a four bit uplink request, ULRQST4, corresponding to an exemplary second request dictionary (RD reference number=1). First column 2002 identifies the bit pattern and bit ordering, most significant bit to least significant bit. Second column 2004 identifies the interpretation associated with each bit pattern. An ULRQST4 of table 2000 conveys one of: (i) no change from the previous 4 bit uplink request, (ii) information about the N[2], and (iii) information about a composite of N[1]+N[3] as a function of either control parameter y or control parameter z of table 1700 of FIG. 17.

Figure 21:
FIG. 21 is a table identifying bit format and interpretations associated with each of 8 bit patterns for a three bit uplink request, ULRQST3, corresponding to an exemplary second request dictionary (RD reference number=1).

FIG. 21 is a table 2100 identifying bit format and interpretations associated with each of 8 bit patterns for a three bit uplink request, ULRQST3, corresponding to an exemplary second request dictionary (RD reference number=1). First column 2102 identifies the bit pattern and bit ordering, most significant bit to least significant bit. Second column 2104 identifies the interpretation associated with each bit pattern. An ULRQST3 of table 2100 conveys: (i) information about N[0] and (ii) information about N[2].

Figure 22:
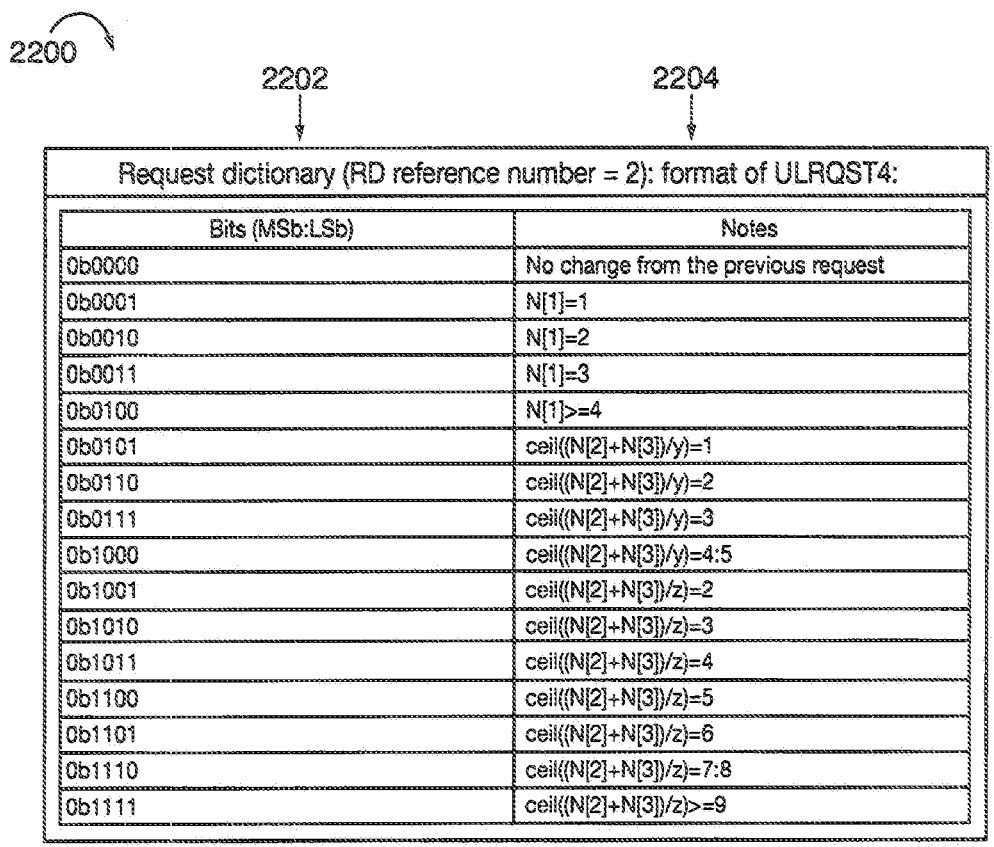
FIG. 22 is a table identifying bit format and interpretations associated with each of 16 bit patterns for a four bit uplink request, ULRQST4, corresponding to an exemplary third request dictionary (RD reference number=2).

FIG. 22 is a table 2200 identifying bit format and interpretations associated with each of 16 bit patterns for a four bit uplink request, ULRQST4, corresponding to an exemplary third request dictionary (RD reference number=2). First column 2202 identifies the bit pattern and bit ordering, most significant bit to least significant bit. Second column 2204 identifies the interpretation associated with each bit pattern. An ULRQST4 of table 2200 conveys one of: (i) no change from the previous 4 bit uplink request, (ii) information about the N[1], and (iii) information about a composite of N[2]+N[3] as a function of either control parameter y or control parameter z of table 1700 of FIG. 17.

Figure 23:
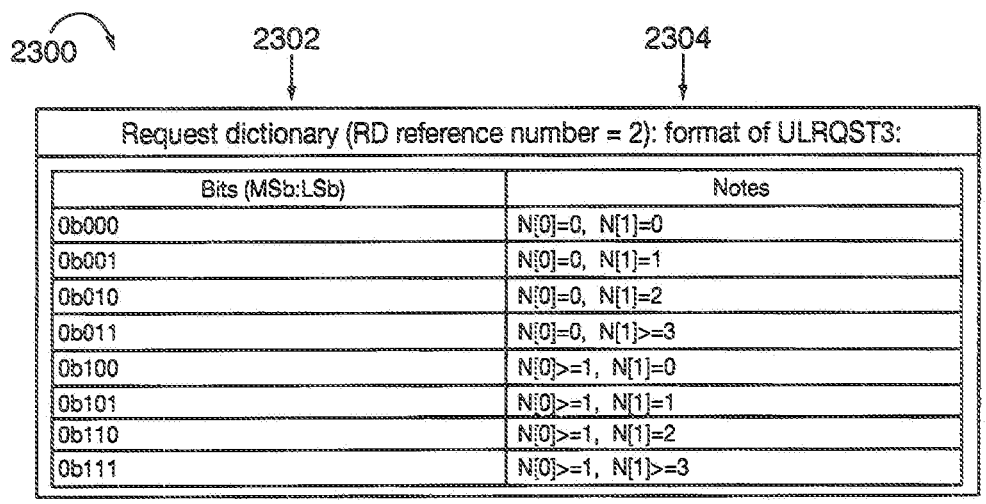
FIG. 23 is a table identifying bit format and interpretations associated with each of 8 bit patterns for a three bit uplink request, ULRQST3, corresponding to an exemplary third request dictionary (RD reference number=2).

FIG. 23 is a table 2300 identifying bit format and interpretations associated with each of 8 bit patterns for a three bit uplink request, ULRQST3, corresponding to an exemplary third request dictionary (RD reference number=2). First column 2302 identifies the bit pattern and bit ordering, most significant bit to least significant bit. Second column 2304 identifies the interpretation associated with each bit pattern. An ULRQST3 of table 2300 conveys: (i) information about N[0] and (ii) information about N[1].

Figure 24:
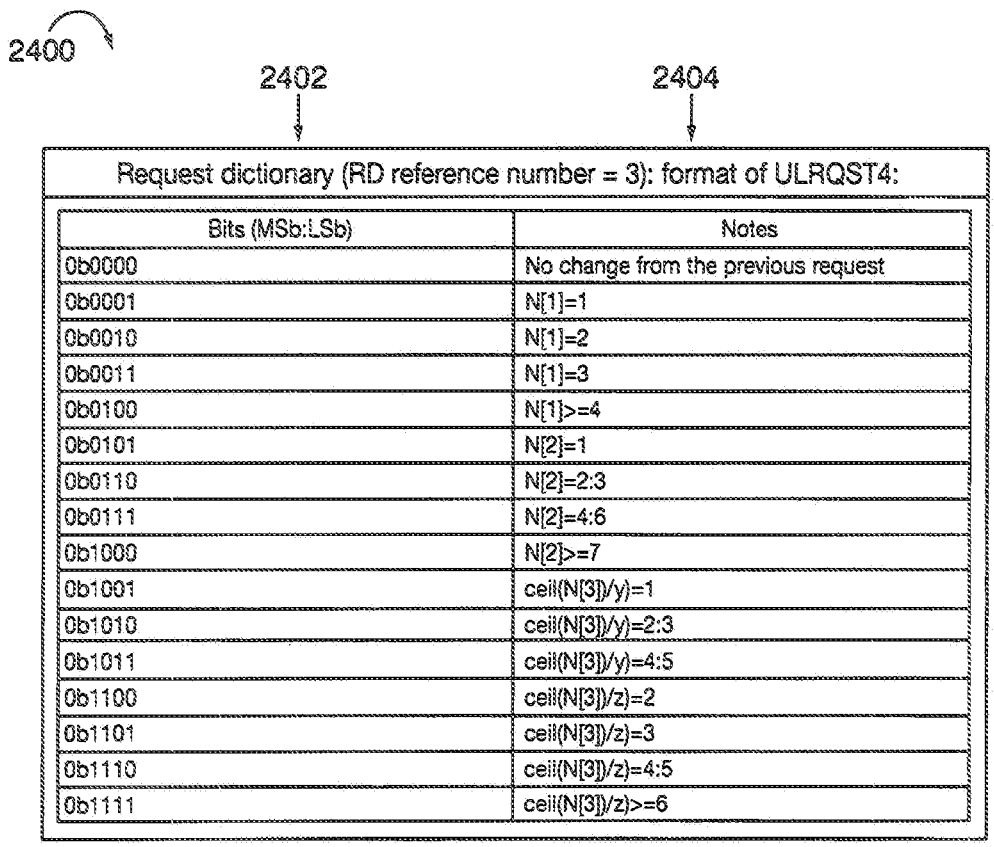
FIG. 24 is a table identifying bit format and interpretations associated with each of 16 bit patterns for a four bit uplink request, ULRQST4, corresponding to an exemplary fourth request dictionary (RD reference number=3).

FIG. 24 is a table 2400 identifying bit format and interpretations associated with each of 16 bit patterns for a four bit uplink request, ULRQST4, corresponding to an exemplary fourth request dictionary (RD reference number=3). First column 2402 identifies the bit pattern and bit ordering, most significant bit to least significant bit. Second column 2404 identifies the interpretation associated with each bit pattern. An ULRQST4 of table 2400 conveys one of: (i) no change from the previous 4 bit uplink request, (ii) information about N[1], (iii) information about N[2], and (iv) information about N[3] as a function of either control parameter y or control parameter z of table 1700 of FIG. 17.

Figure 25:
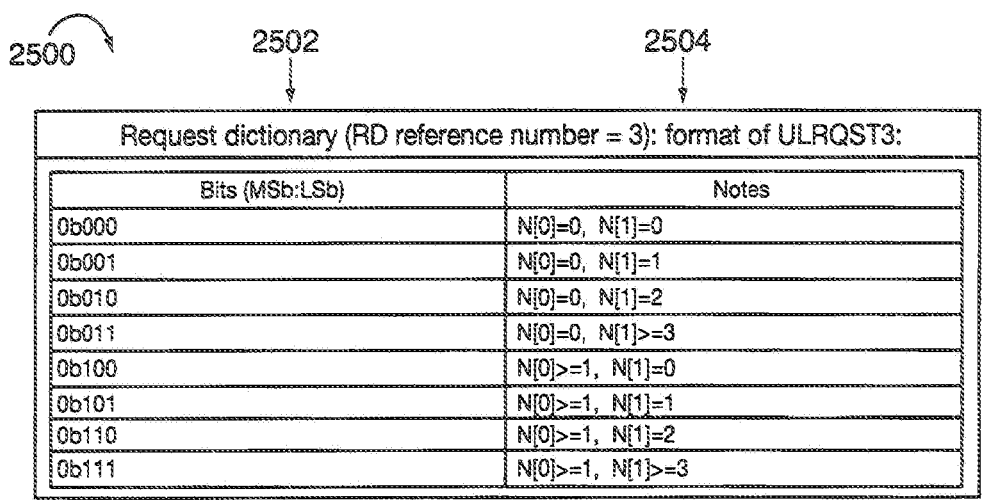
FIG. 25 is a table identifying bit format and interpretations associated with each of 8 bit patterns for a three bit uplink request, ULRQST3, corresponding to an exemplary fourth request dictionary (RD reference number=3).

FIG. 25 is a table 2500 identifying bit format and interpretations associated with each of 8 bit patterns for a three bit uplink request, ULRQST3, corresponding to an exemplary fourth request dictionary (RD reference number=3). First column 2502 identifies the bit pattern and bit ordering, most significant bit to least significant bit. Second column 2504 identifies the interpretation associated with each bit pattern. An ULRQST3 of table 2500 conveys: (i) information about N[0] and (ii) information about N[1].

In accordance with the present invention, the methods of the present invention facilitate a wide range of reporting possibilities. For example, the use of control parameters, e.g., based on SNR and backoff reports, allow for a single bit pattern request corresponding to a given dictionary to take on multiple interpretations. Consider exemplary request dictionary reference number 0 for 4 bit uplink requests as shown in table 1800 of FIG. 18. For a four bit request where each bit pattern corresponds to a fixed interpretations and does not rely on control parameters, 16 possibilities exists. However, in table 1800 four of the bit patterns (0011, 0100, 0101, and 0110) can each have two different interpretations since control parameter y can have value 1 or 2. Similarly, in table 1800 nine of the bit patterns (0111, 1000, 1001, 1010, 1011, 1100, 1101, 1110, and 1111) can each have 10 different interpretations since control parameter z can have any of the values (1, 2, 3, 4, 5, 6, 7, 8, 9, 10). This use of control parameters expands the range of reporting for the 4 bit request report from 16 different possibilities to 111 possibilities.

An exemplary 5 bit wireless terminal transmitter power backoff report (ULTxBKF5) will now be described. A wireless terminal backoff report reports an amount of remaining power that the WT has to use for uplink transmissions for non-DCCH segments, e.g., including uplink traffic channel segment(s) after taking into account the power used to transmit the DCCH segments. wtULDCCHBackOff=wtPowerMax−wtULDCCHTxPower; where wtULDCCHTxPower denotes the per-tone transmission power of the uplink DCCH channel in dBm, and wtPowerMax is the maximum transmission power value of the WT, also in dBm. Note that the wtULDCCHTxPower represents the instantaneous power and is calculated using the wtPowerNominal in the halfslot immediately preceeding the current uplink DCCH segment. In some such embodiments, the per tone power of the uplink DCCH channel relative to wtPowerNominal is 0 dBs. The value of wtPowerMax depends on the device capability of the WT, upon system specifications and/or upon regulations. In some embodiments, the determination of wtPowerMax is implementation dependent.

FIG. 26 is a table 2600 identifying bit format and interpretations associated with each of 32 bit patterns for an exemplary 5 bit uplink transmitter power backoff report (ULTx- BKF5), in accordance with the present invention. First column 2602 identifies the bit pattern and bit ordering, most significant bit to least significant bit. Second column 2604 identifies the reported WT uplink DCCH Backoff report values in dBs corresponding to each bit pattern. In this exemplary embodiment 30 distinct levels can be reported ranging from 6.5 dB to 40 dBs; two bit patterns are left as reserved. A wireless terminal calculates wtULDCCHBackoff, e.g., as indicated above, selects the closet entry in table 2600 and uses that bit pattern for the report.

An exemplary 4 bit downlink beacon ratio report (DL-BNR4) will now be described. The beacon ratio report provides information which is a function of received measured downlink broadcast signals, e.g., beacon signals and/or pilot signals, from a serving base station sector and from one or more other interfering base station sectors. Qualitatively, the beacon ratio report can be used to estimate the relative proximity of the WT to other base station sectors. The beacon ratio report can be, and in some embodiments is, used at the serving BS sector in controlling the uplink rate of the WT to prevent excessive interference to other sectors. The beacon ratio report, in some embodiments, is based on two factors: (i) estimated channel gain ratios, denoted $G_i$, and (ii) loading factors, denoted $b_i$.

The channel gain ratios are defined, in some embodiments, as follows. In the tone block of the current connection, the WT, in some embodiments, determines an estimate of the ratio of the uplink channel gain from the WT to any interfering Base station sector i (BSS i) to the channel gain from the WT to the serving BSS. This ratio is denoted as $G_i$. Typically, the uplink channel gain ratio is not directly measurable at the WT. However, since the uplink and downlink path gains are typically symmetric, the ratio can be estimated by comparing the relative received power of downlink signals from the serving and interfering BSSs. One possible choice for the reference downlink signal is the downlink beacon signal, which is well-suited for this purpose since it can be detected in very low SNR. In some embodiments, beacon signals have a higher per tone transmission power level than other downlink signals from a base station sector. Additionally, the characteristics of the beacon signal are such that precise timing synchronization is not necessary to detect and measure the beacon signal. For example, the beacon signal is, in some embodiments, a high power narrowband, e.g., single tone, two OFDM symbol transmission time period wide signal. Thus at certain locations, a WT is able to detect and measure a beacon signal from a base station sector, where the detection and/or measurement of other downlink broadcast signals, e.g., pilot signals may not be feasible. Using the beacon signal, the uplink path ratio would be given by $G_i=PB_i/PB_0$, where $PB_i$ and $PB_0$ are, respectively, the measured received beacon power from the interfering and serving base station sectors, respectively.

Since the beacon is typically transmitted rather infrequently, the power measurement of the beacon signal may not provide a very accurate representation of average channel gain, especially in a fading environment where the power changes rapidly. For example, in some embodiments one beacon signal, which occupies 2 successive OFDM symbol transmission time periods in duration and which corresponds to a downlink tone block of a base station sector, is transmitted for every beaconslot of 912 OFDM symbol transmission time periods.

Pilot signals, on the other hand, are often transmitted much more frequently than beacon signals, e.g., in some embodiments pilot signals are transmitted during 896 out of the 912 OFDM symbol transmission time periods of a beaconslot. If the WT can detect the pilot signal from the BS sector, it can estimate the received beacon signal strength from the measured received pilot signal instead of using a beacon signal measurement. For example, if the WT can measure the received pilot power, $PP_i$, of the interfering BS sector, then it can estimate the received beacon power $PB_i$ from estimated $PB_i=KZ_iPP_i$, where K is a nominal ratio of the beacon to pilot power of the interfering sector that is the same for each of the BS sectors, and $Z_i$ is a scaling factor that is sector dependent.

Similarly, if the pilot signal power from the serving BS is measurable at the WT, then the received beacon power $PB_0$ can be estimated from the relation, estimated $PB_0=KZ_0PP_0$, where $Z_0$ and $PP_0$ are, respectively, the scaling factor and measured received pilot power from the serving base station sector.

Observe that if the received pilot signal strength is measurable corresponding to the serving base station sector, and the received beacon signal strength is measurable corresponding to interfering base station sector, the beacon ratio can be estimated from:

$$G_i=PB_i/(PP_0KZ_0).$$

Observe that if the pilot strengths are measurable in both the serving and interfering sectors, the beacon ratio can be estimated from:

$$G_i=PP_iKZ_i/(PP_0KZ_0)=PP_iZ_i/(PP_0Z_0).$$

The scaling factors K, $Z_i$ and $Z_0$ are either system constants, or can be inferred by the WT, from other information from the BS. In some embodiments, some of the scaling factors (K, $Z_i$, $Z_0$) are system constants and some of the scaling factors (K, $Z_i$, $Z_0$) are inferred by the WT, from other information form the BS.

In some multicarrier systems with different power levels on different carriers, the scaling factors, $Z_i$ and $Z_0$, are a function of the downlink tone block. For example, an exemplary BSS has three power tier levels, and one of the three power tier levels is associated with each downlink tone block corresponding to a BSS attachment point. In some such embodiments, a different one of the three power tier levels is associated with each of the different tone blocks of the BSS. Continuing with the example, for the given BSS, each power tier level is associated with a nominal bss power level (e.g., one of bssPowerNominal0, bssPowerNominal1, and bssPowerNominal2) and the pilot channel signal is transmitted at a relative power level with respect to a nominal bss power level for the tone block, e.g., 7.2 dB above the nominal bss power level being used by the tone block; however, the beacon per tone relative transmission power level for the BSS is the same irrespective of the tone block from which the beacon is transmitted, e.g., 23.8 dB above the bss power level used by the power tier 0 block (bssPowerNominal0). Consequently, in this example for a given BSS, the beacon transmit power would be the same in each of the tone blocks, while the pilot transmit power is different, e.g. with the pilot transmit power of different tone blocks corresponding to different power tier levels. One set of scale factors for this example would be, K=23.8−7.2 dB, which is the ratio of the beacon to pilot power for tier 0, and Z, is set to the relative nominal power of the tier of the interfering sector to the power of a tier 0 sector.

Figure 27:
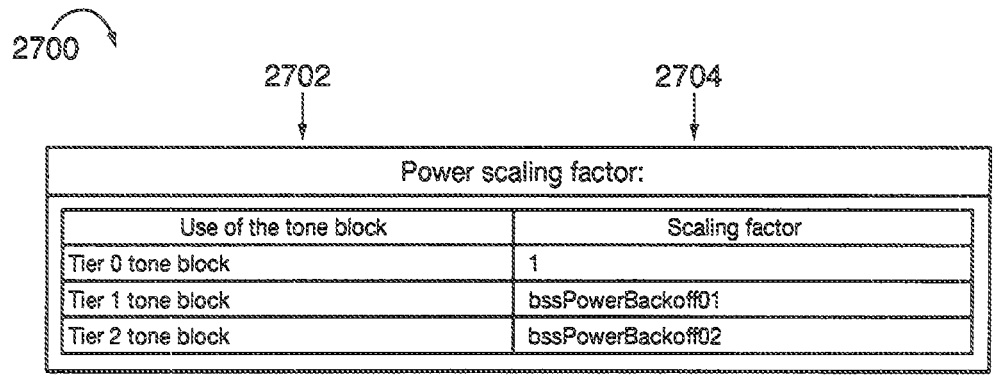
FIG. 27 includes an exemplary power scaling factor table relating tone block power tier number to power scaling factor, implemented in accordance with the present invention.

In some embodiments, the parameter $Z_0$ is determined from stored information, e.g., Table 2700 of FIG. 27, according to how the tone block of the current connection is used in the serving BSS as determined by the bssSectorType of the serving BSS. For example, if the tone block of the current connection is used as a tier 0 tone block by the serving BSS, the $Z_0=1$; if the tone block of the current connection is used as a tier 1 tone block by the serving BSS, the $Z_0$=bssPowerBackoff01; if the tone block of the current connection is used as a tier 2 tone block by the serving BSS, the $Z_0$=bssPowerBackoff02.

FIG. 27 includes exemplary power scaling factor table 2700, implemented in accordance with the present invention. First column 2702 lists the use of the tone block as either a tier 0 tone block, tier 1 tone block, or tier 2 tone block. Second column 2704 lists the scaling factor associated with each tier (0,1,2) tone block, as (1, bssPowerBackoff01, bssPowerBackoff02), respectively. In some embodiments, bssPowerBackoff01 is 6 dBs while bssPowerBackoff02 is 12 dB.

In some embodiments, the DCCH DLBNR4 report can be one of a generic beacon ratio report and a special beacon ratio report. In some such embodiments, a downlink traffic control channel, e.g., a DL.TCCH.FLASH channel, sends a special frame in a beaconslot, the special frame including a "Request for DLBNR4 report field". That field can be used by the serving BSS to control the selection. For example, if the field is set to zero then, the WT reports a generic beacon ratio report; otherwise the WT reports the special beacon ratio report.

A generic beacon ratio report, in accordance with some embodiments of the present invention, measures the relative interference cost the WT would generate to all the interfering beacons or the "closest" interfering beacon, if the WT were to transmit to the serving BSS in the current connection. A special beacon ratio report, in accordance with some embodiments of the present invention, measures the relative interference cost the WT would generate to a specific BSS, if the WT were to transmit to the serving BSS in the current connection. The specific BSS is the one indicated using information received in the Request for DLBNR4 field of the special downlink frame. For example, in some embodiments, the specific BSS is the one whose bssSlope is equal to the value of the "Request for DLBNR4 report field", e.g., in unsigned integer format, and whose bssSectorType is equal to mod (ulUltraslotBeaconslotIndex,3), where ulUltraslotBeaconslotIndex is the uplink index of the beaconslot within the ultraslot of the current connection. In some exemplary embodiments, there are 18 indexed beaconslots within an ultraslot.

Figure 28:
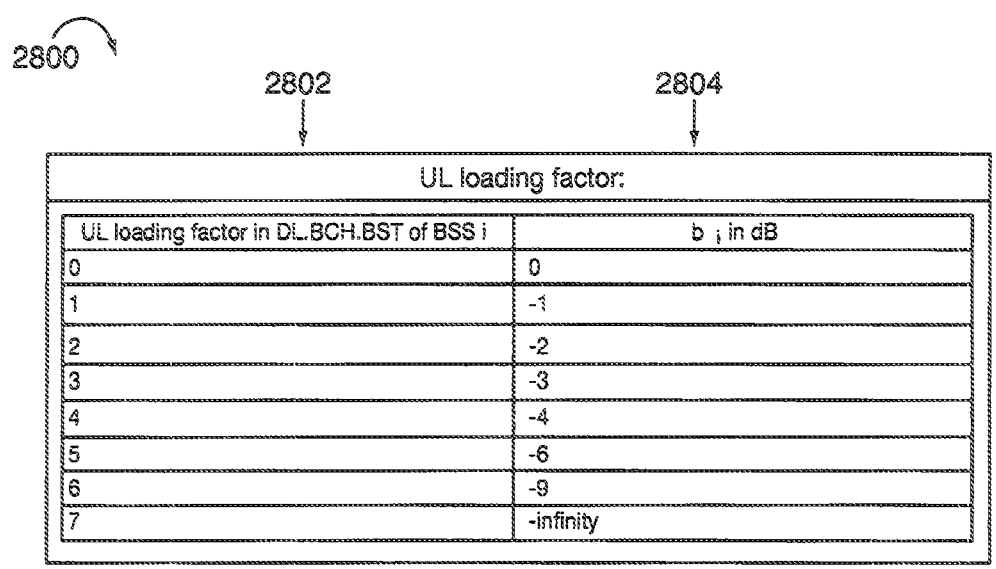
FIG. 28 is an exemplary uplink loading factor table used in communicating base station sector loading information, implemented in accordance with the present invention.

In various embodiments, both the generic and the special beacon ratios are determined from the calculated channel gain ratios G1, G2, . . . , as follows. The WT receives an uplink loading factor sent in a downlink broadcast system subchannel and determines a variable $b_0$ from uplink loading factor table 2800 of FIG. 28. Table 2800 includes a first column 2802 listing eight different values that may be used for the uplink loading factor (0, 1, 2, 3, 4, 5, 6, 7); second column lists the corresponding values for the b value in dB (0, −1, −2, −3, −4, −6, −9, −infinity), respectively. For other BSSi, the WT attempts to receive $b_i$ from the uplink loading factor sent in the downlink broadcast system subchannel of the BSS i in the tone block of the current connection. If the WT is unable to receive the UL loading factor bi, the WT sets $b_i$=1.

In some embodiments, in the single carrier operation, the WT calculates the following power ratio as the generic beacon ratio report: $b_0/(G_1 b_1 + G_2 b_2 + \ldots)$ when ulUltraslotBeaconslot Index is even or b0/max($G_1 b_1$, $G_2 b_2$, . . . ) when ulUltraslotBeaconslotIndex is odd, where ulUltraslotBeaconslotIndex is the uplink index of the beaconslot within the ultraslot of the current connection and the operation + represents a regular addition. When required to send a specific beacon ratio report, the WT, in some embodiments, calculates $b_0/(G_k B_k)$, where index k represents the specific BSS k. In some embodiments, there are 18 indexed beaconslots within an ultraslot.

Figure 29:
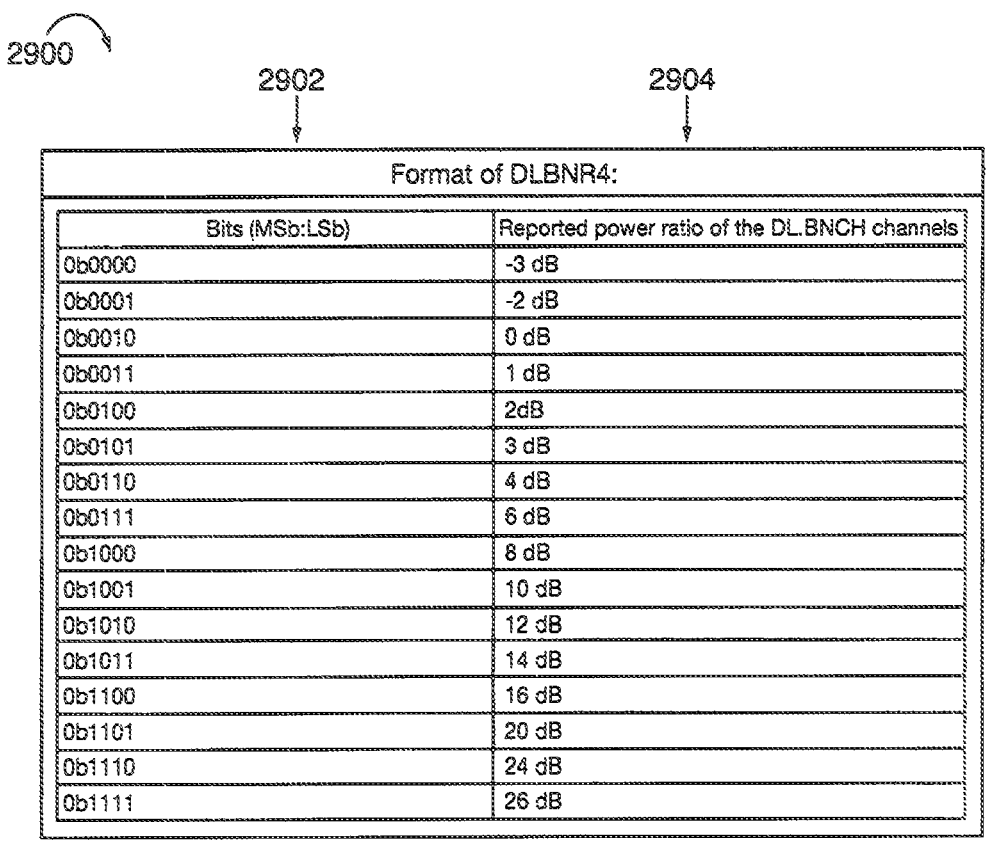
FIG. 29 is a table illustrating an exemplary format for a 4 bit downlink beacon ratio report (DLBNR4), in accordance with the present invention.

FIG. 29 is a table 2900 illustrating an exemplary format for a 4 bit downlink beacon ratio report (DLBNR4), in accordance with the present invention. First column 2902 lists the 16 various bit patterns that the report can convey, while second column 2904 lists the reported power ratio reported corresponding to each bit pattern, e.g., ranging from −3 dB to 26 dBs. The wireless terminal reports the generic and specific beacon ratio reports by selecting and communicating the DLBNR4 table entry that is closed to the determined report value. Although in this exemplary embodiment, the generic and specific beacon ratio reports use the same table for DLBNR4, in some embodiments, different tables may be used.

An exemplary 4 bit saturation level of downlink self-noise SNR report (DLSSNR4) will now be described. In some embodiments, the WT derives the saturation level of the DL SNR, which is defined to be the DL SNR that the WT receiver would measure on a received signal if the BSS transmitted the signal at infinite power, if the base station were capable of transmitting such a signal and the wireless terminal was capable of measuring such a signal. The saturation level can be, and in some embodiments is, determined by the self-noise of the WT receiver, which may be caused by factor such as channel estimation errors. The following is an exemplary method to derive the saturation level of the DL SNR.

In the exemplary method, the WT assumes that if the BSS transmits at power P, the DL SNR is equal to SNR(P)=GP/($a_0$GP+N), where G represent the wireless channel path gain from the BSS to the WT, P is the transmission power, so that GP is the received signal power, N represents the received interference power, $a_0$GP represents the self-noise, where a higher value of $a_0$ denotes a higher value of self-noise. G is a value between 0 and 1, $a_0$, P, and N are positive values. In this model, by definition, the saturation level of the DL SNR is equal to 1/$a_0$. In some embodiments, the WT measures the received power of a downlink Null channel (DL.NCH) to determine the interference power N, measures the received power (denoted as $G^*P_0$) of the downlink pilot channel and SNR (denoted by $SNR_0$) of the downlink pilot channel; the WT then calculates $1/a_0 = (1/SNR_0 - N/(GP_0))^{-1}$.

Once the WT has derived the saturation level of the DL SNR, the WT reports it by using the closest entry to the derived value in a DL self-noise saturation level report table. Table 3000 of FIG. 30 is such an exemplary table describing the format of DLSSNR4. First column 3002 indicates the 16 different possible bit patterns that can be conveyed by the DLSSNR4 report, and second column 3004 lists saturation levels of DL SNR that are communicated corresponding to each bit pattern ranging from 8.75 dB to 29.75 dBs.

In various embodiments, of the present invention, a flexible report is included in the DCCH, such that the WT decides which type of report to communicate and, the type of report can change from one flexible reporting opportunity to the next for a given WT using its allocated dedicated control channel segments.

In an exemplary embodiment, the WT uses a 2 bit type report (TYPE2) to indicate the type of report selected by the WT to be communicated in a 4 bit body report (BODY4) of the same DCCH segment including both the TYPE2 and BODY4 reports. Table 3100 of FIG. 31 is an example of mapping between TYPE2 report information bits and the type of report carried by the corresponding BODY4 report. First column 3102 indicates the four possible bit patterns for the 2 bit TYPE2 report. Second column 3104 indicates the type of report to be carried in the BODY4 report of the same uplink dedicated control channel segment corresponding to the TYPE2 report. Table 3100 indicates that: bit pattern 00 indicates that BODY4 report will be an ULRQST4 report, Bit pattern 01 indicates the BODY4 report will be a DLSSNR4 report, and bit patterns 10 and 11 are reserved.

In some embodiments, a WT selects the TYPE2 and BODY4 reports by assessing the relative importance of the different types of reports from among which the selection may occur, e.g., the reports listed in table 3100. In some embodiments, the WT can select the TYPE2 independently from one segment to another.

Figure 32:
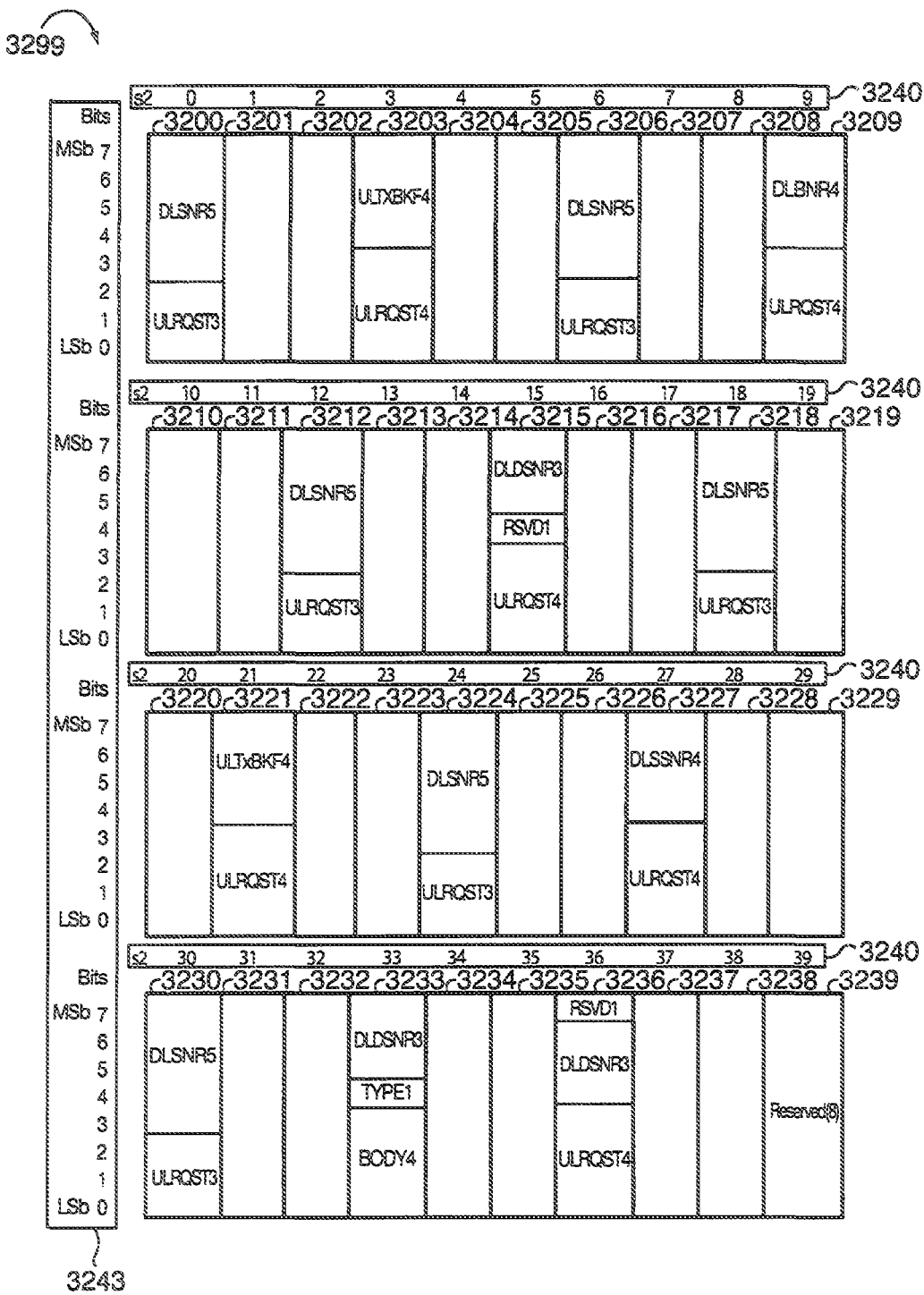
FIG. 32 is a drawing illustrating an exemplary default mode of the split tone format in a beaconslot for a given DCCH tone for an exemplary wireless terminal.

FIG. 32 is a drawing 3299 illustrating an exemplary default mode of the split tone format in a beaconslot for a given DCCH tone for a first WT. In FIG. 32, each block (3200, 3201, 3202, 3203 3204, 3205, 3206, 3207, 3208, 3209, 3210, 3211, 3212, 3213, 3214, 3215, 3216, 3217, 3218, 3219, 3220, 3221, 3222, 3223, 3224, 3225, 3226, 3227, 3228, 3229, 3230, 3231, 3232, 3323, 3234, 3235, 3236, 3237, 3238, 3239) represents one segment whose index s2 (0, . . . , 39) is shown above the block in rectangular region 3240. Each block, e.g., block 3200 representing segment 0, conveys 8 information bits; each block comprises 8 rows corresponding to the 8 bits in the segment, where the bits are listed from the most significant bit to the least significant bit downwards from the top row to the bottom row as shown in rectangular region 3243.

For an exemplary embodiment, the framing format shown in FIG. 32 is used repeatedly in every beaconslot, when the default mode of split-tone format is used, with the following exception. In the first uplink superslot after the wireless terminal migrates to the ON state in the current connection, the WT shall use the framing format shown in FIG. 33. The first uplink superslot is defined: for a scenario when the WT migrates to the ON state from the ACCESS state, for a scenario when the WT migrates to the ON state from a HOLD state, and for a scenario when the WT migrates to the ON state from the ON state of another connection.

Figure 33:
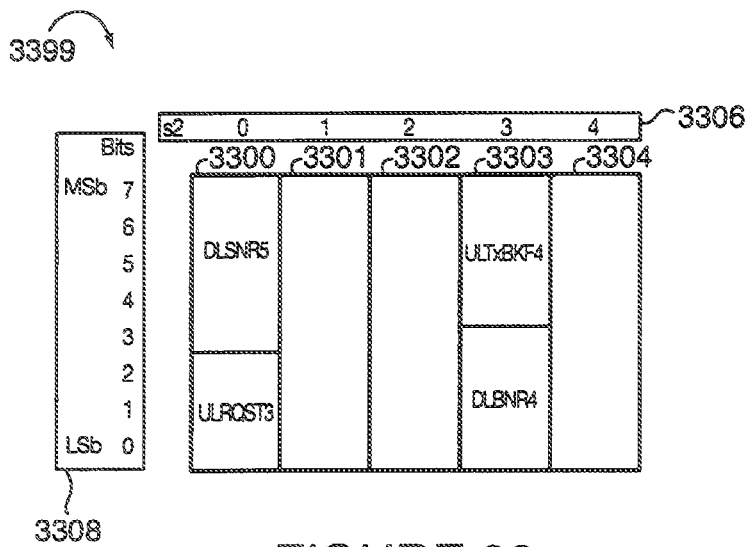
FIG. 33 illustrates an exemplary definition of the default mode in the split-tone format of the uplink DCCH segments in the first uplink superslot after the WT migrates to the ON state.

FIG. 33 illustrates an exemplary definition of the default mode in the split-tone format of the uplink DCCH segments in the first uplink superslot after the WT migrates to the ON state. Drawing 3399 includes five successive segments (3300, 3301, 3302, 3303, 3304) corresponding to segment index numbers, s2=(0, 1, 2, 3, 4), respectively in the superslot as indicated by rectangle 3306 above the segments. Each block, e.g., block 3300 representing segment 0 of the superslot, conveys 8 information bits; each block comprises 8 rows corresponding to the 8 bits in the segment, where the bits are listed from the most significant bit to the least significant bit downwards from the top row to the bottom row as shown in rectangular region 3308.

In the exemplary embodiment, in the scenario of migrating from the HOLD to ON state, the WT starts to transmit the uplink DCCH channel from the beginning of the first UL superslot, and therefore the first uplink DCCH segment shall transport the information bits in the leftmost information column of FIG. 33, the information bits of segment 3300. In the exemplary embodiment, in the scenario of migrating from the ACCESS state to the ON state, the WT does not necessarily start from the beginning of the first UL superslot, but does still transmit the uplink DCCH segments according to the framing format specified in FIG. 33. For example, if the WT starts to transmit the UL DCCH segments from the halfslot of the superslot with index=10, then the WT skips the leftmost information column of FIG. 33 (segment 3300) and the first uplink segment transported corresponds to segment 3303). Note that in the exemplary embodiment, superslot indexed halfslots (1-3) correspond to one segment and superslot indexed halfslots (10-12) correspond to the next segment for the WT. In the exemplary embodiment, for the scenario of switching between the full-tone and split-tone formats, the WT uses the framing format shown in FIG. 32 without the above exception of using the format shown in FIG. 33.

Once, the first UL superslot ends, the uplink DCCH channel segments switch to the framing format of FIG. 32. Depending on where the first uplink superslot ends, the point of switching the framing format may or may not be the beginning of a beaconslot. Note that in this exemplary embodiment, there are five DCCH segments for a given DCCH tone for a superslot. For example, suppose that the first uplink superslot is of uplink beaconslot superslot index=2, where beaconslot superslot index range is from 0 to 7 (superslot 0, superslot 1, . . . , superslot 7). Subsequently in the next uplink superslot, which is of uplink beaconslot superslot index=3, the first uplink DCCH segment using the default framing format of FIG. 32 is of index s2=15 (segment 3215 of FIG. 32) and transports the information corresponding to segment s2=15 (segment 3215 of FIG. 32).

Each uplink DCCH segment is used to transmit a set of Dedicated Control Channel Reports (DCRs). An exemplary summary list of DCRs in the split-tone format for the default mode is given in table 3400 FIG. 34. The information of table 3400 is applicable to the partitioned segments of FIGS. 32 and 33. Each segment of FIGS. 32 and 33 includes two or more reports as described in table 3400. First column 3402 of table 3400 describes abbreviated names used for each exemplary report. The name of each report ends with a number which specifies the number of bits of the DCR. Second column 3404 of table 3400 briefly describes each named report. Third column 3406 specifies the segment index s2 of FIG. 32, in which a DCR is to be transmitted, and corresponds to a mapping between table 3400 and FIG. 32.

Figure 34:
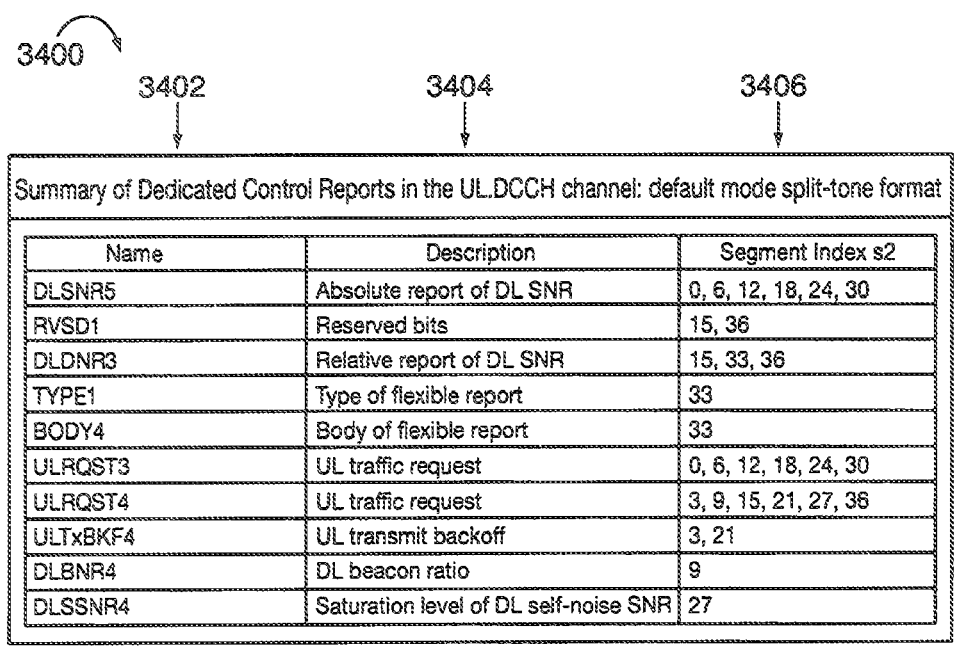
FIG. 34 provides an exemplary summary list of dedicated control reports (DCRs) in the split-tone format for the default mode.

It should be noted that FIGS. 32, 33 and 34 describe the segments (indexed segments 0, 3, 6, 9, 12, 15, 18, 21, 24, 27, 30, 33, and 36) corresponding to a first WT in split tone format for default mode. With respect to FIG. 32, a second wireless terminal that use the split tone format of default mode on the same logical tone in the DCCH will follow the same report pattern but the segments will be shifted by one, thus the second WT uses indexed segments (1, 4, 7, 10, 13, 16, 19, 22, 25, 28, 31, 34, and 37). With respect to FIG. 33, a second wireless terminal that use the split tone format of default mode on the same logical tone in the DCCH will follow the same report pattern but the segments will be shifted by one, thus the second WT uses indexed segments 3301 and 3304. With respect to FIG. 32, a third wireless terminal that use the split tone format of default mode on the same logical tone in the DCCH will follow the same report pattern but the segments will be shifted by two, thus the third WT uses indexed segments (2, 5, 8, 11, 14, 17, 20, 23, 26, 29, 33, 35, and 38). With respect to FIG. 33, a third wireless terminal that use the split tone format of default mode on the same logical tone in the DCCH will follow the same report pattern but the segments will be shifted by two, thus the third WT uses indexed segments 3305. In FIG. 32, segment with index=39 is reserved.

FIG. 33 provides a representation corresponding to the replacement of the first superslot of a beaconslot corresponding to table 3299, e.g., segment 3300 replaces segment 3200 and/or segment 3303 replaces segment 3203. In FIG. 32, for each superslot, one or two segments are allocated to an exemplary wireless terminal using split-tone DCCH format, and the location of the allocated segments varies depending on the superslot of the beaconslot. For example, in the first superslot, two segments (3200, 3203) are allocated corresponding to the first and fourth DCCH segments of the superslots; in the second superslot, two segments (3206, 3209) are allocated corresponding to the $2^{nd}$ and 5th DCCH segments of the superslot; in the third superslot, one segment 3213 is allocated corresponding to the third DCCH segment of the superslot. In some embodiments, segment 3300, when used, is used to replace the first scheduled DCCH segment of a superslot and segment 3303, when used, is used to replace the second scheduled DCCH segment of a superslot. For example, segment 3300 may replace segment 3206 and/or segment 3303 may replace segment 3309. As another example, segment 3300 may replace segment 3212.

In some embodiments, the 5 bit absolute report of DL SNR (DLSNR5) follows the same format in split-tone format default mode as used in the full-tone format default mode. In some such embodiments, there is an exception such that the default value of NumConsecutivePreferred is different in the split-tone format than in the full-tone format, e.g., 6 in the split tone format default mode vs 10 in the full tone format default mode.

In some embodiments, the 3 bit DLDSNR3 report follows the same format in the split-tone format default mode as used in the full-tone format default mode. In some embodiments, the 4 bit DLSSNR4 report follows the same format in the split-tone format default mode as used in the full-tone format default mode.

In some embodiments, the 4 bit uplink transmission backoff report (ULTxBKF4) of the split tone format default mode is generated similarly to the ULTxBKF5 of full tone format default mode, except table 3500 of FIG. 35 is used for the report.

FIG. 35 is a table 3500 identifying bit format and interpretations associated with each of 16 bit patterns for an exemplary 4 bit uplink transmission backoff report (ULTxBKF4), in accordance with the present invention. First column 3502 identifies the bit pattern and bit ordering, most significant bit to least significant bit. Second column 3504 identifies the reported WT uplink DCCH Backoff report values in dBs corresponding to each bit pattern each bit pattern. In this exemplary embodiment 16 distinct levels can be reported ranging from 6 dB to 36 dBs. A wireless terminal calculates wtULDCCHBackoff, e.g., as indicated above, selects the closest entry in table 3500 and uses that bit pattern for the report.

In some embodiments, the 4 bit DLBNR4 report follows the same format in the split-tone format default mode as used in the full-tone format default mode. In some embodiments, the 3 bit ULRQST3 report follows the same format in the split-tone format default mode as used in the full-tone format default mode. In some embodiments, the 4 bit ULRQST4 report follows the same format in the split-tone format default mode as used in the full-tone format default mode.

In various embodiments, of the present invention, a flexible report is included in the DCCH in the split-tone format in the default mode, such that the WT decides which type of report to communicate and, the type of report can change from one flexible reporting opportunity to the next for a given WT using its allocated dedicated control channel segments.

In an exemplary embodiment, the WT uses a 1 bit type report (TYPE1) to indicate the type of report selected by the WT to be communicated in a 4 bit body report (BODY4) of the same DCCH segment including both the TYPE1 and BODY4 reports. Table 3600 of FIG. 36 is an example of mapping between TYPE1 report information bits and the type of report carried by the corresponding BODY4 report. First column 3602 indicates the two possible bit patterns for the 1 bit TYPE1 report. Second column 3604 indicates the type of report to be carried in the BODY4 report of the same uplink dedicated control channel segment corresponding to the TYPE1 report. Table 3600 indicates that: bit pattern 0 indicates that BODY4 report will be an ULRQST4 report, Bit pattern 01 indicates the BODY4 report will be a Reserved report.

In some embodiments, a WT selects the TYPE1 and BODY4 reports by assessing the relative importance if the different types of reports from among which the selection may occur, e.g., the reports listed in table 3600. In some embodiments, the WT can select the TYPE1 independently from one segment to another.

In some embodiments, the encoding and modulation scheme used when the uplink dedicated control channel segment uses the full-tone format is different than the encoding and modulation scheme used when the uplink dedicated control channel segment uses the split-tone format.

An exemplary first method used for encoding and modulation when the dedicated control channel segment uses the full-tone format will now be described. Let $b_5, b_4, b_3, b_2, b_1$, and $b_0$ denote the information bits to be transmitted in the uplink dedicated control channel segment, where $b_5$ is the most significant bit and $b_0$ is the least significant bit. Define $c_2 c_1 c_0 = (b_5 b_4 b_3)\hat{\,}(b_2 b_1 b_0)$, where $\hat{\,}$ is a bit-wise logical OR operation. The WT determines a group of seven modulation-symbols from information bit groups $b_5 b_4 b_3$ according to Table 3700 of FIG. 37. Table 3700 is an exemplary specification of uplink dedicated control channel segment modulation coding in full-tone format. First column 3702 of table 3700 includes bit patterns for 3 ordered information bits; second column 3704 includes corresponding sets of seven ordered coded modulation symbols, each set corresponding to a different possible bit pattern.

The seven modulation-symbols determined from $b_5 b_4 b_3$ are to be the seven most significant coded modulation-symbols of the output of the coding and modulation operation.

The WT determines a group of seven modulation-symbols from information bit groups $b_2 b_1 b_0$ similarly using table 3700, and uses the seven modulation-symbols obtained as the next most significant coded modulation-symbols of the output of the encoding and modulation operation.

The WT determines a group of seven modulation-symbols from information bit groups $c_2 c_1 c_0$ similarly using table 3700, and use the seven modulation-symbols obtained as the least significant coded modulation-symbols of the output of the coding and modulation operation.

An exemplary second method used for encoding and modulation when the dedicated control channel segment uses the split-tone format will now be described. Let $b_7, b_6, b_5, b_4, b_3, b_2, b_1$, and $b_0$ denote the information bits to be transmitted in the uplink dedicated control channel segment, where b7 is the most significant bit and $b_0$ is the least significant bit. Define $c_3 c_2 c_1 c_0 = (b_7 b_6 b_5 b_4)\hat{\,}(b_3 b_2 b_1 b_0)$, where $\hat{\,}$ is a bit-wise logical OR operation. The WT determines a group of seven modulation-symbols from information bit groups $b_7 b_6 b_5 b_4$ according to Table 3800 of FIG. 38. Table 3800 is an exemplary specification of uplink dedicated control channel segment modulation coding in split-tone format. First column 3802 of table 3800 includes bit patterns for 4 ordered information bits; second column 3804 includes corresponding sets of seven ordered coded modulation symbols, each set corresponding to a different possible bit pattern.

The seven modulation-symbols determined from $b_7 b_6 b_5 b_4$ are to be the seven most significant coded modulation-symbols of the output of the coding and modulation operation.

The WT determines a group of seven modulation-symbols from information bit groups $b_3 b_2 b_1 b_0$ similarly using table 3800, and uses the seven modulation-symbols obtained as the next most significant coded modulation-symbols of the output of the encoding and modulation operation.

The WT determines a group of seven modulation-symbols from information bit groups $c_3c_2c_1c_0$ similarly using table 3800, and uses the seven modulation-symbols obtained as the least significant coded modulation-symbols of the output of the coding and modulation operation.

Figure 39:
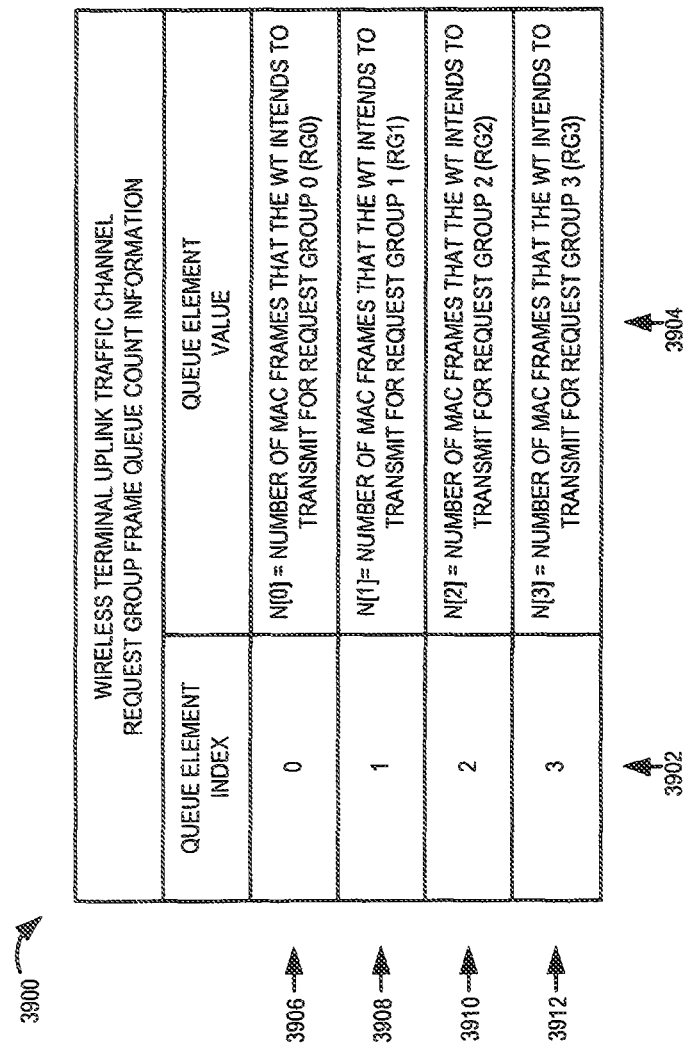
FIG. 39 is a drawing of a table illustrating exemplary wireless terminal uplink traffic channel frame request group queue count information.

FIG. 39 is a drawing of a table 3900 illustrating exemplary wireless terminal uplink traffic channel frame request group queue count information. Each wireless terminal maintains and updates its request group count information. In this exemplary embodiment there are four request groups (RG0, RG1, RG2, RG3). Other embodiments may use different numbers of request groups. In some embodiments, different WTs in the system may have different numbers of request groups. First column 3902 lists queue element index and second column 3904 lists queue element value. First row 3906 indicates that N[0]=the number of MAC frames that the WT intends to transmit for request group 0 (RG0); second row 3908 indicates that N[1]=the number of MAC frames that the WT intends to transmit for request group 1 (RG1); third row indicates that N[2]=the number of MAC frames that the WT intends to transmit for request group 2; fourth row 3912 indicates that N[3]=the number of MAC frames that the WT intends to transmit for request group 3.

Figure 40:
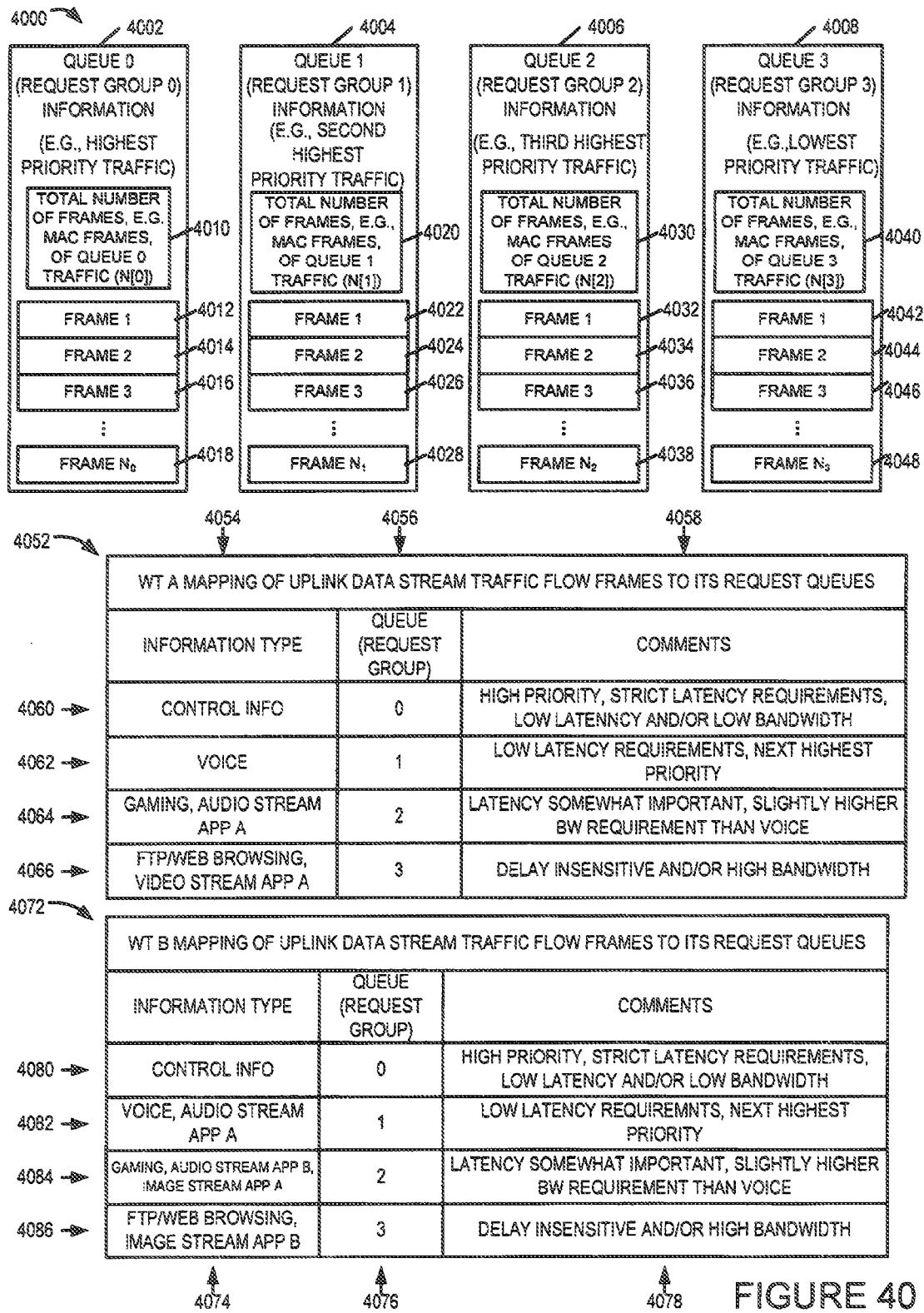
FIG. 40 includes drawings illustrating an exemplary set of four request group queues being maintained by a wireless terminal and drawings illustrating exemplary mappings of uplink data stream traffic flows to request queues for two exemplary wireless terminals, in accordance with an exemplary embodiment of the present invention.

Drawing 4000 of FIG. 40 includes an exemplary set of four request group queues (4002, 4004, 4006, 4008) being maintained by a wireless terminal, in accordance with an exemplary embodiment of the present invention. Queue 0 4002 is the queue for request group 0 information. Queue 0 information 4002 includes a count of the total number of frames, e.g., MAC frames, of queue 0 traffic (N[0]) that the WT intends to transmit 4010 and the corresponding frames of uplink traffic (frame 1 4012, frame 2, 4014, frame 3 4016, . . . , frame $N_0$ 4018). Queue 1 4004 is the queue for request group 1 information. Queue 1 information 4004 includes a count of the total number of frames, e.g., MAC frames, of queue 1 traffic (N[1]) that the WT intends to transmit 4020 and the corresponding frames of uplink traffic (frame 1 4022, frame 2, 4024, frame 3 4026, . . . , frame $N_1$ 4028). Queue 2 4006 is the queue for request group 2 information. Queue 2 information 4006 includes a count of the total number of frames, e.g., MAC frames, of queue 2 traffic (N[2]) that the WT intends to transmit 4030 and the corresponding frames of uplink traffic (frame 1 4032, frame 2, 4034, frame 3 4036, . . . , frame $N_2$ 4038). Queue 3 4008 is the queue for request group 3 information. Queue 3 information 4008 includes a count of the total number of frames, e.g., MAC frames, of queue 3 traffic (N[3]) that the WT intends to transmit 4040 and the corresponding frames of uplink traffic (frame 1 4042, frame 2, 4044, frame 3 4046, . . . , frame $N_3$ 4048). In some embodiments, the request queues, for at least some wireless terminals, are priority queues. For example, in some embodiments, request group 0 queue 4002 is used for the highest priority traffic, request group 1 queue 4004 is used for the $2^{nd}$ highest priority traffic, request group 2 queue 4006 is used for the third highest priority traffic, and request group 3 queue 4008 is used for the lowest priority traffic, from the perspective of the individual wireless terminal.

In some embodiments, the traffic in at least some request queues during at least some times for at least some wireless terminals have different priorities. In some embodiments, priority is one factor considered when mapping a traffic flow to a request queue. In some embodiments, priority is one factor considered when scheduling/transmitting traffic. In some embodiments, priority is representative of relative importance. In some embodiments, all other factors being equal, traffic belonging to a higher priority is scheduled/transmitted more often than traffic belonging to lower priorities.

Drawing 4052 of FIG. 40 illustrates exemplary mapping for a first WT, WT A, of uplink data stream traffic flows to its request group queues. First column 4054 includes information type of the data stream traffic flow; second column 4056 includes the identified queue (request group); third column 4058 includes comments. First row 4060 indicates that control information is mapped to request group 0 queue. Flows mapped to the request group 0 queue are considered high priority, have strict latency requirements, require low latency and/or have low bandwidth requirements. Second row 4062 indicates that voice information is mapped to request group 1 queue. Flows mapped to the request group 1 queue also require low latency but have a lower priority level than request group 0. Third row 4064 indicates that gaming and audio stream application A is mapped to request group 2 queue. For flows mapped to the request group 2, latency is somewhat important and the bandwidth requirements are slightly higher than for voice. Fourth row 4066 indicates that FTP, web browsing, and video stream application A are mapped to request group 3 queue. Flows mapped to the request group 3, are delay insensitive and/or require high bandwidth.

Drawing 4072 of FIG. 40 illustrates exemplary mapping for a second WT, WTB, of uplink data stream traffic flows to its request group queues. First column 4074 includes information type of the data stream traffic flow; second column 4076 includes the identified queue (request group); third column 4078 includes comments. First row 4080 indicates that control information is mapped to request group 0 queue. Flows mapped to the request group 0 queue are considered high priority, have strict latency requirements, require low latency and/or have low bandwidth requirements. Second row 4082 indicates that voice and audio stream application A information are mapped to request group 1 queue. Flows mapped to the request group 1 queue also require low latency but have a lower priority level than request group 0. Third row 4084 indicates that gaming and audio stream application B, and image stream application A are mapped to request group 2 queue. For flows mapped to the request group 2, latency is somewhat important and the bandwidth requirements are slightly higher than for voice. Fourth row 4086 indicates that FTP, web browsing, and image stream application B are mapped to request group 3 queue. Flows mapped to the request group 3, are delay insensitive and/or require high bandwidth.

It should be noted the WT A and WT B use different mapping from their uplink data stream traffic flows to their set of request group queues. For example audio stream application A is mapped to request group queue 2 for WTA, while the same audio stream application A is mapped to request group queue 1 for WTB. In addition, different WTs may have different types of uplink data stream traffic flows. For example, WT B includes an audio stream application B that is not included for WT A. This approach, in accordance with the present invention, allows each WT to customize and/or optimize its request queue mapping to match the different types of data being communicated via its uplink traffic channel segments. For example, a mobile node such as a voice and text message cell phone has different types of data streams than a mobile data terminal used primarily for on-line gaming and web browsing, and would typically have a different mapping of data streams to request group queues.

In some embodiments, the mapping from uplink data stream traffic flows to request group queues for a WT may change with time. Drawing 4001 of FIG. 40A illustrates exemplary mapping for a WT C at a first time T1, of uplink data stream traffic flows to its request group queues. First column 4003 includes information type of the data stream traffic flow; second column 4005 includes the identified queue (request group); third column 4007 includes comments. First row 4009 indicates that control information is mapped to request group 0 queue. Flows mapped to the request group 0 queue are considered high priority, have strict latency requirements, require low latency and/or have low bandwidth requirements. Second row 4011 indicates that voice information is mapped to request group 1 queue. Flows mapped to the request group 1 queue also require low latency but have a lower priority level than request group 0. Third row 4013 indicates that gaming and audio stream application A is mapped to request group 2 queue. For flows mapped to the request group 2, latency is somewhat important and the bandwidth requirements are slightly higher than for voice. Fourth row 4015 indicates that FTP, web browsing, and video stream application A are mapped to request group 3 queue. Flows mapped to the request group 3, are delay insensitive and/or require high bandwidth.

Drawing 4017 of FIG. 40A illustrates exemplary mapping for a WT C at a second time T2, of uplink data stream traffic flows to its request group queues. First column 4019 includes information type of the data stream traffic flow; second column 4021 includes the identified queue (request group); third column 4023 includes comments. First row 4025 indicates that control information is mapped to request group 0 queue. Flows mapped to the request group 0 queue are considered high priority, have strict latency requirements, require low latency and/or have low bandwidth requirements. Second row 4027 indicates that voice application and a gaming application is mapped to request group 1 queue. Flows mapped to the request group 1 queue also require low latency but have a lower priority level than request group 0. Third row 4029 indicates that video streaming application A is mapped to request group 2 queue. For flows mapped to the request group 2, latency is somewhat important and the bandwidth requirements are slightly higher than for voice. Fourth row 4031 indicates that FTP, web browsing and video streaming application B are mapped to request group 3 queue. Flows mapped to the request group 3, are delay insensitive and/or require high bandwidth.

Figure 73:
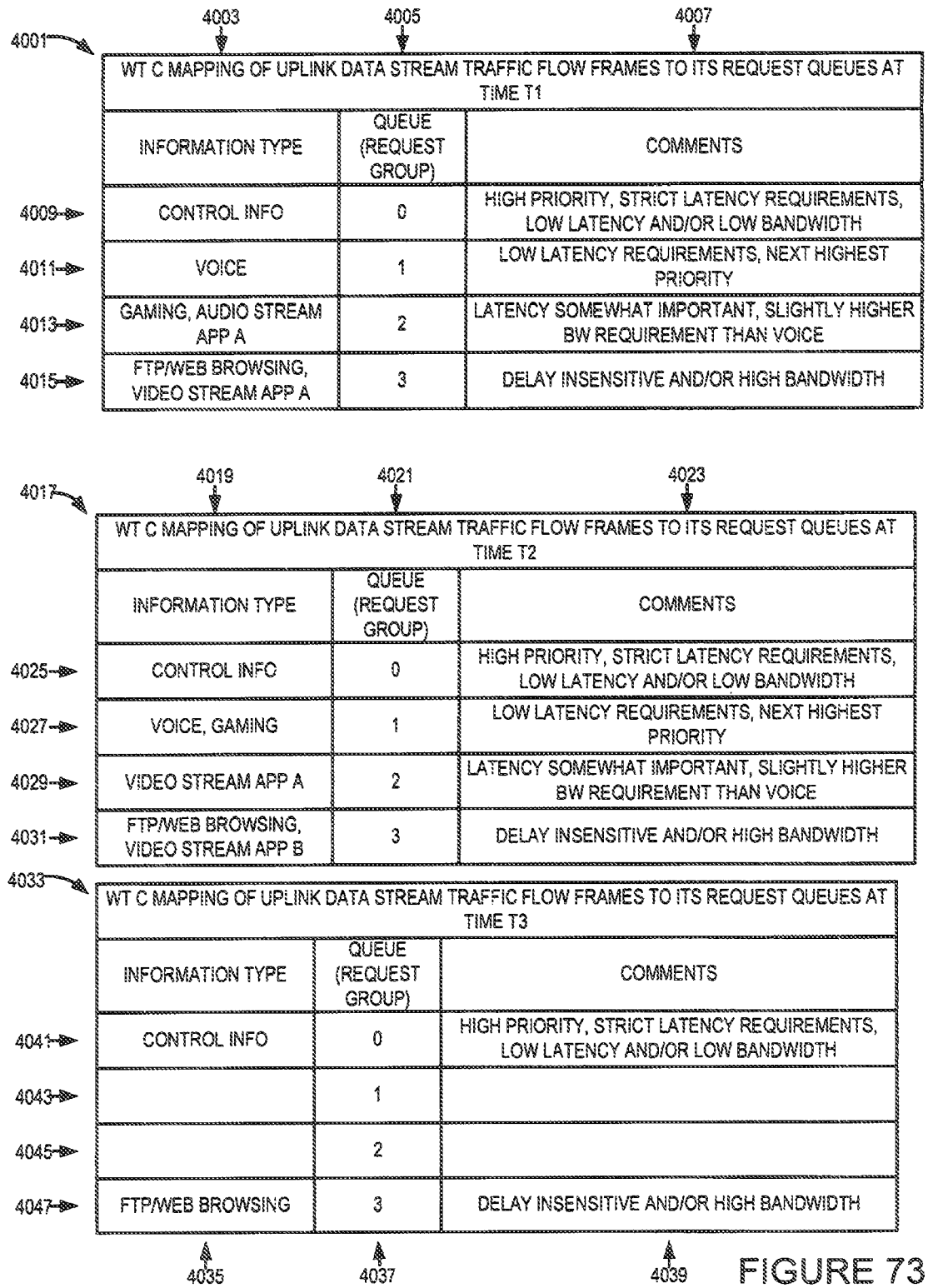
FIG. 73 illustrates exemplary mapping for an exemplary wireless terminal of uplink data stream traffic flows to its request group queues at different times in accordance with various embodiments of the present invention.

Drawing 4033 of FIG. 73 illustrates exemplary mapping for a WT C at a third time T3, of uplink data stream traffic flows to its request group queues. First column 4035 includes information type of the data stream traffic flow; second column 4037 includes the identified queue (request group); third column 4039 includes comments. First row 4041 indicates that control information is mapped to request group 0 queue. Flows mapped to the request group 0 queue are considered high priority, have strict latency requirements, require low latency and/or have low bandwidth requirements. Second row 4043 and third row 4045 indicate that no data traffic applications are mapped to request group 1 and request group 2 queues, respectively. Fourth row 4047 indicates that FTP and web browsing are mapped to request group 3 queue. Flows mapped to the request group 3, are delay insensitive and/or require high bandwidth.

It should be noted WT C uses different mappings from their uplink data stream traffic flows to their set of request group queues at the three times T1, T2 and T3. For example audio stream application A is mapped to request group queue 2 at time T1, while the same audio stream application A is mapped to request group queue 1 at time T2. In addition, the WT may have different types of uplink data stream traffic flows at different times. For example, at time T2, the WT includes a video stream application B that is not included at time T1. In addition, the WT may have no uplink data stream traffic flows mapped to a specific request group queue at a given time. For example, at time T3, there are no uplink data stream traffic flows that are mapped to request group queues 1 and 2. This approach, in accordance with the present invention, allows each WT to customize and/or optimize its request queue mapping to match the different types of data being communicated via its uplink traffic channel segments at any time.

Figure 41:
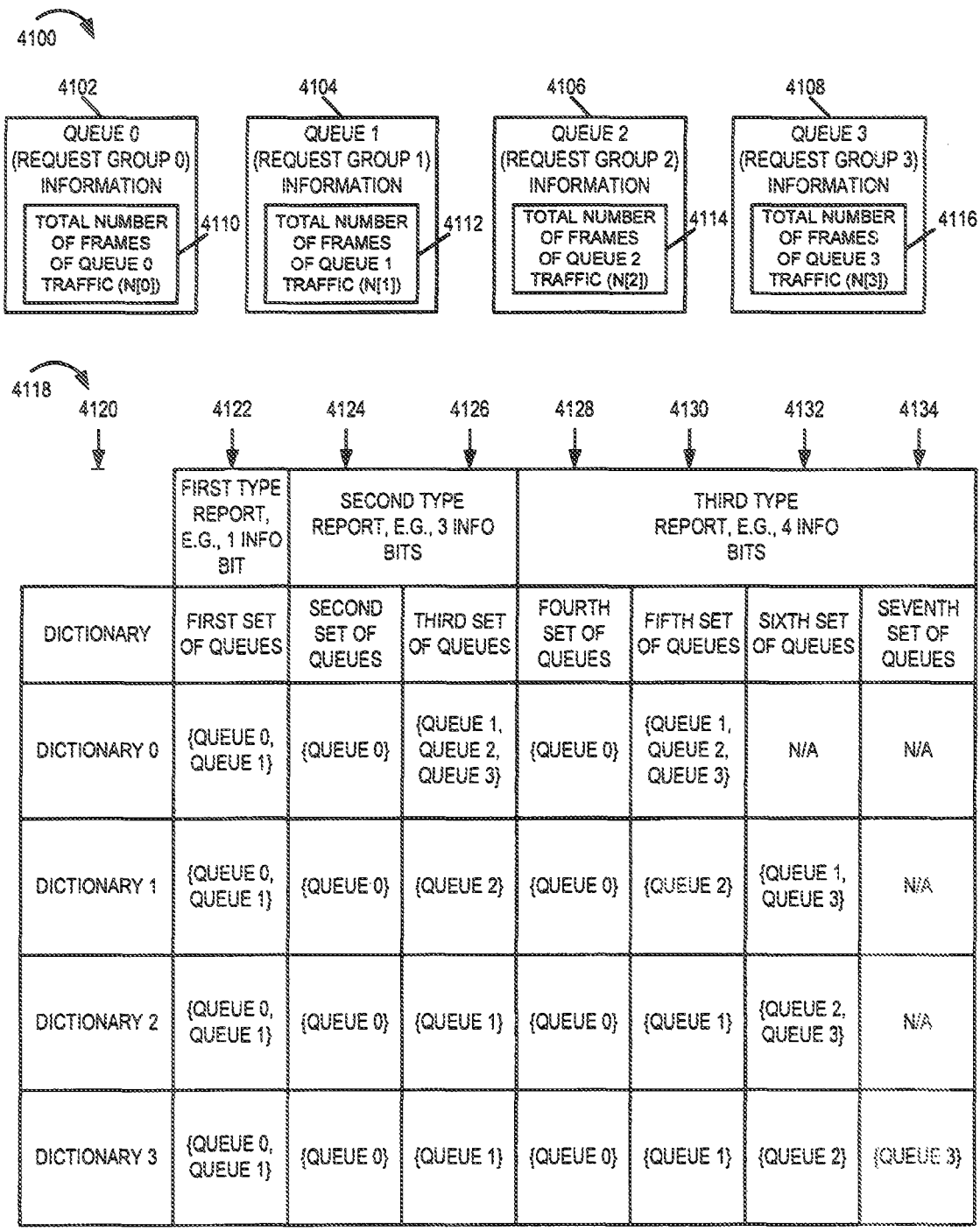
FIG. 41 illustrates an exemplary request group queue structure, multiple request dictionaries, a plurality of types of uplink traffic channel request reports, and grouping of sets of queues in accordance with exemplary formats used for each of the types of reports.

FIG. 41 illustrates an exemplary request group queue structure, multiple request dictionaries, a plurality of types of uplink traffic channel request reports, and grouping of sets of queues in accordance with exemplary formats used for each of the types of reports. In this exemplary embodiment, there are four request group queues for a given wireless terminal. The exemplary structure accommodates four request dictionaries. The exemplary structure uses three types of uplink traffic channel request reports (a 1 bit report, a 3-bit report, and a 4-bit report).

FIG. 41 includes: exemplary queue 0 (request group 0) information 4102 which includes the total number of frames, e.g., MAC frames, of queue 0 traffic that an exemplary WT intends to transmit (N[0]) 4110, exemplary queue 1 (request group 1) information 4104 which includes the total number of frames, e.g., MAC frames, of queue 1 traffic that an exemplary WT intends to transmit (N[1]) 4112, exemplary queue 2 (request group 2) information 4106 which includes the total number of frames, e.g., MAC frames, of queue 2 traffic that an exemplary WT intends to transmit (N[2]) 4114, and exemplary queue 3 (request group 3) information 4108 which includes the total number of frames, e.g., MAC frames, of queue 3 traffic that an exemplary WT intends to transmit (N[3]) 4116. The set of queue 0 info 4102, queue 1 info 4104, queue 2 info 4106 and queue 3 info 4108 correspond to one WT in the system. Each WT in the system maintains its set of queues, tracking uplink traffic frames that it may intend to transmit.

Table 4118 identifies grouping of queue sets used by different types of request reports as a function of the dictionary in use. Column 4120 identifies the dictionary. The first type of exemplary report is, e.g., a 1 bit information report. Column 4122 identifies the first set of queues used for first type reports. The first set of queues is the set {queue 0 and queue 1} for the first type of report irrespective of the request dictionary. Column 4124 identifies the second set of queues used for second type reports. The second set of queues is the set {queue 0} for the second type of report irrespective of the request dictionary. Column 4126 identifies the third set of queues used for second type reports. The third set of queues is: (i) the set {queue 1, queue 2, queue 3} for the second type of report for request dictionary 0, (ii) the set of {queue 2} for the second type of report for request dictionary 1, and (iii) the set of {queue 1} for the second type of report for dictionary 2 and 3. The third type of report uses a fourth and fifth set of queues for each dictionary. The third type of report uses a sixth set of queues for dictionaries 1, 2, and 3. The third type of report uses a seventh set of queues for dictionary 3. Column 4128 identifies that the fourth set of queues for the third type of report is the set {queue 0} irrespective of the dictionary. Column 4130 identifies that the fifth set of queues for the third type of report is the set {queue 1, queue 2, queue 3} for dictionary 0, the set {queue 2} for dictionary 1, the set {queue 1} for dictionaries 2 and 3. Column 4132 identifies that the sixth set of queues for the third type of report is the set {queue 1, queue 3} for dictionary 1, the set {queue 2, queue 3} for dictionary 2, and the set {queue 2} for dictionary 3. Column 4134 identifies that the seventh set of queues for the third type of report is the set {queue 3} for dictionary 3.

As an example, the (first, second, and third) types of reports may be the exemplary (ULRQST1, ULRQST3, and ULRQST4) reports, respectively, of FIGS. 16-25. The sets of queues used (See table 4118) will be described with respect to the dictionary 0 for the exemplary ULRQST1, ULRQST3, and ULRQST 4. First set of queues {queue 0, queue 1} corresponds to ULRQST1 using N[0]+N[1] in table 1600, e.g., an ULRQST1=1 indicates that N[0]+N[1]>0. Queue stats of second set of queues {queue 0} and third set of queues {queue 1, queue 2, queue 3} are jointly coded in an ULRQST3. Second set of queues {queue 0} corresponds to an ULRQST3 which uses N[0] as the first jointly coded element in table 1900, e.g., an ULRQST3=001 indicates N[0]=0. Third set of queues {queue 1, queue 2, queue 3} corresponds to an ULRQST3 which uses (N[1]+N[2]+N[3]) as the second jointly coded element in table 1900, e.g., an ULRQST3=001 indicates ceil((N[1]+N[2]+N[3])/y)=1. Queue stats of fourth set of queues {queue 0} or the fifth set of queues {queue 1, queue 2, queue 3} are coded in an ULRQST4. The fourth set of queues corresponds to ULRQST4 using N[0] in table 1800, e.g., an ULRQST4=0010 indicates that N[0]>=4. The fifth set of queues corresponds to ULRQST4 using N[1]+N[2]+N[3] in table 1800, e.g., an ULRQST4=0011 indicates ceil((N[1]+N[2]+N[3])/y)=1.

In the exemplary embodiment where (first type, second, and third) types of reports are the exemplary (ULRQST1, ULRQST3, and ULRQST4) reports of FIGS. 16-25, the first type of report is independent of request dictionary and uses the first set of queues of table 4118, a second type of report communicates queue stat information about both a second set of queues and a corresponding third set of queues from table 4118, and a third type of report communicates queue stat information about one of: a fourth sets of queues, a corresponding fifth set of queues, a corresponding sixth set of queues, and a corresponding seventh set of queues.

Figures 42, 42A, 42B, 42C, 42D, 42E:
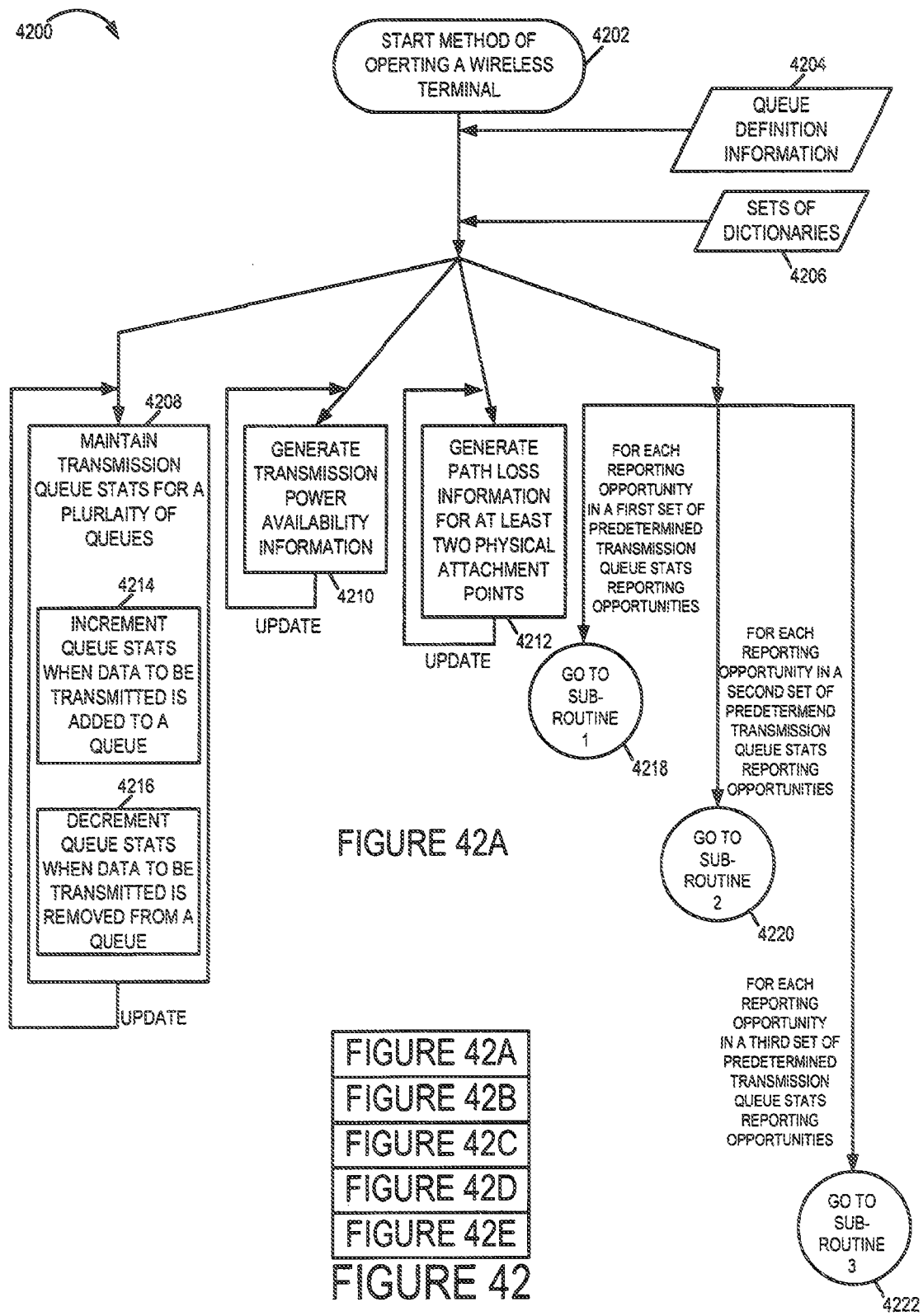
FIG. 42, comprising the combination of FIG. 42A, FIG. 42B, FIG. 42C, FIG. 42D.
FIG. 42E is a flowchart of an exemplary method of operating a wireless terminal in accordance with the present invention.
Figure 42B:
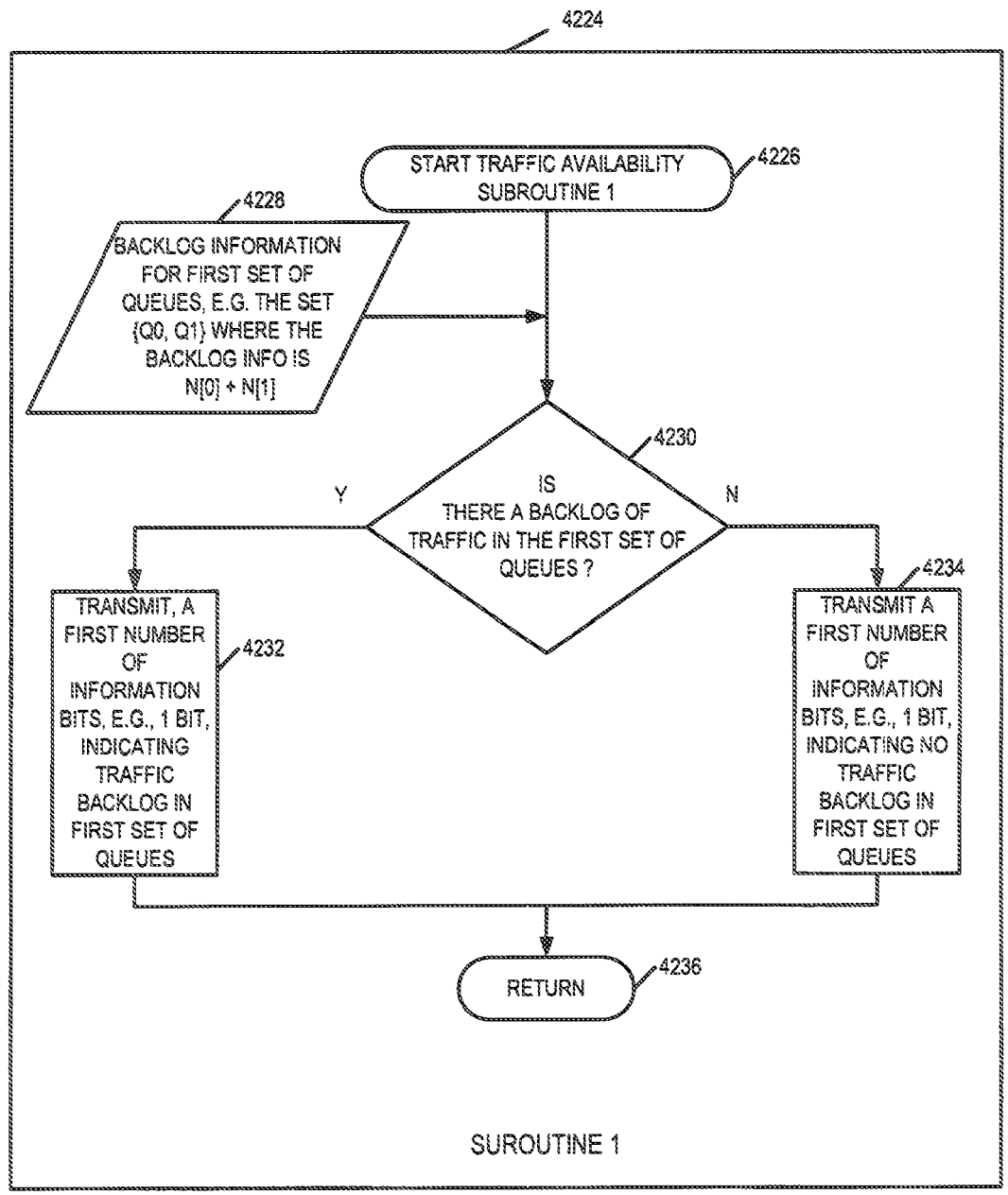
Figure 42C:
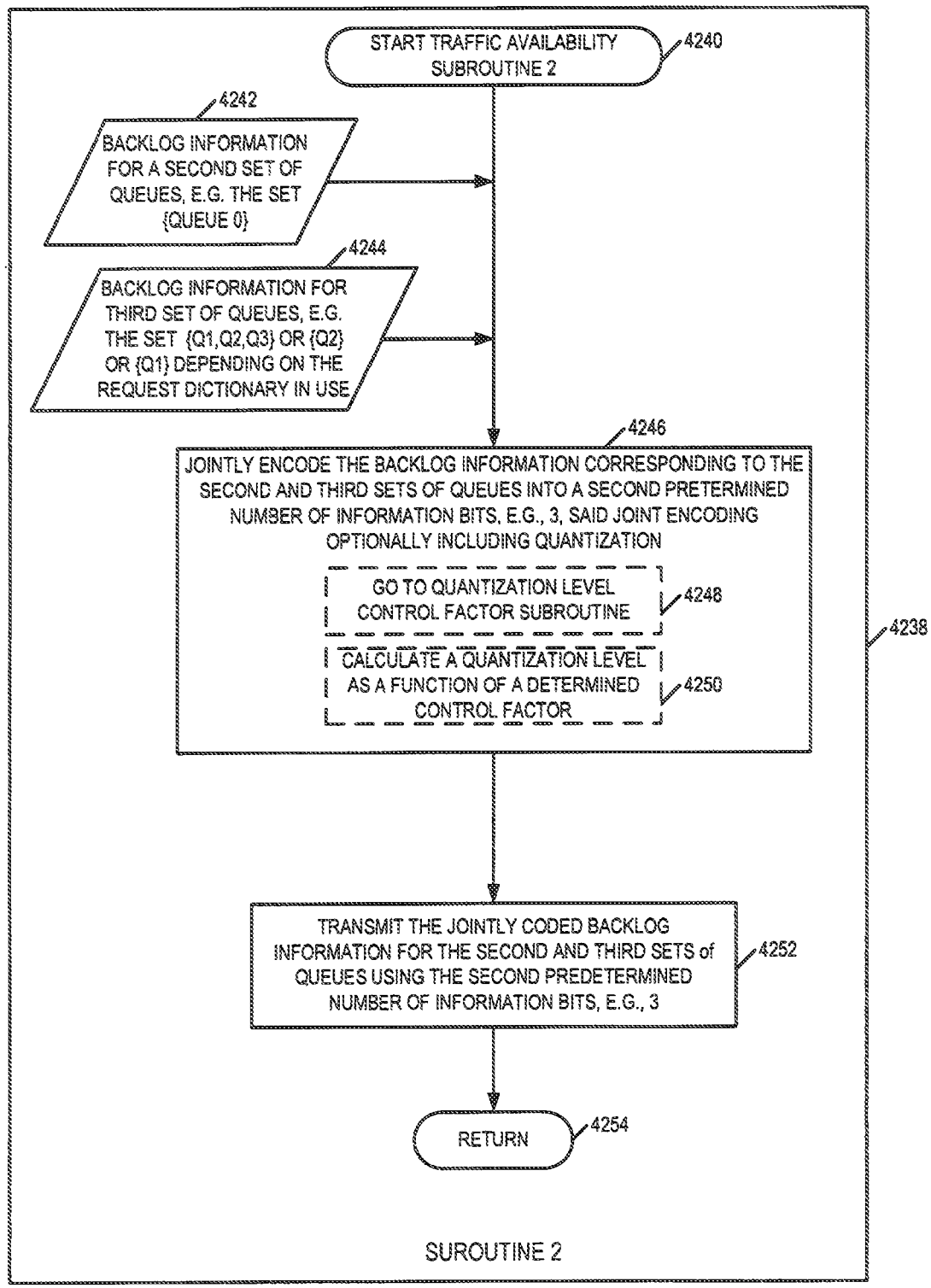
Figure 42D:
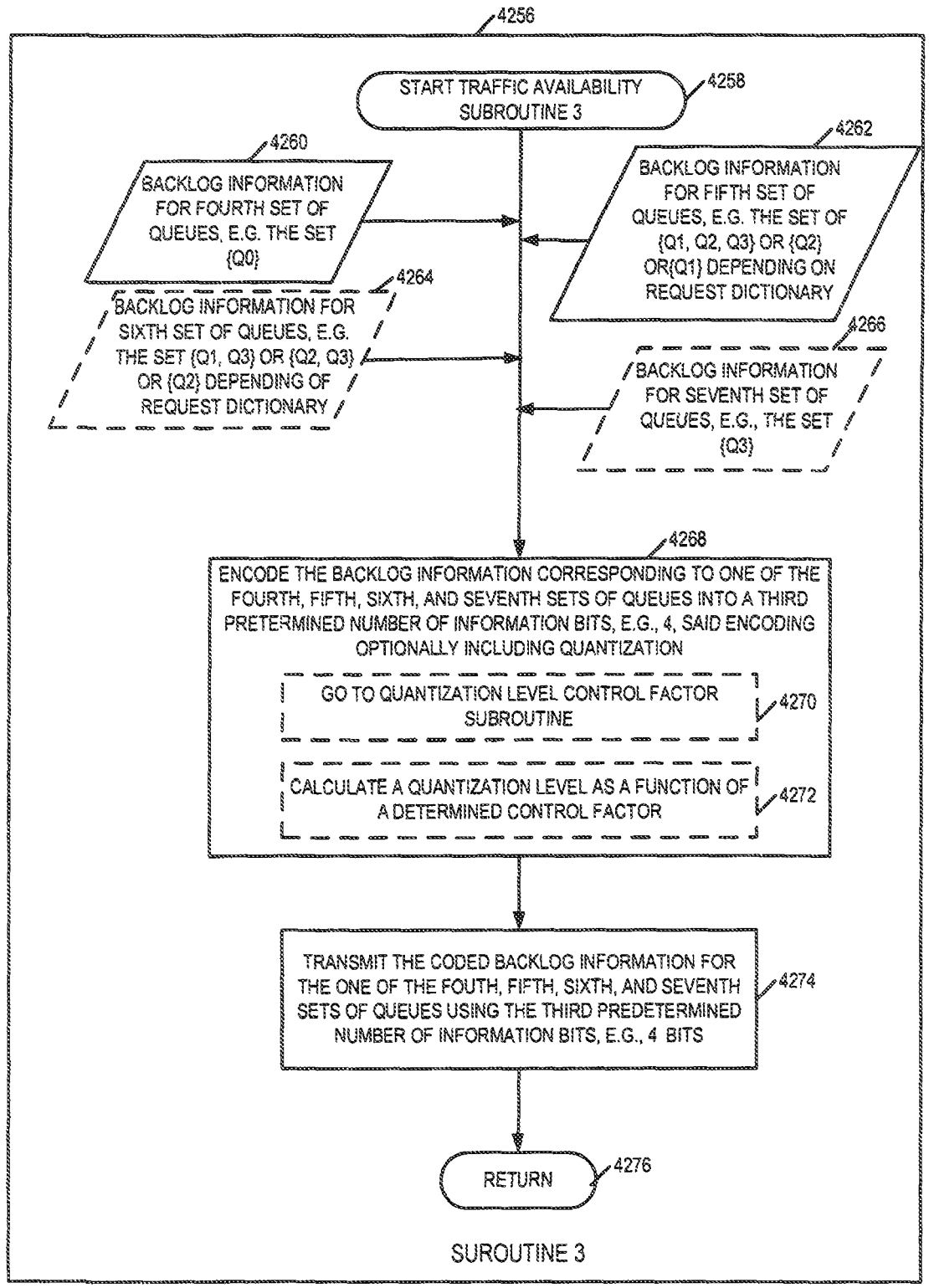
Figure 42E:
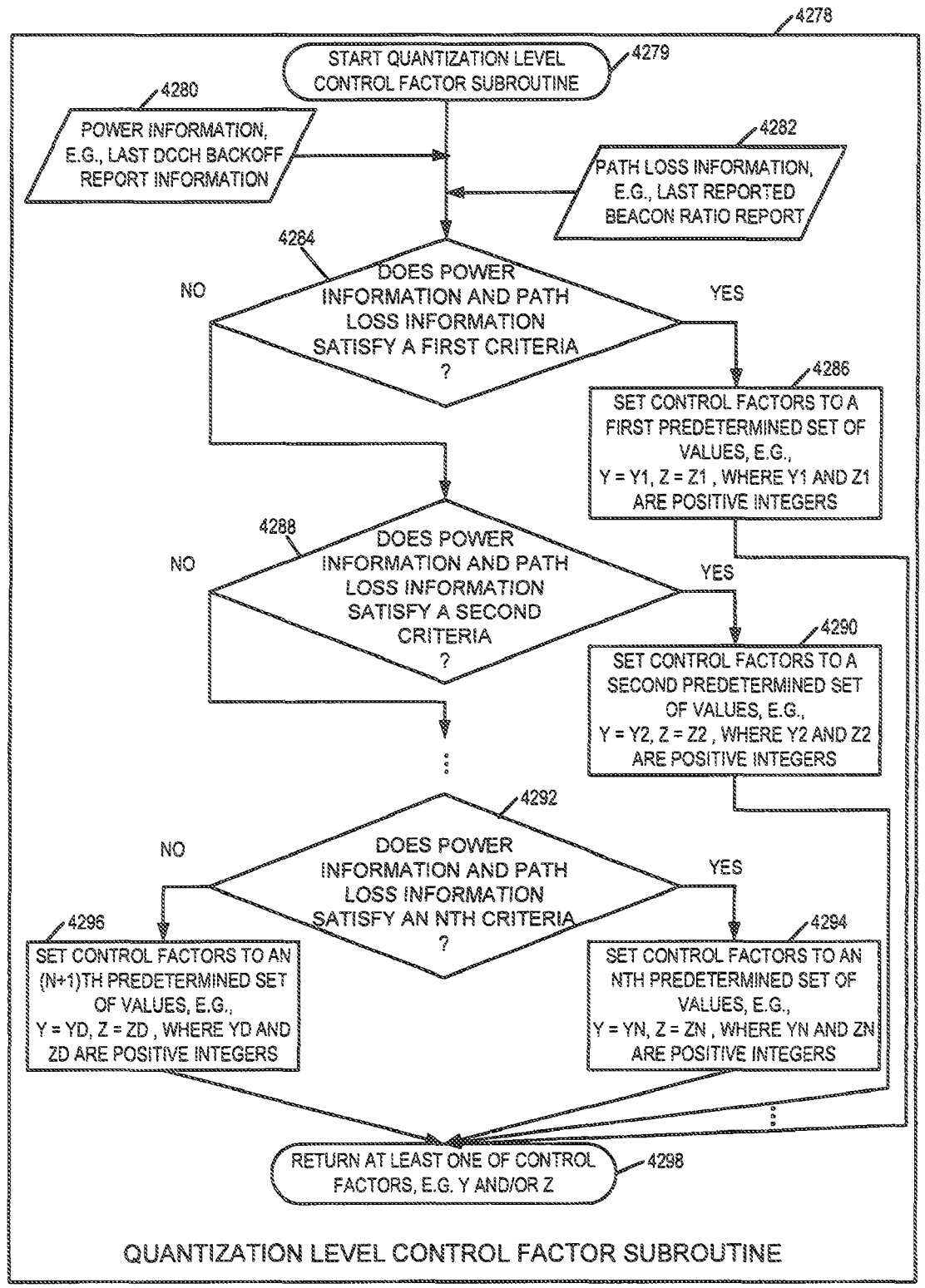

FIG. 42, comprising the combination of FIG. 42A, FIG. 42B, FIG. 42C, FIG. 42D, and FIG. 42E is a flowchart 4200 of an exemplary method of operating a wireless terminal in accordance with the present invention. Operation of the exemplary method starts in step 4202, where the WT is powered on and initialized. Queue definition information 4204, e.g., mapping information defining mapping of traffic flows from various applications into MAC frames of specific request group queues and various grouping of request groups into sets of request groups, and sets of request dictionary information 4206 are available for use by the wireless terminal. For example, the information 4204 and 4206 may be pre-stored in the wireless terminal in non-volatile memory. In some embodiments, a default request dictionary from among the plurality of available request dictionaries is used by the wireless terminal initially, e.g., request dictionary 0. Operation proceeds from start step 4202 to steps 4208, 4210 and 4212.

In step 4208 the wireless terminal maintains transmission queue stats for a plurality of queues, e.g., request group 0 queue, request group 1 queue, request group 2 queue and request group 3 queue. Step 4208 includes sub-step 4214 and sub-step 4216. In sub-step 4214, the wireless terminal increments queue stats when data to be transmitted is added to a queue. For example, new packets from an uplink data stream flow, e.g., a voice communications session flow, are mapped as MAC frames to one of the request groups, e.g., request group 1 queue and a queue stat, e.g., N[1] representing the total number of request group 1 frames that the WT intends to transmit is updated. In some embodiments, different wireless terminals use different mappings. In sub-step 4216, the WT decrements the queue stats when data to be transmitted is removed from a queue. For example, the data to be transmitted may be removed from the queue because the data has been transmitted, the data has been transmitted and a positive acknowledgement was received, the data no longer needs to be transmitted because a data validity timer has expired, or the data no longer needs to be transmitted because the communications session has been terminated.

In step 4210, the wireless terminal generates transmission power availability information. For example, the wireless terminal calculates the wireless terminal transmission back-off power, determines a wireless terminal transmission back-off power report value, and stores backoff power information. Step 4210 is performed on an ongoing basis with the stored information being updated, e.g., in accordance with a DCCH structure.

In step 4212, the wireless terminal generates transmission path loss information for at least two physical attachment points. For example, the wireless terminal measures received pilot and/or beacon signals from at least two physical attachment points calculates a ratio value, determines a beacon ratio report value, e.g., corresponding to a generic beacon ratio report of a first or second type or a specific beacon ratio report, and stores the beacon ratio report information. Step 4212 is performed on an ongoing basis with the stored information being updated, e.g. in accordance with a DCCH structure.

In addition to performing step 4208, 4210 and 4212, the WT, for each reporting opportunity in a (first, second, third) set of predetermined transmission queue stats reporting opportunities operation goes to (sub-routine 1 4224, sub-routine 2 4238, subroutine 3 4256), via (step 4218, step 4220, step 4222), respectively. For example, each first set of predetermined transmission queue stat reporting opportunities corresponds to each one-bit uplink traffic channel request reporting opportunity in the timing structure. For example, if a WT is communicating over DCCH segments using the full-tone DCCH format default mode, e.g., of FIG. 10, the WT receives 16 opportunities to send ULRQST1 in a beaconslot. Continuing with the example, each second set of predetermined transmission queue stat reporting opportunities corresponds to each three-bit uplink traffic channel request reporting opportunity in the timing structure. For example, if a WT is communicating over DCCH segments using the full-tone DCCH format default mode, e.g., of FIG. 10, the WT receives 12 opportunities to send ULRQST3 in a beaconslot. If a WT is communicating over DCCH segments using the split-tone DCCH format default mode, e.g., of FIG. 32, the WT receives 6 opportunities to send ULRQST3 in a beaconslot. Continuing with the example, each third set of predetermined transmission queue stat reporting opportunities corresponds to each four-bit uplink traffic channel request reporting opportunity in the timing structure. For example, if a WT is communicating over DCCH segments using the full-tone DCCH format default mode, e.g., of FIG. 10, the WT receives 9 opportunities to send ULRQST4 in a beaconslot. If a WT is communicating over DCCH segments using the split-tone DCCH format default mode, e.g., of FIG. 32, the WT receives 6 opportunities to send ULRQST4 in a beaconslot. For each flexible report in which the WT decides to send an ULRQST4, operation also goes to sub-routine 4256 via connecting node 4222.

Exemplary traffic availability subroutine 1 4224 will now be described. Operation starts in step 4226, and the WT receives backlog information for a first set of queues, e.g. the set of {Queue 0, Queue 1} where the information received is N[0]+N[1]. Operation proceeds from step 4226 to step 4230.

In step 4230, the WT checks if there is a backlog of traffic in the first set of queues. If there is no backlog in the first set of queues, N[0]+N[1]=0, then operation proceeds from step 4230 to step 4234, where the WT transmits a first number of information bits, e.g., 1 information bit, indicating no traffic backlog in the first set of queues, e.g. the information bit is set equal to 0. Alternatively, if there is a backlog in the first set of queues, N[0]+N[1]>0, then operation proceeds from step 4230 to step 4232, where the WT transmits a first number of information bits, e.g., 1 information bit, indicating a traffic backlog in the first set of queues, e.g. the information bit is set equal to 1. Operation proceeds from either step 4232 or step 4234 to return step 4236.

Exemplary traffic availability subroutine 2 4238 will now be described. Operation starts in step 4240, and the WT receives backlog information for a second set of queues, e.g. the set of {Queue 0} where the information received is N[0]. In step 4240, the WT also receives backlog information for a third set of queues, e.g., the set {queue 1, queue 2, queue 3} or {queue 2} or {queue 1} depending on the request dictionary in use by the WT. For example, corresponding to dictionary (1, 2, 3, 4), the WT may receive (N[1]+N[2]+N[3], N[2], N[1], N[1]), respectively. Operation proceeds from step 4240 to step 4246.

In step 4246, the WT jointly encodes the backlog information corresponding to the second and third sets of queues into a second predetermined number of information bits, e.g., 3, said joint encoding optionally including quantization. In some embodiments, for at least some request dictionaries sub-step 4248 and sub-step 4250 are performed as part of step 4246. In some embodiments, for at least some request dictionaries for at least some iterations of step 4246, sub-step 4248 and sub-step 4250 are performed as part of step 4246. Sub-step 4248 directs operation to a quantization level control factor subroutine. Sub-step 4250 calculates a quantization level as a function of a determined control factor. For example, consider exemplary ULRQST3 using default request dictionary 0 as shown in FIG. 19. In that exemplary case each of the quantization levels are calculated as a function of control factor y. In such an exemplary embodiment, sub-steps 4248 and 4250 are performed in determining the information bit pattern to place in the ULRQST3 report. Alternatively, consider exemplary ULRQST3 using request dictionary 1 as shown in FIG. 21. In that case, none of the quantization levels are calculated as a function of a control factor, e.g. y or z, and therefore sub-step 4248 and 4250 are not performed.

Operation proceeds from step 4246 to step 4252, where the WT transmits the jointly coded backlog information for the second and third sets of queues using the second predetermined number of information bits, e.g., 3 information bits. Operation proceeds from step 4252 to return step 4254.

Exemplary traffic availability subroutine 3 4256 will now be described. Operation starts in step 4258, and the WT receives backlog information for a fourth set of queues, e.g. the set of {Queue 0} where the information received is N[0]. In step 4240, the WT also receives backlog information for a fifth set of queues, e.g., the set {queue 1, queue 2, queue 3} or {queue 2} or {queue 1} depending on the request dictionary in use by the WT. For example, corresponding to dictionary (0, 1, 2, 3), the WT may receive (N[1]+N[2]+N[3], N[2], N[1], N[1]), respectively. In step 4240, the WT may also receives backlog information for a sixth set of queues, e.g., the set {queue 1, queue 3} or {queue 2, queue 3} or {queue 2} depending on the request dictionary in use by the WT. For example, corresponding to dictionary (1, 2, 3), the WT may receive (N[1]+N[3], N[2]+N[3], N[2]), respectively. In step 4240, the WT may also receive backlog information for a seventh set of queues, e.g., the set {queue 3} if request dictionary 3 is in use by the WT. Operation proceeds from step 4258 to step 4266.

In step 4268, the WT encodes the backlog information corresponding to one of the fourth, fifth, sixth, and seventh sets of queues into a third predetermined number of information bits, e.g., 4, said encoding optionally including quantization. In some embodiments, for at least some request dictionaries sub-step 4270 and sub-step 4272 are performed as part of step 4268. In some embodiments, for at least some request dictionaries for at least some iterations of step 4268, sub-step 4270 and sub-step 4272 are performed as part of step 4268. Sub-step 4270 directs operation to a quantization level control factor subroutine. Sub-step 4272 calculates a quantization level as a function of a determined control factor.

Operation proceeds from step 4268 to step 4274, where the WT transmits the coded backlog information for one of the fourth, fifth, sixth, and seventh sets of queues using the third predetermined number of information bits, e.g., 4 information bits. Operation proceeds from step 4274 to return step 4276.

Exemplary quantization level control factor subroutine 4278 will now be described. In some embodiments, the exemplary quantization level control factor subroutine 4278 implementation includes the use of table 1700 of FIG. 17. First column 1702 lists a condition; second column 1704 lists the corresponding value of output control parameter y; third column 1706 lists the corresponding value of output control parameter Z. Operation starts in step 4279, and the subroutine receives power information 4280, e.g., the last DCCH transmitter power backoff report, and path loss information 4282, e.g., the last reported beacon ratio report. Operation proceeds from step 4279 to step 4284, where the WT checks as to whether or not the power information and path loss information satisfy a first criteria. For example, the first criteria is in an exemplary embodiment: (x>28) AND (b>=9), where x is the value in dBs of the most recent uplink transmission power backoff report, e.g., ULTxBKF5 and b is the value in dBs of the most recent downlink beacon ratio report, e.g., DLBNR4. If the first criteria is satisfied, then operation proceeds from step 4284 to step 4286; however if the first criteria is not satisfied, operation proceeds to step 4288.

In step 4286, the wireless terminal sets control factors, e.g. the set {Y, Z}, to a first predetermined set of values, e.g., Y=Y1, Z=Z1, where Y1 and Z1 are positive integers. In one exemplary embodiment, Y1=2 and Z1=10.

Returning to step 4288, in step 4288 the WT checks as to whether or not the power information and path loss information satisfy a second criteria. For example in an exemplary embodiment, the second criteria is (x>27) AND (b>=8). If the second criteria is satisfied, then operation proceeds from step 4288 to step 4290, where the wireless terminal sets control factors, e.g. the set {Y, Z}, to a second predetermined set of values, e.g., Y=Y2, Z=Z2, where Y2 and Z2 are positive integers. In one exemplary embodiment, Y2=2 and Z2=9. If the second criteria is not satisfied operation proceeds to another criteria checking step where, depending on whether or not the criteria is satisfied, the control factor are set to predetermined values or testing is continued.

There are a fixed number of test criteria, utilized in the quantization level control factor subroutine. If none of the first N−1 test criteria are satisfied, operation proceeds to step 4292, where the wireless terminal tests as to whether or not the power information and path loss information satisfy an Nth criteria. For example in an exemplary embodiment where N=9, the Nth criteria is (x>12) and (b<−5). If the Nth criteria is satisfied, then operation proceeds from step 4292 to step 4294, where the wireless terminal sets control factors, e.g. the set {Y, Z}, to a Nth predetermined set of values, e.g., Y=YN, Z=ZN, where YN and ZN are positive integers. In one exemplary embodiment, YN=1 and ZN=2. If the Nth criteria is not satisfied, the wireless terminal sets control factors, e.g., the set {Y, Z} to a (N+1)th predetermined set of values, e.g., a default set Y=YD, Z=ZD, where YD and ZD are positive integers. In one exemplary embodiment, YD=1 and ZD=1.

Operation proceeds from step 4286, step 4290, other control factor setting steps, step 4294 or step 4296 to step 4298. In step 4298, the WT returns at least one control factor value, e.g., Y and/or Z.

Figure 43:
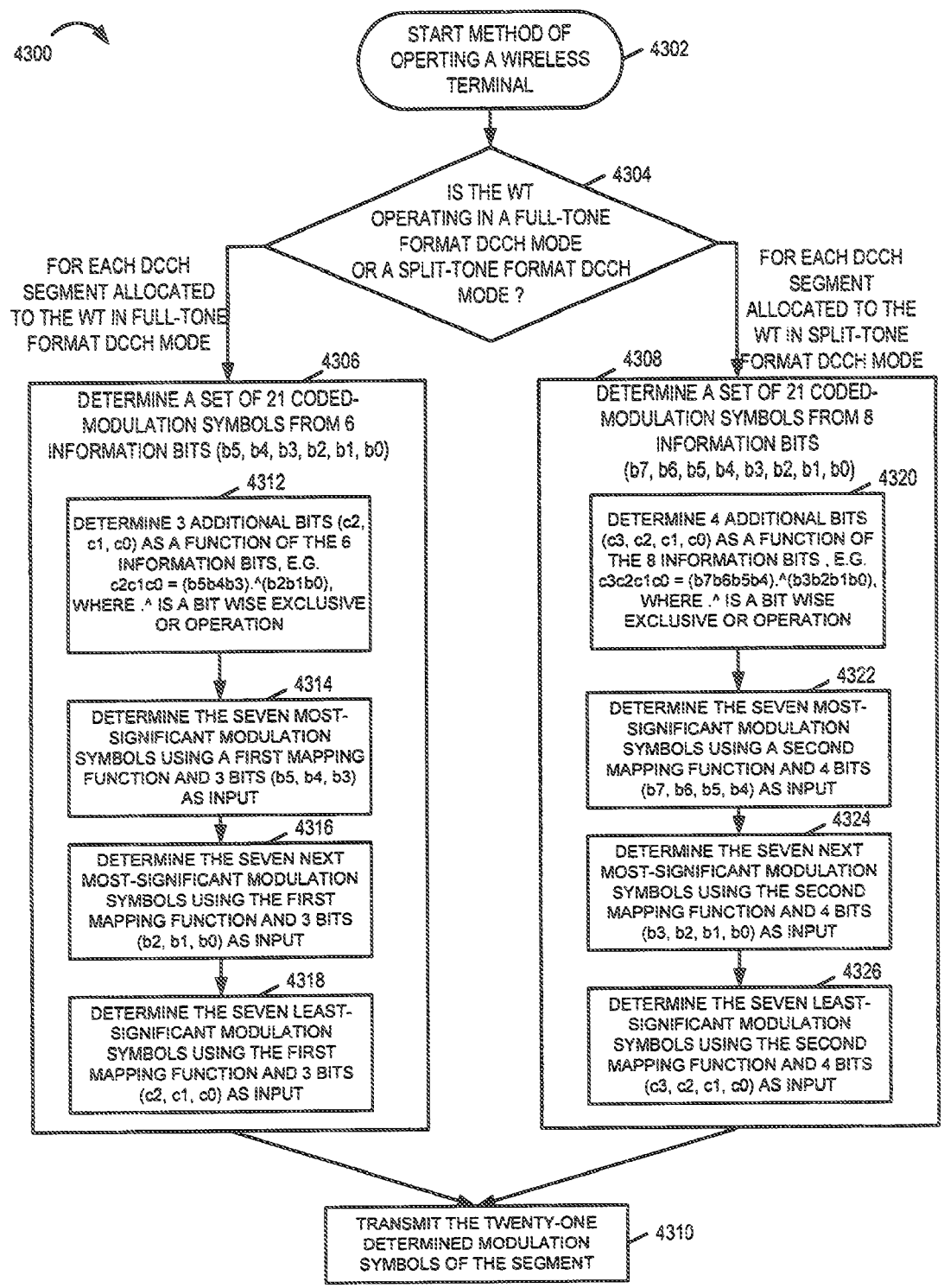
FIG. 43 is a flowchart of an exemplary method of operating a wireless terminal in accordance with the present invention.

FIG. 43 is a flowchart 4300 of an exemplary method of operating a wireless terminal in accordance with the present invention. Operation starts in step 4302, where the wireless terminal is powered on, initialized, has established a connection with a base station. Operation proceeds from start step 4302 to step 4304.

In step 4304, the wireless terminal determines whether the WT is operating in a full-tone format DCCH mode or a split-tone format DCCH mode. For each DCCH segment allocated to the WT in full-tone format DCCH mode, the WT proceeds from step 4304 to step 4306. For each DCCH segment allocated to the WT in split-tone format DCCH mode, the WT proceeds from step 4304 to step 4308.

In step 4306, the WT determines a set of 21 coded modulation-symbol values from 6 information bits (b5, b4, b3, b2, b1, b0). Step 4306 includes sub-steps 4312, 4314, 4316, and 4318. In sub-step 4312, the WT determines 3 additional bits (c2, c1, c0) as a function of the 6 information bits. For example, in one exemplary embodiment, c2c1c0=(b5b4b3).^(b2b1b0) where .^ is a bit wise exclusive OR operation. Operation proceeds from step 4312 to step 4314. In sub-step 4314, the WT determines the seven most-significant modulation symbols using a first mapping function and 3 bits (b5, b4, b3) as input. Operation proceeds from sub-step 4314 to sub-step 4316. In sub-step 4316, the WT determines the seven next most significant modulation symbols using the first mapping function and 3 bits (b2, b1, b0) as input. Operation proceeds from sub-step 4316 to sub-step 4318. In sub-step 4318, the WT determines the seven least-significant modulation symbol using the first mapping function and 3 bits (c2, c1, c0) as input.

In step 4308, the WT determines a set of 21 coded modulation-symbol values from 8 information bits (b7, b6, b5, b4, b3, b2, b1, b0). Step 4308 includes sub-steps 4320, 4322, 4324, and 4326. In sub-step 4320, the WT determines 4 additional bits (c3, c2, c1, c0) as a function of the 8 information bits. For example, in one exemplary embodiment, c3c2c1c0=(b7b6b5b4).^(b3b2b1b0) where .^ is a bit wise exclusive OR operation. Operation proceeds from step 4320 to step 4322. In sub-step 4322, the WT determines the seven most-significant modulation symbols using a second mapping function and 4 bits (b7, b6, b5, b4) as input. Operation proceeds from sub-step 4322 to sub-step 4324. In sub-step 4324, the WT determines the seven next most significant modulation symbols using the second mapping function and 4 bits (b3, b2, b1, b0) as input. Operation proceeds from sub-step 4324 to sub-step 4326. In sub-step 4326, the WT determines the seven least-significant modulation symbol using the second mapping function and 4 bits (c3, c2, c1, c0) as input.

For each DCCH segment allocated to the wireless terminal, operation proceeds from either step 4306 or step 4308 to step 4310. In step 4310, the wireless terminal transmits the twenty-one determined modulation symbols of the segment.

In some embodiments, each DCCH segment corresponds to 21 OFDM tone symbols each tone-symbol of the DCCH segment using the same single logical tone in the uplink timing and frequency structure. The logical tone may be hopped during a DCCH segment, e.g., the same logical tone may corresponds to three different physical tones in the uplink tone block being used for the connection, with each physical tone remaining the same for seven successive OFDM symbol transmission time periods.

In one exemplary embodiment, each segment corresponds to multiple DCCH reports. In one exemplary embodiment, the first mapping function is represented by table 3700 of FIG. 37, and the second mapping function is represented by table 3800 of FIG. 38.

Figure 44:
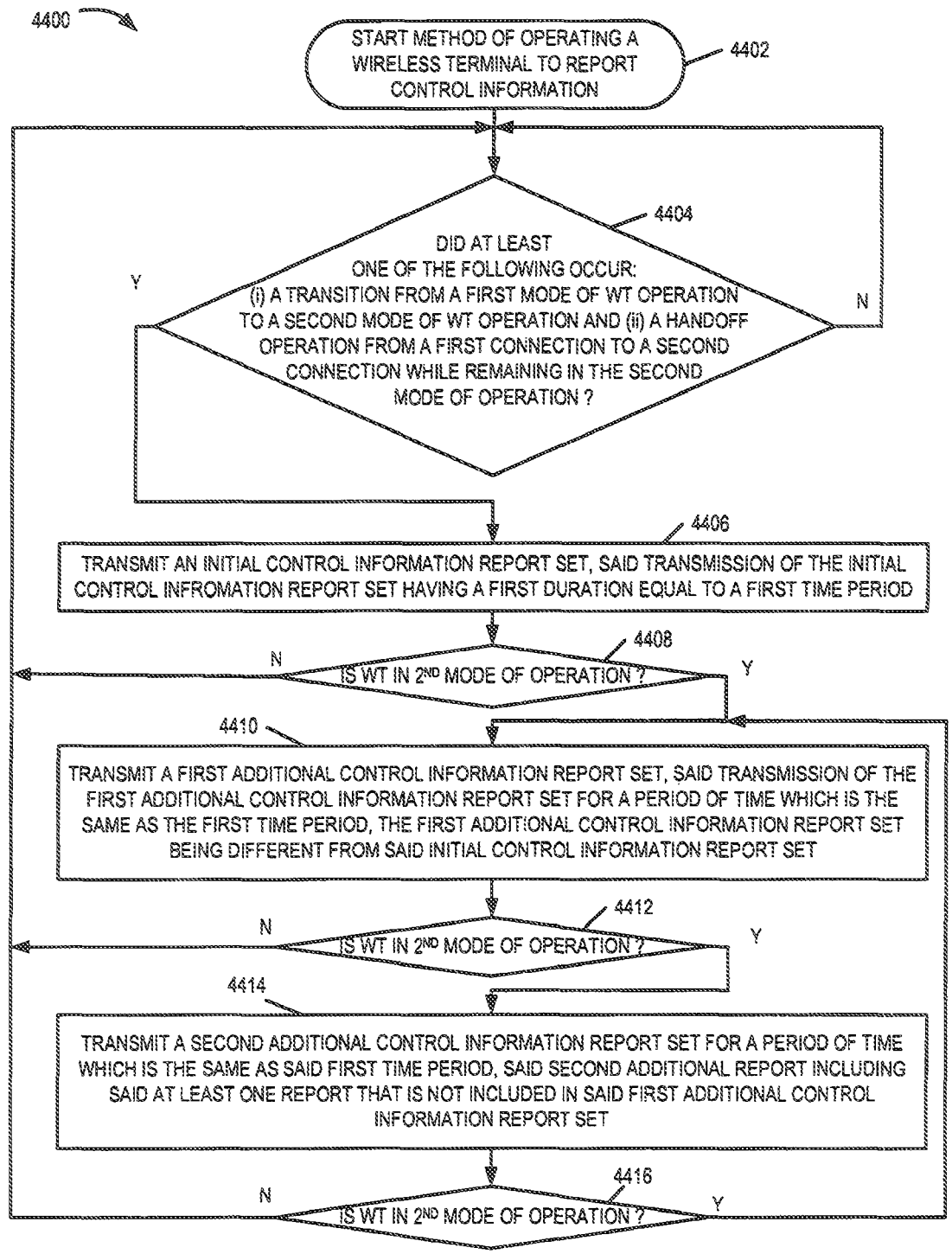
FIG. 44 is a flowchart of an exemplary method of operating a wireless terminal to report control information in accordance with the present invention.

FIG. 44 is a flowchart 4400 of an exemplary method of operating a wireless terminal to report control information in accordance with the present invention. Operation starts in step 4402, where the wireless terminal is powered up and initialized. Operation proceeds from start step 4402 to step 4404. In step 4404, the WT checks as to whether or not one of the following has occurred: (i) a transition from a first mode of WT operation to a second mode of WT operation and (ii) a handoff operation from a first connection to a second connection while remaining in the second mode of operation. In some embodiments, the second mode of operation is an ON mode of operation and said first mode of operation is one of a hold mode of operation, a sleep mode of operation, and an ACCESS mode of operation. In some embodiments, during the ON mode of operation, the wireless terminal can transmit user data on an uplink and during the hold and sleep modes of operation the wireless terminal is precluded from transmitting user data on said uplink. If one of the conditions checked for in step 4404 has occurred, operation proceeds to step 4406; otherwise, operation proceeds back to step 4404 where the checks are again performed.

In step 4406, the WT transmits an initial control information report set, said transmission of the initial control information report set having a first duration equal to a first time period. In some embodiments, the initial control information report set can include one or a plurality of reports. Operation proceeds from step 4406 to step 4408. In step 4408, the WT checks as to whether or not the WT is in the $2^{nd}$ mode of operation. If the WT is in the second mode of operation, operation proceeds from step 4408 to step 4410; otherwise operation proceeds to step 4404.

In step 4410, the WT transmits a first additional control information report set, said transmission of the first additional control information report set for a period of time which is the same as first time period, the first additional control information report set being different than from said initial control information report set. In some embodiments, the initial control information report set is different from the first additional control information report set due to the initial and first additional control information report sets having different formats. In some embodiments, the initial control information report set includes at least one report that is not included in the first additional control information report set. In some such embodiments, the initial control information report set includes at least two reports that are not included in the first additional control information report set. In some embodiments, the at least one report that is not included in the first additional control information report set is one of an interference report and a wireless terminal transmission power availability report. Operation proceeds from step 4410 to step 4412. In step 4412, the WT checks as to whether or not the WT is in the 2$^{nd}$ mode of operation. If the WT is in the second mode of operation, operation proceeds from step 4412 to step 4414; otherwise operation proceeds to step 4404.

In step 4414, the WT transmits a second additional control information report set for a period of time which is the same as said first time period, said second additional control information report including at least one report that is not included in said first additional control information report set. Operation proceeds from step 4414 to step 4416. In step 4416, the WT checks as to whether or not the WT is in the 2$^{nd}$ mode of operation. If the WT is in the second mode of operation, operation proceeds from step 4416 to step 4410; otherwise operation proceeds to step 4404.

Figure 45:
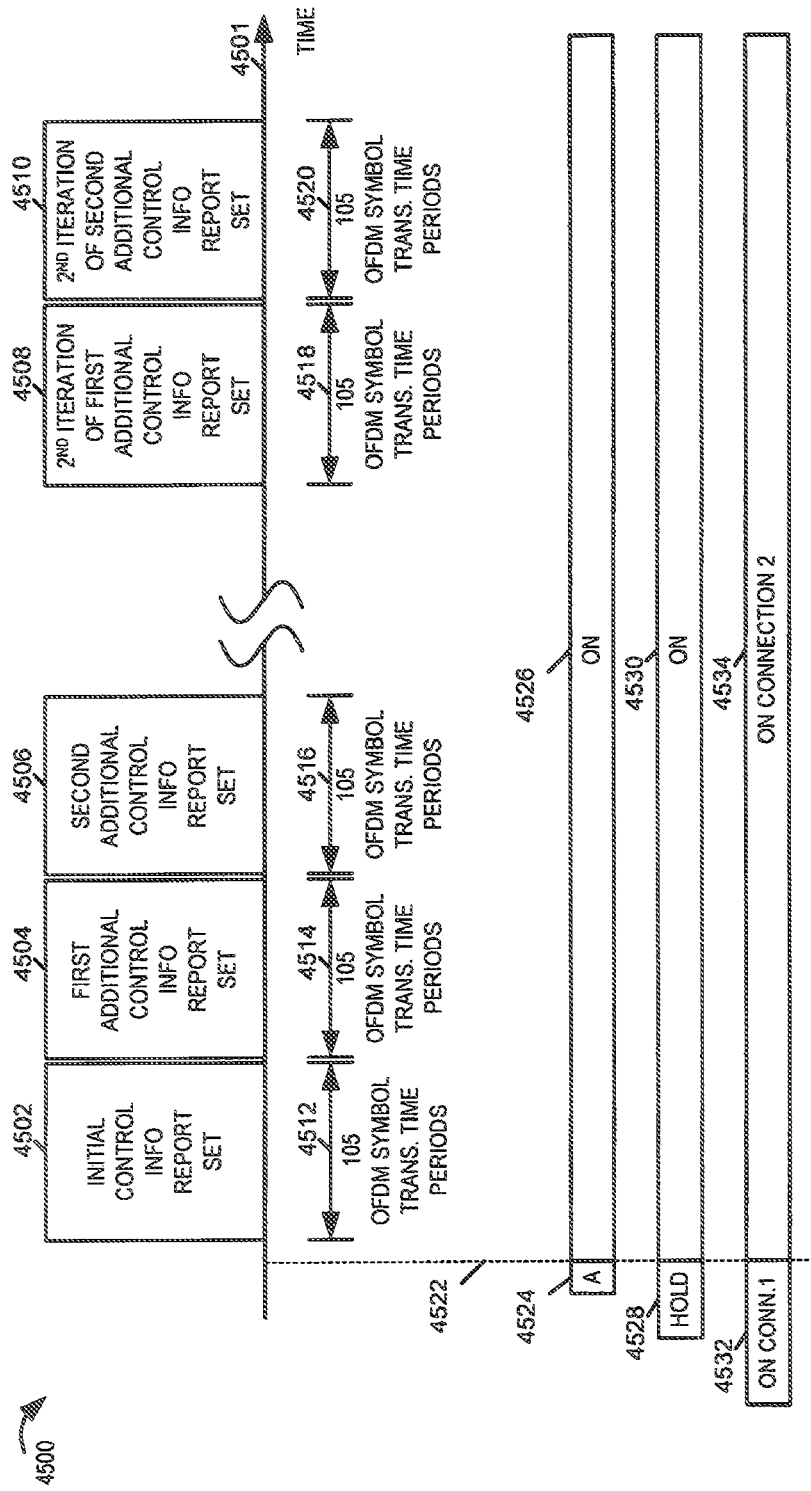
FIGS. 45 and 46 are used to illustrate the use of an initial control information report set in an exemplary embodiment of the present invention.
Figure 46:
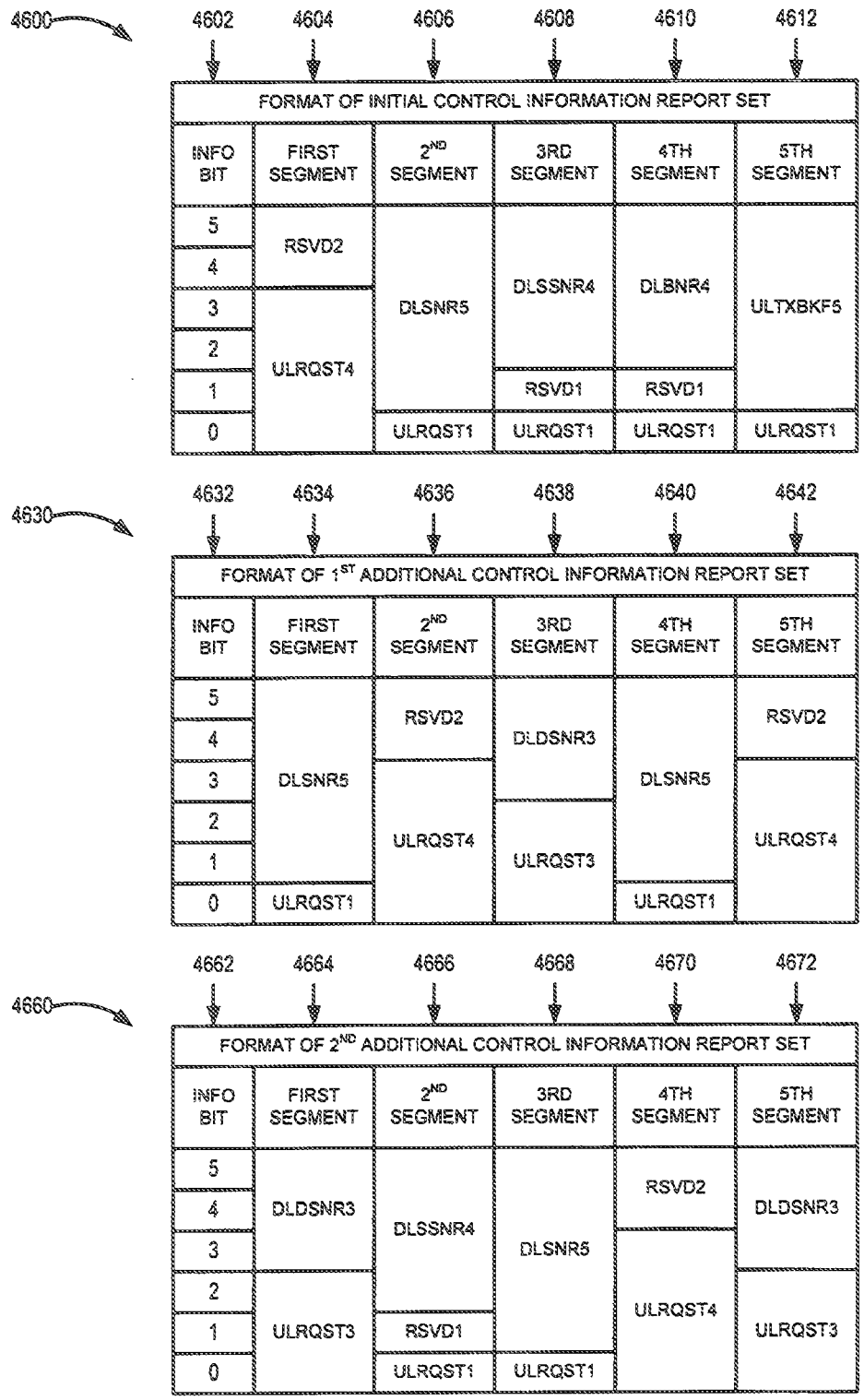

FIGS. 45 and 46 are used to illustrate an exemplary embodiment of the present invention. FIGS. 45 and 46 are applicable to some embodiments discussed with respect to flowchart 4400 of FIG. 44. Drawing 4500 of FIG. 45 includes a initial control information report set 4502, followed by a first additional control information report set 4504, followed by a second additional control information report set 4506, followed by a 2$^{nd}$ iteration of first additional control information report set 4508, followed by a 2$^{nd}$ iteration of second additional control information 4510. Each control information report set (4502, 4504, 4506, 4508, 4510) has a corresponding transmission time period (4512, 4514, 4516, 4518, 4520), respectively, where the duration of each of the time periods (4512, 4514, 4516, 4518, 4520) is the same, the duration being 105 OFDM symbol transmission time periods.

Dotted line 4522 indicates that an event occurred slightly previous to the transmission of the initial control information report set transmission, the event being one of (i) a mode transition from an access mode as indicated by block 4524 to an ON state as indicated by block 4526, (ii) a mode transition from a HOLD state as indicated by block 4528 to an ON state as indicated by block 4530, and (iii) a handoff operation from a first connection in an ON state as indicated by block 4532 to a second connection in an ON state as indicated by block 4534.

As an example, initial control information report set 4502, first additional control information report set 4504 and second control information report set 4506 may be communicated during a first beaconslot, while 2$^{nd}$ iteration of first additional control information report set 4508 and 2$^{nd}$ iteration of second additional control information report set 4510 may be communicated during the next beaconslot. Continuing with the example, each information report set may correspond to a superslot within the beaconslot. For example, using the structure described with respect to the full-tone format of the DCCH for a wireless terminal of FIGS. 10 and 11, one possible mapping of segments corresponding to FIG. 45 is the following. The initial control information report set corresponds to FIG. 11; the first additional control information report set corresponding to indexed segments 30-34 of the beaconslot; the second additional control information set corresponds to indexed segments 30-39 of the beaconslot. FIG. 45 describes such an exemplary mapping.

Drawing 4600 of FIG. 46 describes the format of an exemplary initial control information report set. First column 4602 identifies the bit definition (5, 4, 3, 2, 1, 0). Second column 4604 identifies that the first segment includes a RSVD2 report and a ULRQST4 report. Third column 4606 identifies that the second segment includes a DLSNR5 report and an ULRQST1 report. Fourth column 4608 identifies that the third segment includes a DLSSNR4 report, a RSVD1 report, and an ULRQST1 report. Fifth column 4610 identifies that the fourth segment includes a DLBNR4 report, a RSVD1 report, and a ULRQST1 report. Sixth column 4612 identifies that the fifth segment includes an ULTXBKF5 report and an ULRQST1 report.

Drawing 4630 describes the format of an exemplary 1$^{st}$ additional control information report set. First column 4632 identifies the bit definition (5, 4, 3, 2, 1, 0). Second column 4634 identifies the first segment includes a DLSNR5 report and a ULRQST1 report. Third column 4636 identifies that the second segment includes a RSVD2 report and an ULRQST4 report. Fourth column 4638 identifies that the third segment includes a DLDSNR3 report and an ULRQST3 report. Fifth column 4640 identifies that the fourth segment includes a DLSNR5 report and a ULRQST1 report. Sixth column 4642 identifies that the sixth segment includes an RSVD2 report and an ULRQST4 report.

Drawing 4660 describes the format of an exemplary 2$^{nd}$ additional control information report set. First column 4662 identifies the bit definition (5, 4, 3, 2, 1, 0). Second column 4664 identifies the first segment includes a DLDSNR3 report and a ULRQST3 report. Third column 4666 identifies that the second segment includes a DLSSNR4 report, a RSVD1 report and an ULRQST1 report. Fourth column 4668 identifies that the third segment includes a DLSNR5 report and an ULRQST1 report. Fifth column 4670 identifies that the fourth segment includes a RSVD2 report and a ULRQST4 report. Sixth column 4672 identifies that the sixth segment includes a DLDSNR3 report and an ULRQST3 report.

It can be observed in FIG. 46 that the initial and first additional reports sets will be different because they use different formats. It can also be seen that the initial control information report set includes at least two reports, DLBNR4 and ULTXBKF5, that are not included in the first additional control information report set. The DLBNR4 is an interference report and the ULTXBKF5 is a wireless terminal power availability report. In the example of FIG. 46, the second additional report includes at least one additional report that is not included in the first additional report, RSVD1 report.

Figure 47:
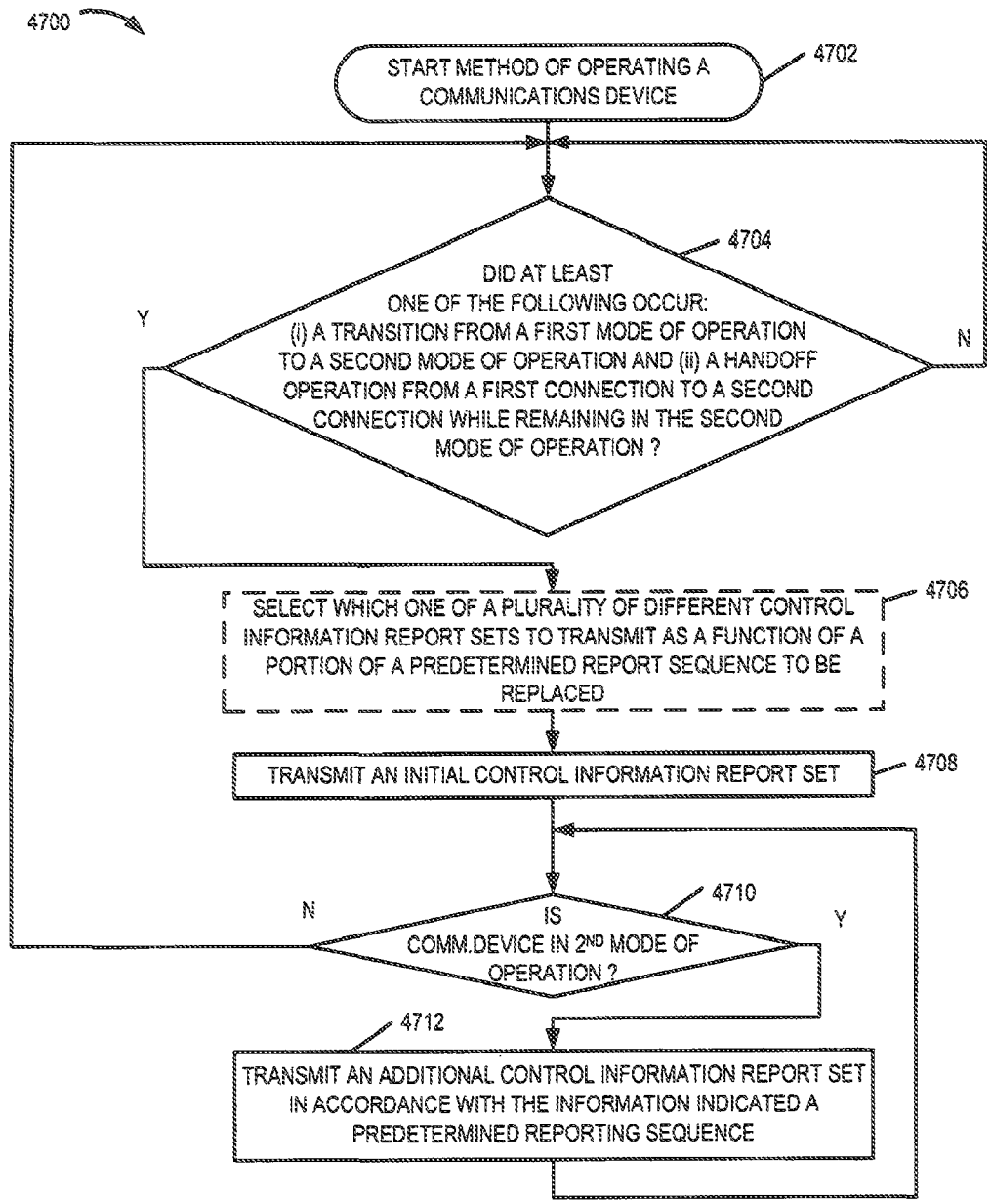
FIG. 47 is a flowchart of an exemplary method of operating a communications device in accordance with the present invention; the communications device including information indicating a predetermined report sequence for use in controlling the transmission of a plurality of different control information reports on a recurring basis.

FIG. 47 is a flowchart 4700 of an exemplary method of operating a communications device in accordance with the present invention; the communications device including information indicating a predetermined report sequence for use in controlling the transmission of a plurality of different control information reports on a recurring basis. In some embodiments, the communications device is a wireless terminal, e.g., a mobile node. For example, the wireless terminal may be one of a plurality of wireless terminals in a multiple access orthogonal frequency division multiplexing (OFDM) wireless communications system.

Operation starts in step 4702, and proceeds to step 4704. In step 4704 the communications device checks as to whether or at least one of the following has occurred: (i) a transition from a first mode of communications device operation to a second mode of communications device operation and (ii) a handoff operation from a first connection, e.g., with a first base station sector physical attachment point, to a second connection, e.g., with a second base station sector physical attachment point, while remaining in the second mode of communications device operation. In some embodiments, the second mode of communications device operation is an ON mode of operation, and the first mode of operation is one of a hold mode of operation and a sleep mode of operation. In some such embodiments, the communications device can transmit user data on an uplink during the ON mode of operation and is precluded from transmitting user data on the uplink during the hold and sleep modes of operation.

If at least one of the tested conditions of step 4704 was satisfied, then operation proceeds from step 4704 to either step 4706 or step 4708 depending upon the embodiment. Step 4706 is an optional step included in some embodiments, but omitted in other embodiments.

Step 4706 is included in some embodiments where the communications device supports a plurality of different initial condition control information report sets. In step 4706, the communications device selects which one of the plurality of initial control information report sets to transmit as a function of the portion of the sequence to be replaced. Operation proceeds from step 4706 to step 4708.

In step 4708, the communications device transmits an initial control information report set. In various embodiments, transmitting an initial control information report set includes transmitting at least one report which would not have been transmitted during the time period used to transmit the initial report if the transmitted reports had followed the predetermined sequence. For example, for a given initial report the at least one report which would not have been transmitted during the time period used to transmit the initial report if the transmitted reports had followed the predetermined sequence is one of an interference report, e.g., a beacon ratio report, and a communications device transmission power availability report, e.g., a communications device transmitter power backoff report. In various embodiments, the initial control information report set can include one or a plurality of reports. In some embodiments, transmitting an initial control information report set includes transmitting said initial control information report set on a dedicated uplink control channel. In some such embodiments, the dedicated uplink control channel is a single tone channel. In some such embodiments, the single tone of the single tone channel is hopped over time, e.g., the single logical channel tone changes to different physical tones due to tone hopping. In various embodiments, the predetermined report sequence repeats over a time period which is greater than a transmission time period used to transmit said initial report set. For example, in an exemplary embodiment, a predetermined reporting sequence repeats on a beaconslot basis, with a beaconslot being 912 OFDM symbol transmission time interval periods, while an exemplary time period used to transmit an initial report set may be 105 OFDM symbol transmission time periods.

Operation proceeds from step 4708 to step 4710, where the communications device checks as to whether it is in the second mode of operation. If the communications device is in the $2^{nd}$ mode of operation, operation proceeds to step 4712; otherwise, operation proceeds to step 4704. In step 4712, the communications device transmits an additional control information report set in accordance with the information indicated in the predetermined reporting sequence. Operation proceeds from step 4712 to step 4710.

In some embodiments, step 4712 following an initial control information report set transmission of step 4708 includes a first additional control information report set, wherein the initial control information report set includes at least one information report set that is not included in the first additional control information report set. For example, the at least one information report that is not included in said first additional control information report set is one of an interference report, e.g., a beacon ratio report, and a communications device power availability report, e.g., a communications device transmission power backoff report.

In various embodiments, the repetition of step 4712 following an initial control information report of step 4712, e.g., while the communications device remains in the second mode of operation, includes the transmission of a first additional control information report set, followed by a second additional control information report set, followed by another first additional control information report set, where the second additional control information report set includes at least one report that is not included in the first additional control information report set.

As an exemplary embodiment, consider that the predetermined report sequence is the report sequence of 40 indexed segments for the uplink dedicated control channel segments in a beaconslot as illustrated by drawing 1099 of FIG. 10. Further consider that the segments of the predetermined report sequence are grouped on a superslot basis with segment indexes (0-4), (5-9), (10-14), (15-19), (20-24), (25-29), (30-34), (35-39), and each group corresponds to a superslot of the beaconslot. If the condition of step 4704 is satisfied, e.g., the communications device has just migrated from a HOLD state of operation to an ON state of operation, the communications device uses the initial report set as indicated in Table 1199 of FIG. 11 for the first superslot, and then uses the predetermined sequence of table 1099 of FIG. 10 for subsequent superslots while remaining in the ON state. For example, the initial report set can replace any of the sets corresponding to segment index grouping (0-4), (5-9), (10-14), (15-19), (20-24), (25-29), (30-34), (35-39), depending upon when the state transition to the ON mode of operation occurs.

Figure 48:
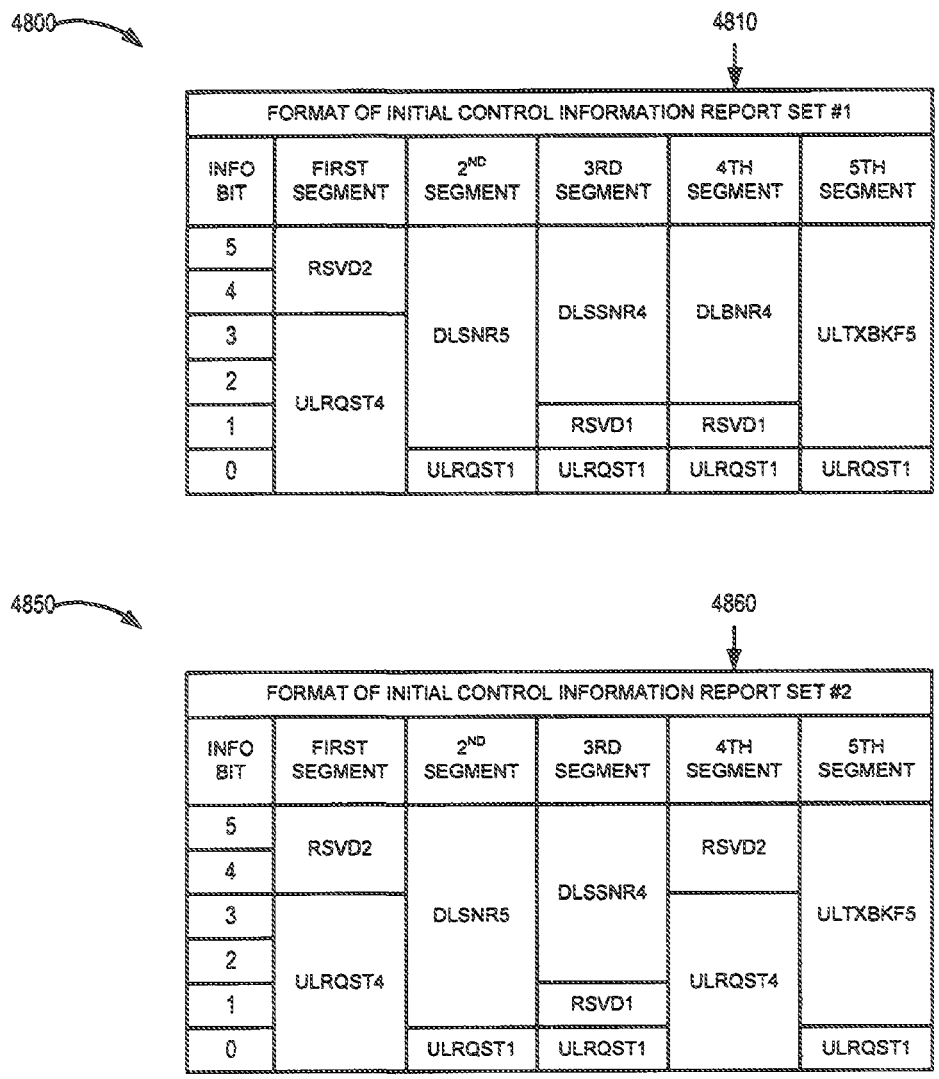
FIG. 48 illustrates two exemplary different formats of initial control channel information report sets, the different format report sets including at least one segment conveying different sets of reports, in accordance with various embodiments of the present invention.

As a variation, consider an exemplary embodiment, where there are multiple, e.g., two, different initial control channel information report sets from which the communication device selects, as a function of the position in the sequence to be replaced. FIG. 48 illustrates two exemplary different formats of control channel information report sets 4800 and 4850. Note that in the format of initial report set #1, the $4^{th}$ segment 4810 includes a DLBNR4 report, a RSVD1 report, and an ULRQST1 report, while in the format of initial report set #2, the $4^{th}$ segment 4860 includes a RSVD2 report and a ULRQST4 report. In an exemplary embodiment using the predetermined reporting sequence of FIG. 10, if the initial control information report is to be transmitted in the $3^{rd}$ superslot of a beaconslot (replacing segments indexes 10-14), then the format of initial control information report set #2 4850 is used; otherwise the format of initial control information report set #1 is used. Note that in the exemplary predetermined reporting sequence of FIG. 10, the 4 bit downlink beacon ratio report, DLBNR4, only occurs once during a beaconslot, and it occurs in the $4^{th}$ superslot of the beaconslot. In this exemplary embodiment, the $2^{nd}$ set of formats of initial reports 4850 is used in the $3^{rd}$ superslot, since in the next subsequent superslot of the beaconslot (the $4^{th}$ superslot), the communications device is scheduled, in accordance with the predetermined structure of FIG. 10, to transmit the DLBNR4 report.

Figure 49:
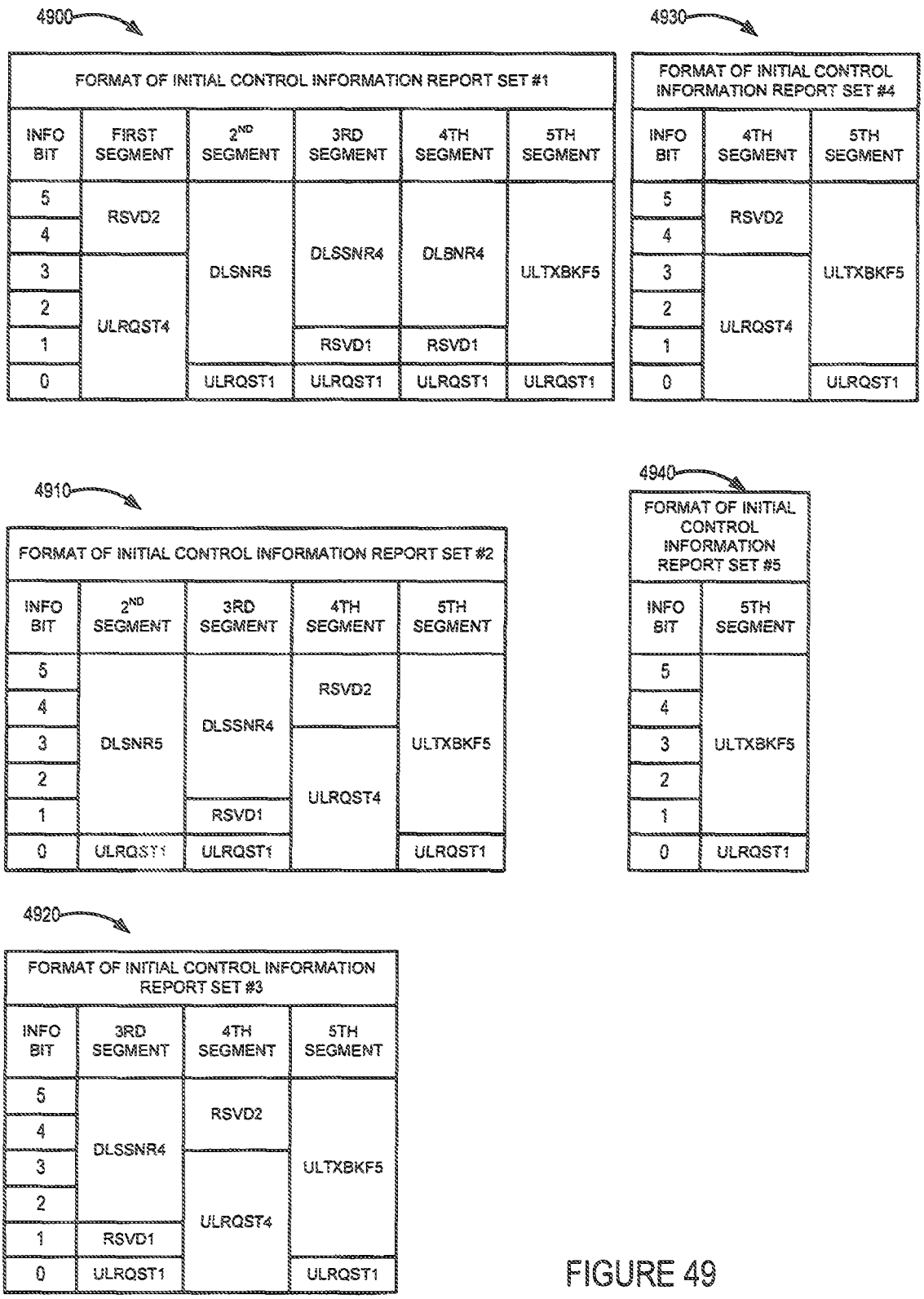
FIG. 49 illustrates a plurality of different initial control information report sets in accordance with various embodiments of the present invention, the different initial control information report sets having different numbers of segments.

As another variation, consider an exemplary embodiment, where there are multiple, e.g., five, different initial control channel information report sets from which the communications device selects, as a function of position in the sequence to be replaced, where each of the different initial control information report sets is a different size. FIG. 49 illustrates initial control information report set #1 4900, initial control information report set #2 4910 initial control information report set #3 4920 initial control information report set #4 4930 initial control information report set #5 4940. In an exemplary embodiment using the predetermined reporting sequence of FIG. 10, if the initial control information report is to be transmitted starting in segment with DCCH index value=0, 5, 10, 15, 20, 25, 30, or 35 of the beaconslot, then initial control information report set #1 4900 is used. Alternatively, if the initial control information report is to be transmitted starting in segment with DCCH index value=1, 6, 11, 16, 21, 26, 31, or 36 of the beaconslot, then initial control information report set #2 4910 is used. Alternatively, if the initial control information report is to be transmitted starting in segment with DCCH index value=2, 7, 12, 17, 22, 27, 32, or 37 of the beaconslot, then initial control information report set #3 4920 is used. Alternatively, if the initial control information report is to be transmitted starting in segment with DCCH index value=3, 8, 13, 18, 23, 28, 33, or 38 of the beaconslot, then initial control information report set #4 4930 is used. Alternatively, if the initial control information report is to be transmitted starting in segment with DCCH index value=4, 9, 14, 19, 24, 29, 34, or 39 of the beaconslot, then initial control information report set #5 4940 is used.

In accordance with the present invention, embodiments are possible where different initial information report sets differ in both the size of the report set and the content of the report set for a given DCCH segment of the superslot.

Figure 50:
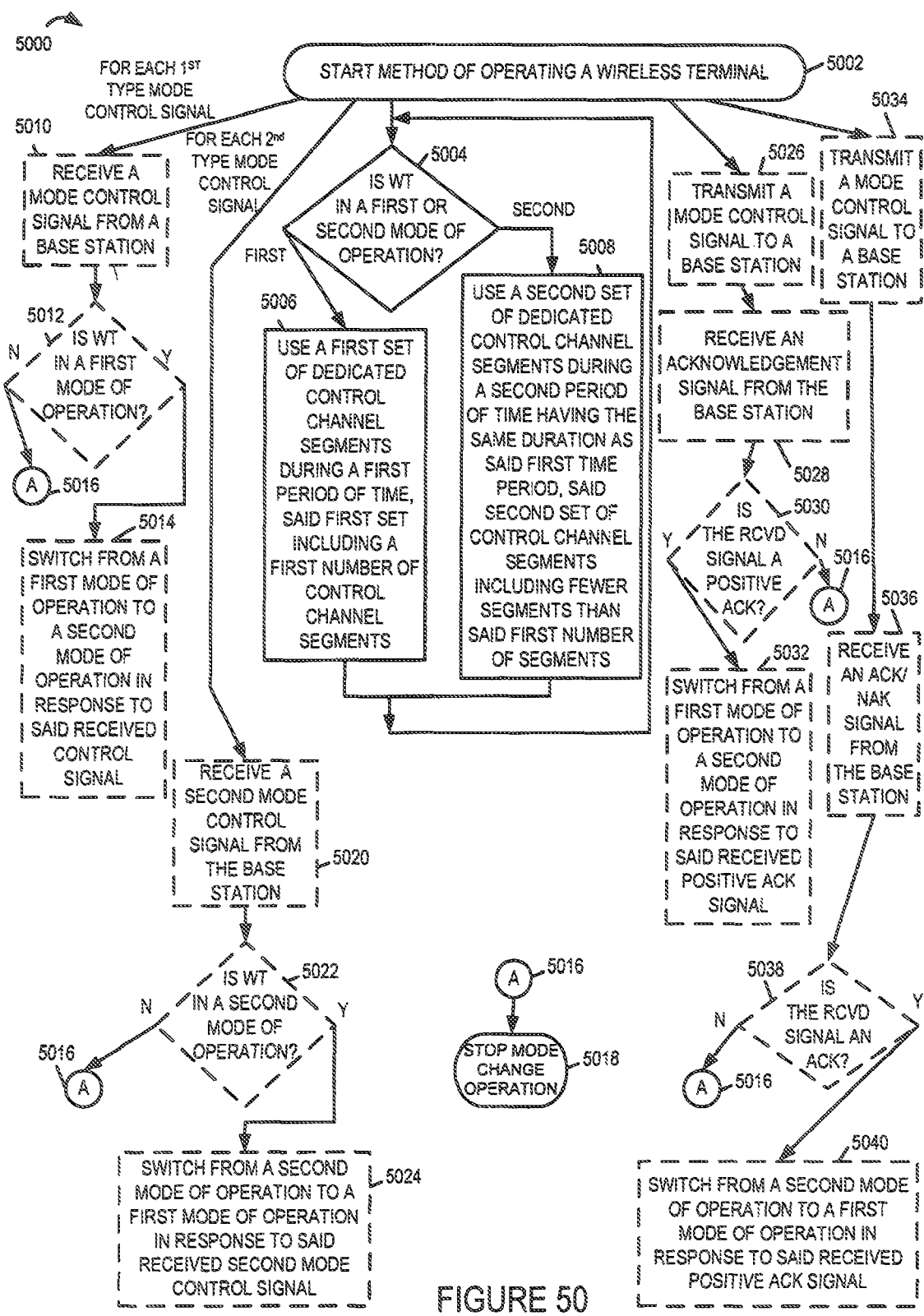
FIG. 50 is a flowchart of an exemplary method of operating a wireless terminal in accordance with the present invention.

FIG. 50 is a flowchart of an exemplary method of operating a wireless terminal in accordance with the present invention. For example, the wireless terminal may be a mobile node in an exemplary spread spectrum multiple access orthogonal frequency division multiplexing (OFDM) wireless communications system. Operation starts in step 5002, where the wireless terminal has been powered on, established a communications link with a base station sector attachment point, has been allocated dedicated control channel segments to use for uplink dedicated control channel reports, and has been established in either a first mode of operation or a second mode of operation. For example, in some embodiments, the first mode of operation is a full-tone mode of dedicated control channel operation, while the second mode of operation is a split tone mode of dedicated control channel operation. In some embodiments, each of the dedicated control channel segments includes the same number of tone-symbols, e.g., 21 tone-symbols. Operation proceeds from start step 5002 to step 5004. Two exemplary types of embodiments are illustrated in flowchart 5000. In a first type of embodiment, the base station sends mode control signals to command changes between first and second modes of operation. In such exemplary embodiments, operation proceeds from step 5002 to steps 5010 and 5020. In a second type of embodiment, the wireless terminal requests mode transitions between first and second modes. In such an embodiment, operation proceeds from step 5002 to steps 5026 and step 5034. Embodiments are also possible, in accordance with the present invention, where the base station can command mode changes without input from the wireless terminal, and where the wireless terminal can request mode changes, e.g., with the base station and wireless terminal each being capable of initiating a mode change.

In step 5004, the WT checks as to whether the WT is currently in a first or second mode of operation. If the WT is currently in a first mode of operation, e.g., a full tone mode, operation proceeds from step 5004 to step 5006. In step 5006, the WT uses a first set of dedicated control channel segments during a first period of time, said first set including a first number of dedicated control channel segments. However, if it is determined in step 5004, that the WT is in a second mode of operation, e.g., a split tone mode, operation proceeds from step 5004 to step 5008. In step 5008, the WT uses a second set of dedicated control channel segments during a second period of time having the same duration of as said first time period, said second set of control channel segments including fewer segments than said first number of segments.

For example, in one exemplary embodiment, if one considers the first period of time to be a beaconslot, the first set in the full-tone mode includes 40 DCCH segments using a single logical tone, while the second set in the split-tone mode includes 13 DCCH segments using a single logical tone. The single logical tone used by the WT in the full-mode may be same or different than the single logical tone used in the split tone mode.

As another example, in the same exemplary embodiment, if one considers the first time period to be the first 891 OFDM symbol transmission time intervals of a beaconslot, the first set in full-tone mode includes 39 DCCH segments using a single logical tone, while the second set in the split-tone mode includes 13 DCCH segments using a single logical tone. In this example, the first number of segments divided by the second number of segments is the integer 3. The single logical tone used by the WT in the full-mode may be same or different than the single logical tone used in the split tone mode.

During the second mode of operation, e.g., split-tone mode, the second set of dedicated control channel segments used by the WT is, in some embodiments, a subset of a larger set of dedicated control channel segments that can be used by the same or a different WT in a full-tone mode of operation during a time period that is not the second time period. For example, the first set of dedicated control channel segments used during the first period of time by the wireless terminal can be the larger set of dedicated control channel segments, and the first and second sets of dedicated control channel segments can correspond to the same logical tone.

Operation proceeds from step 5002 to step 5010 for each $1^{st}$ type of mode control signal directed to the WT, e.g., a mode control signal commanding the WT to switch from a first mode to a second mode of operation. In step 5010, the WT receives a first type mode control signal from a base station. Operation proceeds from step 5010 to step 5012. In step 5012 the WT checks as to whether or not it is currently in a first mode of operation. If the wireless terminal is in a first mode of operation, operation proceeds to step 5014 where the WT switches from a first mode of operation to a second mode of operation in response to said received control signal. However, if it is determined in step 5012 that the WT is not currently in the first mode of operation, the WT proceeds via connecting node A 5016 to step 5018, where the WT stops the implementation of the mode change since there is a misunderstanding between the base station and WT.

Operation proceeds from step 5002 to step 5020 for each $2^{nd}$ type of mode control signal directed to the WT, e.g., a mode control signal commanding the WT to switch from a second mode to a first mode of operation. In step 5020, the WT receives a second type mode control signal from a base station. Operation proceeds from step 5020 to step 5022. In step 5022 the WT checks as to whether or not it is currently in a second mode of operation. If the wireless terminal is in a second mode of operation, operation proceeds to step 5024 where the WT switches from a second mode of operation to a first mode of operation in response to said received second mode control signal. However, if it is determined in step 5022 that the WT is not currently in the second mode of operation, the WT proceeds via connecting node A 5016 to step 5018, where the WT stops the implementation of the mode change since there is a misunderstanding between the base station and WT.

In some embodiments, the first and/or second type of mode control change command signal from a base station also include information identifying whether the logical tone used by the WT will change following the mode switch and, in some embodiments, information identifying the logical tone to be used by the WT in the new mode. In some embodiments, if the WT proceeds to step 5018, the WT signals the base station, e.g., indicating that there is a misunderstanding and that a mode transition has not been completed.

Operation proceeds from step 5002 to step 5026 for each time that the wireless terminal proceeds to initiate a mode change from a first mode of operation, e.g., full-tone DCCH mode, to a second mode of operation, e.g., split-tone DCCH mode. In step 5026, the WT transmits a mode control signal to a base station. Operation proceeds from step 5026 to step 5028. In step 5028 the WT receives an acknowledgement signal from the base station. Operation proceeds from step 5028 to step 5030. In step 5030 if the received acknowledgement signal is a positive acknowledgment, operation proceeds to step 5032, where the wireless terminal switches from a first mode of operation to a second mode of operation in response to said received positive acknowledgement signal. However, if in step 5030, the WT determines that the received signal is a negative acknowledgment signal or the WT cannot successfully decode the received signal the WT proceeds via connecting node A 5016 to step 5018 where the WT stops the mode change operation.

Operation proceeds from step 5002 to step 5034 for each time that the wireless terminal proceeds to initiate a mode change from a second mode of operation, e.g., split-tone DCCH mode, to a second mode of operation, e.g., full-tone DCCH mode. In step 5034, the WT transmits a mode control signal to a base station. Operation proceeds from step 5034 to step 5036. In step 5036 the WT receives an acknowledgement signal from the base station. Operation proceeds from step 5036 to step 5038. In step 5038 if the received acknowledgement signal is a positive acknowledgment, operation proceeds to step 5040, where the wireless terminal switches from a second mode of operation to a first mode of operation in response to said received positive acknowledgement signal. However, if in step 5038, the WT determines that the received signal is a negative acknowledgment signal or the WT cannot successfully decode the received signal the WT proceeds via connecting node A 5016 to step 5018 where the WT stops the mode change operation.

Figure 51:
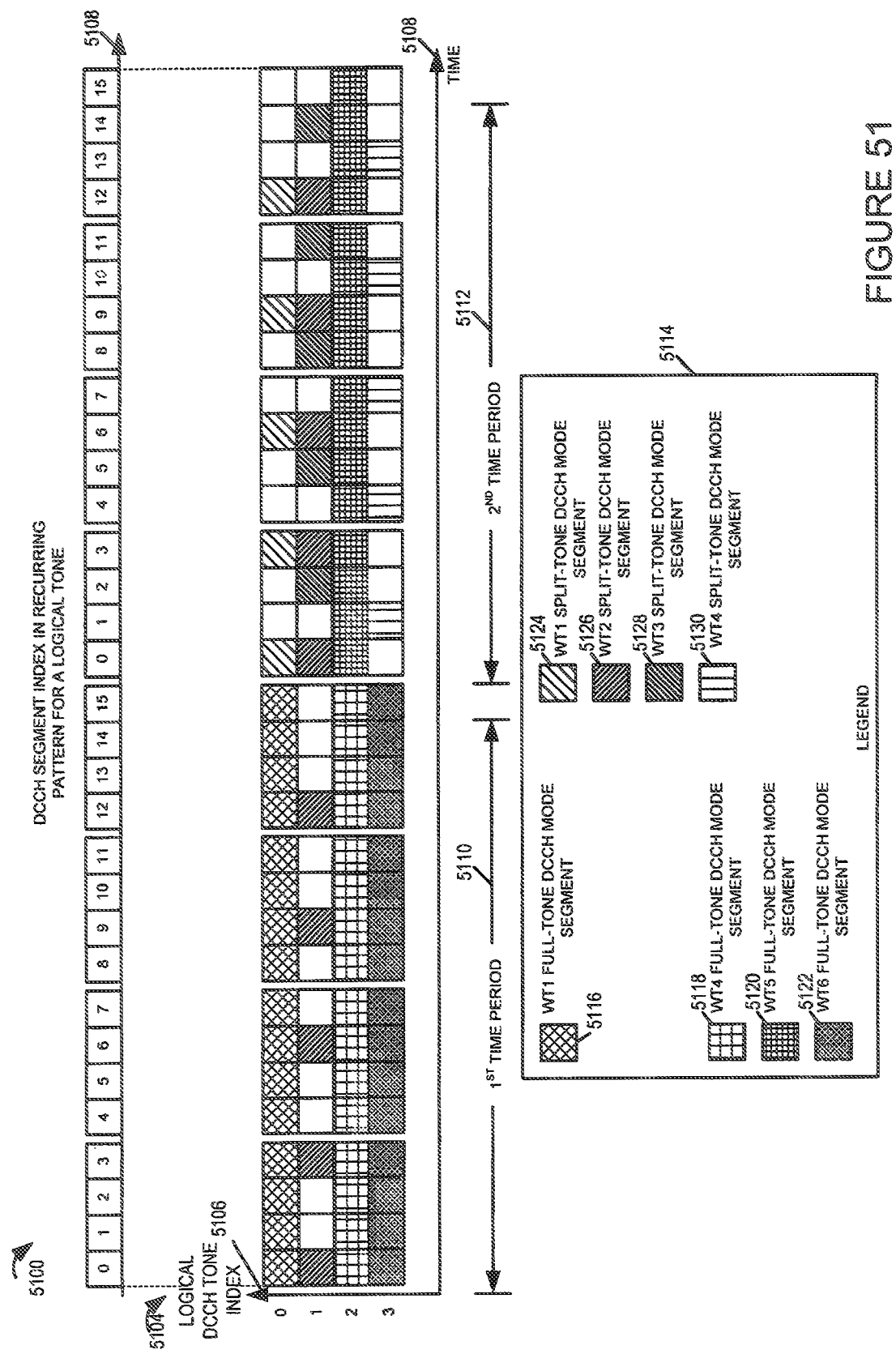
FIG. 51 is a drawing illustrating exemplary full-tone DCCH mode segments and exemplary split-tone DCCH mode segments allocated to exemplary wireless terminals, in accordance with various embodiments of the present invention.

FIG. 51 is a drawing illustrating exemplary operation in accordance with the present invention. In the exemplary embodiment of FIG. 51, the dedicated control channel is structured to use a repeating pattern of 16 segments indexed from 0 to 15, for each logical tone in the dedicated control channel. Other embodiments, in accordance with the present invention may use a different number of indexed DCCH segments in a recurring pattern, e.g., 40 segments. Four exemplary logical DCCH tones, indexed (0, 1, 2, 3) are illustrated in FIG. 51. In some embodiments, each segment occupies the same amount of air link resources. For example, in some embodiments, each segment has same number of tone-symbols, e.g., 21 tone-symbols. Drawing 5100 identifies the index of the segments over time for two successive iterations of the pattern corresponding to a logical tone in drawing 5104.

Drawing 5104 plots logical DCCH tone index on vertical axis 5106 vs time on horizontal axis 5108. A first time period 5110 and a second time period 5112 are shown which have the same duration. Legend 5114 identifies: (i) squares with widely spaced crosshatch shading 5116 represents WT1 full-tone DCCH mode segments, (ii) squares with widely spaced vertical and horizontal line shading 5118 represent WT4 full-tone DCCH mode segments, (iii) squares with narrowly spaced vertical and horizontal line shading 5120 represent WT5 full-tone DCCH mode segments, (iv) squares with fine crosshatch shading 5122 represent WT6 full-tone DCCH mode segments, (v) squares with widely spaced diagonal line shading sloping upward from left to right 5124 represent WT1 split-tone DCCH mode segments, (vi) squares with narrowly spaced diagonal line shading sloping downward from left to right 5126 represent WT2 split-tone DCCH mode segments, (vii) squares with narrowly spaced diagonal line shading sloping upward from left to right 5128 represent WT3 split-tone DCCH mode segments, and (viii) squares with widely spaced vertical line shading 5130 represent WT4 split-tone DCCH mode segments.

In drawing 5104, it may be observed that WT1 is in full-tone DCCH mode during the first time period 5110 and uses a set of 15 segments (indexed 0-14) corresponding to logical tone 0 during that time period. During the $2^{nd}$ time period 5112, which is the same duration as the first time period, WT1 is in split-tone DCCH mode and uses a set of 5 segments with index values (0, 3, 6, 9, 12) corresponding to logical tone 0, which is a subset of the set of segments used during the $1^{st}$ time period 5110.

In drawing 5104, it may also be observed that WT4 is in full-tone DCCH mode during $1^{st}$ time period 5110 and uses a set of 15 segments (indexed 0-14) corresponding to logical tone 2, and WT4 is in split tone format during $2^{nd}$ time period 5112 and uses a set of 5 segments with index values (1, 4, 7, 10, 13) corresponding to logical tone 3. It should also be observed that the set of 5 segments with index values (1, 4, 7, 10, 13) corresponding to logical tone 3 is part of a larger set of segments used by WT6 in full-tone DCCH mode during the $1^{st}$ time period 5110.

Figure 52:
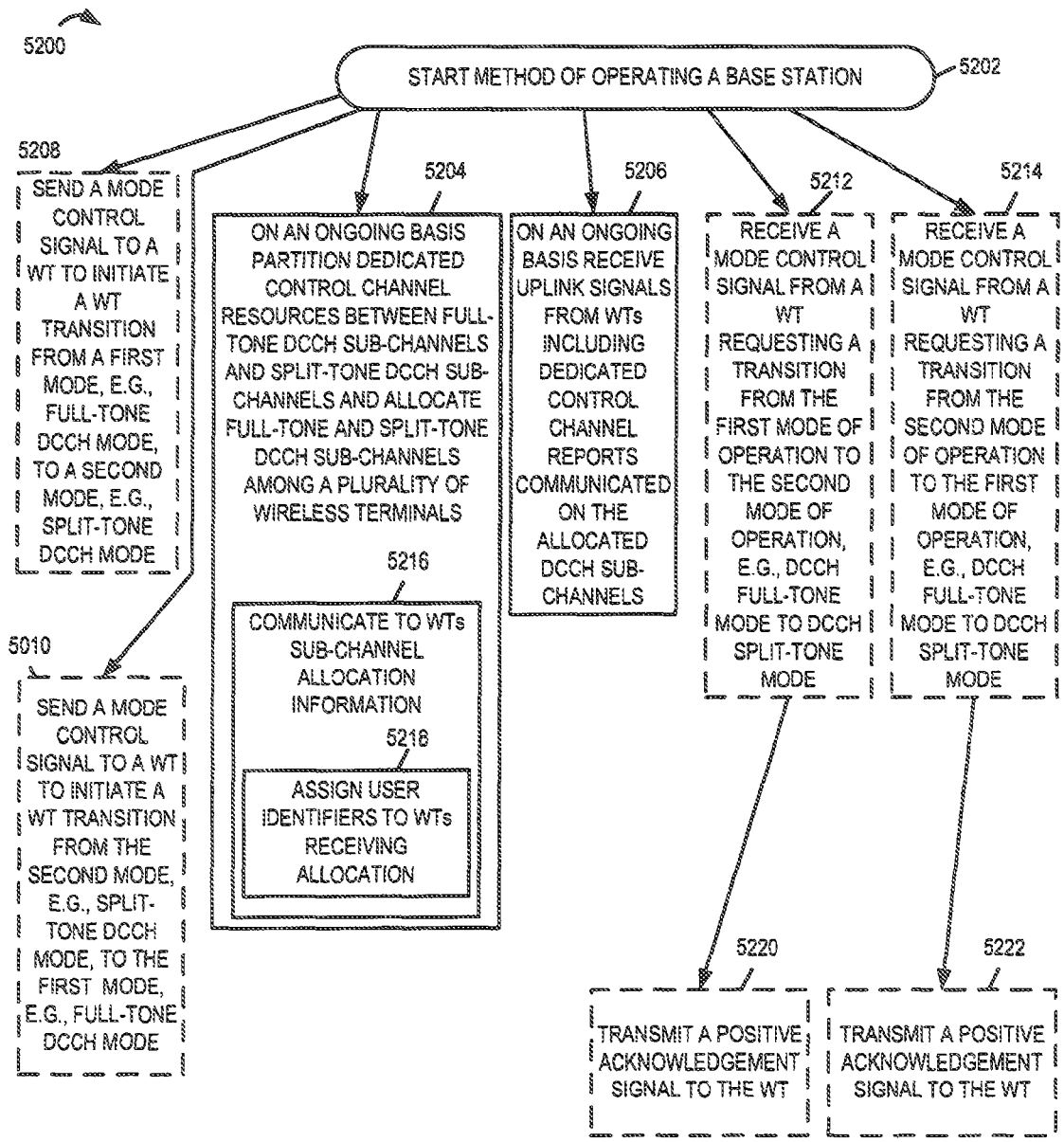
FIG. 52 is a flowchart of a drawing of an exemplary method of operating a base station in accordance with the present invention.

FIG. 52 is a flowchart 5200 of an exemplary method of operating a base station in accordance with the present invention. Operation of the exemplary method starts in step 5202, where the base station is powered on and initialized. Operation proceeds to steps 5204 and steps 5206. In step 5204, the base station, on an ongoing basis, partitions the dedicated control channel resources between full-tone DCCH sub-channels and split tone DCCH sub-channel and allocates the full-tone and split tone DCCH sub-channels among a plurality of wireless terminals. For example, in an exemplary embodiment the DCCH channel uses 31 logical tones and each logical tone corresponds to 40 DCCH channel segments in a single iteration of a repeating pattern, e.g., on a beacon-slot basis. At any given time each logical tone can correspond to either a full-tone DCCH mode of operation where DCCH segments corresponding to the tone are allocated to a single WT, or a split tone DCCH mode where DCCH segments corresponding to the tone can be allocated to up to a fixed maximum number of WTs, e.g., where the fixed maximum number of WTs=3. In such an exemplary embodiment using 31 logical tones for the DCCH channel, if each of the DCCH channel logical tones are in full-tone mode, the base station sector attachment point can have allocated DCCH segments to 31 WTs. At the other extreme if each of the DCCH channel logical tones are in split-tone format, then 93 WTs can be assigned segments. In general, at any given time the DCCH channel is partitioned and may include a mixture of full and split tone sub-channels, e.g., to accommodate current loading conditions and current needs of the WTs using the base station as their attachment point.

Figure 53:
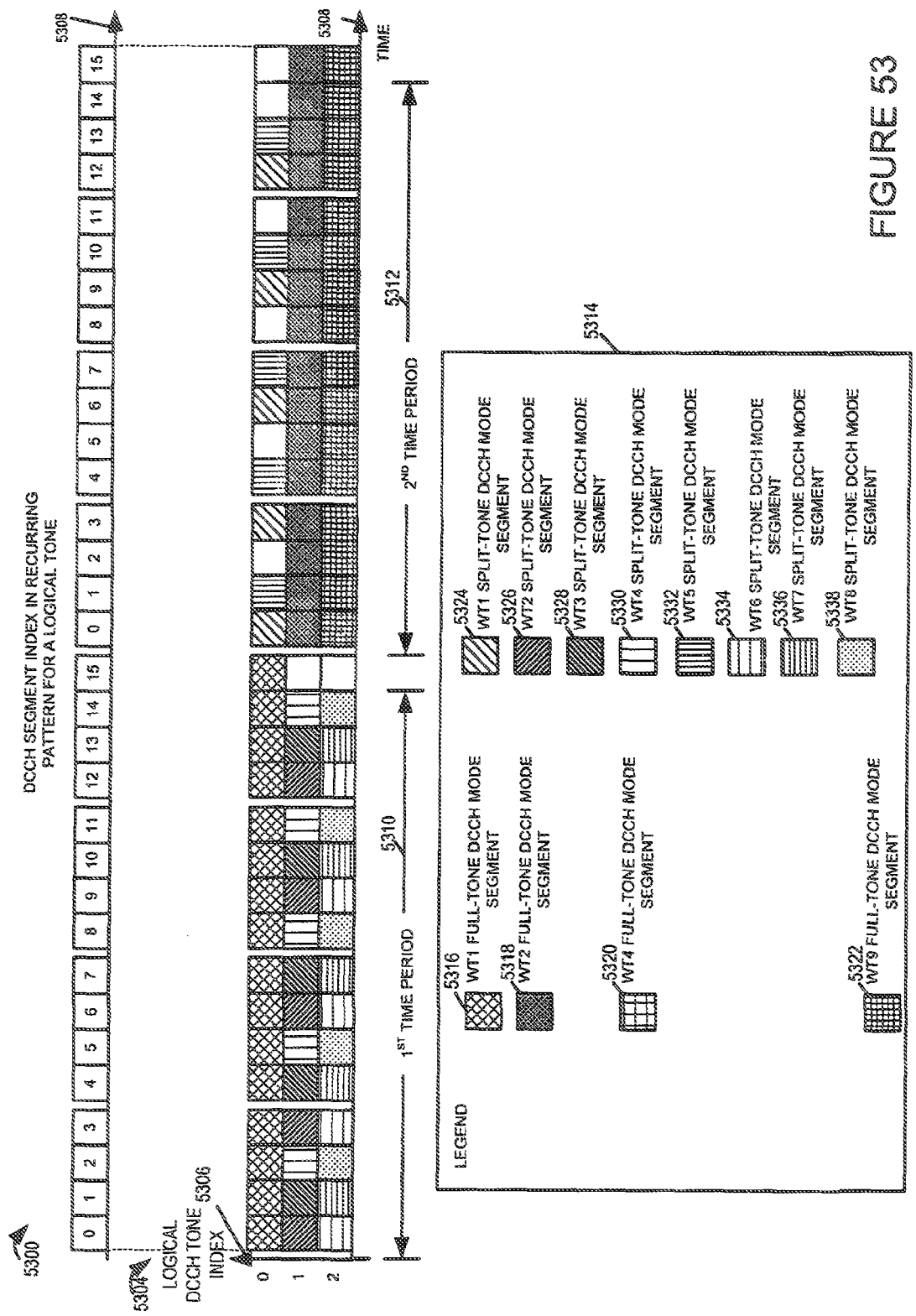
FIG. 53 is a drawing illustrating exemplary full-tone DCCH mode segments and exemplary split-tone DCCH mode segments allocated to exemplary wireless terminals, in accordance with various embodiments of the present invention.

FIG. 53 illustrates exemplary partitioning and allocation of dedicated control channel resources for another exemplary embodiment, e.g., an embodiment using 16 indexed DCCH segments corresponding to a logical tone which repeat on a recurring basis. The method described with respect to FIG. 53 may be used in step 5204 and may be extended to other embodiments.

Step 5204 includes sub-step 5216, in which the base station communicates to the WTs sub-channel allocation information. Sub-step 5216 includes sub-step 5218. In sub-step 5218, the base station assigns user identifiers to WTs receiving allocation of dedicated control channel segments, e.g., On state user identifiers.

In step 5206, the base station, on an ongoing basis, receives uplink signals from WTs including dedicated control channel reports communicated on the allocated DCCH sub-channels. In some embodiments, the wireless terminals use different coding to communicate information transmitted in DCCH segments during a full-tone DCCH mode of operation and during a split-tone DCCH mode of operation; therefore the base station performs different decoding operations based on the mode.

Two exemplary types of embodiments are illustrated in flowchart 5200. In a first type of embodiment, the base station sends mode control signals to command changes between first and second modes of operation, e.g., between full-tone DCCH mode and split-tone DCCH mode. In such exemplary embodiments, operation proceeds from step 5202 to steps 5208 and 5010. In a second type of embodiment, the wireless terminal requests mode transitions between first and second modes, e.g., between full-tone DCCH mode and split-tone DCCH mode. In such an embodiment, operation proceeds from step 5202 to steps 5212 and step 5214. Embodiments are also possible, in accordance with the present invention, where the base station can command mode changes without input from the wireless terminal, and where the wireless terminal can request mode changes, e.g., with the base station and wireless terminal each being capable of initiating a mode change.

Operation proceeds to step 5208 for each instance where the base station decides to command a WT to change from a first mode, e.g., full-mode DCCH mode to a second mode, e.g. split-tone DCCH mode. In step 5208, the base station sends a mode control signal to a WT to initiate a WT transition from a first mode, e.g., full-tone DCCH mode, to a second mode, e.g., split-tone DCCH mode.

Operation proceeds to step 5210 for each instance where the base station decides to command a WT to change from the second mode, e.g., split-mode DCCH mode, to the first mode, e.g. full-tone DCCH mode. In step 5210, the base station sends a mode control signal to a WT to initiate a WT transition from the second mode, e.g., split-tone DCCH mode, to the first mode, e.g., full-tone DCCH mode.

Operation proceeds to step 5212 for each instance where the base station receives a request from a WT to change from a first mode, e.g., full-tone DCCH mode to a second mode, e.g. split-tone DCCH mode. In step 5212, the base station receives a mode control signal from a WT requesting a transition from a first mode of operation to a second mode of operation, e.g., from full-tone DCCH mode to split-tone DCCH mode. Operation proceeds from step 5212 to step 5220, if the base station decides to accommodate the request. In step 5220, the base station transmits a positive acknowledgement signal to the WT which sent the request.

Operation proceeds to step 5214 for each instance where the base station receives a request from a WT to change from a second mode, e.g., split-tone DCCH mode to a first mode, e.g. full-tone DCCH mode. In step 5214, the base station receives a mode control signal from a WT requesting a transition from a second mode of operation to a first mode of operation, e.g., from split-tone DCCH mode to full-tone DCCH mode. Operation proceeds from step 5214 to step 5222, if the base station decides to accommodate the request. In step 5222, the base station transmits a positive acknowledgement signal to the WT which sent the request.

FIG. 53 is a drawing illustrating exemplary operation in accordance with the present invention. In the exemplary embodiment of FIG. 53, the dedicated control channel is structured to use a repeating pattern of 16 segments indexed from 0 to 15, for each logical tone in the dedicated control channel. Other embodiments, in accordance with the present invention may use a different number of indexed DCCH segments in a recurring pattern, e.g., 40 segments. Three exemplary logical DCCH tones, indexed (0, 1, 2) are illustrated in FIG. 53. In some embodiments, each segment occupies the same amount of air link resources. For example, in some embodiments, each segment has same number of tone-symbols, e.g., 21 tone-symbols. Drawing 5300 identifies the index of the segments over time for two successive iterations of the recurring indexing pattern corresponding to a logical tone in drawing 5304.

Drawing 5304 plots logical DCCH tone index on vertical axis 5306 vs time on horizontal axis 5308. A first time period 5310 and a second time period 5312 are shown which have the same duration. Legend 5314 identifies: (i) squares with widely spaced crosshatch shading 5316 represents WT1 full-tone DCCH mode segments, (ii) squares with narrowly spaced crosshatch shading 5318 represents WT2 full-tone DCCH mode segments, (iii) squares with widely spaced vertical and horizontal line shading 5320 represent WT4 full-tone DCCH mode segments, (iv) squares with narrowly spaced vertical and horizontal line shading 5322 represent WT9 full-tone DCCH mode segments, (v) squares with widely spaced diagonal line shading sloping upward from left to right 5324 represent WT1 split-tone DCCH mode segments (vi) squares with narrowly spaced diagonal line shading sloping downward from left to right 5326 represent WT2 split-tone DCCH mode segments, (vii) squares with narrowly spaced diagonal line shading sloping upward from left to right 5328 represent WT3 split-tone DCCH mode segments, (viii) squares with widely spaced vertical line shading 5330 represent WT4 split-tone DCCH mode segments, and (ix) squares with narrowly spaced vertical line shading 5332 represent WT5 split-tone DCCH mode segments, (x) squares with widely spaced horizontal line shading 5334 represent WT6 split-tone DCCH mode segments, (xi) squares with narrowly spaced horizontal line shading 5336 represent WT7 split-tone DCCH mode segments, and (xii) squares with dot shading 5338 represent WT8 split-tone DCCH mode segments.

In drawing 5304, it may be observed that WT1 is in full-tone DCCH mode during the first time period 5310 and uses a set of 15 segments (indexed 0-14) corresponding to logical tone 0 during that time period. In accordance with some embodiments of the invention, a base station allocated a first dedicated control sub-channel to WT1, the first dedicated control sub-channel including the set of 15 segments (indexed 0-14) corresponding to logical tone 0 for use during 1$^{st}$ time period 5310.

In drawing 5304, it may also be observed that WT2, WT3, and WT4 are each split-tone DCCH mode during the first time period 5310 and each use a set of 5 segments indexed ((0, 3, 6, 9, 12), (1, 4, 7, 10, 13), (2, 5, 8, 11, 14)), respectively corresponding to the same logical tone, logical tone 1 during 1st time period 5310. In accordance with some embodiments of the invention, a base station allocated a (second, third, and fourth) dedicated control sub-channel to (WT2, WT3, WT3), the (second, third, and fourth) dedicated control sub-channels each including a set of 5 segments with index values ((0, 3, 6, 9, 12), (1, 4, 7, 10, 13), (2, 5, 8, 11, 14)), respectively corresponding to the same logical tone, logical tone 1 during 1st time period 5310.

In drawing 5304, it may also be observed that WT6, WT7, and WT8 are each split-tone DCCH mode during the first time period 5310 and each use a set of 5 segments indexed ((0, 3, 6, 9, 12), (1, 4, 7, 10, 13), (2, 5, 8, 11, 14)), respectively corresponding to the same logical tone, logical tone 2 during 1st time period 5310. In accordance with some embodiments of the invention, a base station allocated a (fifth, sixth, and seventh) dedicated control sub-channel to (WT6, WT7, WT8), the (fifth, sixth, and seventh) dedicated control sub-channels each including a set of 5 segments with index values ((0, 3, 6, 9, 12), (1, 4, 7, 10, 13), (2, 5, 8, 11, 14)), respectively corresponding to the same logical tone, logical tone 2 during 1st time period 5310.

In drawing 5304, it may be observed that (WT1, WT5) are in split-tone DCCH mode during the second time period 5312 and each uses a set of 5 segments with index values (0, 3, 6, 9, 12), (1, 4, 7, 10, 13)), respectively, corresponding to logical tone 0 during the second time period 5312. In accordance with some embodiments of the invention, a base station allocated an (eighth, ninth) dedicated control sub-channel to (WT1, WT5), the (eighth, ninth) dedicated control sub-channel including the set of 5 segments with index (0, 3, 6, 9, 12), (1, 4, 7, 10, 13)), respectively, corresponding to logical tone 0 during the second time period 5312. WT1 used logical tone 0 during the first time period, while WT 5 did not use logical tone 0 during the first time period.

In drawing 5304, it may also be observed that (WT2) is in full-tone DCCH mode during the second time period 5312 and uses a set of 15 segments indexed (0-14) corresponding to logical tone 1 during the second time period 5312. In accordance with some embodiments of the invention, a base station allocated a (tenth) dedicated control sub-channel to (WT2), the dedicated control sub-channel including the set of 15 segments indexed (0-14) corresponding to logical tone 1 during the second time period 5312. It may be noted that WT2 is one of the WTs from the set of (WT2, WT3, WT4) which used logical tone 1 during the first time period 5310.

In drawing 5304, it may also be observed that (WT9) is in full-tone DCCH mode during the second time period 5312 and each uses a set of 15 segments indexed (0-14) corresponding to logical tone 2 during the second time period 5312. In accordance with some embodiments of the invention, a base station allocated an (eleventh) dedicated control sub-channel to (WT9), the dedicated control sub-channel including the set of 15 segments indexed (0-14) corresponding to logical tone 2 during the second time period 5312. It may be noted that WT9 is a different WT than the WTs (WT6, WT7, WT8) which used logical tone 2 during the first time period 5310.

In some embodiments, the logical tones (tone 0, tone 1, tone 2) are subjected to an uplink tone hopping operation which determines which physical tones the logical tones correspond to for each of a plurality of symbol transmission time periods, e.g., in the first time period 5310. For example, logical tones 0, 1, and 2 may be part of a logical channel structure including 113 logical tones, which are hopped, in accordance with a hopping sequence to a set of 113 physical tones used for uplink signaling. Continuing with the example, consider that each DCCH segment corresponds to a single logical tone and corresponds to 21 successive OFDM symbol transmission time intervals. In an exemplary embodiment, the logical tone is hopped such that the logical tone corresponding to three physical tones, with the wireless terminal using each physical tone for seven consecutive symbol transmission time intervals of the segment.

In an exemplary embodiment using 40 indexed DCCH channel segments corresponding to a logical tone which repeat on a recurring basis, an exemplary $1^{st}$ and $2^{nd}$ time period may each include 39 DCCH segments, e.g., the first 39 DCCH segments of a beaconslot corresponding to the logical tone. In such an embodiment, if a given tone is in full-tone format, a WT is allocated by the base station a set of 39 DCCH segments for the $1^{st}$ or $2^{nd}$ time period corresponding to the allocation. If a given tone is in split-tone format, a WT is allocated a set of 13 DCCH segments for the $1^{st}$ or $2^{nd}$ time period corresponding to the allocation. In full-tone mode the $40^{th}$ indexed segment can also be allocated to and used by the WT in full-tone mode. In split-tone mode, in some embodiments, the $40^{th}$ indexed segment is a reserved segment.

Figure 54:
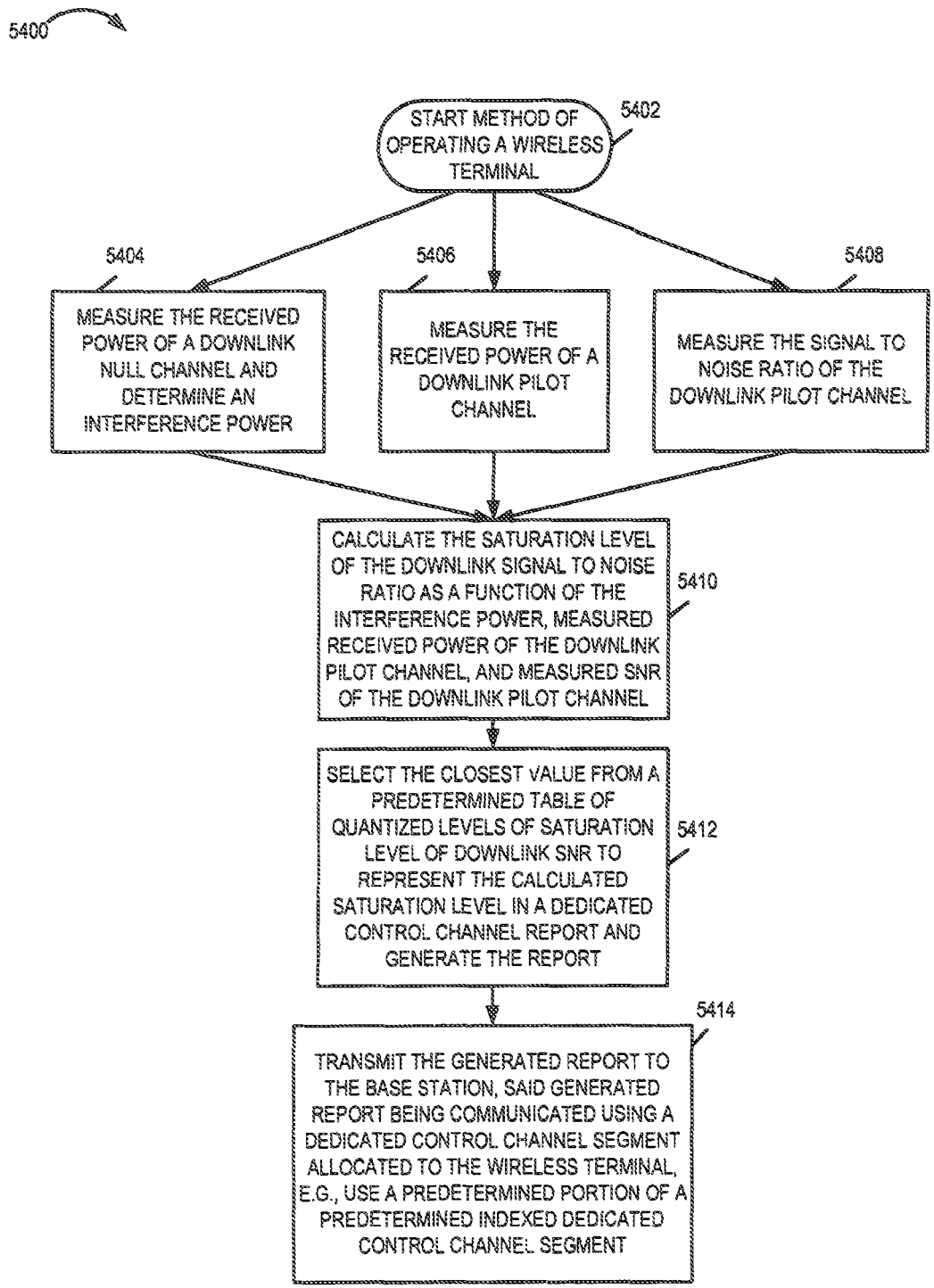
FIG. 54 is a drawing of a flowchart of an exemplary method of operating a wireless terminal in accordance with the present invention.

FIG. 54 is a drawing of a flowchart 5400 of an exemplary method of operating a wireless terminal in accordance with the present invention. Operation starts in step 5402 where the wireless terminal is powered on and initialized. Operation proceeds from step 5402 to steps 5404, 5406, and 5408. In step 5404, the wireless terminal measures the received power of a downlink null channel (DL.NCH) and determines an interference power (N). For example, the Null channel corresponds to predetermined tone-symbols in an exemplary downlink timing and frequency structure used by the base station serving as the current attachment point for the wireless terminal in which the base station intentionally does not transmit using those tone-symbols; therefore, received power on the NULL channel measured by the wireless terminal receiver represents interference. In step 5406, the wireless terminal measures the received power $(G^*P_0)$ of a downlink pilot channel (DL.PICH). In step 5408, the wireless terminal measures the signal to noise ratio $(SNR_0)$ of the downlink pilot channel (DL.PICH). Operation proceeds from steps 5404, 5406, and 5408 to step 5410.

In step 5410, the wireless terminal calculates the saturation level of the downlink signal to noise ratio as a function of: the interference power, measured received power of the downlink pilot channel, and measured SNR of the downlink pilot channel. For example, saturation level of the DL $SNR=1/a_0=(1/SNR_0-N/(GP_0))^{-1}$. Operation proceeds from step 5410 to steps 5412. In step 5412, the wireless terminal selects the closet value from a predetermined table of quantized level of saturation level of downlink SNR to represent the calculated saturation level in a dedicated control channel report, and the wireless terminal generates the report. Operation proceeds from step 5412 to step 5414. In step 5414, the wireless terminal transmits the generated report to the base station, said generated report being communicated using a dedicated control channel segment allocated to the wireless terminal, e.g., using a predetermined portion of a predetermined indexed dedicated control channel segment. For example, the exemplary WT may be in a full-tone format mode of DCCH operation using the repetitive reporting structure of FIG. 10, and the report may be the DLSSNR4 reports of DCCH segment 1036 with index numbers s2=36.

Figure 55:
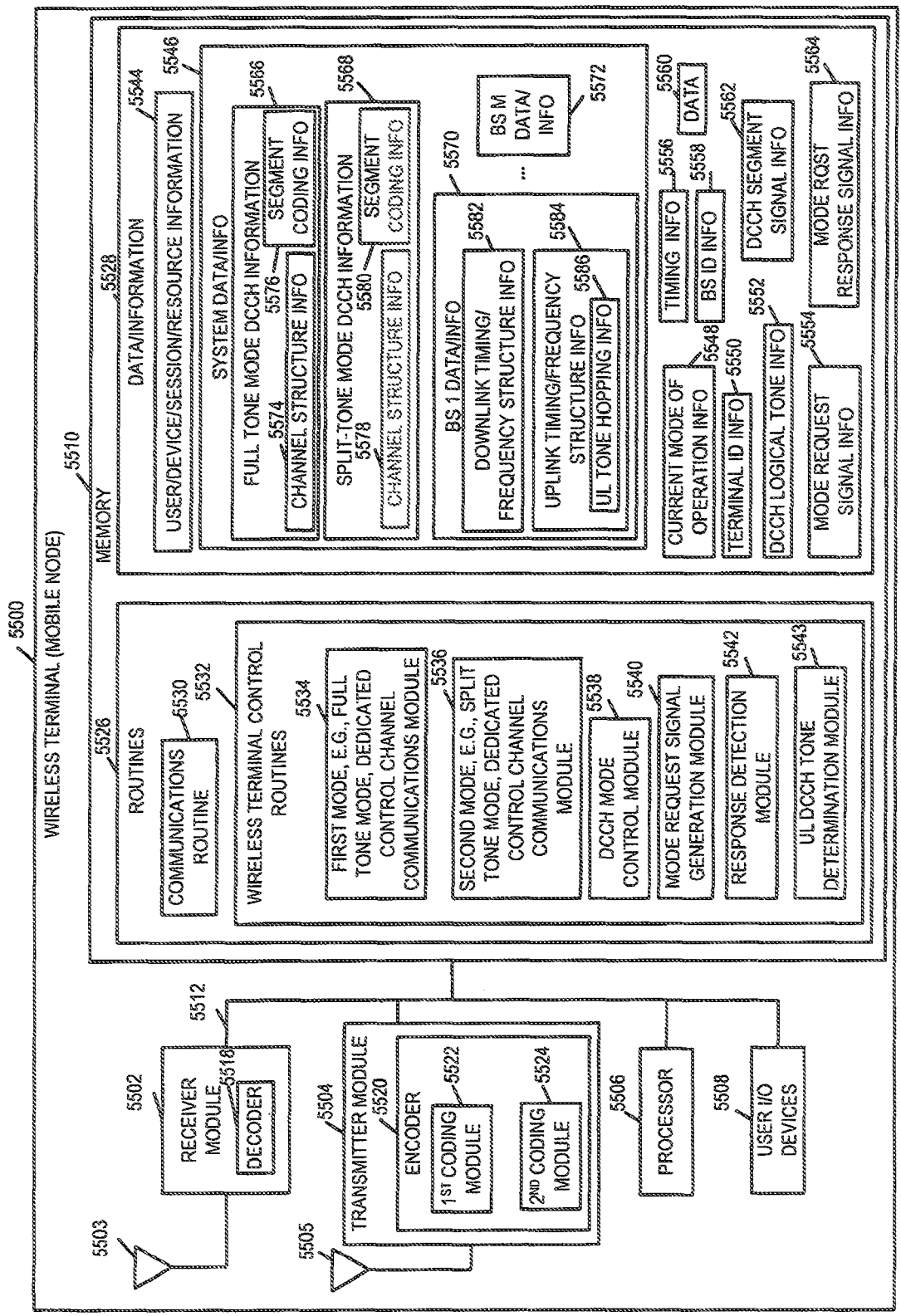
FIG. 55 is a drawing of an exemplary wireless terminal, e.g., mobile node, implemented in accordance with the present invention and using methods of the present invention.

FIG. 55 is a drawing of an exemplary wireless terminal 5500, e.g., mobile node, implemented in accordance with the present invention and using methods of the present invention. Exemplary WT 5500 may be any of the wireless terminals of the exemplary system of FIG. 1. Exemplary wireless terminal 5500 includes a receiver module 5502, a transmitter module 5504, a processor 5506, user I/O devices 5508, and a memory 5510 coupled together via a bus 5512 over which the wireless terminal 5500 interchanges data and information.

The receiver module 5502, e.g., an OFDM receiver, is coupled to a receive antenna 5503 via which the wireless terminal 5500 receives downlink signals from base stations. Downlink signals received by the wireless terminal 5500 include: mode control signals, mode control request response signals, assignment signals including the assignment of user identifiers, e.g., an ON identifier associated with a logical uplink dedicated control channel tone, uplink and/or downlink traffic channel assignment signals, downlink traffic channel signals, and downlink base station identification signals. Receiver module 5502 includes a decoder 5518 via which the wireless terminal 5500 decodes received signals which had been encoded prior to transmission by the base station. The transmitter module 5504, e.g., an OFDM transmitter, is coupled to a transmit antenna 5505 via which the wireless terminal 5500 transmits uplink signals to base stations. In some embodiments, the same antenna is used for transmitter and receiver. Uplink signals transmitted by the wireless terminal include: mode request signals, access signals, dedicated control channel segment signals during first and second modes of operation, and uplink traffic channel signals. Transmitter module 5504 includes an encoder 5520 via which the wireless terminal 5500 encodes at least some uplink signals prior to transmission. Encoder 5520 includes a $1^{st}$ coding module 5522 and a $2^{nd}$ coding module 5524. $1^{st}$ coding module 5522 codes information to be transmitted in DCCH segments during the first mode of operation according to a first coding method. $2^{nd}$ coding module 5524 codes information to be transmitted in DCCH segments during the second mode of operation according to a second coding method; the first and second coding methods are different.

User I/O devices 5508, e.g., microphone, keyboard, keypad, mouse, switches, camera, display, speaker, etc., are used to input data/information, output data/information, and control at least some functions of the wireless terminal, e.g., initiate a communications session. Memory 5510 includes routines 5526 and data/information 5528. The processor 5506, e.g., a CPU, executes the routines 5526 and uses the data/information 5528 in memory 5510 to control the operation of the wireless terminal 5500 and implement methods of the present invention.

Routines 5526 include a communications routine 5530 and wireless terminal control routines 5532. The communications routine 5530 implements the various communications protocols used by the wireless terminal 5500. The wireless terminal control routines 5532 control operation of the wireless terminal 5500 including controlling operation of the receiver module 5502, transmitter module 5504 and user I/O devices 5508. Wireless terminal control routines 5532 include a first mode dedicated control channel communications module 5534, a second mode dedicated control channel communications module 5536, a dedicated control channel mode control module 5538, a mode request signal generation module 5540, a response detection module 5542, and an uplink dedicated control channel tone determination module 5543.

The first mode dedicated control channel communications module 5534 controls dedicated control channel communications using a first set of dedicated control channel segments during a first mode of operation, said first set including a first number of control channel segments for a first period of time. The first mode is, in some embodiments, a full tone mode, of dedicated control channel operation. The second mode dedicated control channel communications module 5536 controls dedicated control channel communications using a second set of dedicated control channel segments during a second mode of operation, said second set of dedicated control channel segments corresponding to a time period having the same duration as said first period of time, said second set of dedicated control channel segments including fewer segments than said first number of dedicated control channel segments. The second mode is, in some embodiments, a split-tone mode, of dedicated control channel operation. In various embodiments, a dedicated control channel segment whether in the first mode or the second mode of operation uses the same amount of uplink air link resources, e.g., the same number of tone-symbols, e.g., 21 tone-symbols. For example, a dedicated control channel segment may correspond to one logical tone in the timing and frequency structure being used by the base station, but may correspond to three physical tones with three sets of seven tone-symbols each being associated with a different physical uplink tone in accordance with uplink tone hopping information.

DCCH mode control module 5538, in some embodiments, controls switching into one said first mode of operation and said second mode of operation in response to a received mode control signal from a base station, e.g., a mode control command signal from a base station. In some embodiments, the mode control signal also identifies, for the split tone mode of operation, which set of uplink dedicated control channel segments is associated with the split tone mode of operation. For example, for a given logical DCCH channel tone, in split tone operation, there may be a plurality, e.g., three, non-overlapping sets of DCCH segments and the mode control signal may identify which of the sets is to be associated with the wireless terminal. DCCH mode control module 5538, in some embodiments, controls switching into a requested mode of operation which is one of the first mode of operation, e.g., full-tone DCCH mode, and the second mode of operation, e.g., split-tone DCCH mode, in response to a received affirmative request acknowledgment signal.

Mode request generation module 5540 generates a mode request signal indicating a requested mode of DCCH operation. Response detection module 5542 detects a response to said mode request signal from the base station. The output of response detection module 5542 is used by the DCCH mode control module 5538 to determine if the wireless terminal 5500 is to be switched into the requested mode of operation.

Uplink DCCH tone determination module 5543 determines the physical tone to which an assigned logical DCCH tone corresponds to over time based on the uplink tone hopping information stored in the wireless terminal.

Data/information 5528 includes user/device/session/resource information 5544, system data/information 5546, current mode of operation information 5548, terminal ID information 5550, DCCH logical tone information 5552, mode request signal information 5554, timing information 5556, base station identification information 5558, data 5560, DCCH segment signal information 5562, and mode request response signal information 5564. User/device/session/resource information 5544 includes information corresponding to peer nodes in communications sessions with WT 5500, address information, routing information, session information including authentication information, and resource information including allocated DCCH segments and uplink and/or downlink traffic channel segments associated with the communications session which are allocated to WT 5500. Current mode of operation information 5548 includes information identifying whether the wireless terminal is currently in a first, e.g., full-tone DCCH mode of operation, or a second, e.g., split-tone DCCH mode of operation. In some embodiments, the first and second modes of operation with respect to the DCCH both correspond to wireless terminal On states of operation. Current mode of operation information 5548 also includes information identifying other modes of wireless terminal operation, e.g., sleep, hold, etc. Terminal identifier information 5550 includes base station assigned wireless terminal identifiers, e.g., registered user identifier and/or an ON state identifier. In some embodiments, the ON state identifier is associated with a DCCH logical tone being used by the base station sector attachment point which allocated the On state identifier to the wireless terminal. DCCH logical tone information 5552 includes, when the wireless terminal is in one of first mode of DCCH operation and a second mode of DCCH operation, information identifying the DCCH logical tone currently allocated to the wireless terminal to use when communicating uplink DCCH segment signals. Timing information 5556 includes information identifying the wireless terminals current timing within the repetitive timing structure being used by the base stations serving as an attachment point for the wireless terminal. Base station identification information 5558 includes base station identifiers, base station sector identifiers, and base station tone block and/or carrier identifiers associated with the base station sector attachment point being used by the wireless terminal. Data 5560 includes uplink and/or downlink user data being communicated in communications sessions, e.g., voice, audio data, image data, text data, file data. DCCH segment signal information 5562 includes information to be communicated corresponding to DCCH segments allocated to the wireless terminal, e.g., information bits to be communicated in DCCH segments representing various control information reports. Mode request signal information 5554 includes information corresponding to mode request signals generated by module 5540. Mode request response signal information 5564 includes response information detected by module 5542.

System data/information 5546 includes full tone mode DCCH information 5566, split-tone mode DCCH information 5568, and a plurality of sets of base station data/information (base station 1 data/information 5570, . . . , base station M data/information 5572). Full tone mode DCCH information 5566 includes channel structure information 5574 and segment coding information 5576. Full tone mode DCCH channel structure information 5574 includes information identifying segments and reports to be communicated in segments when the wireless terminal is in a full-tone DCCH mode of operation. For example, in one exemplary embodiment, there is a plurality of DCCH tones, e.g., 31 in the DCCH channel, each logical DCCH tone when in the full-tone mode, following a recurring pattern of forty DCCH segments associated with the single logical DCCH tone in the DCCH channel. Full tone mode DCCH segment coding information 5576 includes information used by $1^{st}$ coding module 5522 to encode DCCH segments. Split-tone mode DCCH information 5568 includes channel structure information 5578 and segment coding information 5580. Split-tone mode DCCH channel structure information 5578 includes information identifying segments and reports to be communicated in segments when the wireless terminal is in a split-tone DCCH mode of operation. For example, in one exemplary embodiment, there is a plurality of DCCH tones, e.g., 31 in the DCCH channel, each logical DCCH tone when in the split-tone mode is split over time among up to three different WTs. For example, for a given logical DCCH tone a WT receives a set of 13 DCCH segments to use out of 40 segments in a recurring pattern, each set of 13 DCCH segments being non-overlapping with the other two sets of 13 DCCH segments. In such an embodiment, one may consider, e.g., a time interval in the structure including 39 DCCH segments allocated to a single WT if in the full-tone mode, but partitioned among three wireless terminals in the split-tone format. Split-tone mode DCCH segment coding information 5580 includes information used by $2^{nd}$ coding module 5524 to encode DCCH segments.

In some embodiments, during one time period a given logical DCCH tone is used in a full-tone mode of operation, while at other times the same logical DCCH tone is used in a split tone mode of operation. Thus WT 5500 can be allocated a set of DCCH channel segments in a recurring structure while in the split-tone mode of DCCH operation which is a subset of a larger set of DCCH channel segments used in the full-tone mode of operation.

Base station 1 data/information 5570 includes base station identification information used to identify base station, sector, carrier and/or tone block associated with an attachment point. Base station 1 data/information 5570 also includes downlink timing/frequency structure information 5582 and uplink timing/frequency structure information 5584. Uplink timing/frequency structure information 5584 includes uplink tone hopping information 5586.

Figure 56:
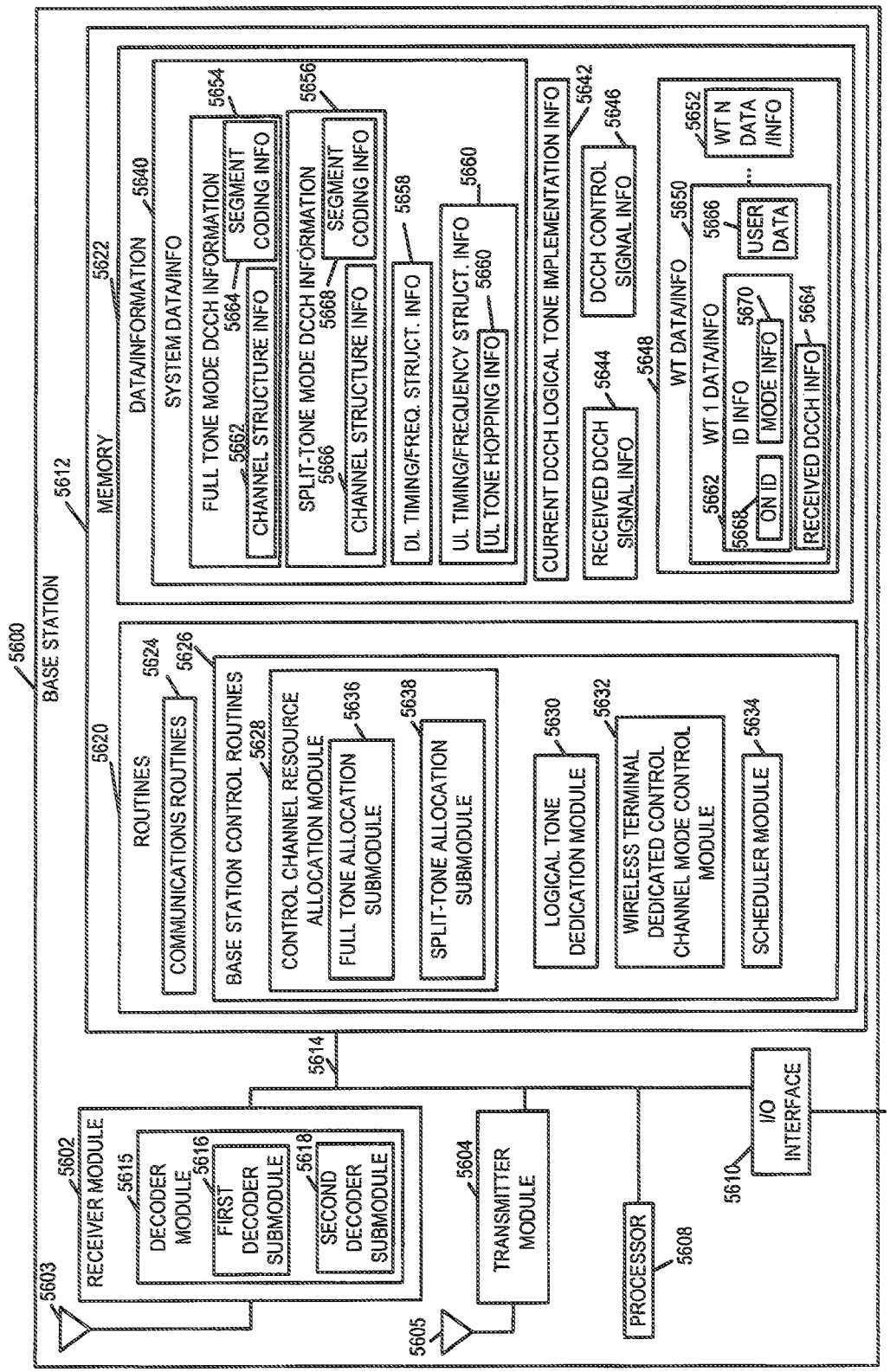
FIG. 56 is a drawing of an exemplary base station, e.g., access node, implemented in accordance with the present invention and using methods of the present invention.

FIG. 56 is a drawing of an exemplary base station 5600, e.g., access node, implemented in accordance with the present invention and using methods of the present invention. Exemplary base station 5600 may be any of the base stations of the exemplary system of FIG. 1. Exemplary base station 5600 includes a receiver module 5602, a transmitter module 5604, a processor 5608, an I/O interface 5610, and a memory 5612 coupled together via a bus 5614 over which the various elements interchange data and information.

Receiver module 5602, e.g., an OFDM receiver, receives uplink signals from a plurality of wireless terminals via receive antenna 5603. The uplink signals include dedicated control channel segment signals from wireless terminals, requests for mode changes, and uplink traffic channel segment signals. Receiver module 5602 includes a decoder module 5615 for decoding uplink signals which were encoded prior to transmission by the wireless terminals. The decoder module 5615 includes a first decoder sub-module 5616 and a second decoder sub-module 5618. The first decoder sub-module 5616 decodes information received in dedicated control channel segments corresponding to logical tones used in a full-tone DCCH mode of operation. The second decoder sub-module 5618 decodes information received in dedicated control channel segments corresponding to logical tones used in a split-tone DCCH mode of operation; the first and second decoder sub-modules (5616, 5618) implement different decoding methods.

Transmitter module 5604, e.g., an OFDM transmitter, transmits downlink signals to wireless terminals via transmit antenna 5605. Transmitted downlink signals include registration signals, DCCH control signals, traffic channel assignment signals, and downlink traffic channel signals.

I/O interface 5610 provides an interface for coupling the base station 5600 to other network nodes, e.g., other base stations, AAA server nodes, home agent nodes, routers, etc., and/or the Internet. I/O interface 5610 allows a wireless terminal using base station 5600 as its point of network attachment to communicate with peer nodes, e.g., other wireless terminals, in different cells, via a backhaul communication network.

Memory 5612 includes routines 5620 and data/information 5622. The processor 5608, e.g. a CPU, executes the routines 5620 and uses the data/information 5622 in memory 5612 to control the operation of the base station 5600 and implement methods of the present invention. Routines 5620 include a communications routines 5624, and base station control routines 5626. The communications routines 5624 implement the various communications protocols used by the base station 5600. Base station control routines 5626 include a control channel resource allocation module 5628, a logical tone dedication module 5630, a wireless terminal dedicated control channel mode control module 5632, and a scheduler module 5634.

The control channel resource allocation module 5628 allocates dedicated control channel resources including logical tones corresponding to dedicated control channel segments in an uplink. The control channel resource allocation module 5628 includes a full tone allocation sub-module 5636 and a split-tone allocation sub-module 5638. The full tone allocation sub-module 5636 allocates one of said logical tones corresponding to the dedicated control channel to a single wireless terminal. The split-tone allocation sub-module 5638 allocates different sets of dedicated control channel segments corresponding to one of the logical tones corresponding to the dedicated control channel to a plurality of wireless terminals to be used on a time shared basis with each of the plurality of wireless terminal being dedicated a different non-overlapping portion of time in which said logical tone is to be used on a time shared basis. For example, in some embodiments, a single logical dedicated control channel tone may be allocated to and shared by up three wireless terminals in the split-tone mode of operation. At any given time full tone allocation sub-module 5636 may be operating on none, some, or each of the DCCH channel tones; at any given time the split-tone allocation sub-module 5638 may be operating on none, some, or each of the DCCH channel tones.

The logical tone dedication module 5630 controls whether a logical dedicated control channel tone is to be used to implement a full tone dedicated control channel or a split-tone dedicated control channel. The logical tone dedication module 5630 is responsive to wireless terminal loading to adjust the number of logical tones dedicated to full-tone dedicated control channels and to split-tone dedicated control channels. In some embodiments, the logical tone dedication module 5630 is responsive to requests from a wireless terminal to operate in either a full-tone mode or a split-tone mode and adjusts the allocation of logical tones as a function of received wireless terminal requests. For example, base station 5600, in some embodiments, for a given sector and uplink tone block uses a set of logical tones for the dedicated control channels, e.g., 31 logical tones, and at any given time the logical dedicated control channel tones are partitioned among full-tone mode logical tones and split-tone mode logical tones by logical tone dedication module 5630.

Wireless terminal dedicated control channel mode control module 5632 generates control signals for indicating logical tone assignments and dedicated control channel mode assignments to wireless terminals. In some embodiments, a wireless terminal is assigned an ON state identifier by the generated control signals, and the value of the ON identifier is associated with a particular logical dedicated control channel tone in the uplink channel structure. In some embodiments, the assignments generated by module 5632 indicate that a wireless terminal corresponding to an assignment should operate in a full tone or split-tone mode with respect to an assigned logical tone. The split tone mode assignments further indicate which of a plurality of segments corresponding to an assigned logical dedicated control channel tone the wireless terminal corresponding to the assignment should use.

Scheduler module 5634 schedules uplink and/or downlink traffic channel segments to wireless terminals, e.g., to wireless terminals which are using the base station 5600 as their point of network attachment, are in an On state and currently have an assigned dedicated control channel either in split-tone mode or full-tone mode.

Data/information 5622 includes system data/information 5640, current DCCH logical tone implementation information 5642, received DCCH signal information 5644, DCCH control signal information 5646, and a plurality of sets of wireless terminal data/information 5648 (WT 1 data/information 5650, . . . , WT N data/information 5652). System data/information 5640 includes full tone mode DCCH information 5654, split-tone mode DCCH information 5656, downlink timing/frequency structure information 5658 and uplink timing/frequency structure information 5660. Full-tone mode DCCH information 5654 includes full-tone mode channel structure information 5662 and full tone mode segment coding information 5664. Split-tone mode DCCH information 5656 includes split-tone mode channel structure information 5666 and split-tone mode segment coding information 5668. Uplink timing/frequency structure information 5660 includes uplink tone hopping information 5660. Each single logical tone in an uplink tone block channel structure corresponds to a physical tone which is hopped in frequency over time. For example consider a single logical dedicated control channel tone. In some embodiments, each DCCH segment corresponding to the single logical DCCH tone comprises 21 OFDM tone-symbols corresponding to a first physical tone used for seven consecutive OFDM symbol time periods, a second physical tone used for seven consecutive OFDM symbol time periods, and a third physical tone used for seven consecutive OFDM symbol time periods, the first, second, and third tones being selected in accordance with an implemented uplink tone-hopping sequence known to both the base station and wireless terminal. For at least some of the dedicated control channel logical tones for at least some DCCH segments, the first, second and third physical tones are different.

Current DCCH logical tone implementation information 5642 includes information identifying the decisions of logical tone dedication module 5630, e.g., whether each given logical dedicated control channel tone is currently being used in full-tone format or split-tone format. Received DCCH signal information 5644 includes information received on any of the dedicated control channel segments in the uplink dedicated control channel structure of the base station 5600. DCCH control signal information 5646 includes assignment information corresponding to assigning dedicated control channel logical tones and modes of dedicated control channel operation. DCCH control signal information 5646 also includes received requests from a wireless terminal for a dedicated control channel, requests for a DCCH mode of operation, and/or requests for a change of DCCH mode of operation. DCCH control signal information 5646 also includes acknowledgment signaling information in response to received requests from wireless terminals.

WT 1 data/information 5650 includes identification information 5662, received DCCH information 5664, and user data 5666. Identification information 5662 includes a base station assigned WT On identifier 5668 and mode information 5670. In some embodiments, the base station assigned On identifier value is associated with a logical dedicated control channel tone in the uplink channel structure used by the base station. Mode information 5650 includes information identifying whether the WT is in a full-tone DCCH mode of operation or a split-tone mode DCCH mode of operation, and when the WT is in a split tone-mode information associating the WT with a subset of DCCH segments associated with the logical tone. Received DCCH information 5664 includes received DCCH reports associated with WT1, e.g., conveying uplink traffic channel requests, beacon ratio reports, power reports, self-noise reports, and/or signal to noise ratio reports. User data 5666 includes uplink and/or downlink traffic channel user data associated with WT1, e.g., voice data, audio data, image data, text data, file data, etc., corresponding to communications sessions and communicated via uplink and/or downlink traffic channel segments allocated to the WT1.

Figure 57:
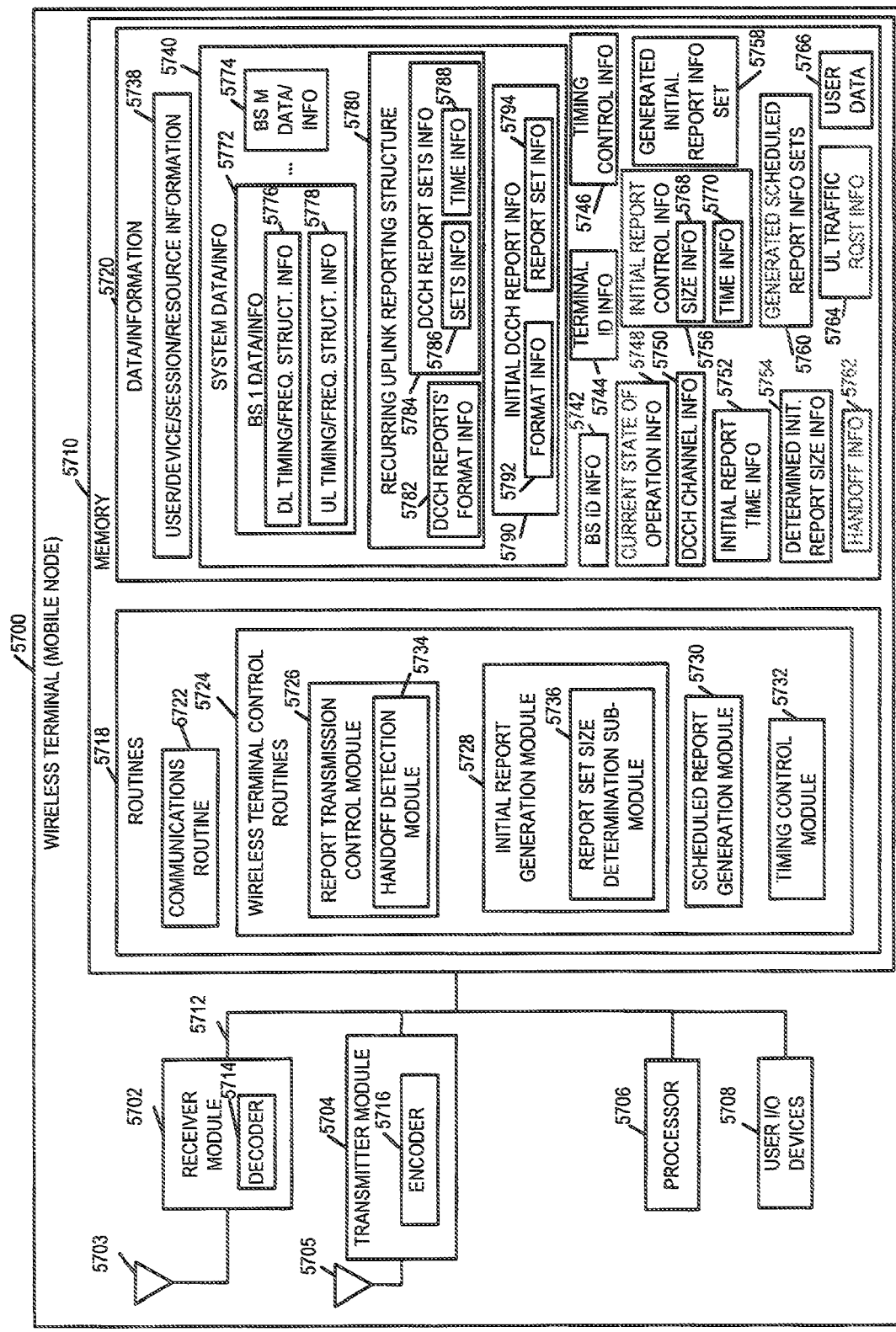
FIG. 57 is a drawing of an exemplary wireless terminal, e.g., mobile node, implemented in accordance with the present invention and using methods of the present invention.

FIG. 57 is a drawing of an exemplary wireless terminal 5700, e.g., mobile node, implemented in accordance with the present invention and using methods of the present invention. Exemplary WT 5700 may be any of the wireless terminals of the exemplary system of FIG. 1. Exemplary wireless terminal 5700 includes a receiver module 5702, a transmitter module 5704, a processor 5706, user I/O devices 5708, and a memory 5710 coupled together via a bus 5712 over which the wireless terminal interchanges data and information.

The receiver module 5702, e.g., an OFDM receiver, is coupled to a receive antenna 5703 via which the wireless terminal 5700 receives downlink signals from base stations. Downlink signals received by the wireless terminal 5700 include beacon signals, pilot signals, registration response signals, power control signals, timing control signals, assignments of wireless terminal identifiers, e.g., an On state identifier corresponding to a DCCH channel logical tone, other DCCH assignment information, e.g., used to identify a set of DCCH channel segments in a uplink repetitive structure, assignments of uplink traffic channel segments and/or assignment of downlink traffic channel segments. Receiver module 5702 includes a decoder 5714 via which the wireless terminal 5700 decodes received signals which had been encoded prior to transmission by the base station. The transmitter module 5704, e.g., an OFDM transmitter, is coupled to a transmit antenna 5705 via which the wireless terminal 5700 transmits uplink signals to base stations. Uplink signals transmitted by the wireless terminal 5700 include: access signals, handoff signals, power control signals, timing control signals, DCCH channel segment signals, and uplink traffic channel segment signals. DCCH channel segment signals include initial DCCH report set signals and scheduled DCCH report set signals. In some embodiments, the same antenna is used for transmitter and receiver. Transmitter module 5704 includes an encoder 5716 via which the wireless terminal 5700 encodes at least some uplink signals prior to transmission.

User I/O devices 5708, e.g., microphone, keyboard, keypad, mouse, switches, camera, display, speaker, etc., are used to input data/information, output data/information, and control at least some functions of the wireless terminal, e.g., initiate a communications session. Memory 5710 includes routines 5718 and data/information 5720. The processor 5706, e.g., a CPU, executes the routines 5718 and uses the data/information 5720 in memory 5710 to control the operation of the wireless terminal 5700 and implement methods of the present invention.

Routines 5718 include a communications routine 5722 and wireless terminal control routines 5724. The communications routine 5722 implements the various communications protocols used by the wireless terminal 5700. The wireless terminal control routines 5724 control operation of the wireless terminal 5700 including controlling operation of the receiver module 5702, transmitter module 5704 and user I/O devices 5708. Wireless terminal control routines 5724 include a report transmission control module 5726, an initial report generation module 5728, a scheduled report generation module 5730, and a timing control module 5732. The report transmission control module 5726 includes a handoff detection module 5734. The initial report generation module 5728 includes a report size set determination sub-module 5736.

Report transmission control module controls the wireless terminal 5700 to transmit an initial information report set following the transition by said wireless terminal from a first mode of operation to a second mode of operation and to transmit scheduled reports according to an uplink reporting schedule following transmission of said initial report set. In some embodiments the first mode of operation is one of a sleep state and a hold state and the second mode of operation is an ON state, e.g., an On state in which the wireless terminal is permitted to transmit user data. In various embodiments, in the second mode, e.g., ON state, the wireless terminal has a dedicated uplink reporting channel for reporting information including requests for uplink traffic channel resources which can be used to transmit user data. In various embodiments, in the first mode, e.g., sleep state or Hold state, the wireless terminal does not have a dedicated uplink reporting channel for reporting information including requests for uplink traffic channel resources which can be used to transmit user data.

The initial report generation module 5728, which is responsive to the report transmission control module 5726, generates an initial information report set as a function of a point in time with respect to an uplink transmission schedule at which said initial report set is to be transmitted. Scheduled report generation module 5730 generates scheduled report information sets to be transmitted following said initial information report. The timing control module 5732 correlates the uplink reporting structure based on downlink signals received from the base station, e.g., as part of closed loop timing control. In some embodiments, the timing control module 5732 is implemented, either partially or entirely as a timing control circuit. The handoff detection module 5734 detects a handoff from a first access node attachment point to a second access node attachment point and controls the wireless terminal to generate an initial information report set following certain types of identified handoffs, the generated initial information report set to be transmitted to the second access node attachment point. The certain types of identified handoffs include, in some embodiments, handoffs in which the wireless terminal transitions though an access state of operation with respect to the second access node attachment point before going to an On state with respect to the second access node. For example, the first and access node attachment points may correspond to different access nodes located in different cells which are not timing synchronized with respect to one another and the wireless terminal needs to go through the access state to achieve timing synchronization with respect to the second access node.

The handoff detection module 5734 controls the wireless terminal to forgo the generation and transmission of an initial information report following a handoff from a first access node attachment point to a second access node attachment point, under certain other types of handoffs, and to proceed directly into transmitting scheduled report information sets. For example, the first and second access node attachment points may be timing synchronized and correspond to the same access node, e.g., different adjacent sectors and/or tone blocks, and the certain other type of handoff is, e.g., a handoff which involves a transition from an ON state with respect to the first attachment point to an On state with respect to the second attachment point without having to transition through an access state.

Report set size determination sub-module 5736 determines an initial report set size as a function of the point in time with respect to the uplink transmission schedule at which said initial report is to be transmitted. For example, an initial report information set size is, in some embodiments, one of a plurality of set sizes, e.g., corresponding to one, two three, four or five DCCH segments, depending upon where in the uplink timing structure the initial report transmission is to be started, e.g., the point within a superslot. In some embodiments, the types of reports included in the initial report set is a function of where in the uplink timing structure the initial report transmission is to be started, e.g., depending upon the superslot location within a beaconslot.

Data/information 5720 includes user/device/session/resource information 5738, system data/information 5740, base station identification information 5742, terminal identification information 5744, timing control information 5746, current state of operation information 5748, DCCH channel information 5750, initial report time information 5752, determined initial report size information 5754, initial report control information 5756, generated initial report information set 5758, generated scheduled information report information sets 5760, handoff information 5762, uplink traffic request information 5764, and user data 5766. The initial report control information includes size information 5768 and time information 5770.

User/device/session/resource information 5738 includes information user identification information, e.g., user log-in IDs, passwords and user priority information, device information, e.g., device identification information and device characteristic parameters, session information, e.g., information pertaining to peers, e.g., other WTs in communications sessions with WT 5700, communications session information such as session keys, addressing and/or routing information, and resource information, e.g., uplink and/or downlink air link segments and/or identifiers allocated to the WT 5700.

System data/information 5740 includes a plurality of sets of base station information (base station 1 data/information 5772, ..., base station M data/information 5774), recurring uplink reporting structure information 5780, and initial DCCH report information 5790. Base station 1 data/information 5772 includes downlink timing/frequency structure information 5776 and uplink timing/frequency structure information 5778. Downlink timing/frequency structure information 5776 includes downlink logical tone structure identifying various channels and segments, e.g., assignment, beacon, pilot, downlink traffic channel, etc., in a repetitive downlink structure and identifying timing, e.g., OFDM symbol time duration, indexing, groupings of OFDM symbol times, e.g., into slots, superslots, beaconslots, ultraslots, etc. Information 5776 also includes base station identification information, e.g., cell, sector, and carrier/tone block identification information. Information 5776 also includes downlink tone hopping information used to map logical tones to physical tones. Uplink timing/frequency structure information 5778 includes uplink logical tone structure identifying various channels and segments, e.g., access, assignment, power control channels, timing control channels, dedicated control channel (DCCH), uplink traffic channel, etc., in a repetitive uplink structure and identifying timing, e.g., OFDM symbol time duration, indexing, groupings of OFDM symbol times, e.g., into halfslots, slots, superslots, beaconslots, ultraslots, etc., as well as information correlating the downlink to uplink timing BS1, e.g., a timing offset between the uplink and downlink repetitive timing structures at the base station. Information 5778 also includes uplink tone hopping information used to map logical tones to physical tones.

Recurring uplink reporting structure information 5780 includes DCCH reports' format information 5782, and DCCH report sets information 5784. DCCH report sets information 5784 includes sets information 5786 and time information 5788. For example, the recurring uplink reporting structure information 5780 includes, in some embodiments, information identifying a recurring pattern of a fixed number of indexed DCCH segments, e.g., 40 indexed DCCH segments. Each of the indexed DCCH segments includes one of more types of DCCH reports, e.g., uplink traffic channel request reports, interference reports such as beacon ratio reports, different SNR reports, etc. The format of each of the different types of reports is identified in DCCH reports' format information 5782, e.g., for each type of report associating a fixed number of information bits with different potential bit patterns and interpretations of information conveyed by the corresponding bit pattern. DCCH report sets information 5784 identifies different grouping of reports associated with different indexed segments in the recurring DCCH reporting structure. Sets information 5786 identifies for each indexed DCCH segment identified by a corresponding time information entry 5788 a set of reports communicated in the segment and the order of those reports in the segment. For example in one exemplary embodiment, an exemplary DCCH segment with index value=6 includes 5 bit uplink transmission power backoff report and a 1 bit uplink traffic channel segment request report, while a DCCH segment with an index value=32 includes a 3 bit downlink difference signal to noise ratio report and a 3 bit uplink traffic channel request report. (See FIG. 10.)

Initial DCCH report information 5790 includes format information 5792 and report set information 5794. The format information 5792 includes information indicating the format of initial reports sets to be transmitted. In some embodiments, the formats of the initial reports, groupings, and/or number of initial reports to be transmitted in an initial report set depend on the time at which the initial report set is to be transmitted, e.g., with respect to a recurring uplink timing structure. Report set information 5794 includes information identifying various initial reports sets, e.g., number of reports, types of reports, and ordered grouping of reports, e.g., associated with DCCH segments to be communicated in the initial report.

Base station identification information 5742 includes information identifying the base station attachment point being used by the wireless terminal. Base station identification information 5742 includes physical attachment point identifiers, e.g., cell, sector and carrier/tone block identifiers associated with the base station attachment point. In some embodiments, at least some of the base station identifier information is communicated via beacon signals. Base station identification information 5742 also includes base station address information. Terminal identification information 5744 includes base station assigned identifiers associated with the wireless terminal, e.g., a registered user identifier and a On state identifier, the On state identifier being associated with a logical DCCH tone to be used by the wireless terminal. Timing control information 5746 includes received downlink signals from the base station used by the timing control module 5732 for correlating the uplink reporting structure, at least some of the received downlink timing control signals being used for closed loop timing control. Timing control information 5746 also includes information identifying the current timing with respect to repetitive uplink and downlink timing structures, e.g., an OFDM symbol transmission time period with respect to the structures. Current state of operation information 5748 includes information identifying the wireless terminal's current state of operation, e.g., sleep, hold, ON. Current state of operation information 5748 also includes information identifying when a WT is in a full-tone DCCH mode of operation or in a split-tone mode of DCCH operation, in an access process, or in the process of a handoff. In addition, current state of operation information 5748 includes, information identifying whether a wireless terminal is communicating an initial DCCH report set or communicating recurring reporting structure information DCCH report sets, when the wireless terminal is assigned a logical DCCH channel tone to use. Initial report time information 5752 includes information identifying the point in time with respect to an uplink transmission schedule at which the initial DCCH report set is to be transmitted. Determined initial report size information 5754 is an output of the report set size determination sub-module 5736. Initial report control information 5756 includes information used by the initial report generation module 5728 to control the content of an initial report set. Initial report control information 5756 includes size information 5768 and time information 5770. Generated initial report information set 5758 is an initial report set generated by wireless terminal initial report generation module 5728 using the data/information 5720 including initial DCCH report structure information 5790, initial report control information 5756, and information to be included in the reports of the initial report such as, e.g., uplink traffic channel request information 5764, SNR information, and measured interference information. Generated scheduled report information sets 5760 includes generated scheduled information report sets, e.g., each set corresponding to a scheduled DCCH segment to be used by the wireless terminal. The generated scheduled report information sets 5760 being generated by the scheduled report generation module 5730 using the data/information 5720 including the recurring uplink reporting structure information 5780, and information to be included in the reports of the initial report such as, e.g., uplink traffic channel request information 5764, SNR information, and measured interference information. Uplink traffic request information 5764 includes information pertaining to requests for uplink traffic channel segment resources, e.g., number of frames of uplink user data to be communicated corresponding to different request group queues. User data 5766 includes, voice data, audio data, image data, text data, file data to be communicated via uplink traffic channel segments and/or received via downlink traffic channel segments.

Figure 58:
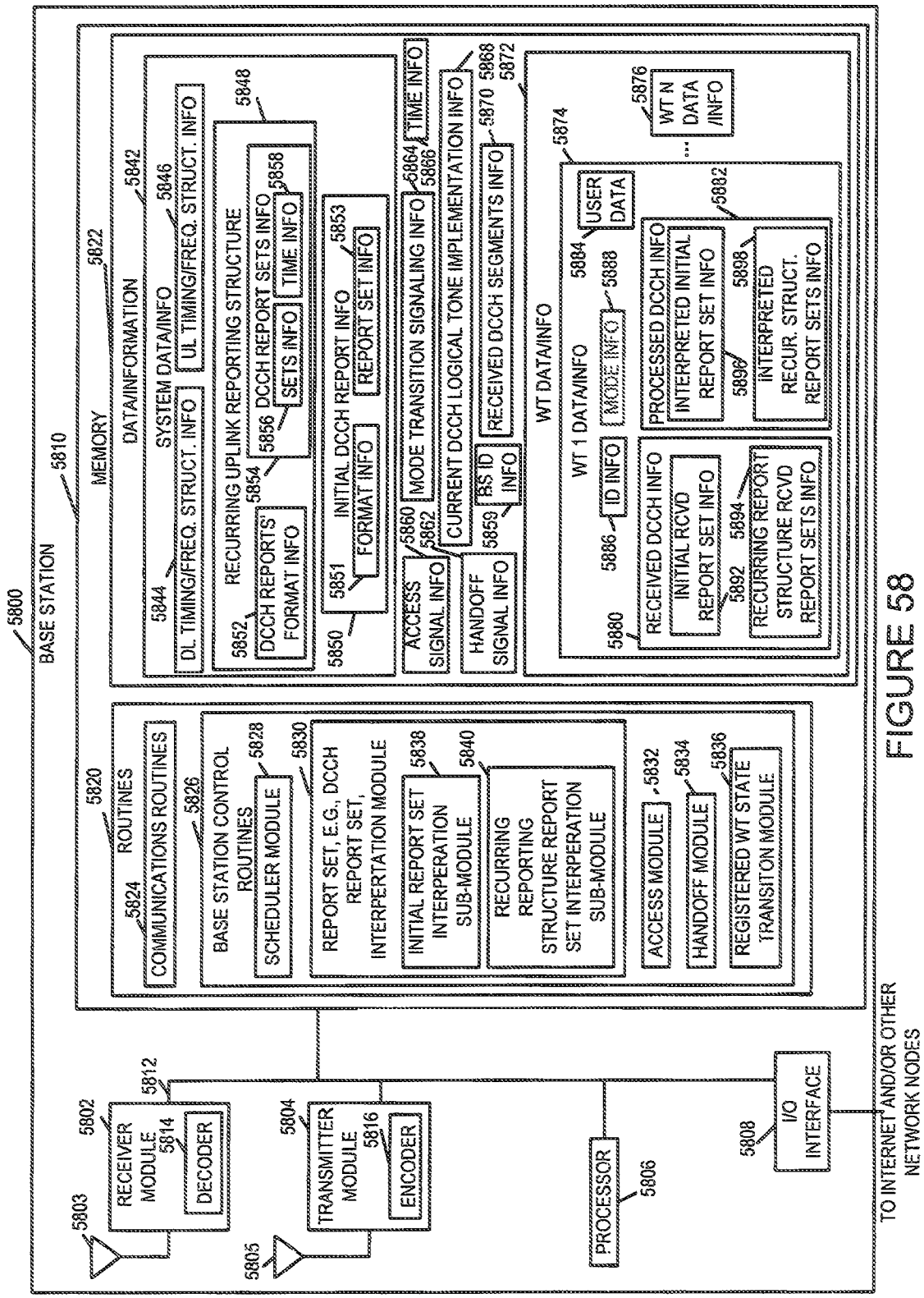
FIG. 58 is a drawing of an exemplary base station, e.g., access node, implemented in accordance with the present invention and using methods of the present invention.

FIG. 58 is a drawing of an exemplary base station 5800, e.g., access node, implemented in accordance with the present invention and using methods of the present invention. Exemplary base station 5800 may be any of the base stations of the exemplary system of FIG. 1. Exemplary base station 5800 includes a receiver module 5802, a transmitter module 5804, a processor 5806, an I/O interface 5808, and a memory 5810 coupled together via a bus 5812 over which the various elements interchange data and information.

Receiver module 5802, e.g., an OFDM receiver, receives uplink signals from a plurality of wireless terminals via receive antenna 5803. The uplink signals include dedicated control channel report information sets from wireless terminals, access signals, requests for mode changes, and uplink traffic channel segment signals. Receiver module 5802 includes a decoder module 5814 for decoding uplink signals which were encoded prior to transmission by the wireless terminals.

Transmitter module 5804, e.g., an OFDM transmitter, transmits downlink signals to wireless terminals via transmit antenna 5805. Transmitted downlink signals include registration signals, DCCH control signals, traffic channel assignment signals, and downlink traffic channel signals.

I/O interface 5808 provides an interface for coupling the base station 5800 to other network nodes, e.g., other base stations, AAA server nodes, home agent nodes, routers, etc., and/or the Internet. I/O interface 5808 allows a wireless terminal using base station 5800 as its point of network attachment to communicate with peer nodes, e.g., other wireless terminals, in different cells, via a backhaul communication network.

Memory 5810 includes routines 5820 and data/information 5822. The processor 5806, e.g. a CPU, executes the routines 5820 and uses the data/information 5822 in memory 5810 to control the operation of the base station 5800 and implement methods of the present invention. Routines 5820 include a communications routines 5824 and base station control routines 5826. The communications routines 5824 implement the various communications protocols used by the base station 5800. Base station control routines 5826 include a scheduler module 5828, a report set interpretation module 5830, an access module 5832, a handoff module 5834, and a registered wireless terminal state transition module 5836.

Scheduler module 5828 schedules uplink and/or downlink traffic channel segments to wireless terminals, e.g., to wireless terminals which are using the base station 5800 as their point of network attachment, are in an On state and currently have an assigned dedicated control channel either in split-tone mode or full-tone mode.

Report set interpretation module 5830, e.g., a DCCH report set interpretation module, includes an initial report set interpretation sub-module 5838 and a recurring reporting structure report set interpretation sub-module 5840. Report set interpretation module 5830 interprets each received DCCH report set in accordance with the initial DCCH report information 5850 or the recurring uplink reporting structure information 5848. Report set interpretation module 5830 is responsive to transitions by wireless terminals to the ON state. Report set interpretation module 5830 interprets as an initial information report set, a DCCH report information set received from a wireless terminal immediately after one of: a migration of the wireless terminal to an On state from a hold state with respect to the current connection, a migration of the wireless terminal to an On state from an access state with respect to the current connection, and a migration of the wireless terminal to an On state from an On state which existed with respect to another connection prior to a handoff to the base station. Report set interpretation module 5830 includes an initial report set interpretation sub-module 5838 and a recurring reporting structure report set interpretation sub-module 5840. Initial report set interpretation sub-module 5838 processes received information report sets, e.g., corresponding to a received DCCH segment, which have been determined to be an initial DCCH report set, using data/information 5822 including initial DCCH report information 5850, to obtain interpreted initial report set information. Recurring reporting structure report set interpretation sub-module 5840 processes received information report sets, e.g., corresponding to a received DCCH segment, which have been determined to be a recurring reporting structure DCCH report set, using data/information 5822 including recurring uplink reporting structure information 5848, to obtain interpreted recurring structure report set information.

Access module 5832 controls operations relating to wireless terminal access operations. For example, a wireless terminal transitions through the access mode to an On state achieving uplink timing synchronization with a base station attachment point and receiving a WT On state identifier associated with a logical DCCH channel tone in the uplink timing and frequency structure to be used to communicate uplink DCCH segment signals. Following this transition to the On state, the initial report set interpretation sub-module 5838 is activated to process DCCH segments for the remainder of a superslot, e.g., one, two, three, four, or five DCCH segments, then operation is transferred to the recurring reporting structure report set interpretation sub-module 5840 to process subsequent DCCH segments from the wireless terminal. The number of DCCH segments and/or the format used for those segments processed by module 5838 before transferring control to module 5840 is a function of the time at which the access occurs with respect to the recurring uplink DCCH reporting structure.

Handoff module 5834 controls operations pertaining to handoffs a wireless terminal from one attachment point to another attachment point. For example, a wireless terminal in an ON state of operation with a first base station attachment point may perform a handoff operation to base station 5800 to transition into an ON state with respect to a second base station attachment point, the second base station attachment point being a base station 5800 attachment point, and the handoff module 5834 activates the initial report set interpretation sub-module 5838.

Registered wireless terminal state transition module 5836 performs operations related to mode changes of wireless terminals which have registered with the base station. For example, a registered wireless terminal currently in a Hold state of operation in which the wireless terminal is precluded from transmitting uplink user data may transition to an On state of operation in which the WT is assigned an ON state identifier associated with a DCCH logical channel tone and in which the wireless terminal can receive uplink traffic channel segments which are to be used to communicate uplink user data. Registered WT state transition module 5836 activates initial report set interpretation sub-module 5838 in response to the mode transition from Hold to ON of the wireless terminal.

Base station 5800 manages a plurality of ON state wireless terminals. For a set of received DCCH segments, communicated from different wireless terminals, corresponding to the same time interval, the base station, at some times, processes some of the segments using the initial report set interpretation sub-module 5838 and some of the reports using the recurring reporting structure set interpretation sub-module 5840.

Data/information 5822 includes system data/information 5842, access signal information 5860, handoff signal information 5862, mode transition signaling information 5864, time information 5866, current DCCH logical tone implementation information 5868, received DCCH segments information 5870, base station identification information 5859, and WT data/information 5872.

System data/information 5842 includes downlink timing/frequency structure information 5844, uplink timing/frequency structure information 5846, recurring uplink reporting structure information 5848, and initial DCCH report information 5850. Recurring uplink reporting structure information 5848 includes DCCH reports' format information 5852 and DCCH report sets information 5854. DCCH report sets information 5854 includes sets information 5856 and time information 5858. Initial DCCH report information 5850 includes format information 5851 and report set information 5853.

Downlink timing/frequency structure information 5844 includes downlink logical tone structure identifying various channels and segments, e.g., assignment, beacon, pilot, downlink traffic channel, etc., in a repetitive downlink structure and identifying timing, e.g., OFDM symbol time duration, indexing, groupings of OFDM symbol times, e.g., into slots, superslots, beaconslots, ultraslots, etc. Information 5844 also includes base station identification information, e.g., cell, sector, and carrier/tone block identification information. Information 5844 also includes downlink tone hopping information used to map logical tones to physical tones. Uplink timing/frequency structure information 5846 includes uplink logical tone structure identifying various channels and segments, e.g., access, assignment, power control channels, power control channels, dedicated control channel (DCCH), uplink traffic channel, etc., in a repetitive uplink structure and identifying timing, e.g., OFDM symbol time duration, indexing, groupings of OFDM symbol times, e.g., into halfslots, slots, superslots, beaconslots, ultraslots, etc., as well as information correlating the downlink to uplink timing, e.g., a timing offset between the uplink and downlink repetitive timing structures at the base station. Information 5846 also includes uplink tone hopping information used to map logical tones to physical tones.

Recurring uplink reporting structure information 5848 includes DCCH reports' format information 5852, and DCCH report sets information 5848. DCCH report sets information 5854 includes sets information 5856 and time information 5858. For example, the recurring uplink reporting structure information 5848 includes, in some embodiments, information identifying a recurring pattern of a fixed number of indexed DCCH segments, e.g., 40 indexed DCCH segments. Each of the indexed DCCH segments includes one of more types of DCCH reports, e.g., uplink traffic channel request reports, interference reports such as beacon ratio reports, different SNR reports, etc. The format of each of the different types of reports is identified in DCCH reports' format information 5852, e.g., for each type of report associating a fixed number of information bits with different potential bit patterns and interpretations of information conveyed by the corresponding bit pattern. DCCH report sets information 5854 identifies different grouping of reports associated with different indexed segments in the recurring DCCH reporting structure. Sets information 5856 identifies for each indexed DCCH segment identified by a corresponding time information entry 5858 a set of reports communicated in the segment and the order of those reports in the segment. For example in one exemplary embodiment, an exemplary DCCH segment with index value=6 includes 5 bit uplink transmission power backoff report and a 1 bit uplink traffic channel segment request report, while a DCCH segment with an index value=32 includes a 3 bit downlink delta signal to node ratio report and a 3 bit uplink traffic channel request report. (See FIG. 10.)

Initial DCCH report information 5850 includes format information 5851 and report set information 5853. The format information 5851 includes information indicating the format of initial reports sets to be transmitted. In some embodiments, the formats of the initial reports, groupings, and/or number of initial reports to be transmitted in an initial report set depend on the time at which the initial report set is to be transmitted, e.g., with respect to a recurring uplink timing structure. Report set information 5853 includes information identifying various initial reports sets, e.g., number of reports, types of reports, and ordered grouping of reports, e.g., associated with DCCH segments to be communicated in the initial report set.

Base station identification information 5859 includes information identifying the base station attachment point being used by the wireless terminal. Base station identification information 5859 includes physical attachment point identifiers, e.g., cell, sector and carrier/tone block identifiers associated with the base station attachment point. In some embodiments, at least some of the base station identifier information is communicated via beacon signals. Base station identification information also includes base station address information. Access signal information 5860 includes access request signals received from wireless terminals, access response signals sent to wireless terminal, timing signals related to the access, and base station internal signaling to activate the initial report interpretation sub-module 5838 in response to a transition from the access state to the On state for a wireless terminal. Handoff signal information 5862 includes information pertaining to handoff operations including handoff signaling received from other base stations and base station internal signaling to activate the initial report interpretation sub-module 5838 in response to a transition from a WT ON state of another connection to a WT On state with respect to a base station 5800 attachment point connection. Mode transitioning signaling information 5864 includes signals between a currently registered wireless terminal and base station 5800 regarding state changes, e.g., a change from hold state to On state, and base station internal signaling to activate the initial report set interpretation sub-module 5838 in response to state transitions, e.g., Hold to On. Registered WT state transition module 5836 also deactivates recurring reporting structure report set interpretation sub-module 5840 with respect to a wireless terminal in response to some state changes, e.g., a wireless terminal transition from ON state to one of Hold state, sleep state, or Off state.

Time information 5866 includes current time information, e.g., an indexed OFDM symbol time period within a recurring uplink timing structure being used by the base station. Current DCCH logical tone implementation information 5868 includes information identifying which of the base stations logical DCCH tones are currently in a full-tone DCCH mode and which are in a split-tone DCCH mode. Received DCCH segments information 5860 includes information from received DCCH segments corresponding to a plurality of WT users currently assigned logical DCCH tones.

WT data/information 5872 includes a plurality of sets of wireless terminal information (WT 1 data/information 5874, . . . , WT N data/information 5876). WT 1 data/information 5874 includes identification information 5886, mode information 5888, received DCCH information 5880, processed DCCH information 5882, and user data 5884. Received DCCH information 5880 includes initial received report set information 5892 and recurring report structure received report sets information 5894. Processed DCCH information 5882 includes interpreted initial report set information 5896 and interpreted recurring structure report sets information 5898. Identification information 5886 includes a base station assigned wireless terminal registration identifier, addressing information associated with WT1. At times, the identification information 5886 includes a WT On state identifier, the On state identifier associated with a logical DCCH channel tone to be used by the wireless terminal to communicate DCCH segment signals. Mode information 5888 includes information identifying the current state of WT1, e.g., sleep state, Hold state, access state, On state, in the process of a handoff, etc., and information further qualifying the ON state, e.g., full tone DCCH On or split-tone DCCH On. User data 5884 includes uplink and/or downlink traffic channel segment information, e.g., voice data, audio data, image data, text data, file data, etc., to be received from/communicated to a peer node of WT1 in a communications session with WT1.

Initial received report set information 5892 includes a set of information corresponding to a WT1 DCCH segment which was communicated using format in accordance with an initial reporting information 5850 and is interpreted by module 5838 recovering interpreted initial report information set information 5896. Recurring report structure received report sets information 5894 includes a set of information corresponding to a WT1 DCCH segment which was communicated using format in accordance with recurring uplink reporting structure information 5848 and is interpreted by module 5840 recovering a interpreted recurring report information set information 5898.

Figure 59C:
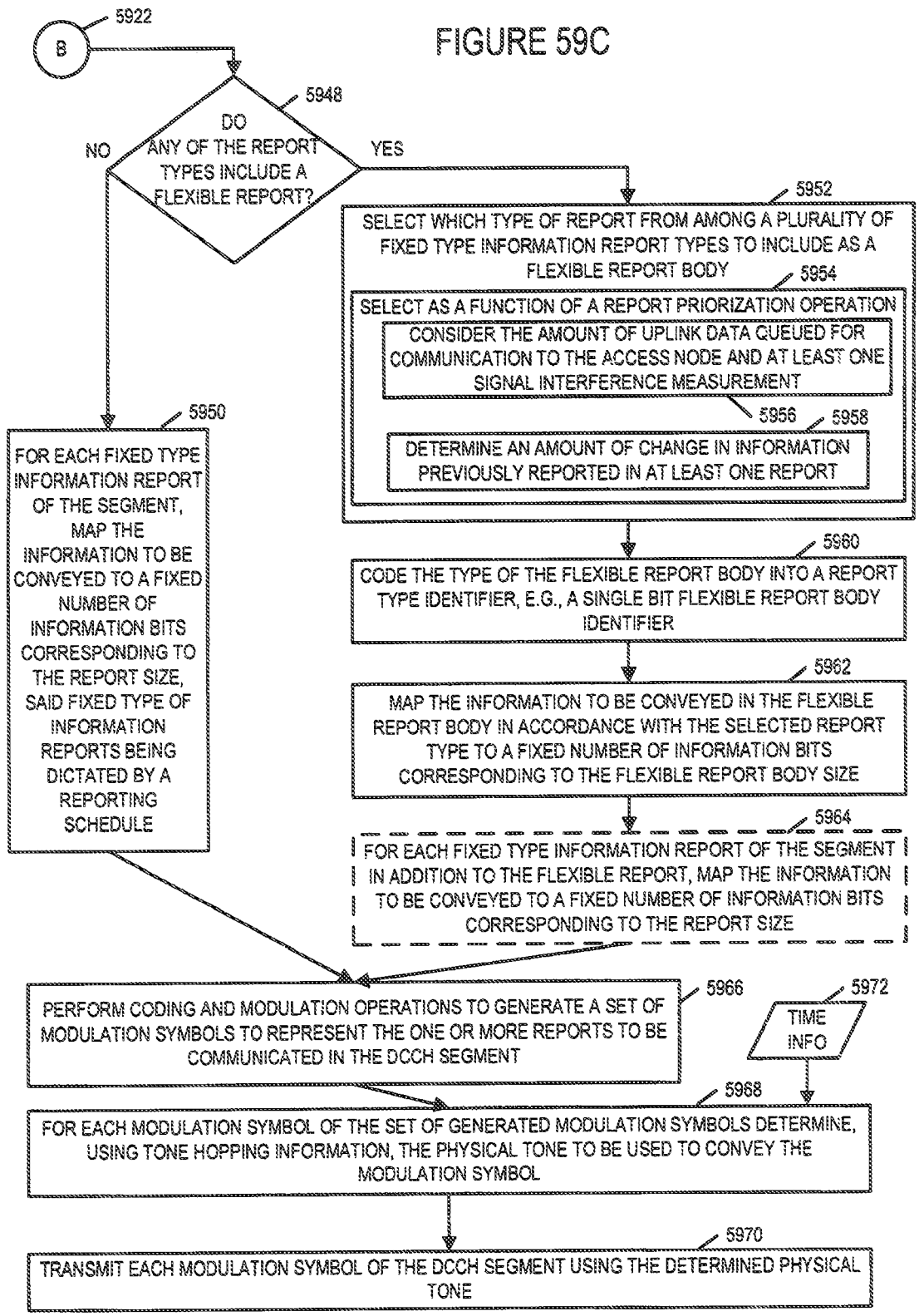
FIG. 59C is a flowchart of an exemplary method of operating a wireless terminal in accordance with the present invention.

FIG. 59 comprising the combination of FIG. 59A, FIG. 59B and FIG. 59C is a flowchart 5900 of an exemplary method of operating a wireless terminal in accordance with the present invention. The exemplary method starts in step 5901 where the wireless terminal is powered up and initialized. Operation proceeds from step 5901 to steps 5902 and step 5904. In step 5902, the wireless terminal tracks, on an ongoing basis, current time in relation to an uplink recurring DCCH reporting schedule and in relation to uplink tone hopping information. Time information 5906 is output from step 5902 to be used in other steps of the method.

In step 5904, the wireless terminal receives a base station On state identifier associated with a DCCH logical tone in an uplink channel structure of an access node serving as the wireless terminal's point of attachment. Operation proceeds from step 5904 to step 5908. In step 5908, the wireless terminal receives information identifying whether the wireless terminal should be in a full-tone DCCH mode of operation or a split-tone DCCH mode of operation, said information indicating split-tone DCCH mode of operation also identifying one among a plurality of sets of DCCH segments associated with the DCCH logical tone. For example, in an exemplary embodiment, when in full-tone DCCH mode, a wireless terminal is allocated a single logical DCCH tone corresponds to a recurring set of 40 indexed DCCH segments in an uplink channel structure, but while in a split-tone mode of operation, a wireless terminal is allocated a single logical DCCH tone which is time shared such that the wireless terminal receives a set of 13 indexed segments in a recurring uplink channel structure and two other wireless terminals may each be allocated a different set of 13 segments in the uplink channel structure. In some embodiments the information communicated in steps 5904 and 5908 are communicated in the same message. Operation proceeds from step 5908 to step 5910.

In step 5910, the wireless terminal proceeds to step 5912 if the wireless terminal has determined that it in full-tone DCCH mode, while operation proceeds to step 5914 if the wireless terminal has determined that it in split-tone DCCH mode.

In step 5912, the wireless terminal identifies DCCH communication segments allocated to the wireless terminal using time information 5906 and the identified logical DCCH tone. For example, in an exemplary embodiment, for each beacon slot, the wireless terminal identifies a set of 40 indexed DCCH segments corresponding to assigned logical DCCH tone. Operation proceeds from step 5912 to step 5916, for each identified communications segment. In step 5916, the wireless terminal using time information 5906, the indexed value of the DCCH segment within the recurring structure, and stored information associating sets of report types with each indexed segment, identifies a set of report types to be communicated in the DCCH communications segment. Operation proceeds from step 5916 via connecting node A 5920 to step 5924.

In step 5924, the wireless terminal checks as to whether any of report types identified in step 5916 include a flexible report. If any of the identified report types indicate a flexible report, then operation proceeds from step 5924 to step 5928; otherwise operation proceeds from step 5924 to step 5926.

In step 5926, the wireless terminal, for each fixed type information report of the segment, maps the information to be conveyed to a fixed number of information bits corresponding to the report size, said fixed type of information reports being dictated by a reporting schedule. Operation proceeds from step 5926 to step 5942.

In step 5928, the wireless terminal selects which type of report from among a plurality of fixed type information report types to include as a flexible report body. Step 5928 includes sub-step 5930. In sub-step 5930, the wireless terminal performs the selection as a function of a report prioritization operation. Sub-step 5930 includes sub-step 5932 and 5934. In sub-step 5932, the wireless terminal considers the amount of uplink data queued for communication to the access node, e.g., the backlog in a plurality of request queues, and at least one signal interference measurement, e.g., a beacon ratio report. In sub-step 5934, the wireless terminal determines an amount of change in information previously reported in at least one report, e.g., a measured change in a downlink saturation level of self-noise SNR report. Operation proceeds from step 5928 to step 5936.

In step 5936, the wireless terminal codes the type of flexible body report into a type identifier, e.g., a two bit flexible report body identifier. Operation proceeds from step 5936 to step 5938. In step 5938, the wireless terminal maps the information to be conveyed in the flexible report body in accordance with the selected report type to a number of information bits corresponding to the flexible report body size. Operation proceeds from step 5938 to either step 5940 or step 5942. Step 5942 is an optional step, included in some embodiments. In step 5940, for each fixed type information report of the segment in addition to the flexible report, map the information to be conveyed to a fixed number of information bits corresponding to the report size. Operation proceeds from step 5940 to step 5942. For example, in some embodiments, a DCCH segment including a flexible report, when in the full-tone mode utilizes the full number of information bits communicated by the segment for itself, e.g., the segment conveys 6 information bits, 2 bits are used for identifying the type of report and 4 bits used for conveying the body of the report. In such an embodiment, step 5940 is not performed. In some other embodiments, the total number of bits conveyed by a DCCH segment in the full-tone DCCH mode is greater than the number of bits represented by the flexible report and step 5940 is included to utilize the remaining information bits of the segment. For example, the segment conveys a total of 7 information bits 6 of which are utilized by the flexible report and 1 is used for a fixed one information bit uplink traffic request report.

In step 5942, the wireless terminal performs coding and modulation operations to generate a set of modulation symbols to represent the one or more reports to be communicated in the DCCH segment. Operation proceeds from step 5942 to step 5944. In step 5944, the wireless terminal, for each modulation symbol of the set of generated modulation symbols determines, using time information 5906 and tone hopping information, the physical tone to be used to convey the modulation symbol. For example, in an exemplary embodiment, each DCCH segment corresponds to 21 OFDM tone-symbols each tone symbol being used to convey one QPSK modulation symbol, each of the 21 OFDM tone-symbols corresponding to the same logical DCCH tone; however due to uplink tone hopping, 7 OFDM tone symbols in a first set of seven successive OFDM symbol time periods corresponding to a first physical tone, a second set of seven OFDM tone-symbols in a second set of seven successive OFDM symbol time periods corresponding to a second physical tone, and a third set of seven successive OFDM symbol time periods corresponding to a third physical tone, the first second and third physical tones being different. Operation proceeds from step 5944 to step 5946. In step 5946, the wireless terminal transmits each modulation symbol of the DCCH segment using the determined corresponding physical tone.

Returning to step 5914, in step 5914, the wireless terminal identifies DCCH communication segments allocated to the wireless terminal using time information 5906, the identified logical DCCH tone, and the information identifying the one among the plurality of sets of DCCH segments. For example, in an exemplary embodiment, for each beacon slot, the wireless terminal identifies a set of 13 indexed DCCH segments corresponding to assigned logical DCCH tone. Operation proceeds from step 5914 to step 5918, for each identified DCCH communications segment. In step 5918, the wireless terminal using time information 5906, the indexed value of the DCCH segment within the recurring structure, and stored information associating sets of report types with each indexed segment, identifies a set of report types to be communicated in the DCCH communications segment. Operation proceeds form step 5916 via connecting node B 5922 to step 5948.

In step 5948, the wireless terminal checks as to whether any of report types identified in step 5918 include a flexible report. If any of the identified report types indicate a flexible report, then operation proceeds from step 5948 to step 5952; otherwise operation proceeds from step 5948 to step 5950.

In step 5950, the wireless terminal, for each fixed type information report of the segment, maps the information to be conveyed to a fixed number of information bits corresponding to the report size, said fixed type of information reports being dictated by a reporting schedule. Operation proceeds from step 5950 to step 5966.

In step 5952, the wireless terminal selects which type of report from among a plurality of fixed type information report types to include as a flexible report body. Step 5952 includes sub-step 5954. In sub-step 5954, the wireless terminal performs the selection as a function of a report prioritization operation. Sub-step 5954 includes sub-step 5956 and 5958. In sub-step 5956, the wireless terminal considers the amount of uplink data queued for communication to the access node, e.g., the backlog in a plurality of request queues, and at least one signal interference measurement, e.g., a beacon ratio report. In sub-step 5958, the wireless terminal determines an amount of change in information previously reported in at least one report, e.g., a measured change in a downlink saturation level of self-noise SNR report. Operation proceeds from step 5952 to step 5960.

In step 5960, the wireless terminal codes the type of flexible body report into a type identifier, e.g., a single bit flexible report body identifier. Operation proceeds from step 5960 to step 5962. In step 5962, the wireless terminal maps the information to be conveyed in the flexible report body in accordance with the selected report type to a number of information bits corresponding to the flexible report body size. Operation proceeds from step 5962 to either step 5964 or step 5966. Step 5964 is an optional step, included in some embodiments. In step 5964, for each fixed type information report of the segment in addition to the flexible report, map the information to be conveyed to a fixed number of information bits corresponding to the report size. Operation proceeds from step 5964 to step 5966. For example, in some embodiments, a DCCH segment including a flexible report, when in the split-tone mode utilizes the full number of information bits communicated by the segment for itself, and in such an embodiment, step 5964 is not performed. In some other embodiments, the total number of bits conveyed by a DCCH segment in the split-tone DCCH mode is greater than the number of bits represented by the flexible report and step 5940 is included to utilize the remaining information bits of the segment. For example, the segment conveys a total of 8 information bits 6 of which are utilized by the flexible report and 1 information bit is used for a fixed one information bit uplink traffic request report, and 1 information bit is used for another predetermined report type. In some embodiments, the size of the body of the flexible report varies corresponding to different selections of the type of report to be conveyed by the flexible report, e.g., a 4 bit uplink traffic channel request or a five bit uplink transmission power backoff report, and the remainder of the available bits in the segment can be allocated to predetermined fixed report types, e.g., 1 or 2 bits.

In step 5966, the wireless terminal performs coding and modulation operations to generate a set of modulation symbols to represent the one or more reports to be communicated in the DCCH segment. Operation proceeds from step 5966 to step 5968. In step 5968, the wireless terminal, for each modulation symbol of the set of generated modulation symbols determines, using time information 5906 and tone hopping information, the physical tone to be used to convey the modulation symbol. For example, in an exemplary embodiment, each DCCH segment corresponds to 21 OFDM tone-symbols each tone symbol being used to convey one QPSK modulation symbol, each of the 21 OFDM tone-symbols corresponding to the same logical DCCH tone; however due to uplink tone hopping, 7 OFDM tone symbols in a first set of seven successive OFDM symbol time periods corresponding to a first physical tone, a second set of seven OFDM tone-symbols in a second set of seven successive OFDM symbol time periods corresponding to a second physical tone, and a third set of seven successive OFDM symbol time periods corresponding to a third physical tone, the first second and third physical tones being determined in accordance with tone hopping information and may be different. Operation proceeds from step 5968 to step 5970. In step 5970, the wireless terminal transmits each modulation symbol of the DCCH segment using the determined corresponding physical tone.

Figure 60:
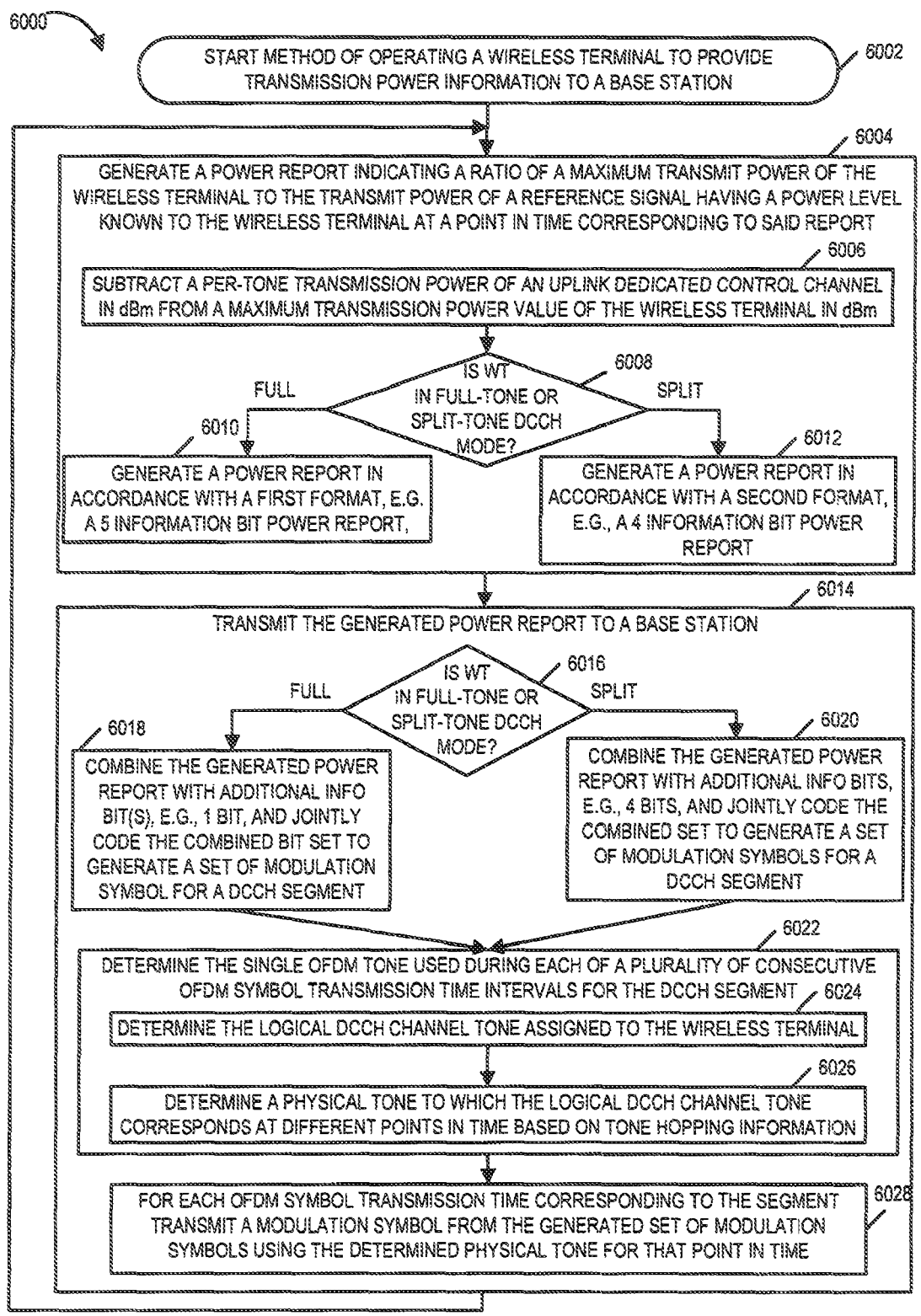
FIG. 60 is a flowchart of an exemplary method of operating a wireless terminal to provide transmission power information to a base station in accordance with the present invention.

FIG. 60 is a flowchart 6000 of an exemplary method of operating a wireless terminal to provide transmission power information to a base station in accordance with the present invention. Operation starts in step 6002. For example, the wireless terminal may have been previously powered on, established a connection with a base station, have transitioned in the ON state of operation, and been assigned dedicated control channel segments to use in either a full-tone or split tone mode of DCCH operation. The full-tone DCCH mode of operation is in some embodiments, a mode in which the wireless tone is dedicated a single logical tone channel used for DCCH segments which is not shared with other wireless terminal, while the split tone-DCCH mode of operation is, in some embodiments, a mode in which the wireless terminal is dedicated a portion of a single logical DCCH tone channel which can be allocated to be used on a time shared with another wireless terminal or terminals. Operation proceeds from start step 6002 to step 6004.

In step 6004, the wireless terminal generates a power report indicating a ratio of a maximum transmit power of the wireless terminal to the transmit power of a reference signal having a power level known to the wireless terminal at a point in time corresponding to the power report. In some embodiments the power report is a backoff report, e.g., a wireless terminal transmission power backoff report, indicating a dB value. In some embodiments, the maximum transmission power value depends on a power output capability of the wireless terminal. In some embodiments, the maximum transmission power is specified by a government regulation limiting the maximum output power level of the wireless terminal. In some embodiments, the reference signal is controlled by the wireless terminal based upon at least one closed loop power level control signal received from a base station. In some embodiment, the reference signal is a control information signal transmitted over a dedicated control channel to the base station. The reference signal, in some embodiments, is measured for received power level by the base station to which it is transmitted. In various embodiments, the dedicated control channel is a single tone control channel which corresponds to a single logical tone dedicated to the wireless terminal for use in transmitting control information. In various embodiments, the power report is a power report corresponding to a single instant in time. In some embodiments, the known reference signal is a signal transmitted on the same channel as the power report, e.g., the same DCCH channel. In various embodiments, the point in time to which a generated power report corresponds has a known offset from a start of a communication segment, e.g., a DCCH segment, in which said power report is to be transmitted. Step 6004 includes sub-step 6006, sub-step 6008, sub-step 6010, and sub-step 6012.

In sub-step 6006, the wireless terminal performs a subtraction operation including subtracting a per-tone transmission power of an uplink dedicated control channel in dBm from a maximum transmission power of wireless terminal in dBm. Operation proceeds from sub-step 6006 to sub-step 6008. In sub-step 6008, the wireless terminal proceeds to different sub-steps depending upon whether the wireless terminal is in a full-tone DCCH mode of operation or a split-tone DCCH mode of operation. If the wireless terminal is in full-tone DCCH mode of operation, operation proceeds from sub-step 6008 to sub-step 6010. If the wireless terminal is in split-tone DCCH mode of operation, operation proceeds from sub-step 6008 to sub-step 6012. In sub-step 6010, the wireless terminal generates a power report in accordance with a first format, e.g., a 5 information bit power report. For example the result of sub-step 6006 is compared to a plurality of different levels, each level corresponding to a different 5 bit pattern, the level closet to the result of sub-step 6006 is selected for the report, and the bit pattern corresponding to that level is used for the report. In one exemplary embodiment, the levels range from 6.5 dBs to 40 dBs. (See FIG. 26.) In sub-step 6012 the wireless terminal generates a power report in accordance with a second format, e.g., a 4 information bit power report. For example the result of sub-step 6006 is compared to a plurality of different levels, each level corresponding to a different 4 bit pattern, the level closet to the result of sub-step 6006 is selected for the report, and the bit pattern corresponding to that level is used for the report. In one exemplary embodiment, the levels range from 6 dBs to 36 dBs. (See FIG. 35.) Operation proceeds from step 6004 to step 6014.

In step 6014, the wireless terminal is operated to transmit the generated power report to a base station. Step 6014 includes sub-steps 6016, 6018, 6020, 6022, and 6028. In sub-step 6016, the wireless terminal proceeds to different sub-steps depending upon whether the wireless terminal is in a full-tone DCCH mode of operation or a split-tone DCCH mode of operation. If the wireless terminal is in full-tone DCCH mode of operation, operation proceeds from sub-step 6016 to sub-step 6018. If the wireless terminal is in split-tone DCCH mode of operation, operation proceeds from sub-step 6016 to sub-step 6020.

In sub-step 6018, the wireless terminal combines the generated power report with additional information bit(s), e.g., 1 additional information bit, and jointly codes the set of combined information bits, e.g., set of 6 information bits, to generate a set of modulation symbols for a DCCH segment, e.g., a set of 21 modulation symbols. For example, the 1 additional information bit is, in some embodiments, a single information bit uplink traffic channel resource request report. In sub-step 6020, the wireless terminal combines the generated power report with additional information bit(s), e.g., 4 additional information bits, and jointly codes the set of combined information bits, e.g., set of 8 information bits, to generate a set of modulation symbols for a DCCH segment, e.g., a set of 21 modulation symbols. For example, the set of 4 additional information bit is, in some embodiments, a 4 information bit uplink traffic channel resource request report. Operation proceeds from sub-step 6018 or sub-step 6020 to sub-step 6022.

In sub-step 6022, the wireless terminal determines the single OFDM tone used during each of a plurality of consecutive OFDM symbol transmission time periods for the DCCH segment. Sub-step 6022 includes sub-step 6024 and sub-step 6026. In sub-step 6024, the wireless terminal determines the logical DCCH channel tone assigned to the wireless terminal, and in sub-step 6026, the wireless terminal determines a physical tone to which the logical DCCH channel tone corresponds at different points in time based on tone hopping information. For example, in some embodiments, an exemplary DCCH segment corresponds to a single DCCH channel logical tone and the DCCH segment includes 21 OFDM tone-symbols, one OFDM tone-symbol for each of the 21 consecutive OFDM symbol transmission time intervals, the same physical tone used for a first set of seven, a second physical tone used for a second set of seven, and a third physical tone used for a third set of seven. Operation proceeds from sub-step 6022 to sub-step 6028. In sub-step 6028, the wireless terminal, for each OFDM symbol transmission time period, corresponding to the DCCH segment, transmits a modulation symbol from the set of generated modulation symbols using the determined physical tone for that point in time.

Operation proceeds from step 6014 to step 6004, where the wireless terminal proceeds to generate another power report. In some embodiments, the power report is transmitted twice during each recurring cycle of a dedicated control channel reporting structure used to control transmission of control information by the wireless terminal. In some embodiments, the power report is transmitted, on average at least once every 500 OFDM symbol transmission time periods but on average at intervals spaced apart by at least 200 symbol transmission time intervals.

Various features of an exemplary embodiment, in accordance with the present invention will now be described. The wireless terminal (WT) uses an ULRQST1, ULRQST3 or ULRQST4 to report the status of the MAC frame queues at the WT transmitter.

The WT transmitter maintains MAC frame queues, which buffers the MAC frames to be transmitted over the link. The MAC frames are converted from the LLC frames, which are constructed from packets of upper layer protocols. An uplink user data packet belongs to one of 4 request groups. A packet is associated with a particular request group. If the packet belongs to one request group, then each of the MAC frames of that packet also belong to that request group.

The WT reports the number of MAC frames in the 4 request groups that the WT may intend to transmit. In the ARQ protocol, those MAC frames are marked as "new" or "to be retransmitted".

The WT maintains a vector of four elements N[0:3]: for k=0:3, N[k] represents the number of MAC frames that the WT intends to transmit in request group k. The WT reports the information about N[0:3] to the base station sector (BSS) so that the BSS can utilize the information in an uplink (UL) scheduling algorithm to determine the assignment of uplink traffic channel (UL.TCH) segments.

Figure 61:
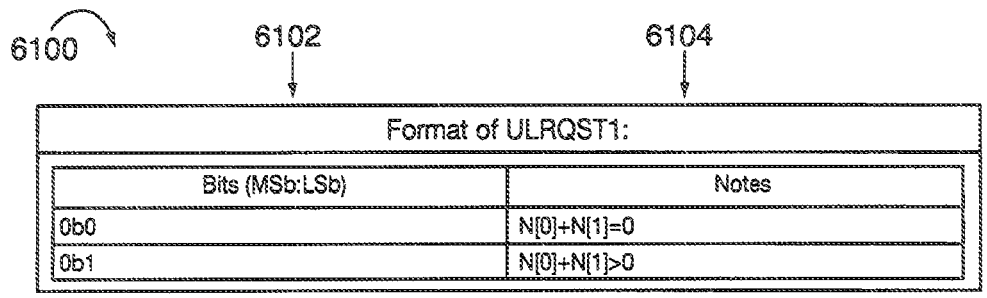
FIG. 61 is a table of an exemplary format for an exemplary 1 bit uplink request (ULRQST1) report.

The WT uses an ULRQST1 to report N[0]+N[1] according to Table 6100 of FIG. 61.

At a given time, the WT uses only one request dictionary. When the WT just enters the ACTIVE state, the WT uses the default request dictionary. To change the request dictionary, the WT and the BSS uses an upper layer configuration protocol. When the WT migrates from the ON state to the HOLD state, the WT keeps the last request dictionary used in the ON state so that when the WT migrates from the HOLD state to the ON state later, the WT continues to use the same request dictionary until the request dictionary is explicitly changed. However, if the WT leaves the ACTIVE state, then the memory of the last request dictionary used is cleared.

To determine an ULRQST3 or ULRQST4, the WT first calculates the following two parameters, y and z, and then use one of the following dictionaries. Denote by x the value (in dB) of the most recent 5 bit uplink transmission power back-off report (ULTXBKF5) report, and by $b_0$ the value in (dB) of the most recent generic 4 bit downlink beacon ratio report (DLBNR4). The WT further determines an adjusted generic DLBNR4 report value b as follows: b=$b_0$–ulTCHrate-FlashAssignmentOffset, where minus is defined in the dB sense. The base station sector broadcasts the value of ulTCH-rateFlashAssignmentOffset in a downlink broadcast channel. The WT uses ulTCHrateFlashAssignmentOffset equal to 0 dB until the WT receives the value from the broadcast channel.

Figure 62:
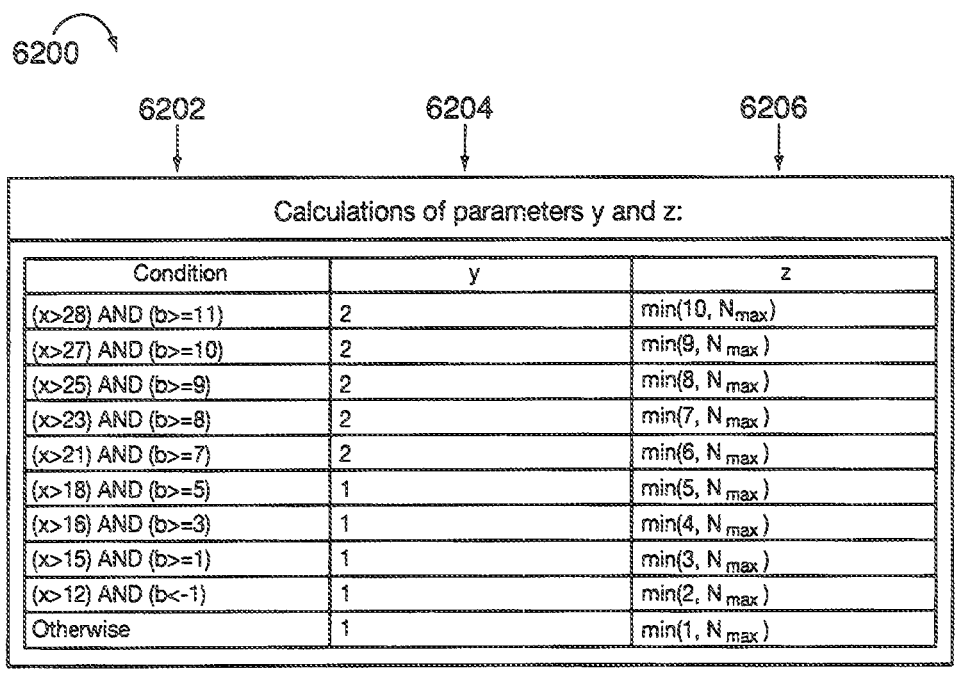
FIG. 62 is an exemplary table used to calculate exemplary control parameters y and z, the control parameters y and z being used in determining uplink multi-bit request reports conveying transmission request group queue information.

Given x and b, the WT determines y and z as those from the first row in Table 6200 of FIG. 62 for which the condition in the first column is satisfied. For example, if x=17 and b=3, then z=min(4,$N_{max}$) and y=1. Denote $R_{max}$ the highest rate option that the WT can support, and $N_{max}$ the number of MAC frames of that highest rate option.

The WT uses an ULRQST3 or ULRQST4 to report the actual N[0:3] of the MAC frame queues according to a request dictionary. A request dictionary is identified by a request dictionary (RD) reference number.

The exemplary request dictionaries show that any ULRQST4 or ULRQST3 report may not completely include the actual N[0:3]. A report is in effect a quantized version of the actual N[0:3]. A general guideline is that the WT should send a report to minimize the discrepancy between the reported and the actual MAC frames queues first for request groups 0 and 1, and then for request group 2, and finally for request group 3. However, the WT has the flexibility of determining a report to benefit the WT the most. For example, when the WT is using the request dictionary 2, the WT may use an ULRQST4 to report N[1]+N[3] and use an ULRQST3 to report N[2]. In addition, if a report is directly related to a subset of request groups according to the request dictionary, it does not automatically imply that the MAC frame queues of a remaining request group are empty. For example, if a report means N[2]=1, then it may not automatically imply that N[0]=0, N[1]=0, or N[3]=0.

Figure 63:
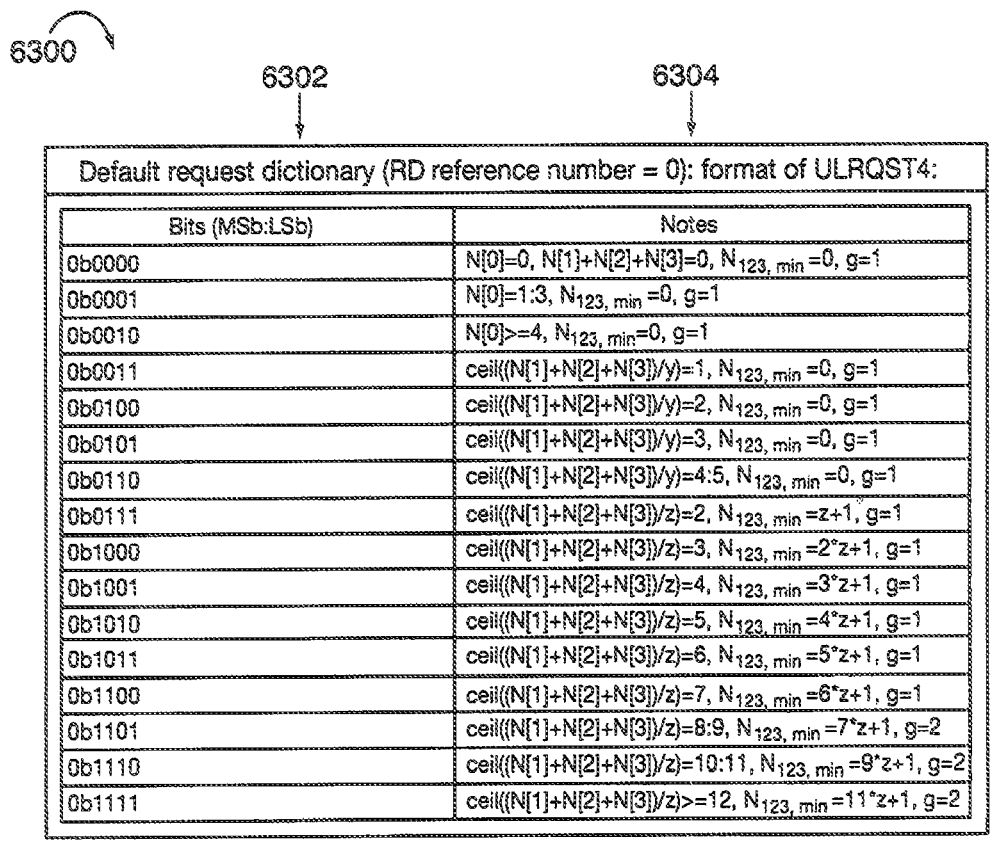
FIG. 63 and FIG. 64 define an exemplary request dictionary with the RD reference number equal to 0.
Figure 64:
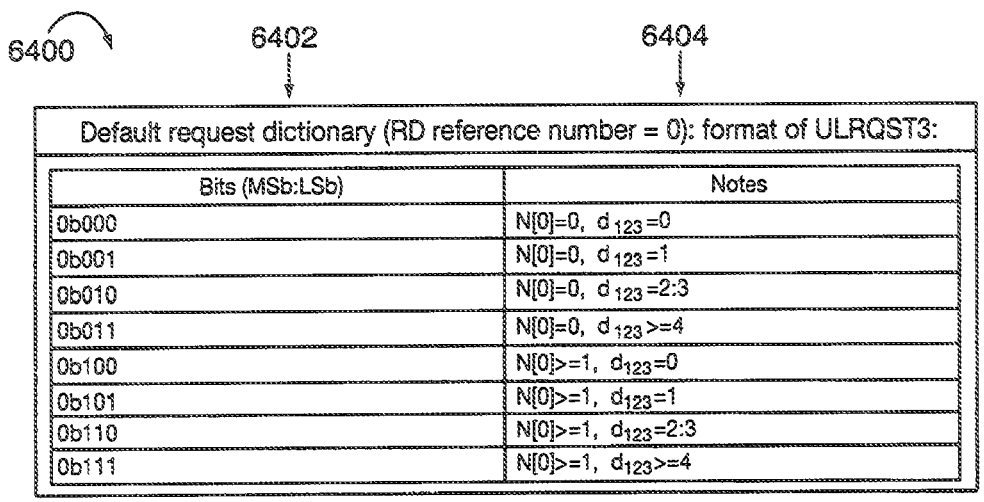

Table 6300 of FIG. 63 and Table 6400 of FIG. 64 define an exemplary request dictionary with the RD reference number equal to 0. Define $d_{123}$=ceil(((N[1]+N[2]+N[3]–$N_{123,min}$)/(y*g)), where $N_{123,min}$ and g are variables determined by the most recent ULRQST4 report as per Table 6300.

Figure 65:
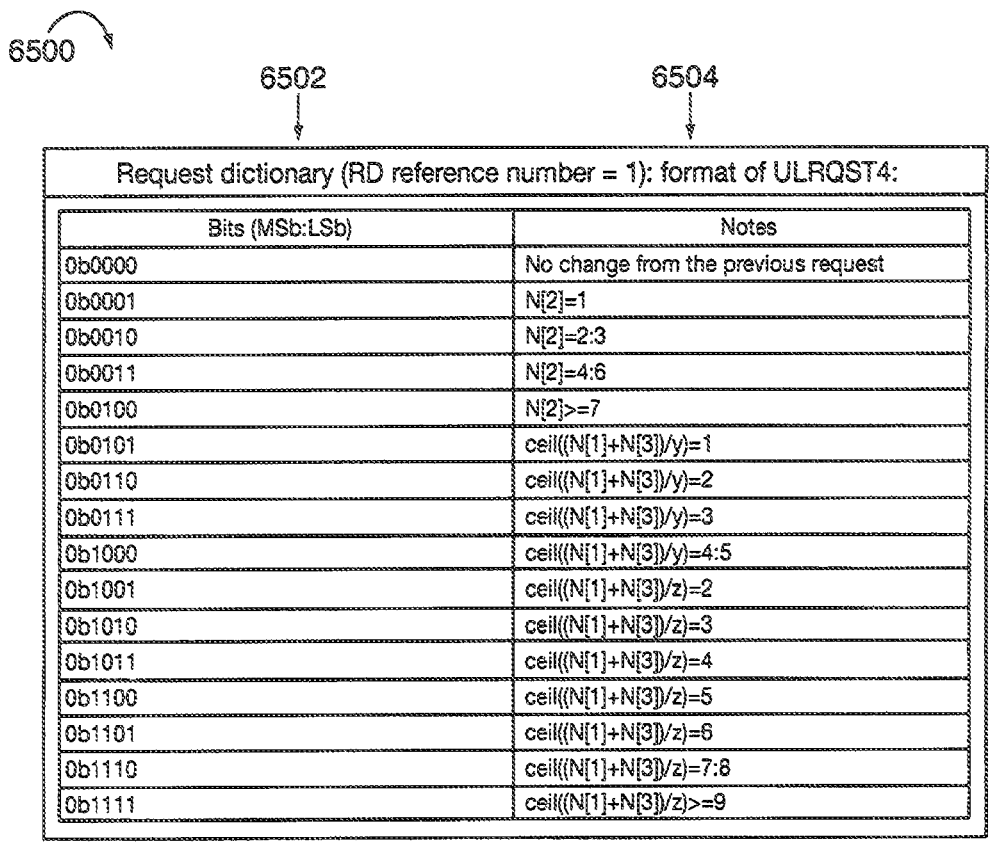
FIG. 65 and FIG. 66 includes tables which define an exemplary request dictionary with the RD reference number equal to 1.
Figure 66:
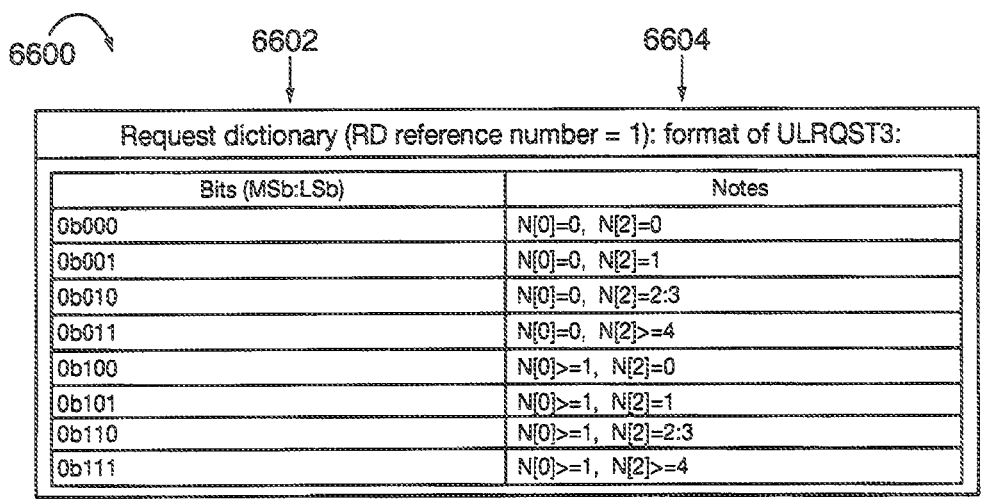

Table 6500 of FIG. 65 and Table 6600 of FIG. 66 define an exemplary request dictionary with the RD reference number equal to 1.

Figure 67:
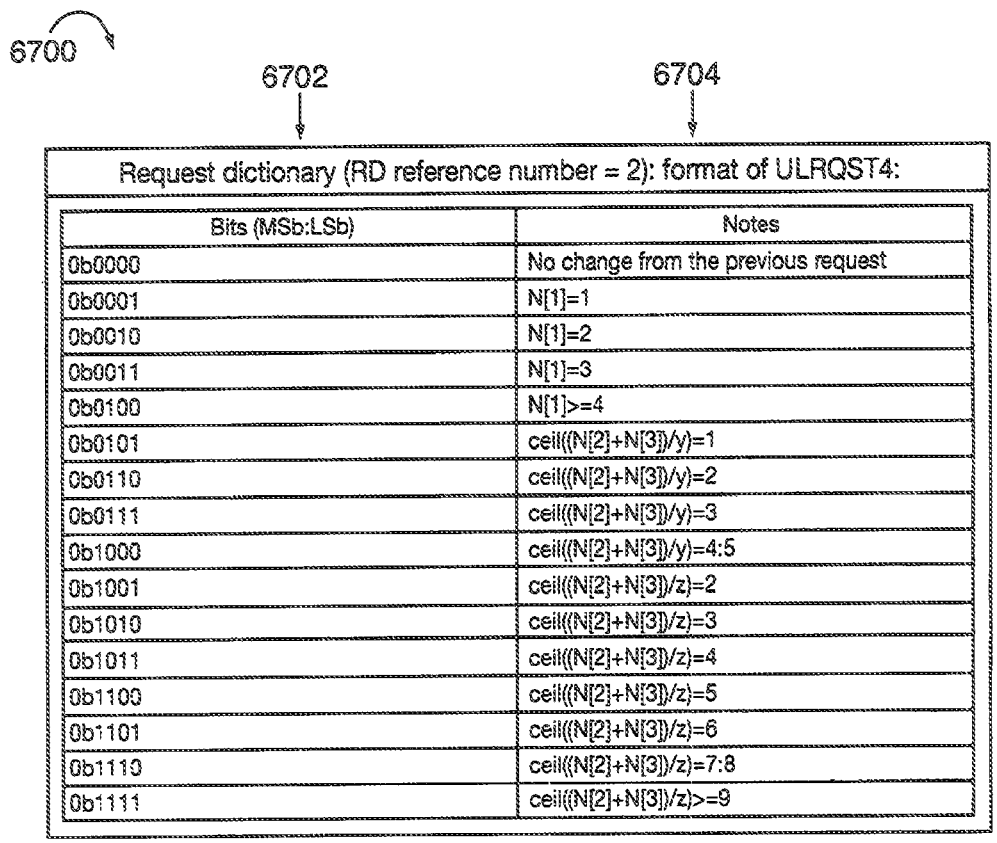
FIG. 67 and FIG. 68 include tables which define an exemplary request dictionary with the RD reference number equal to 2.
Figure 68:
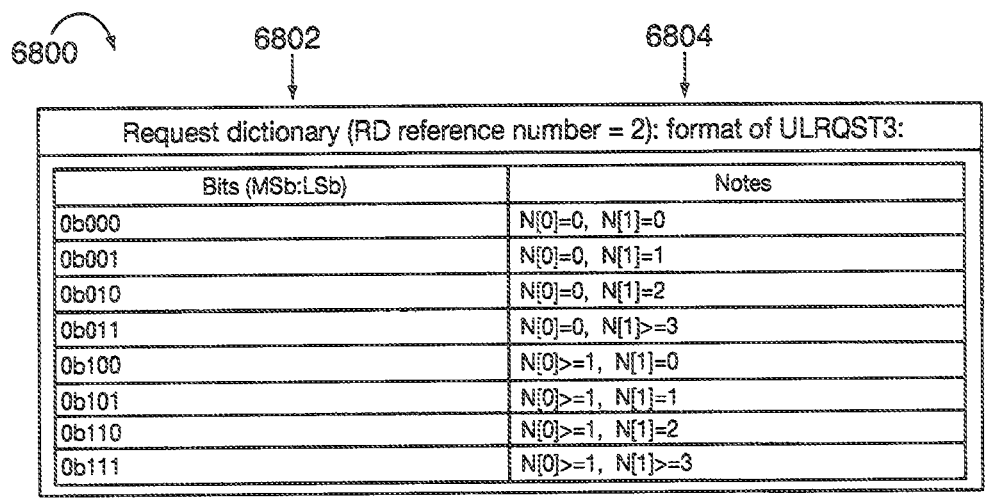

Table 6700 of FIG. 67 and Table 6800 of FIG. 68 define an exemplary request dictionary with the RD reference number equal to 2.

Figures 69, 70:
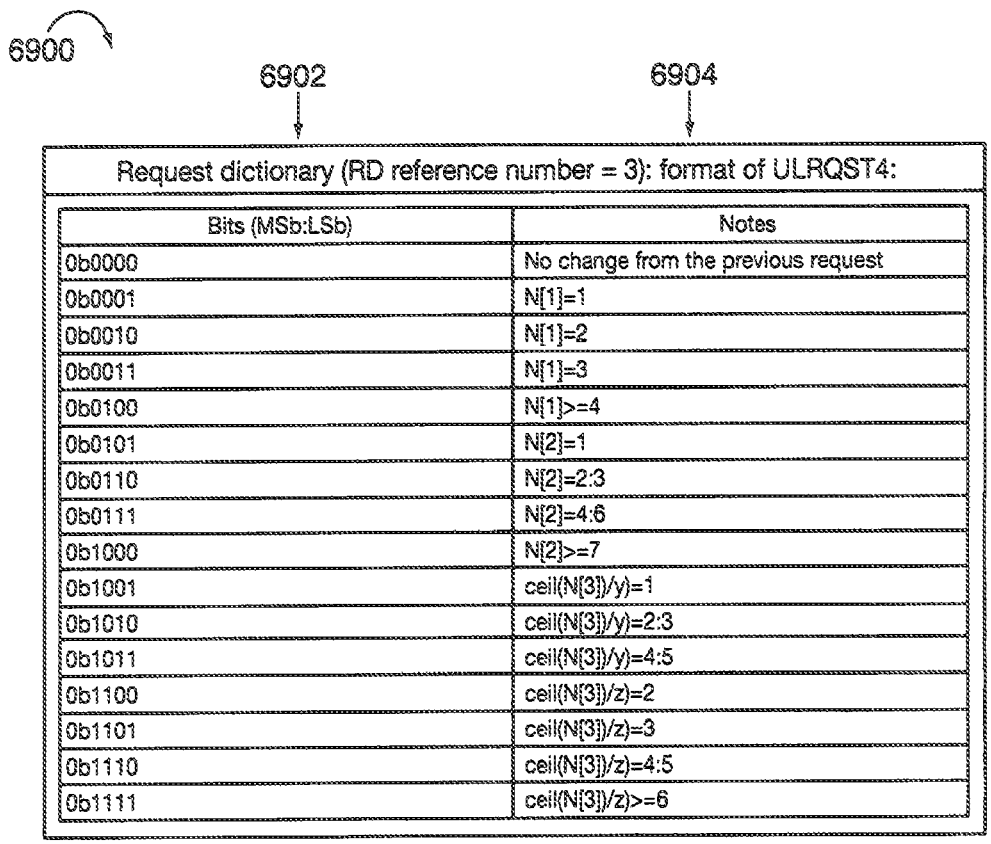
FIG. 69 and FIG. 70 include tables which define an exemplary request dictionary with the RD reference number equal to 3.

Table 6900 of FIG. 69 and Table 7000 of FIG. 70 define an exemplary request dictionary with the RD reference number equal to 3.

Figure 71:
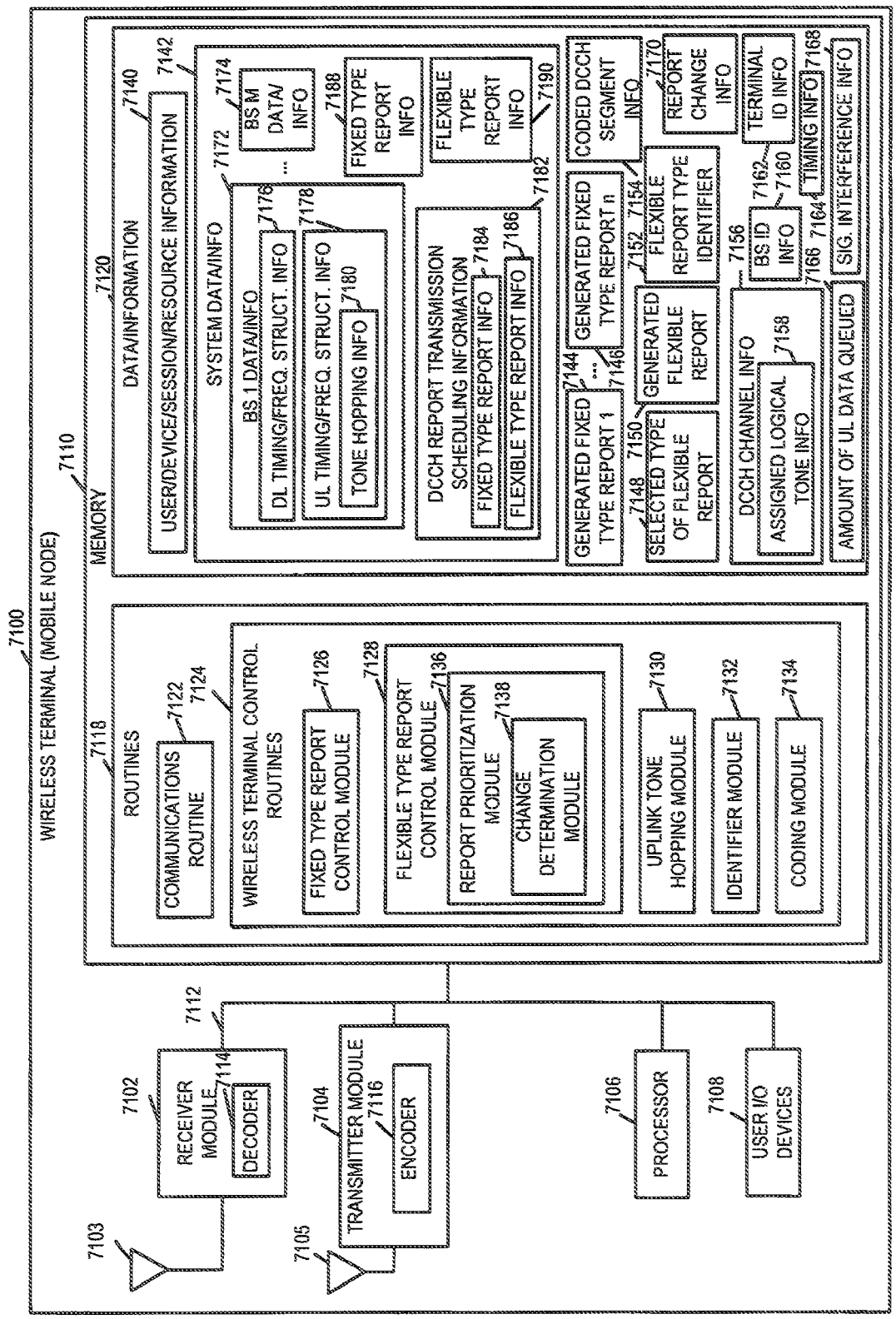
FIG. 71 is a drawing of an exemplary wireless terminal, e.g., mobile node, implemented in accordance with the present invention and using methods of the present invention.

FIG. 71 is a drawing of an exemplary wireless terminal 7100, e.g., mobile node, implemented in accordance with the present invention and using methods of the present invention. Exemplary WT 7100 may be any of the wireless terminals of the exemplary system of FIG. 1. Exemplary WT 7100 may be any of the WTs (136, 138, 144, 146, 152, 154, 168, 170, 172, 174, 176, 178) of exemplary system 100 of FIG. 1. Exemplary wireless terminal 7100 includes a receiver module 7102, a transmitter module 7104, a processor 7106, user I/O devices 7108, and a memory 7110 coupled together via a bus 7112 via which the various elements may interchange data and information.

Memory 7110 includes routines 7118 and data/information 7120. The processor 7106, e.g., a CPU, executes the routines 7118 and uses the data/information 7120 in memory 7110 to control the operation of the wireless terminal 7100 and implement methods of the present invention.

Receiver module 7102, e.g., an OFDM receiver, is coupled to receive antenna 7103 via which the wireless terminal 7100 receives downlink signals from base stations. Receiver module 7102 includes a decoder 7114 which decodes at least some of the received downlink signals. Transmitter module 7104, e.g., an OFDM transmitter, is coupled to a transmit antenna 7105 via which the wireless terminal 7100 transmits uplink signals to base stations. Transmitter module 7104 is used for transmitting a plurality of different types of fixed reports using uplink dedicated control channel segments dedicated to the wireless terminal. Transmitter module 7104 is also used for transmitting flexible reports using uplink dedicated control channel segments dedicated to the wireless terminal, the uplink DCCH segments which include a flexible report being the same size as at least some of the uplink DCCH segments which include fixed type reports and do not include a flexible report. Transmitter module 7104 includes an encoder 7116 which is used to encode at least some of the uplink signals prior to transmission. In some embodiments, each individual dedicated control channel uplink segment is encoded independently of other dedicated control channel uplink segments. In various embodiments, the same antenna is used for both the transmitter and receiver.

User I/O devices 7108, e.g., microphone, keyboard, keypad, switches, camera, speaker, display, etc., are used to input/output user data, control applications, and control the operation of the wireless terminal, e.g., allowing a user of WT 7100 to initiate a communications session.

Routines 7118 includes a communications routine 7122 and wireless terminal control routines 7124. Communications routine 7122 performs various communications protocols used by wireless terminal 7100. Wireless terminal control routines 7124 include a fixed type report control module 7126, a flexible type report control module 7128, an uplink tone hopping module 7130, an identifier module 7132, and a coding module 7134.

Fixed type report control module 7126 controls the transmission of a plurality of different types of fixed type information reports according to a reporting schedule, said fixed type information reports being of a type dictated by the reporting schedule.

Flexible type report control module 7128 controls transmission of flexible reports at predetermined locations in the reporting schedule, said flexible type reports being of report types selected by the flexible report control module from a plurality of reports which can be reported using a flexible report. Flexible report control module 7128 includes a report prioritization module 7136. The report prioritization module 7136 takes into consideration the amount of uplink data queued for communication to the base station and a least one signal interference measurement, when determining which one of a plurality of alternative reports should be communicated in a flexible report. Report prioritization module 7138 also includes a change determination module 7138, which determines an amount of change in information previously reported in at least one report. For example, if the change determination module 7138 determines that the value of saturation level of SNR indicative of WT self-noise has not changed significantly from the last reported value, but the demand for uplink traffic channel resources has significantly increased from the last reported request, the wireless terminal 7100 may select to use the flexible report to communicate an uplink traffic channel request report instead of a saturation level of SNR report.

Uplink tone hopping module 7130 determines, based on stored tone hopping information, for transmission purposes, the physical tone corresponding to the logical assigned DCCH channel tone at different points in time corresponding to the transmission of dedicated segments. For example, in one exemplary embodiment, a DCCH segment corresponds to three dwells, each dwell using the same physical tone for seven successive OFDM symbol transmission time intervals; however, the physical tone associated with the different dwells is determined by tone hopping information and may be different.

Identifier module 7132 generates flexible type report identifiers to be communicated with flexible reports, the report type identifiers communicated with an individual flexible report indicating the type of flexible report being communicated. In various embodiments, the identifier module 7132 generates a report which indicates the type of flexible report which corresponds to the report type identifier. In this exemplary embodiment, an individual flexible type report is communicated in the same DCCH segment with the corresponding report type identifier. In this exemplary embodiment, identifier module 7132 is not used for fixed type reports as there is a predetermined understanding between the base station and wireless terminal as to the type of fixed report being communicated based on position of the fixed report within the recurring reporting structure.

Coding module 7134 codes an individual flexible report identifier and a corresponding flexible report together in a single coding unit corresponding to the DCCH communications segment in which they are transmitted. In some embodiments, coding module 7134 operates in conjunction with encoder 7116.

Data/information 7120 includes user/device/session/resource information 7140, system data/information 7142, generated fixed type report 1 7144, . . . , generated fixed type report n 7146, selected type of flexible report 7148, generated flexible report 7150, flexible report type identifier 7152, coded DCCH segment information 7154, DCCH channel information 7156 including assigned logical tone information 7158, base station identification information 7160, terminal identification information 7162, timing information 7164, amount of uplink data queued 7166, signal interference information 7168, and report change information 7170. Assigned logical tone information 7158 identifies a base station assigned single logical uplink dedicated control channel tone to be used by the WT 7100 for communicating uplink DCCH segment signals conveying fixed and flexible reports. In some embodiments, the single assigned logical DCCH tone is associated with a base station assigned ON state identifier.

User/device/session/resource information 7140 includes information pertaining to communications sessions, e.g., peer node information, addressing information, routing information, state information, and resource information identifying uplink and downlink air link resources, e.g., segments, allocated to WT 7100. Generated fixed type of report 1 7144 is a fixed type report corresponding to one of the plurality of fixed types of reports supported by WT 7100 and has been generated using fixed type report information 7188. Generated fixed type of report n 7146 is a fixed type report corresponding to one of the plurality of fixed types of reports supported by WT 7100 and has been generated using fixed type report information 7188. Selected type of flexible report 7148 is information identifying the wireless terminal's selection for the type of report to be communicated in the flexible report, e.g., a pattern of two bits identifying one of four patterns corresponding to a TYPE 2 report of FIG. 31. Generated flexible report 7150 is a flexible type report corresponding to one of the plurality of types of reports which may be selected by WT 7100 to be communicated in a flexible report and has been generated using flexible type report information 7190, e.g., a pattern of four bits corresponding to a BODY 4 report and representing a bit pattern of one of an ULRQST4 report, e.g., of FIG. 18, or a DLSSNR4 report of FIG. 30. Coded DCCH segment information 7154 is an output of coding module 7134, e.g., a coded DCCH segment corresponding to a Type 2 and Body 4 report or a coded DCCH segment corresponding to a mixture of fixed type reports.

DCCH channel information 7156 includes information identifying DCCH segments allocated to WT 7100, e.g., information identifying a DCCH mode of operation, e.g., a full-tone DCCH mode or a split tone DCCH mode and information identifying an assigned logical DCCH tone 7158 in a DCCH channel structure being used by the base station attachment point. Base station identification information 7160 includes information identifying the base station attachment point being used by WT 7200, e.g., information identifying a base station, base station sector, and/or carrier or tone block pair associated with the attachment point. Terminal identification information 7162 includes WT 7100 identification information and base station assigned wireless terminal identifiers temporarily associated with WT 7100, e.g., a registered user identifier, an active user identifier, an ON state identifier associated with a logical DCCH channel tone. Timing information 7164 includes current timing information, e.g., identifying a current OFDM symbol time within a recurring timing structure. Timing information 7164 is used by fixed type control module 7126 in conjunction with uplink timing/frequency structure information 7178 and fixed type report transmission scheduling information 7184 in deciding when to transmit different types of fixed reports. Timing information 7164 is used by flexible report control module 7128 in conjunction with uplink timing/frequency structure information 7178 and flexible type report transmission scheduling information 7186 in deciding when to transmit a flexible report. Amount of uplink data queued 7166, e.g., amounts of MAC frames in request group queues and/or combinations of amounts of MAC frames in request group queue sets, is used by report prioritization module 7136 in selecting the type of report to be communicated in a flexible report slot. Signal interference information 7168 is also used by prioritization module 7136 in selecting the type of report to be communicated in a flexible report slot. Report change information 7170, e.g., information indicating deltas from previously communicated DCCH reports, obtained from change determination module 7138 is used by report prioritization module 7136 in selecting the type of report to be communicated in a flexible report slot.

System data/information 7142 includes a plurality of sets of base station data/information (BS 1 data/information 7172, . . . , BS M data/information 7174), DCCH report transmission scheduling information 7182, fixed type report information 7188, and flexible type report information 7190. BS 1 data/information 7172 includes downlink timing and frequency structure information 7176 and uplink timing/frequency structure information 7178. Downlink timing/frequency structure information 7176 includes downlink carrier information, downlink tone block information, number of downlink tones, downlink tone hopping information, downlink channel segment information, OFDM symbol timing information, and grouping of OFDM symbols. Uplink timing/frequency structure information 7178 includes uplink carrier information, uplink tone block information, number of uplink tones, uplink tone hopping information, uplink channel segment information, OFDM symbol timing information, and grouping of OFDM symbols. The uplink timing/frequency structure information 7178 includes tone hopping information 7180.

DCCH report transmission scheduling information 7182 is used in controlling the transmission of reports to a base station, e.g., access node, using dedicated segments of a communications control channel. DCCH transmission scheduling information 7182 includes information identifying the composite of different DCCH segments in a recurring reporting schedule identifying the location and type of fixed type reports within the recurring schedule and identifying the location of flexible type reports within the recurring schedule. Report transmission scheduling information 7182 includes fixed type report information 7184 and flexible type report information 7186. For example, in one exemplary embodiment the recurring schedule includes 40 indexed DCCH segments, and the composite of each indexed segment in terms of fixed and/or flexible report inclusion is identified by report transmission scheduling information 7182. FIG. 10 provides an example of exemplary DCCH report transmission schedule information corresponding to a recurring structure including 40 indexed DCCH segments used in a full-tone DCCH mode of operation occurring in a beaconslot. In the example, of FIG. 10, the BODY 4 reports are flexible reports and the TYPE2 reports are identifier reports identifying the type of report communicated in a corresponding BODY4 report for the same DCCH segment. The other illustrated reports, e.g., DLSNR5 report, ULRQST1 report, DLDNSNR3 report, ULRQST3 report, RSVD2 report, ULRQST4 report, ULTX-BKF5 report, DLBNR4 report, RSVD1 report, and DLSSNR4 report, are fixed type reports. There are more fixed reports than flexible reports in one iteration of the reporting schedule. In some embodiments, the reporting schedule includes at least 8 times as many fixed reports as flexible reports in one iteration of the reporting schedule. In some embodiments, the reporting schedule includes, on average, less than one dedicated control channel segment used to report a flexible report for each nine dedicated control channel segments used to transmit a fixed report.

Fixed type report information 7188 includes information identifying the format for each of the plurality of fixed types of reports communicated over the dedicated control channel, e.g., number of information bits associated with a report and interpretation given to each of the possible bit patterns that can be communicated. The plurality of fixed type information reports include: uplink traffic channel request reports, a wireless terminal self-nose report, e.g., a downlink saturation level of self-noise SNR report, an absolute report of downlink SNR, a relative report of downlink SNR, an uplink transmission power report, e.g., a WT transmission power backoff report, and an interference report, e.g., a beacon ratio report. FIGS. 13, 15, 16, 18, 19, 26, 29, and 30 illustrate exemplary fixed type report information 7188 corresponding to a DLSNR5 report, a DLDSNR3 report, a ULRQST1 report, a ULRQST4 report, an ULRQST 3 report, an ULTxBKF5 report, and a DLBNR4 report, respectively.

Flexible type report information 7190 includes information identifying the format for each of the potential types of reports that may be selected to be communicated in a flexible report that is to communicated over the dedicated control channel, e.g., number of information bits associated with a report and interpretation given to each of the possible bit patterns that can be communicated. Flexible type report information 7190 also includes information identifying a flexible type indicator report to accompany the flexible report, e.g., number of information bits associated with the flexible type indicator report and designation of the type of flexible report that each bit pattern signifies. In some embodiments, at least some of the types of reports that may be selected by the WT to be communicated in a flexible report are the same as the fixed type of report. For example, in one exemplary embodiment the flexible report can selected from a set of reports including a 4 bit uplink traffic channel request report and a 4 bit downlink saturation level of SNR report, the 4 bit uplink traffic channel request report and the 4 bit downlink saturation level of SNR report following the same format used when communicated as a fixed type report in a predetermined fixed position in the recurring reporting schedule. FIGS. 31, 18, and 30 illustrate exemplary flexible type report information 7190.

Figure 72:
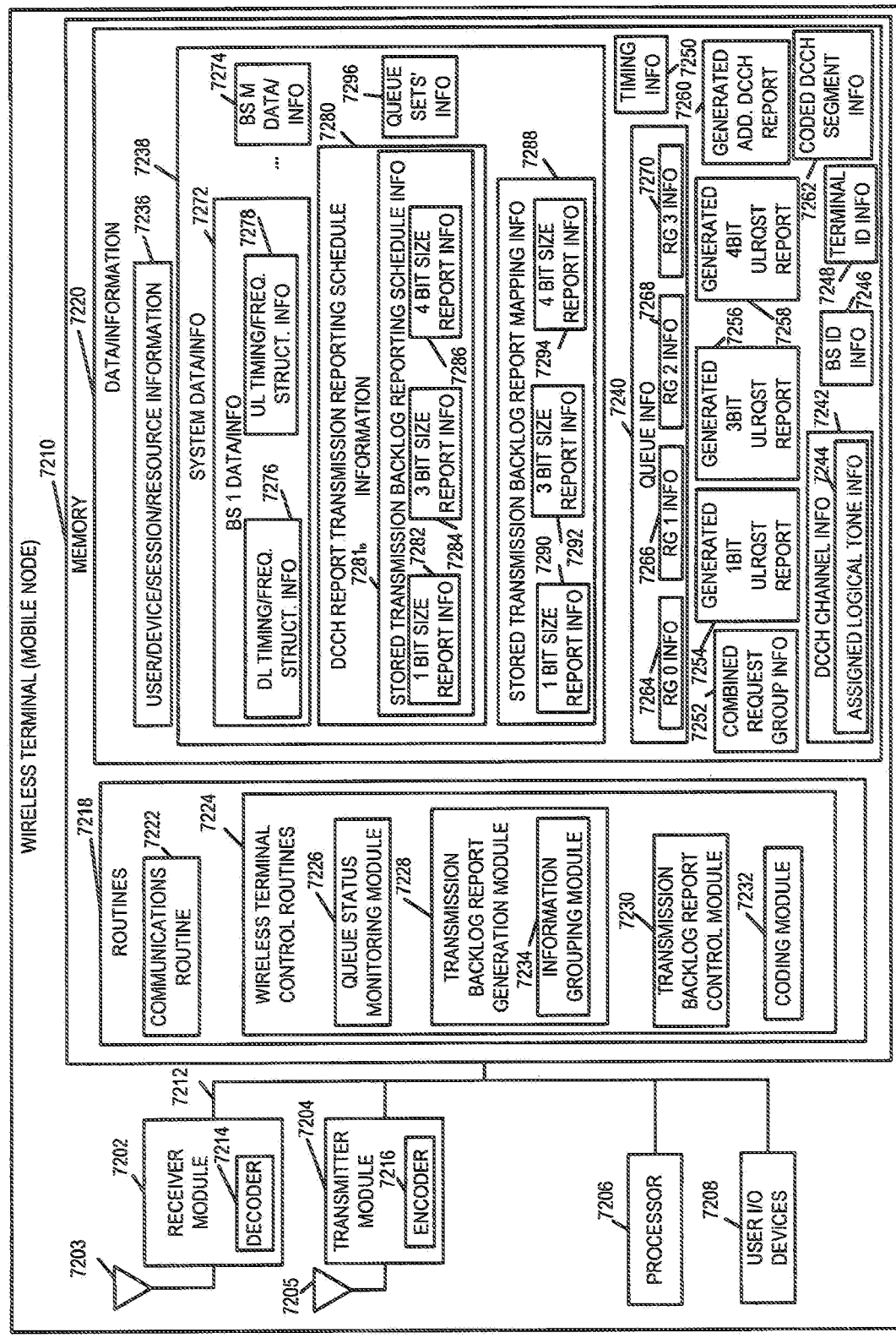
FIG. 72 is a drawing of an exemplary wireless terminal, e.g., mobile node, implemented in accordance with the present invention and using methods of the present invention.

FIG. 72 is a drawing of an exemplary wireless terminal 7200, e.g., mobile node, implemented in accordance with the present invention and using methods of the present invention. Exemplary WT 7200 may be any of the wireless terminals of the exemplary system of FIG. 1. Exemplary WT 7200 may be any of the WTs (136, 138, 144, 146, 152, 154, 168, 170, 172, 174, 176, 178) of exemplary system 100 of FIG. 1. Exemplary wireless terminal 7200 includes a receiver module 7202, a transmitter module 7204, a processor 7206, user I/O devices 7208, and a memory 7210 coupled together via a bus 7212 over which the various elements may interchange data/information.

Memory 7210 includes routines 7218 and data/information 7220. The processor 7206, e.g., a CPU, executes the routines 7218 and uses the data/information 7220 in memory 7210 to control the operation of the wireless terminal 7200 and implement methods of the present invention.

Receiver module 7202, e.g., an OFDM receiver, is coupled to receive antenna 7203 via which the wireless terminal 7200 receives downlink signals from base stations. Receiver module 7202 includes a decoder 7214 which decodes at least some of the received downlink signals. Received downlink signals include signals conveying base station attachment point identification information, e.g., beacon signals, and signals including base station assigned wireless terminal identifiers, e.g., an ON state identifier assigned to WT 7200 by a base station attachment point, the ON state identifier associated with dedicated control channel segments to be used by WT 7200. Other received downlink signals include assignment signals corresponding to uplink and/or downlink traffic channel segments and downlink traffic channel segment signals. Assignments of uplink traffic channel segments by a base station attachment point to WT 7200 may be in response to received backlog information reports from WT 7200.

Transmitter module 7204, e.g., an OFDM transmitter, is coupled to a transmit antenna 7205 via which the wireless terminal 7200 transmits uplink signals to base stations. Transmitter module 7204 is used for transmitting at least some of the generated backlog information reports. The transmitted generated backlog information reports are transmitted by transmitter module 7204 in uplink control channel segments dedicated to the wireless terminal 7200. Transmitter module 7204 is also used for transmitting uplink traffic channel segment signals. Transmitter module 7204 includes an encoder 7216 which is used to encode at least some of the uplink signals prior to transmission. In some embodiments, each individual dedicated control channel uplink segment is encoded independently of other dedicated control channel uplink segments. In various embodiments, the same antenna is used for both the transmitter and receiver.

User I/O devices 7208, e.g., microphone, keyboard, keypad, switches, camera, speaker, display, etc., are used to input/output user data, control applications, and control the operation of the wireless terminal, e.g., allowing a user of WT 7200 to initiate a communications session.

Routines 7218 includes a communications routine 7222 and wireless terminal control routines 7224. Communications routine 7222 performs various communications protocols used by wireless terminal 7200. Wireless terminal control routines 7224 controls operations of the wireless terminal 7200 including receiver module 7202 control, transmitter module 7204 control, and user I/O devices 7208 control. Wireless terminal control routines 7224 are used to implement methods of the present invention.

Wireless terminal control routines 7224 include a queue status monitoring module 7226, a transmission backlog report generation module 7228, a transmission backlog report control module 7230, and a coding module 7332. Queue status monitoring module 7266 monitors the amount of information in at least one of a plurality of different queues used to store information to be transmitted. The amount of information in a queue changes over time, e.g., as additional data/information needs to be transmitted, data/information is successfully transmitted, data/information needs to be retransmitted, data/information is dropped, e.g., due to a time consideration or due to the termination of a session or application. Transmission backlog report generation module 7288 generates different bit size backlog information reports providing transmission backlog information, e.g. 1 bit uplink request reports, 3 bit uplink request reports, and 4 bit uplink request reports. Transmission backlog report control module 7230 controls the transmission of generated backlog information reports. Transmission backlog report generation module 7228 includes an information grouping module 7234. Information grouping module 7234 groups status information corresponding to different sets of queues. Grouping module 7234 supports different information groupings for backlog information reports of different bit sizes. Coding module 7332 codes information to be transmitted in dedicated uplink control channel segments, and for at least some segments, the coding module 7332 codes a transmission backlog report with at least one additional backlog report used to communicate non-backlog control information. Possible additional reports, which are encoded with transmission backlog reports for a DCCH segment, include signal to noise ratio reports, self-noise report, an interference report, and a wireless terminal transmission power report.

Data/information 7220 includes user/device/session/resource information 7236, system data/information 7238, queue information 7240, DCCH channel information 7242 including assigned logical tone information 7244, base station identification information 7246, terminal identification information 7248, timing information 7250, combined request group information 7252, generated 1 bit uplink request report 7254, generated 3 bit uplink request report 7256, generated 4 bit uplink request report 7258, generated additional DCCH report 7260, and coded DCCH segment information 7262.

User/device/session/resource information 7236 includes information pertaining to communications sessions, e.g., peer node information, addressing information, routing information, state information, and resource information identifying uplink and downlink air link resources, e.g., segments, allocated to WT 7200. Queue information 7240 includes user data that WT 7200 intends to transmit, e.g., MAC frames of user data associated with a queue, and information identifying the amount of user data that WT 7200 intends to transmit, e.g., a total number of MAC frames associated with a queue. Queue information 7240 includes request group 0 information 7264, request group 1 information 7266, request group 2 information 7268, and request group 3 information 7270.

DCCH channel information 7242 includes information identifying DCCH segments allocated to WT 7200, e.g., information identifying a DCCH mode of operation, e.g., a full-tone DCCH mode or a split tone DCCH mode and information identifying an assigned logical DCCH tone 7244 in a DCCH channel structure being used by the base station attachment point. Base station identification information 7246 includes information identifying the base station attachment point being used by WT 7200, e.g., information identifying a base station, base station sector, and/or carrier or tone block pair associated with the attachment point. Terminal identification information 7248 includes WT 7200 identification information and base station assigned wireless terminal identifiers temporarily associated with WT 7200, e.g., a registered user identifier, an active user identifier, an ON state identifier associated with a logical DCCH channel tone. Timing information 7250 includes current timing information, e.g., identifying a current OFDM symbol time within a recurring timing structure. Timing information 7250 is used by transmission backlog report control module 7230 in conjunction with uplink timing/frequency structure information 7278 and stored transmission backlog reporting schedule information 7281 in deciding when to transmit different types of backlog reports. Combined request group information 7254 includes information pertaining to combinations of request groups, e.g., a value identifying the amount of information, e.g., total number of MAC frames, to be transmitted corresponding to the combination of request group 0 and request group 1.

Generated 1 bit uplink request report 7254 is a 1 information bit transmission backlog report generated by transmission backlog report generation module 7228 using queue information 7240 and/or combined request group information 7252, and 1 bit size report mapping information 7290. Generated 3 bit uplink request report 7256 is a 3 information bit transmission backlog report generated by transmission backlog report generation module 7228 using queue information 7240 and/or combined request group information 7252, and 3 bit size report mapping information 7292. Generated 4 bit uplink request report 7258 is a 4 information bit transmission backlog report generated by transmission backlog report generation module 7228 using queue information 7240 and/or combined request group information 7252, and 4 bit size report mapping information 7294. Generated additional DCCH report 7260 is, e.g., a generated downlink absolute SNR report, a generated delta SNR report, a generated interference report, e.g., a beacon ratio report, a generated self-noise report, e.g., a WT self-noise report of saturation level of SNR, a WT power report, e.g., a WT transmission power backoff report. Coding module 7234 codes a transmission backlog report 7254, 7256, 7258, with a generated additional report 7260, for a given DCCH segment, obtaining coded DCCH segment information. In this exemplary embodiment, each DCCH segment is the same size, e.g., uses the same number of tone-symbols, regardless of whether the transmission backlog report included in the DCCH segment is a 1 bit report, 3 bit report, or 4 bit report. For example, for one DCCH segment a 1 bit UL request transmission backlog report is jointly coded with a 5 bit downlink absolute SNR report; for another DCCH segment a 3 bit UL request transmission backlog report is jointly coded with a 3 bit downlink delta SNR report; for another DCCH segment a 4 bit UL request transmission backlog report is jointly coded with a 2 bit reserved report.

System data/information 7238 includes a plurality of sets of base station information (BS 1 data/information 7272, ..., BS M data/information 7274), dedicated control channel report transmission reporting schedule information 7280, stored transmission backlog report mapping information 7288, and queue sets' information 7296. BS1 data/information 7272 includes downlink timing/frequency structure information 7276 and uplink timing/frequency structure information 7278. Downlink timing/frequency structure information 7276 includes downlink carrier information, downlink tone block information, number of downlink tones, downlink tone hopping information, downlink channel segment information, OFDM symbol timing information, and grouping of OFDM symbols. Uplink timing/frequency structure information 7278 includes uplink carrier information, uplink tone block information, number of uplink tones, uplink tone hopping information, uplink channel segment information, OFDM symbol timing information, and grouping of OFDM symbols. DCCH report transmission reporting schedule information 7280 includes stored transmission backlog reporting schedule information 7281. FIG. 10 provides exemplary DCCH transmission schedule information corresponding to a recurring schedule of 40 indexed DCCH segments in a beaconslot for a full-tone DCCH mode of operation, the beaconslot being a structure used in the timing/frequency structure of the base station. Stored transmission backlog reporting schedule information includes information identifying the location of each of transmission backlog reports, e.g., the location of the ULRQST1, ULRQST3, and ULRQST4 reports in FIG. 10. The stored transmission backlog reporting scheduling information 7281 is used by the transmission backlog report control module 7230 in determining when to transmit a report of a particular bit size. The stored transmission backlog reporting schedule information 7281 includes 1 bit size report information 7282, 3 bit size report information 7284, and 4 bit size report information 7286. For example, with respect to FIG. 10, 1 bit size report information 7282 includes information identifying that an ULRQST1 report corresponds to the LSB of DCCH segment with index s2=0; 3 bit size report information 7284 includes information identifying that an ULRQST3 report corresponds to the 3 LSBs of DCCH segment with index s2=2; 4 bit size report information 7286 includes information identifying that an ULRQST4 report corresponds to the 4 LSBs of DCCH segment with index s2=4.

The stored transmission backlog scheduling information 7281 indicates that more 1 bit size backlog reports are to be transmitted than 3 bit size backlog reports in one iteration of the transmission report schedule. The stored transmission backlog scheduling information 7281 also indicates that more or the same number of 3 bit size backlog reports are to be transmitted than 4 bit size backlog reports in one iteration of the transmission report schedule. For example, in FIG. 10, there are 16 identified ULRQST1 reports, 12 identified ULRQST3 reports, and 9 identified ULRQST4 reports. In this exemplary embodiment corresponding to FIG. 10, the flexible reports, Body 4 reports, may convey a 4 bit ULRQST report, and under a case where the 3 flexible reports, of one iteration of the reporting structure, carry a ULRQST4 report, the wireless terminal communicates 12 ULRQST4 reports.

Stored transmission backlog report mapping information 7288 includes 1 bit size report information 7290, 3 bit size report information 7292, and 4 bit size report information 7294. Examples of 1 bit size report mapping information 7290 includes FIG. 16 and FIG. 61. Examples of 3 bit size report mapping information include FIGS. 19, 21, 23, 25, 64, 66, 68, and 70. Examples of 4 bit size report mapping information include FIGS. 18, 20, 22, 24, 63, 65, 67, and 69. Stored transmission backlog mapping information 7288 includes information indicating a mapping between queue status information and bit patterns that can be communicated using the different bit size backlog reports. In this exemplary embodiment, the 1 bit size backlog report provides backlog information corresponding to a plurality of different transmission queues; the one bit indicates the existence of information to be transmitted or lack thereof corresponding to the combination of request group 0 and request group 1. In various embodiments, the smallest bit size, e.g., 1 bit size, backlog report is used for highest priority traffic, e.g., where the highest priority is voice or control traffic. In some embodiments, the second bit size report, e.g., the 3 bit size report, communicates a delta, with respect to a previously communicated third bit size report, e.g., 4 bit size report; FIGS. 63 and 64 illustrates such a relationship. In some embodiments, the second fixed size report, e.g., the 3 bit size report, provides information on two sets of queues. For example, consider FIG. 41, the second type of report communicates information on a second set of queues and a third set of queues. In various embodiments, the third size report, e.g., the 4 bit size report, provides information on one set of queues. In some such embodiments, the one set of queues includes one request group queue, two request group queues, or three request group queues. In some embodiments, there are predetermined number of request groups for uplink traffic, e.g., four, RG0, RG1, RG2, and RG3, and a third fixed size report, e.g., the four bit size report is capable of communicating backlog information corresponding to any of the different request group queues. For example, consider FIG. 41, a third type report communicates information on one of a fourth set of queues, a fifth set of queues, a sixth set of queues or a seventh set of queues, and for any given dictionary the third type of report is capable of communicating information pertaining to RG0, RG1, RG2, and RG3.

Queue sets' information 7296 including information identifying grouping of queues to be used when generating transmission backlog reports. FIG. 41 illustrates exemplary groupings of queues used in various exemplary types of transmission backlog reports.

Figure 74:
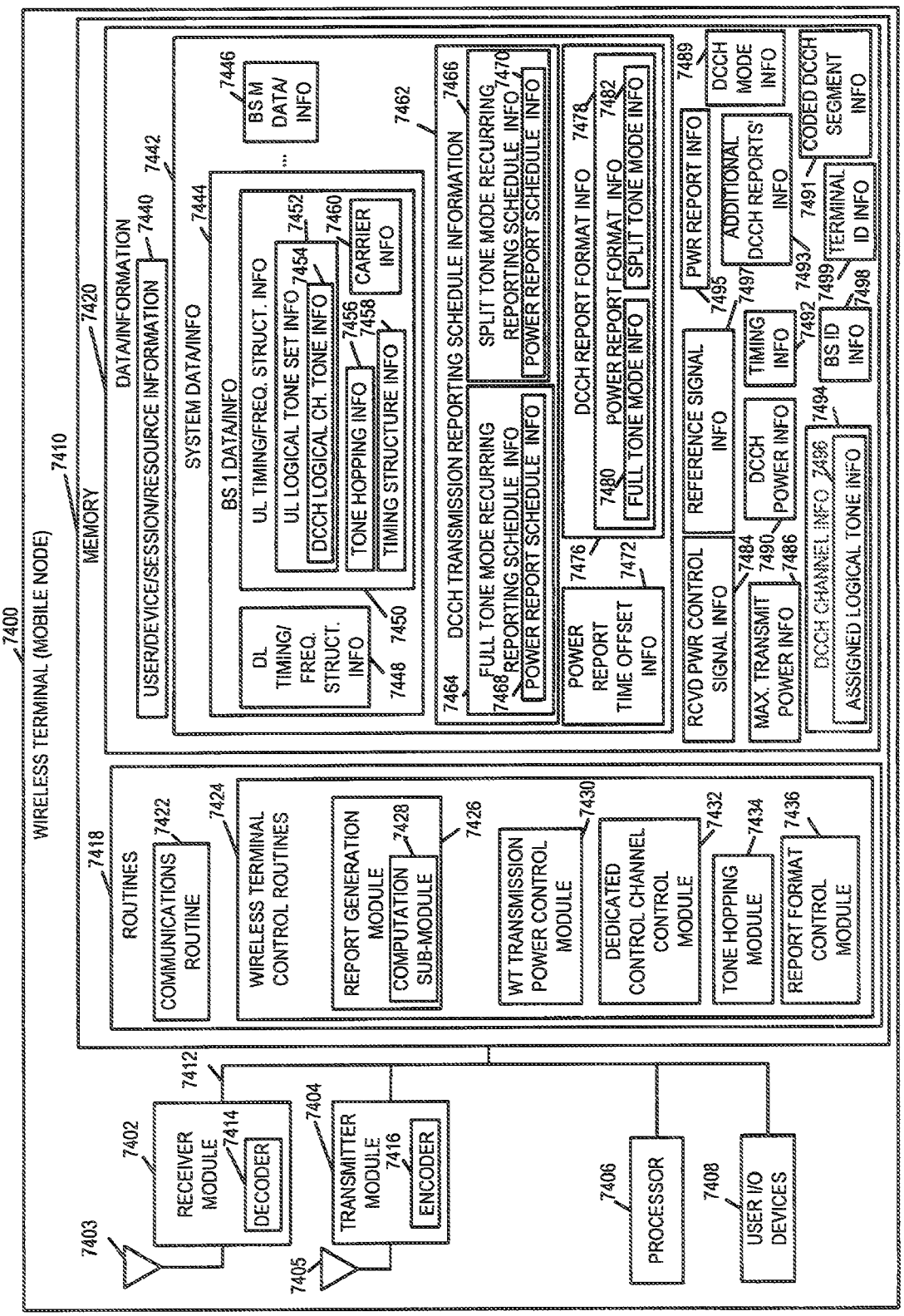
FIG. 74 is a drawing of an exemplary wireless terminal, e.g., mobile node, implemented in accordance with the present invention and using methods of the present invention.

FIG. 74 is a drawing of an exemplary wireless terminal 7400, e.g., mobile node, implemented in accordance with the present invention and using methods of the present invention. Exemplary wireless terminal 7400 may be any of the wireless terminals of FIG. 1. Exemplary wireless terminal 7400 includes a receiver module 7402, a transmitter module 7404, a processor 7406, user I/O devices 7408, and memory 7410 coupled together via a bus 7412 over which the various elements interchange data and information.

Memory 7410 includes routines 7418 and data/information 7420. The processor 7406, e.g., a CPU, executes the routines 7418 and uses the data/information 7420 in memory 7410 to control the operation of the wireless terminal 7400 and implement methods of the present invention. User I/O devices 7408, e.g., microphone, keyboard, keypad, switches, camera, display, speaker, etc., are used to input user data, output user data, allow a user to control applications, and/or control various functions of the wireless terminal, e.g., initiate a communications session.

Receiver module 7402, e.g., an OFDM receiver, is coupled to a receive antenna 7403 via which the wireless terminal 7400 receives downlink signals from base stations. Received downlink signals include, e.g., beacon signals, pilot signals, downlink traffic channel signals, power control signals including closed loop power control signals, timing control signals, assignment signals, registration response signals, and signals including base station assigned wireless terminal identifiers, e.g., an ON state identifier associated with a DCCH logical channel tone. Receiver module 7402 includes a decoder 7414 used to decode at least some of the received downlink signals.

Transmitter module 7404, e.g., an OFDM transmitter, is coupled to a transmit antenna 7405 via which the wireless terminal 7400 transmits uplink signals to base stations. In some embodiments, the same antenna is used for receiver and transmitter, e.g., the antenna is coupled through a duplexer module to receiver module 7402 and transmitter module 7404. Uplink signals include, e.g., registration request signals, dedicated control channel segment signals, e.g., conveying a reference signal which can be measured by a base station and reports including WT power reports such as a WT transmission power backoff report, and uplink traffic channel segment signals. Transmitter module 7404 includes an encoder 7416 used to encode at least some of the uplink signals. DCCH segments, in this embodiment, are encoded on a per segment basis.

Routines 7418 includes a communications routine 7422 and wireless terminal control routines 7422. The communications routine 7422 implements the various communications protocols used by the wireless terminal 7400. Wireless terminal control routines 7422 include a report generation module 7426, a wireless terminal transmission power control module 7430, a dedicated control channel control module 7432, a tone hopping module 7434, and a report format control module 7436. Report generation module 7426 includes a computation sub-module 7428.

Report generation module 7426 generates power reports, e.g., wireless terminal transmission power backoff reports, each power report indicating a ratio of a maximum transmit power of the wireless terminal to the transmit power of a reference signal having a power level known to the wireless terminal at a point in time corresponding to the power report. Wireless terminal transmission power control module 7430 is used for controlling the wireless terminal's transmission power level based on information including at least one closed loop power level control signal received from a base station. The closed loop power control signal received from the base station may be a signal used to control the wireless terminal transmitter power so that a desired received power level is achieved at the base station. In some embodiments, the base station does not have actual knowledge of the wireless terminals actual transmission power level and/or maximum transmit power level. In some system implementations different devices may have different maximum transmit power levels, e.g., a desk top wireless terminal may have a different maximum transmission power capability than a portable notebook computer implemented wireless terminal, e.g., operating off battery power.

Wireless terminal transmission power control module 7430 performs closed loop power control adjustments of a transmission power level associated with the dedicated control channel. Dedicated control channel control module 7432 determines which single logical tone in a plurality of logical tones is to be used for the dedicated control channel signaling, said single logical tone being dedicated to the wireless terminal for use in transmitting control signaling using a set of dedicated control channel segments.

Tone hopping module 7434 determines at different points in time a single physical OFDM tone to be used to communicate dedicated control channel information during a plurality of consecutive OFDM symbol transmission time intervals. For example, in one exemplary embodiments, a dedicated control channel segment corresponding to a single dedicated control channel logical tone includes 21 OFDM tone-symbol, the 21 OFDM tone-symbols comprising three sets of 7 OFDM tone-symbols, each set of seven OFDM tone-symbols corresponding to a half-slot of seven consecutive OFDM symbol transmission time periods and corresponding to a physical OFDM tone, each of the three sets may correspond to a different physical OFDM tone with the OFDM tone for a set being determined in accordance with tone hopping information. Report format control module 7436 controls the format of the power report as a function of which one of a plurality of dedicated control channel modes of operation is being used by the wireless terminal 7400 at the time the report is transmitted. For example, in one exemplary embodiment, the wireless terminal uses a 5 bit format for the power report when in a full-tone DCCH mode of operation and uses a 4 bit power report when in a split-tone mode of operation.

Computation sub-module 7428 subtracts a per-tone transmission power of an uplink dedicated control channel in dBm from a maximum transmission power of the wireless terminal in dBm. In some embodiments, the maximum transmission power is a set value, e.g., a predetermined value stored in the wireless terminal or a value communicated to the wireless terminal, e.g., from a base station, and stored in the wireless terminal. In some embodiments, the maximum transmission power depends on a power output capacity of the wireless terminal. In some embodiments, the maximum transmission power is dependent upon the type of wireless terminal. In some embodiments, the maximum transmission power is dependent upon a mode of operation of the wireless terminal, e.g., with different modes corresponding to at least two of the following: operation using an external power source, operation using a battery, operation using a battery having a first level of energy reserve, operation using a battery having a second level of energy reserve, operation using a battery with an expected amount of energy reserve to support a first duration of operational time, operation using a battery with an expected amount of energy reserve to support a second duration of operational time, operation in a normal power mode, operation in a power saving mode said maximum transmit power in the power saving mode being lower than said maximum transmit power in said normal power mode. In various embodiments, the maximum transmission power value is a value which has been selected to be in compliance with a government regulation limiting the maximum output power level of the wireless terminal, e.g., the maximum transmission power value is selected to be the maximum permissible level. Different devices may have different maximum power level capabilities which may or may not be known to a base station. The base station can, and in some embodiments does, use the backoff report in determining the supportable uplink traffic channel data throughput, e.g., per transmission segment throughput, which can be supported by the wireless terminal. This is because the backoff report provides information about the additional power which can be used for traffic channel transmissions even though the base station may not know the actual transmission power level being used or the maximum capability of the wireless terminal since the backoff report is provided in the form of a ratio.

In some embodiments the wireless terminal can support one or more wireless connections at the same time, each connection having a corresponding maximum transmission power level. The maximum transmission power levels, indicated by values, may be different for different connections. In addition, for a given connection the maximum transmission power level may vary over time, e.g., as the number of connections being supported by the wireless terminal varies. Thus, it may be noted that even if the base station knew the maximum transmission power capability of a wireless terminal, the base station may not be aware of the number of communications links being supported by the wireless terminal at a particular point in time. However, the backoff report provides information which informs the base station about the available power for a given connection without requiring the base station to know about other possible existing connections which may be consuming power resources.

Data/information 7420 includes user/device/session/resource information 7440, system data 7442, received power control signal information 7484, maximum transmission power information 7486, DCCH power information 7490, timing information 7492, DCCH channel information 7494, base station identification information 7498, terminal identification information 7499, power report information 7495, additional DCCH reports' information 7493, coded DCCH segment information 7491, and DCCH mode information 7489. DCCH channel information 7494 includes assigned logical tone information 7496, e.g., information identifying the single logical DCCH channel tone currently allocated to the wireless terminal by a base station attachment point.

User/device/session/resource information 7440 includes user identification information, username information, user security information, device identification information, device type information, device control parameters, session information such as peer node information, security information, state information, peer node identification information, peer node addressing information, routing information, air link resource information such as uplink and/or downlink channel segments assigned to WT 7400. Received power control information 7484 includes received WT power control commands from a base station, e.g., to increase, decrease or do not change the transmission power level of the wireless terminal with respect to a control channel being closed loop power controlled, e.g., a DCCH channel. Maximum transmit power information 7486 includes a maximum wireless terminal transmit power value to be used in generating a power report. Reference signal information 7496 includes information identifying the reference signal to be used in the power report calculation, e.g., as the DCCH channel signal, and a transmit power level of the reference signal at a point in time, the point in time being determined based on the start transmit time of the DCCH segment in which the power report is communicated and power report time offset information 7472. DCCH power information 7490 is the result of computation sub-module 7428 which the maximum transmit power information 7486 and the reference signal info 7497 as input. DCCH power information 7490 is represented by a bit pattern in power report information 7495 for communicating a power report. Additional DCCH reports' information 7493 includes information corresponding to other types of DCCH reports, e.g., other DCCH reports such as a 1 bit uplink traffic channel request report or a 4 bit uplink traffic channel request report, which is communicated in the same DCCH segment as a power report. Coded DCCH segment information 7491 includes information representing a coded DCCH segment, e.g., a DCCH segment conveying a power report and an additional report. Timing information 7492 includes information identifying the timing of the reference signal information and information identifying the timing of the start of a DCCH segment to be used to communicate a power report. Timing information 7492 includes information identifying the current timing, e.g., relating indexed OFDM symbol timing within an uplink timing and frequency structure to recurring DCCH reporting schedule information, e.g., to indexed DCCH segments. Timing information 7492 is also used by the tone hopping module 7344 to determine tone hopping. Base station identification information 7498 includes information identifying the base station, base station sector, and/or base station tone block associated with a base station attachment point being used by the wireless terminal. Terminal identification information 7499 includes wireless terminal identification information including base station assigned wireless terminal identifiers, e.g., a base station assigned wireless terminal ON state identifier to be associated with DCCH channel segments. DCCH channel information 7496 includes information identifying the DCCH channel, e.g., as a full-tone channel or as one of a plurality of split tone channel. Assigned logical tone information 7496 includes information identifying the logical DCCH tone to be used by the WT 7400 for its DCCH channel, e.g., one DCCH logical tone from the set of tones identified by information 7454, the identified tone corresponding to a base station assigned WT ON state identifier of terminal ID information 7499. DCCH mode information 7489 includes information identifying the current DCCH mode of operation, e.g., as a full-tone format mode of operation or a split-tone format mode of operation. In some embodiments, DCCH mode information 7489 also includes information identifying different mode of operation corresponding to different values for the maximum transmit power information, e.g., a normal mode and a power saving mode.

System data/information 7442 includes a plurality of sets of base station data/information (BS 1 data/information 7444, BS M data/information 7446), DCCH transmission reporting schedule information 7462, power report time offset information 7472 and DCCH report format information 7476. BS 1 data/information 7442 includes downlink timing/frequency structure information 7448 and uplink timing/frequency structure information 7450. Downlink timing/frequency structure information 7448 includes information identifying downlink tone sets, e.g., a tone block of 113 tones, downlink channel segment structure, downlink tone hopping information, downlink carrier frequency information, and downlink timing information including OFDM symbol timing information and grouping of OFDM symbols, as well as timing information relating the downlink and uplink. Uplink timing/frequency structure information 7450 includes uplink logical tone set information 7452, tone hopping information 7456, timing structure information 7458, and carrier information 7460. Uplink logical tone set information 7452, e.g., information corresponding to a set of 113 uplink logical tones in an uplink channel structure being used by a base station attachment point, includes DCCH logical channel tone information 7454, e.g., information corresponding to a subset of 31 logical tones used for the dedicated control channel with a wireless terminal in the ON state using the BS1 attachment point receiving one of the 31 tones to use for its dedicated control channel segment signaling. Carrier information 7460 includes information identifying the uplink carrier frequency corresponding to a base station 1 attachment point.

DCCH transmission reporting schedule information 7462 includes DCCH full tone mode recurring reporting schedule information 7464 and split-tone mode recurring reporting schedule information 7466. Full tone mode recurring reporting schedule information 7464 includes power report schedule information 7468. Split tone mode recurring reporting schedule information 7466 includes power report schedule information 7470. DCCH report format information 7476 includes power report format information 7478. Power report format information 7478 includes full-tone mode information 7480 and split tone mode information 7482.

DCCH transmission reporting scheduling information 7462 is used in controlling the transmission of generated DCCH reports. Full tone mode recurring reporting scheduling information 7464 is in for controlling DCCH reports when the wireless terminal 7400 is operating in a full-tone mode of DCCH operation. Drawing 1099 of FIG. 10 illustrates exemplary full-tone mode DCCCH recurring reporting schedule information 7464. Exemplary power report schedule information 7468 is information indicating that segment 1006 with index s2=6 and segment 1026 with index s2=26 are each used to convey a 5 bit wireless terminal uplink transmission power backoff report (ULTXBKF5). Drawing 3299 of FIG. 32 illustrates exemplary split-tone mode DCCCH recurring reporting schedule information 7466. Exemplary power report schedule information 7470 is information indicating that segment 3203 with index s2=3 and segment 3221 with index s2=21 are each used to convey a 4 bit wireless terminal uplink transmission power backoff report (ULTXBKF4).

DCCH report format information 7476 indicates formats used for each of the DCCH reports, e.g., number of bits in a report, and the information associated with each of potential bit patterns that can be communicated with the report. Exemplary full-tone mode power report format information 7480 includes information corresponding to Table 2600 of FIG. 26 illustrating the format of ULTxBKF5. Exemplary split-tone mode power report format information 7482 includes information corresponding to Table 3500 of FIG. 35 illustrating the format of ULTxBKF4. Backoff Reports ULTxBKF5 and ULTxBKF4 indicate a dB value.

Power report time offset information 7472 includes information indicating a time offset between the point in time to which a generated power report corresponds, e.g., provides information for, and a start of a communications segment in which said report is to be transmitted. For example, consider that a ULTxBKF5 report is to be communicated in an exemplary uplink segment corresponding to segment 1006 with index s2=6 of a beaconslot and consider that the reference signal used in generating the report is the dedicated control channel signal, power report time offset information 7472. In such a case, the time offset information 7472 includes information indicating a time offset between the time to which the report information corresponds, e.g., the OFDM symbol transmission time interval prior to the transmission time of the report corresponding to the reference signal, e.g., DCCH signal, transmission power level and a start of the segment 1006 transmission.

FIG. 75 is a drawing 7500 used to explain features of an exemplary embodiment of the present invention using a wireless terminal transmission power report. Vertical axis 7502 represents the transmission power level of the wireless terminal's dedicated control channel, e.g., a single tone channel, while horizontal axis represents time 7504. The dedicated control channel is used by the wireless terminal to communicate various uplink control information reports via dedicated control channel segment signals. The various uplink control information reports include a wireless terminal transmission power report, e.g., a WT transmission power backoff report, and other addition control information reports, e.g., uplink traffic channel request reports, interference reports, SNR reports, self-noise reports, etc.

Each small shaded circle, e.g., circle 7506, is used to represent the transmission power level of the dedicated control channel at a corresponding point in time. For example, each point in time, in some embodiments, corresponds to an OFDM symbol transmission time interval and the identified power level is the power level associated with the modulation symbol corresponding to the single tone of the WT's DCCH channel during that OFDM symbol transmission time interval. In some embodiments, each point in time, corresponds to a dwell, e.g., representing a fixed number, e.g., seven, of consecutive OFDM symbol transmission time periods using the same physical tone for the wireless terminal's DCCH channel.

Dashed line box 7514 represents a DCCH segment which conveys a WT transmission power backoff report. The segment includes multiple OFDM symbol transmission time periods. In some embodiments, a DCCH segment includes 21 OFDM tone-symbols and includes 21 OFDM symbol transmission time intervals, one OFDM tone-symbol corresponding to each of the 21 OFDM symbol transmission time intervals. The exemplary transmission backoff report indicates a ratio of a maximum transmission power of the WT, e.g., a set value, to the transmit power of a reference signal. In this exemplary embodiment, the reference signal is the DCCH channel signal at a point in time which is offset from the start of the DCCH segment used to communicate the transmission power backoff report. Time 7516 identifies the start of the DCCH segment conveying the WT transmission power backoff report. Time offset 7518, e.g., a predetermined value, relates time 7516 to time 7512 which is the transmission time of the reference signal used to generate the power report of segment 7514. X 7508 identifies the reference signal in terms of a power level 7510 and the time 7512.

In addition to the DCCH control channel which is used in various embodiments for wireless terminals in an ON state, it should be appreciated that the system of the present invention also supports additional dedicated uplink control signaling channels, e.g., timing control channels and/or state transition request channels which may be dedicated to a wireless terminal. These additional channels may exist in the case of the hold state in addition to the ON state with terminals in the ON-State being provided the DCCH control channel in addition to the timing and state transition request channels. Signaling on the timing control and/or state transition request channels occurs at a much lower rate than signaling on the DCCH control channel, e.g., at rate ⅕ or less from the wireless terminals perspective. In some embodiments, the dedicated uplink channels provided in the hold state based on Active user IDs assigned by the base station attachment point while DCCH channel resources are allocated by the base station attachment point based on information including an ON state identifier assigned by the base station attachment point.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

While described in the context of an OFDM system, at least some of the methods and apparatus of the present invention, are applicable to a wide range of communications systems including many non-OFDM and/or non-cellular systems.

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a wireless terminal to provide transmission power information to a base station, the method comprising:
   determining a power difference between a maximum transmit power of the wireless terminal and a transmit power estimate, the transmit power estimate corresponding to a transmission power level of a tone of a dedicated uplink channel at a point in time;
   generating a power report, the power report including the power difference;
   transmitting the power report, wherein the point in time is offset from a start of a communications segment in which the power report is transmitted; and
   repeating the determining, generating, and transmitting steps according to a report transmission schedule.

2. The method of claim 1, wherein determining the power difference comprises comparing the transmit power estimate of the dedicated uplink channel to the maximum transmit power.

3. The method of claim 1, wherein the transmission power level of the tone of the dedicated uplink channel is controlled by the wireless terminal based on at least one closed loop power level control signal received from the base station.

4. The method of claim 3, wherein the dedicated uplink channel includes a control information signal transmitted over the dedicated uplink channel to the base station.

5. The method of claim 1, wherein the power report corresponds to the point in time.

6. The method of claim 5, wherein a format of the power report depends on which one of a plurality of information reporting modes used at the time the power report is transmitted.

7. The method of claim 1, wherein the power report indicates a dB value.

8. A wireless terminal, comprising:
a report generation module for determining a power difference between a maximum transmit power of the wireless terminal and a transmit power estimate, the transmit power estimate corresponding a transmission power level of a tone of a dedicated uplink channel at a point in time, and generating a power report, the power report including the power difference;
a transmitter for transmitting the power report to a base station, wherein the point in time is offset from a start of a communications segment in which the power report is to be transmitted;
memory storing transmission schedule information for use in controlling the transmission of reports generated by the report generation module according to a report transmission schedule.

9. The wireless terminal of claim 8, wherein determining a difference comprises comparing the transmit power estimate of the dedicated uplink channel to the maximum transmit power.

10. The wireless terminal of claim 8, wherein the transmission power level of the tone of the dedicated uplink channel is controlled by the wireless terminal based on at least one closed loop power level control signal received from the base station.

11. The wireless terminal of claim 10, wherein the dedicated uplink channel includes a control information signal transmitted over a dedicated control channel to the base station.

12. The wireless terminal of claim 8, wherein the power report corresponds to the point in time.

13. The wireless terminal of claim 12, wherein a format of the power report depends on which one of a plurality of control information reporting modes used at the time the power report is transmitted.

14. The wireless terminal of claim 8, wherein the power report indicates a dB value.

15. A wireless terminal, comprising:
means for determining a power difference between a maximum transmit power of the wireless terminal and a transmit power estimate, the transmit power estimate corresponding to a transmission power level of a tone of a dedicated uplink channel at a point in time, and means for generating a power report, the power report including the power difference;
means for transmitting the power report, wherein the point in time is offset from a start of a communications segment in which the power report is to be transmitted; and
means for operating the means for determining, the means for generating, and the means for transmitting according to a report transmission schedule.

16. The wireless terminal of claim 15, wherein the means for determining compares the transmit power estimate of the dedicated uplink channel to the maximum transmit power.

17. A non-transitory computer readable medium embodying computer executable instructions, for use in a wireless terminal, the computer readable medium comprising instructions for causing a processor to perform the steps of:
determining a power difference between a maximum transmit power of the wireless terminal and a transmit power estimate, the transmit power estimate corresponding to a transmission power level of a tone of a dedicated uplink channel at a point in time;
generating a power report, the power report including the power difference;
transmitting the power report, wherein the point in time is offset from a start of a communications segment in which the power report is to be transmitted; and
repeating the determining, generating and transmitting steps according to a report transmission schedule.

18. The non-transitory computer readable medium of claim 17, wherein the step of determining compares the transmit power estimate of the dedicated uplink channel to the maximum transmit power.

* * * * *